INPUT ITEM COUNTER

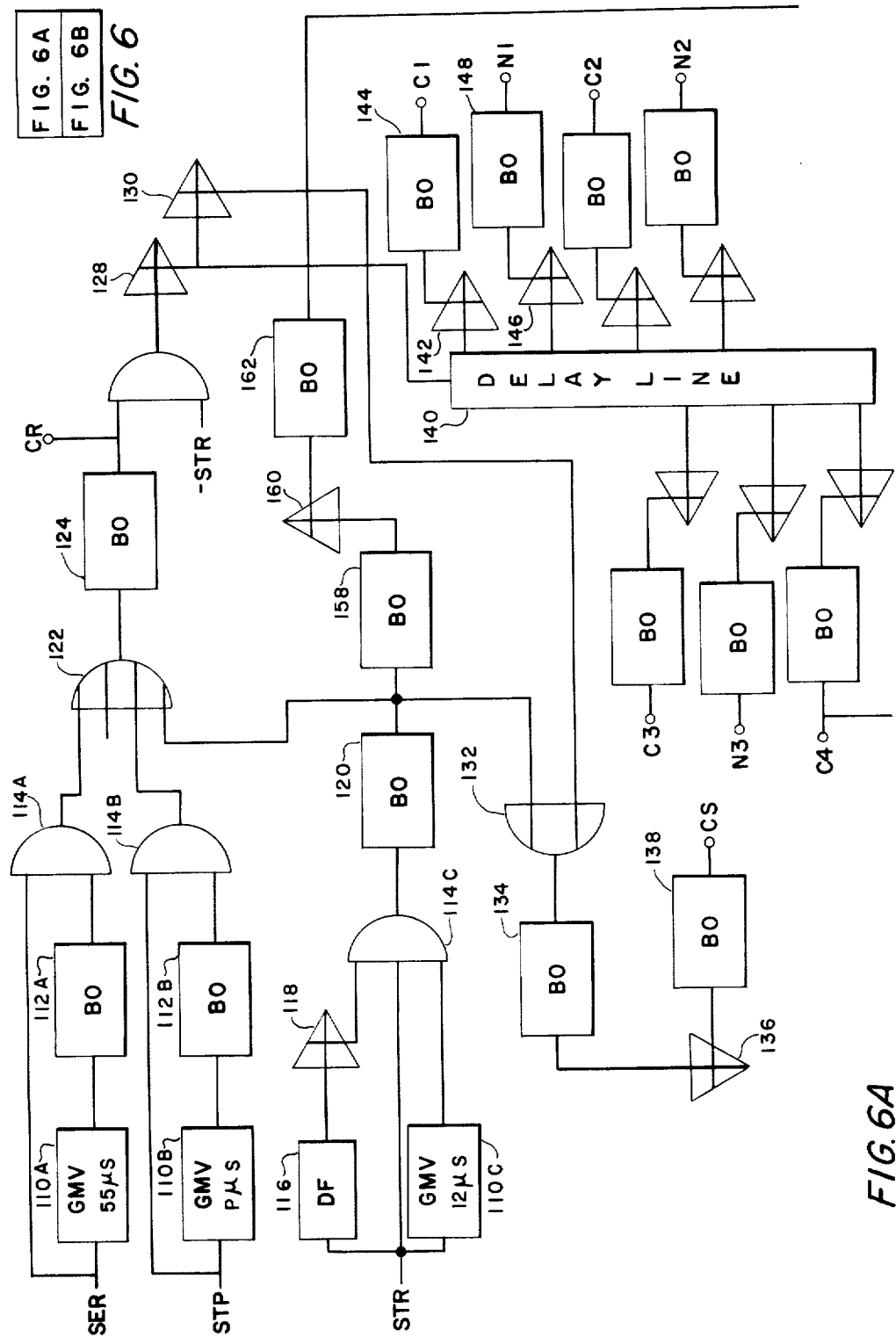

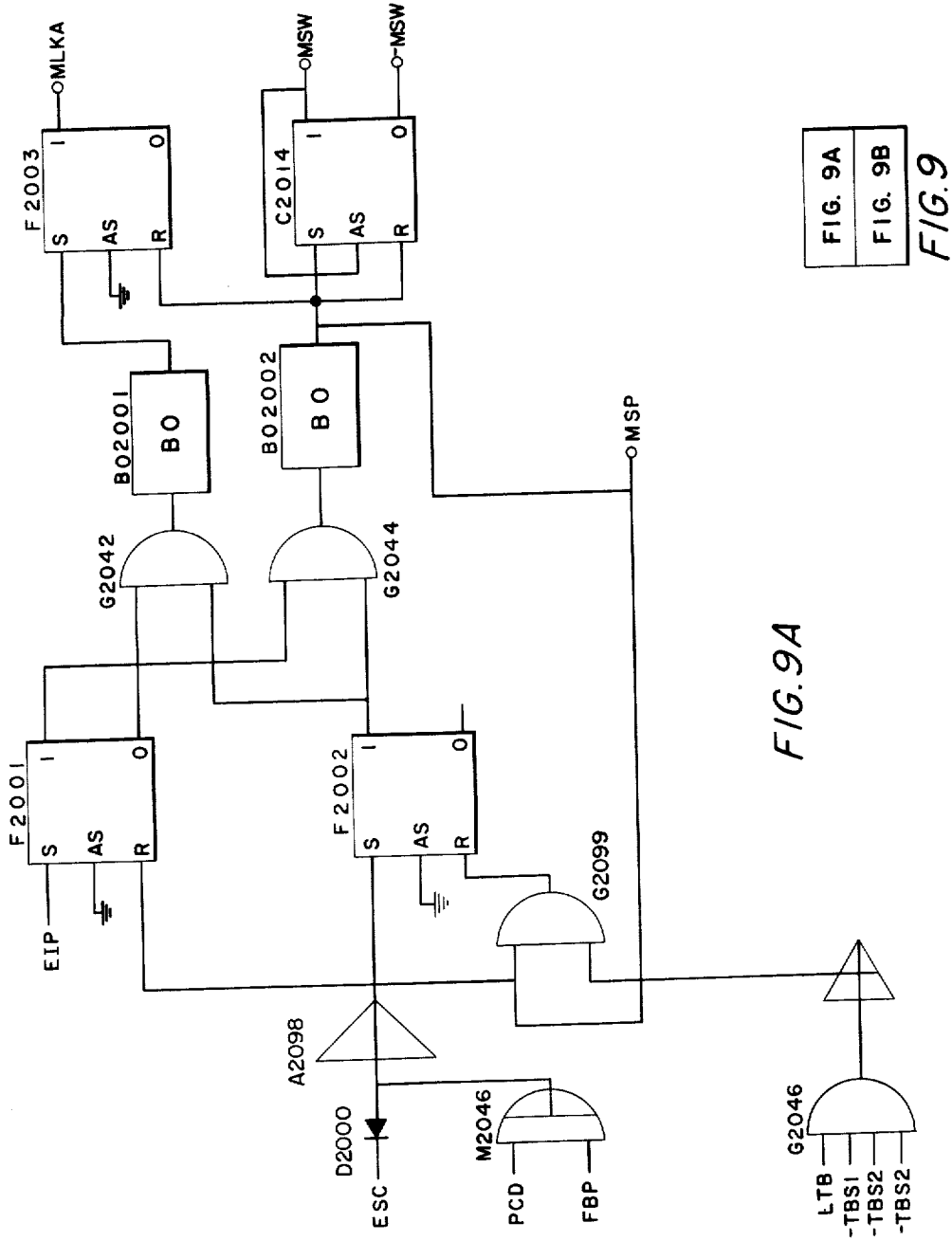

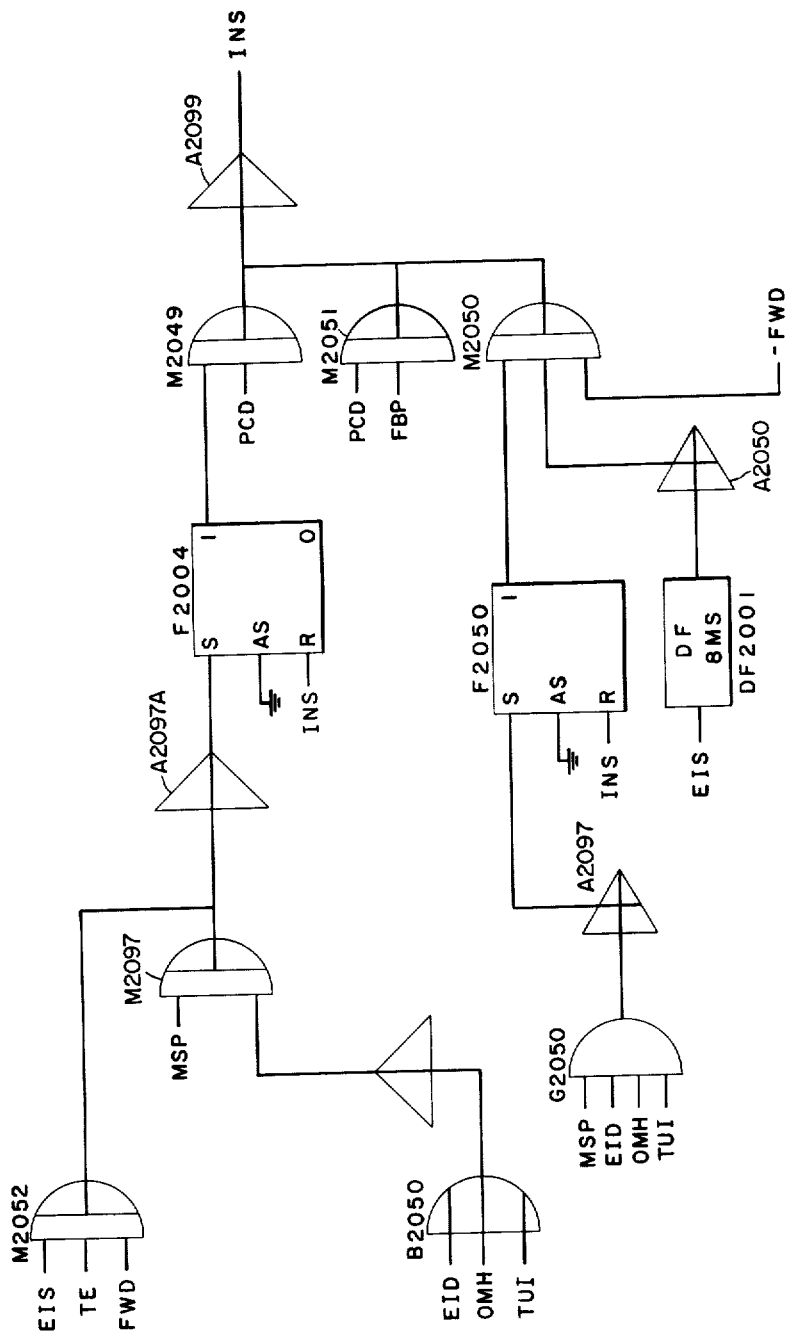

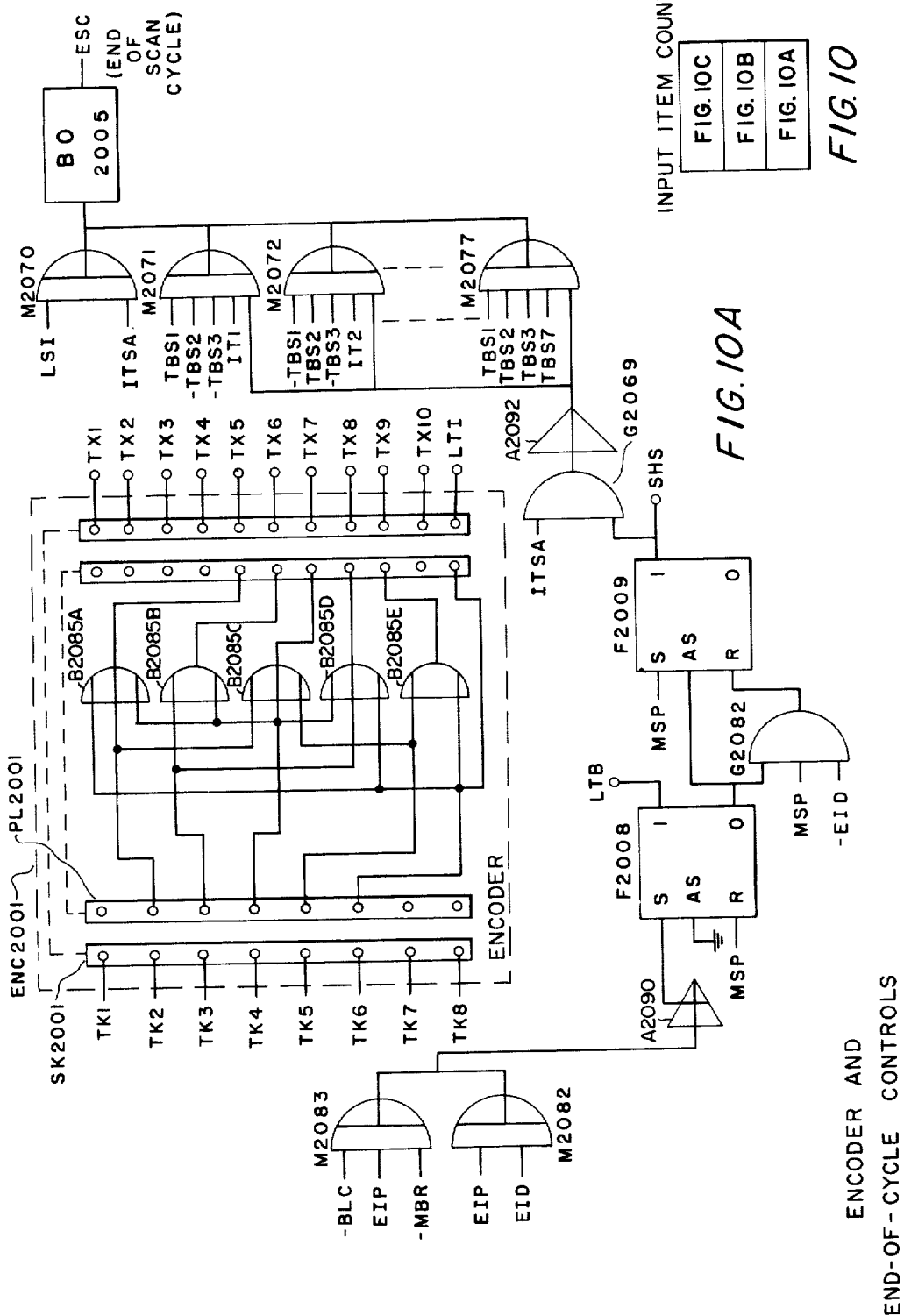

INPUT MEMORY UNIT
DATA CIRCUITS

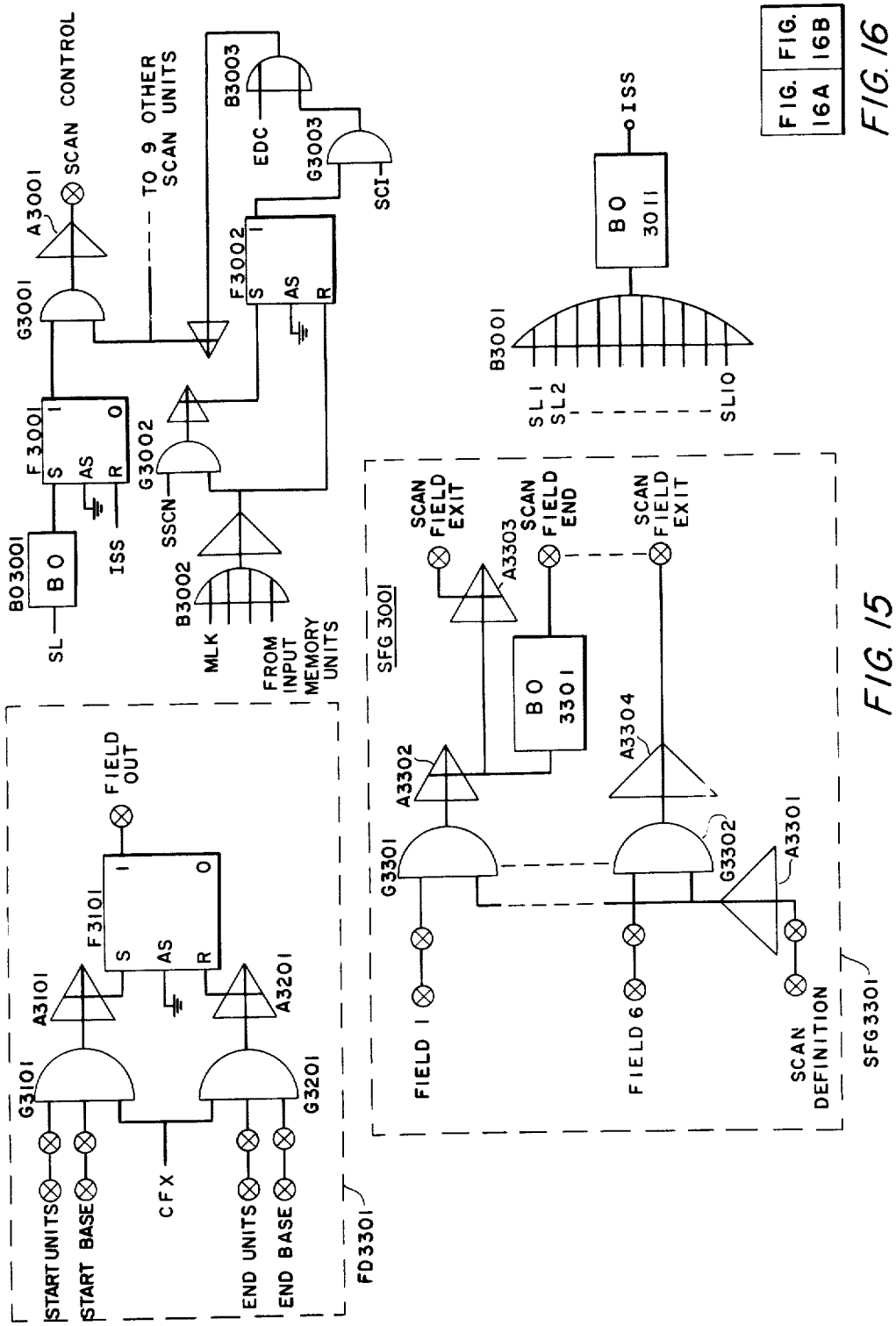

FIG. 16A

FIELD DEFINITION
AND
SCAN CONTROL BOARD

SECTION B

*FIG. 16B*

DATA TRANSFER CIRCUITS

OUTPUT MEMORY UNIT
MEMORY SWITCHING

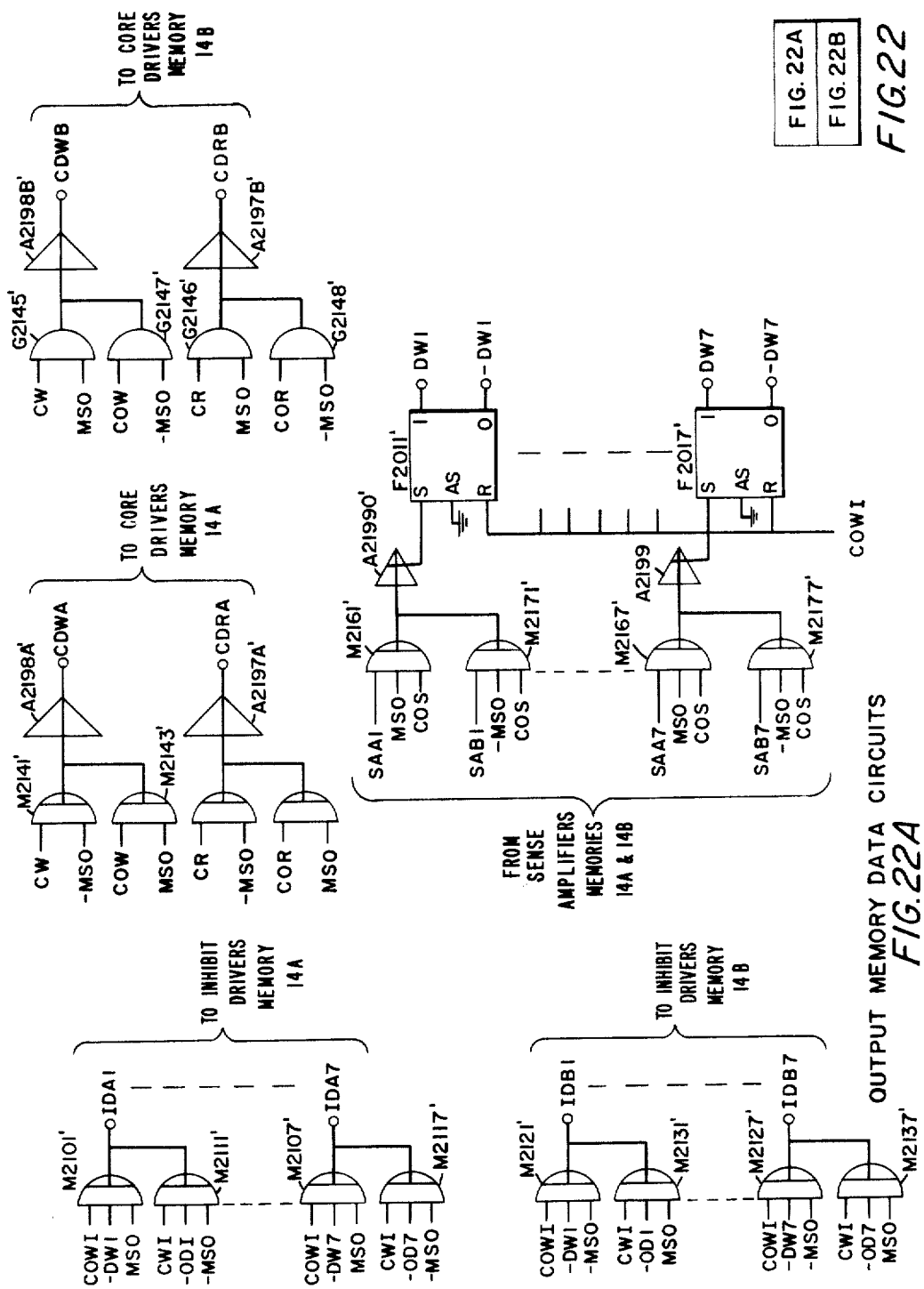

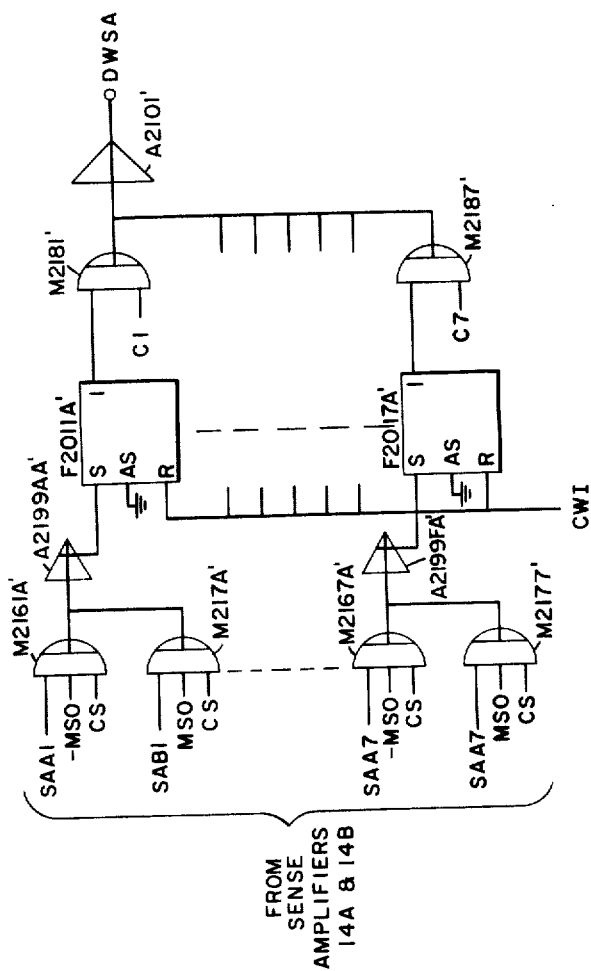
FIG. 22B OUTPUT MEMORY DATA CIRCUITS

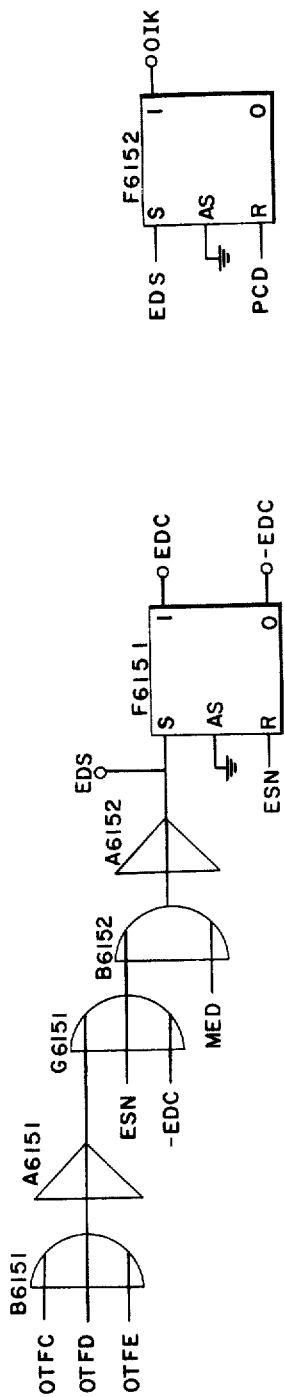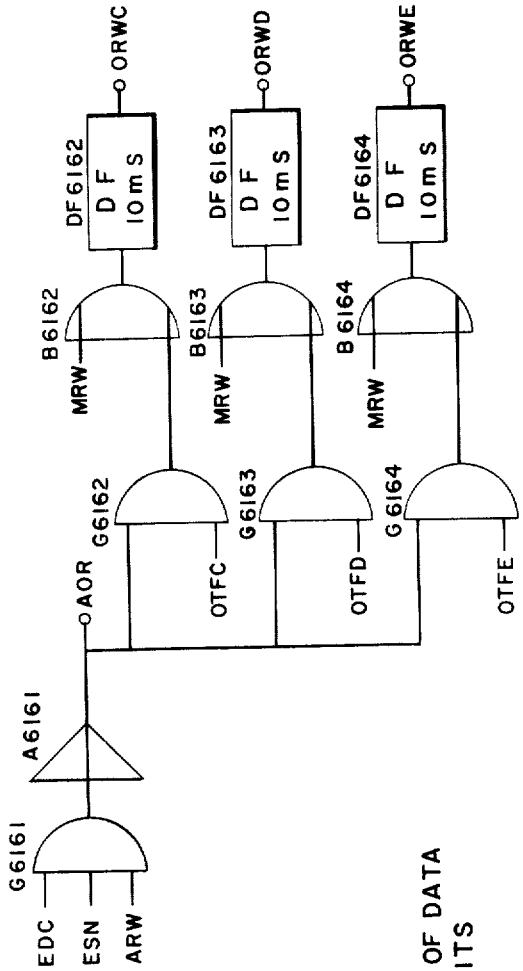
FIG. 24 OUTPUT CONTROL—END OF DATA AND REWIND CIRCUITS

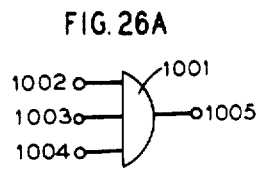
FIG. 26A
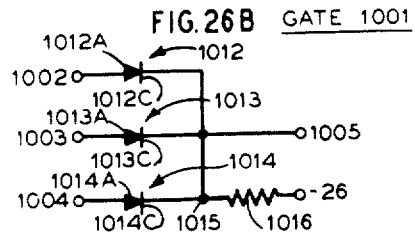
FIG. 26B GATE 1001
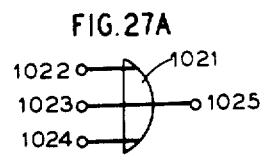
FIG. 27A
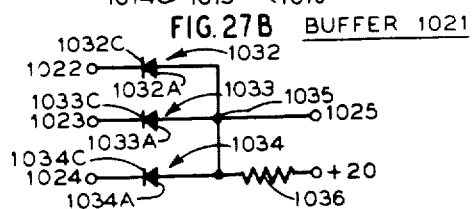
FIG. 27B BUFFER 1021
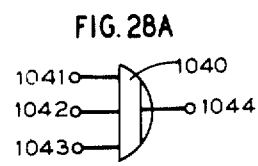
FIG. 28A
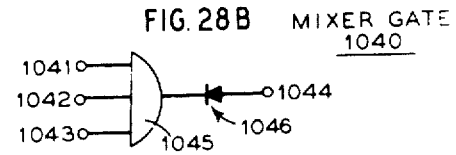
FIG. 28B MIXER GATE 1040
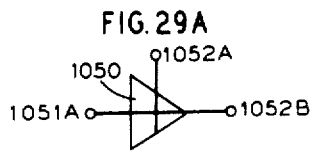
FIG. 29A
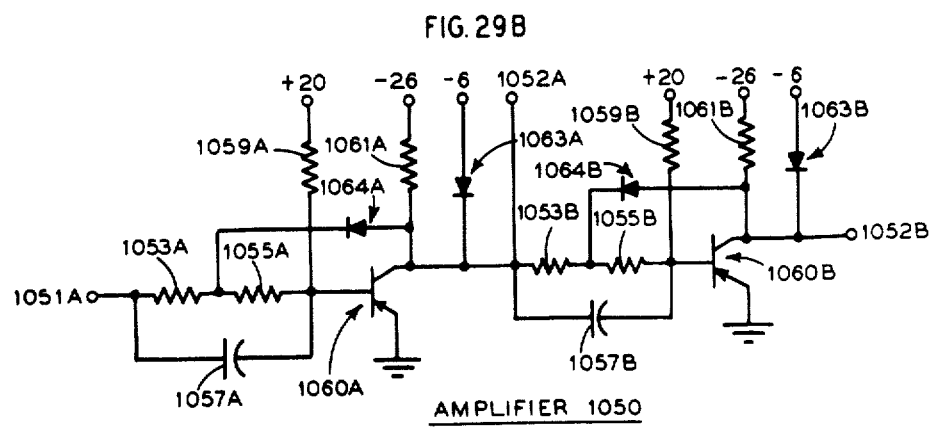
FIG. 29B
AMPLIFIER 1050

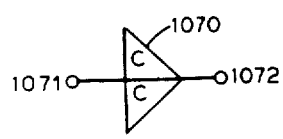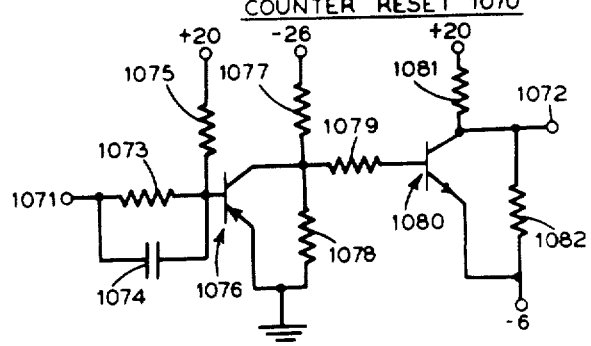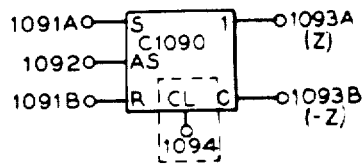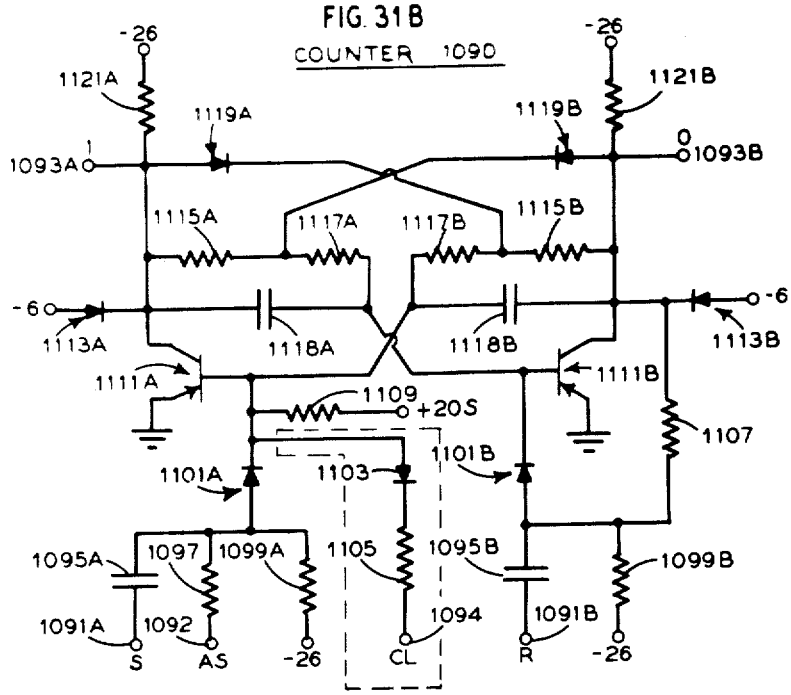

FIG. 32B
BINARY COUNTER 1130
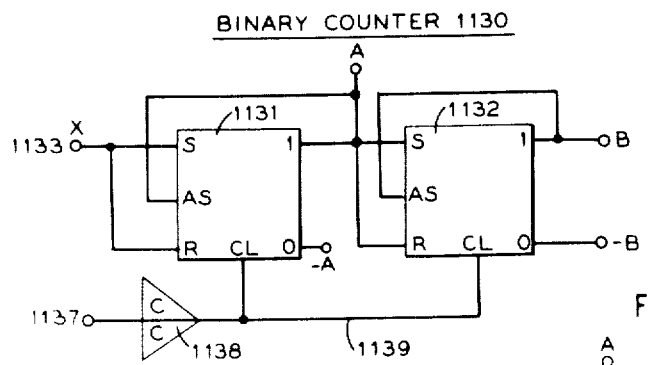
FIG. 32A
FIG. 33A
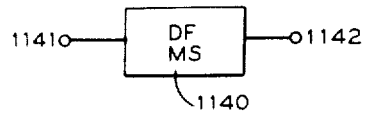
FIG. 33B
DELAY FLOP 1140
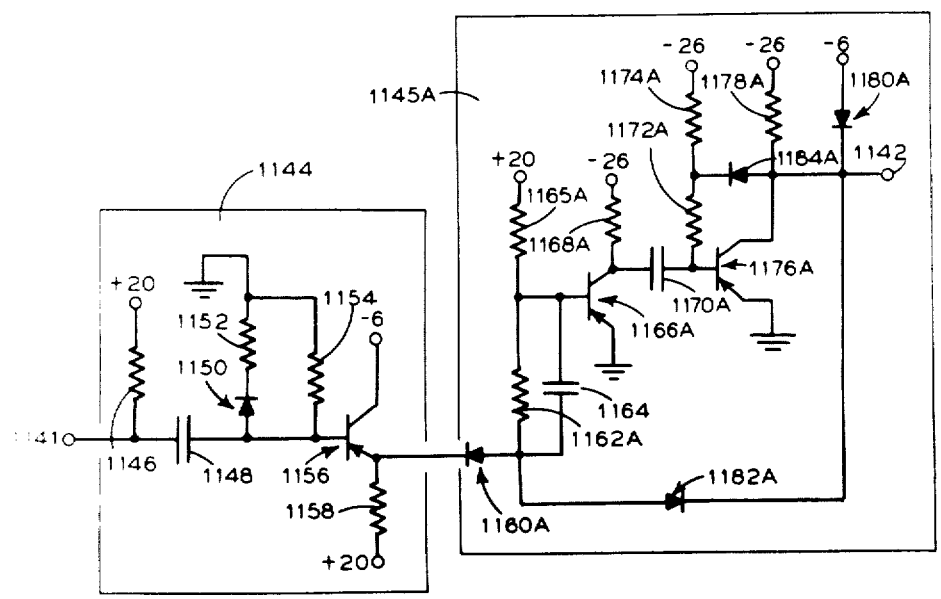

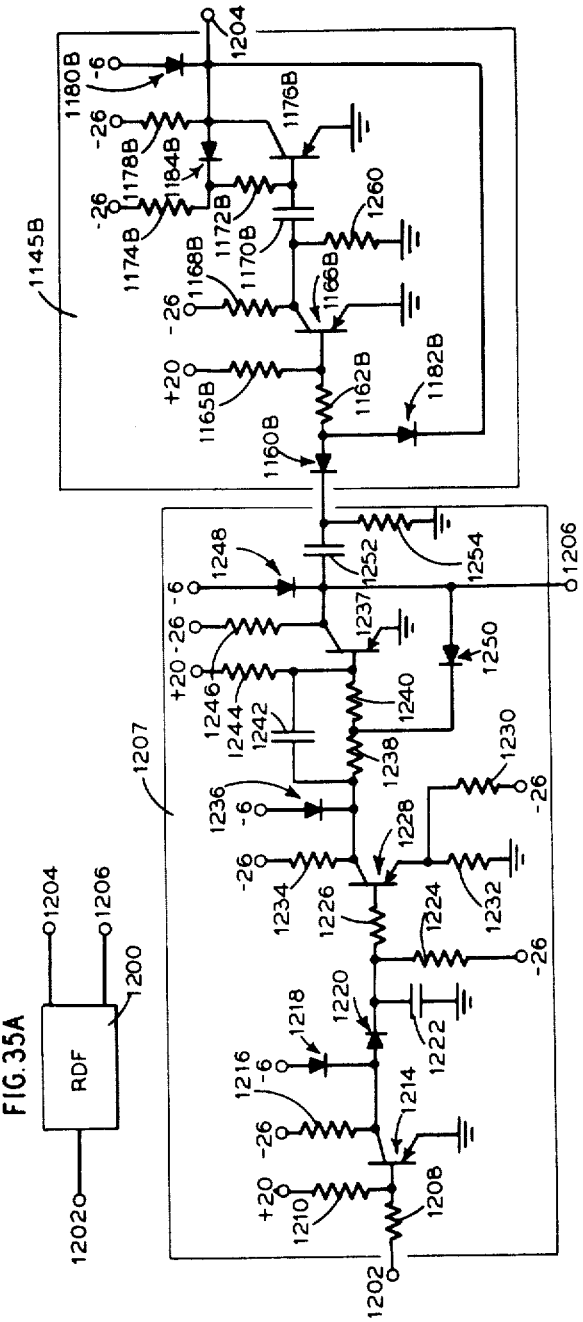

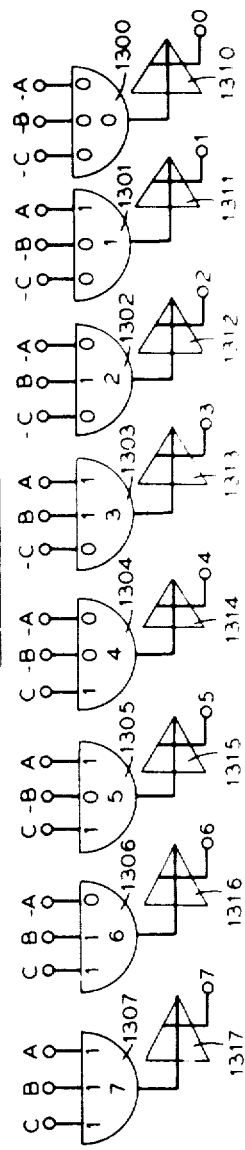
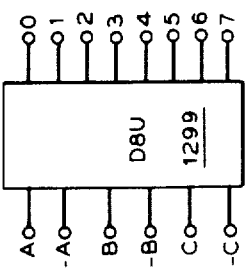
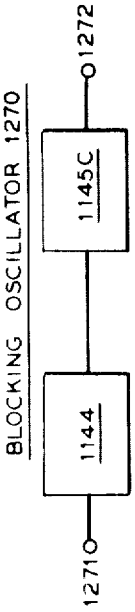
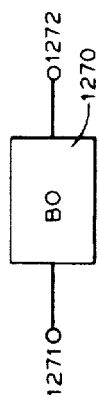

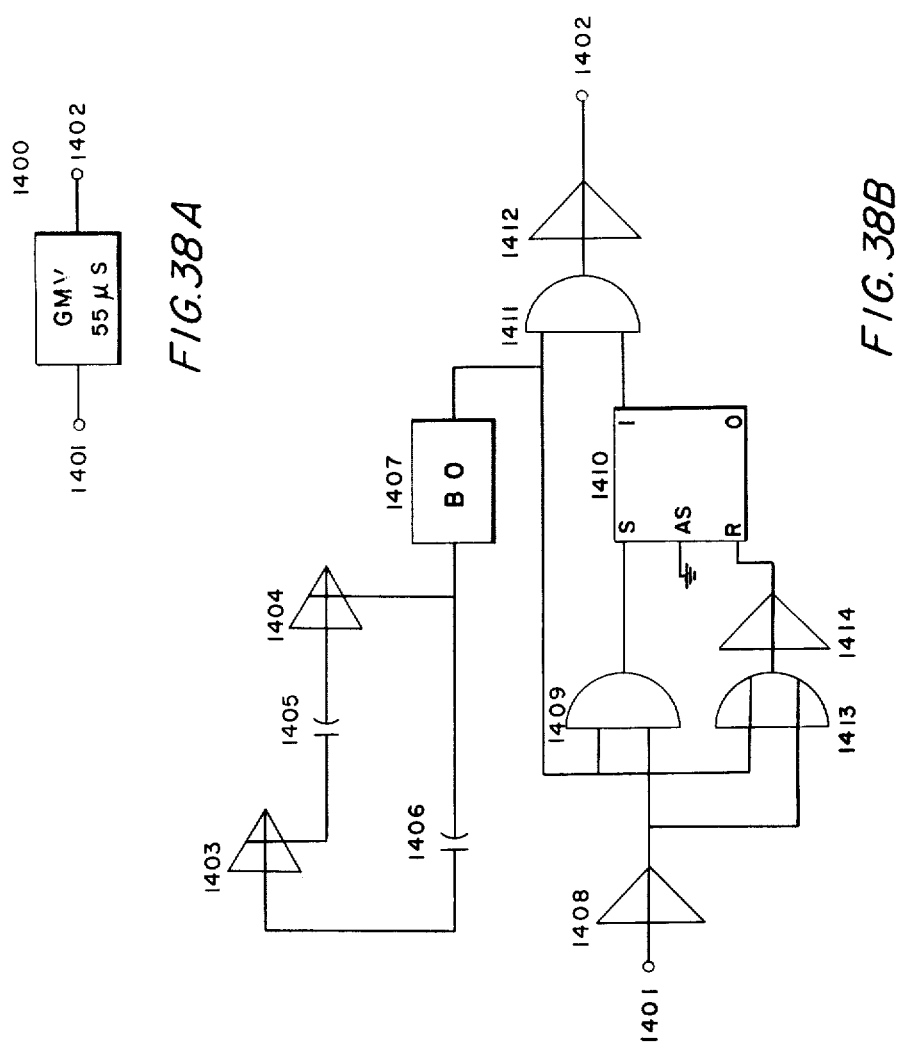

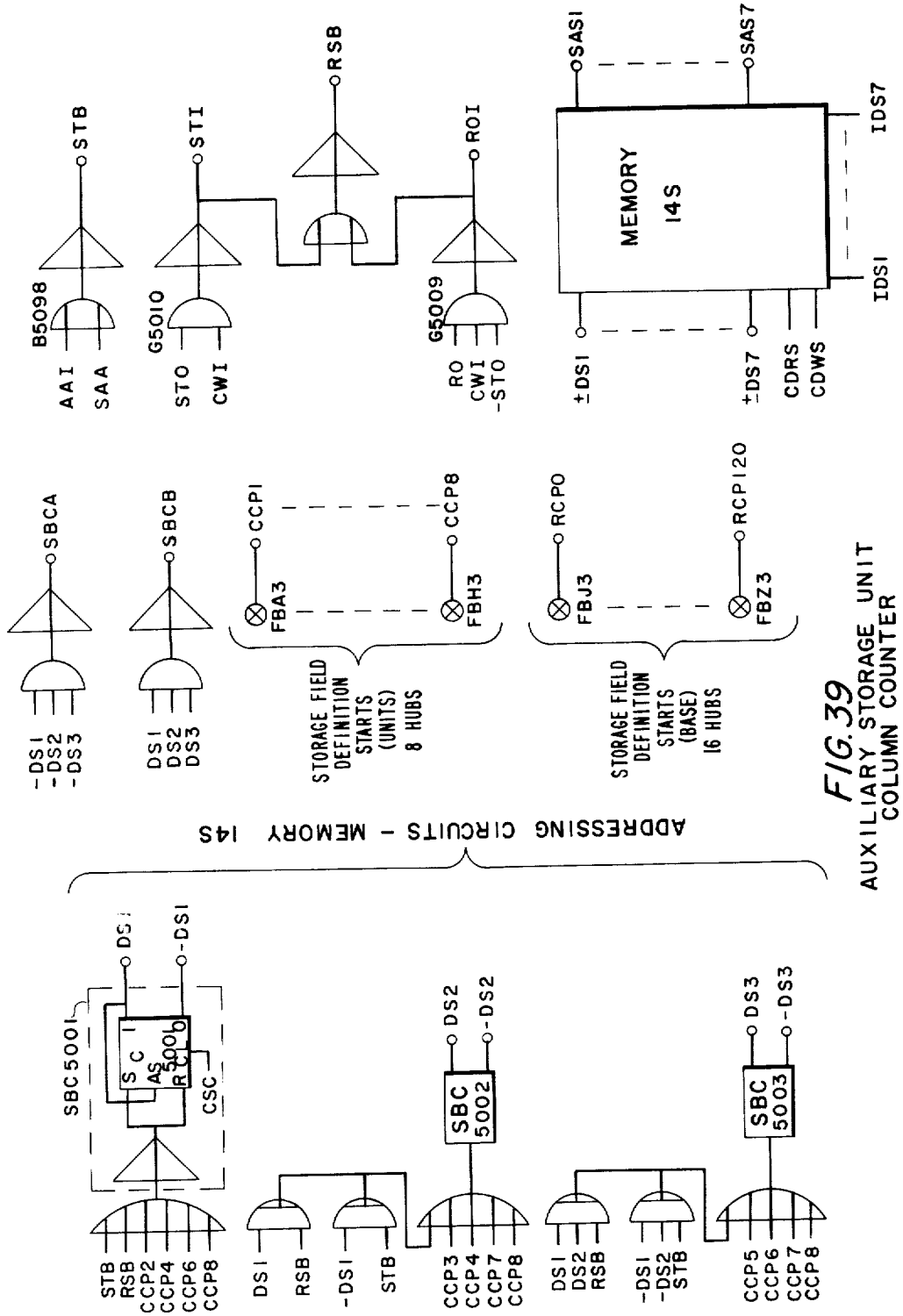
FIG. 39 AUXILIARY STORAGE UNIT COLUMN COUNTER

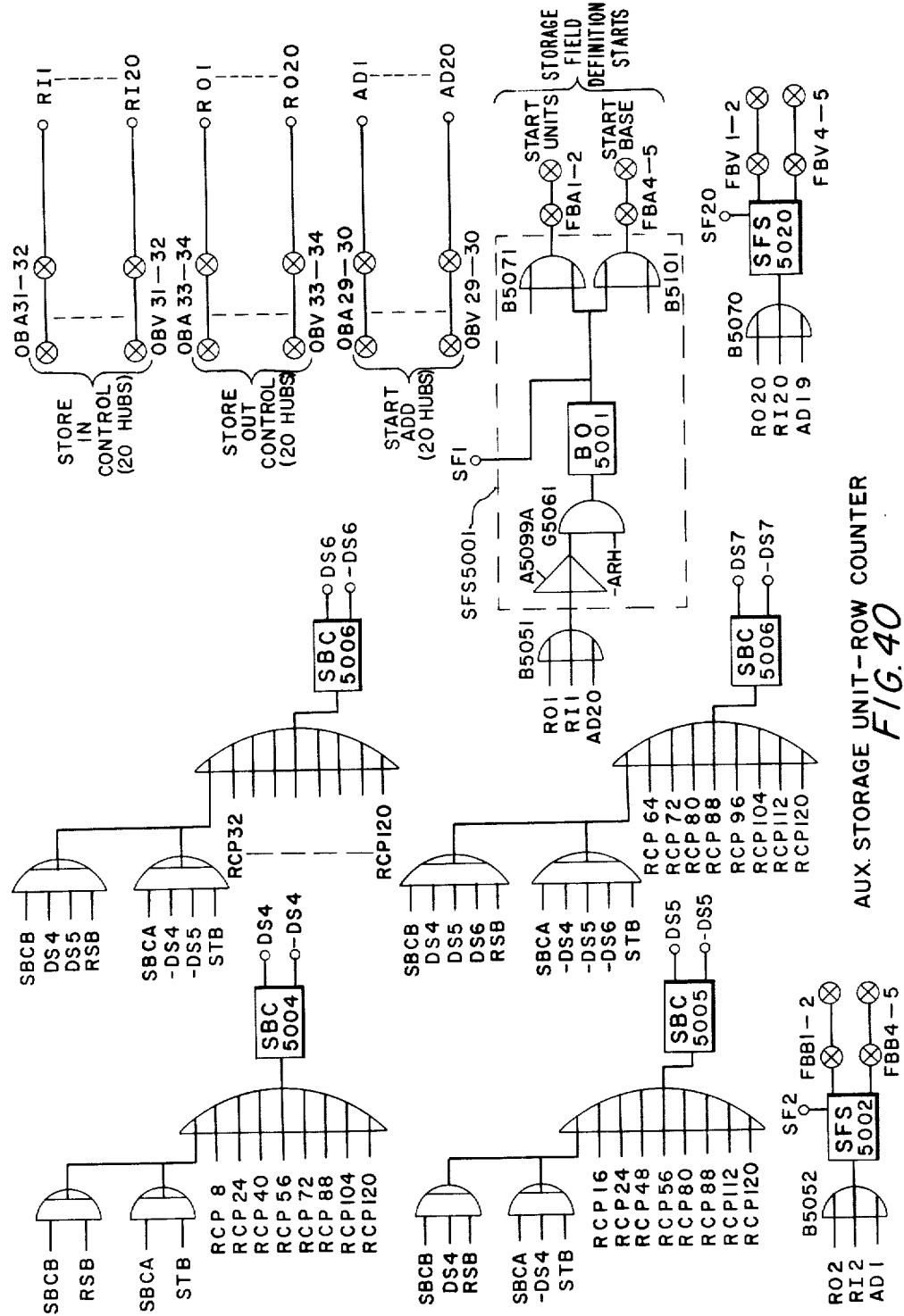
FIG. 40 AUX. STORAGE UNIT-ROW COUNTER

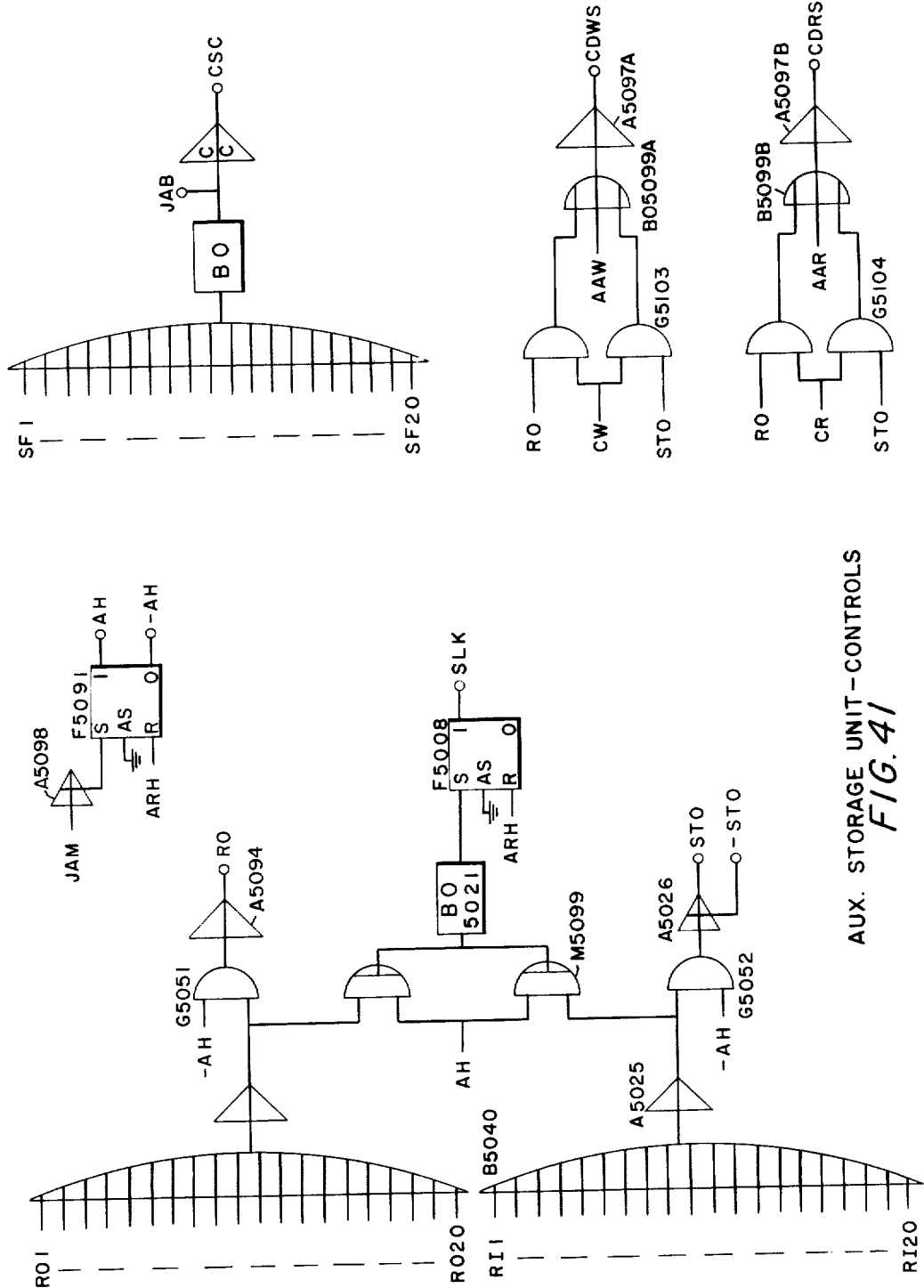
FIG. 41 AUX. STORAGE UNIT-CONTROLS

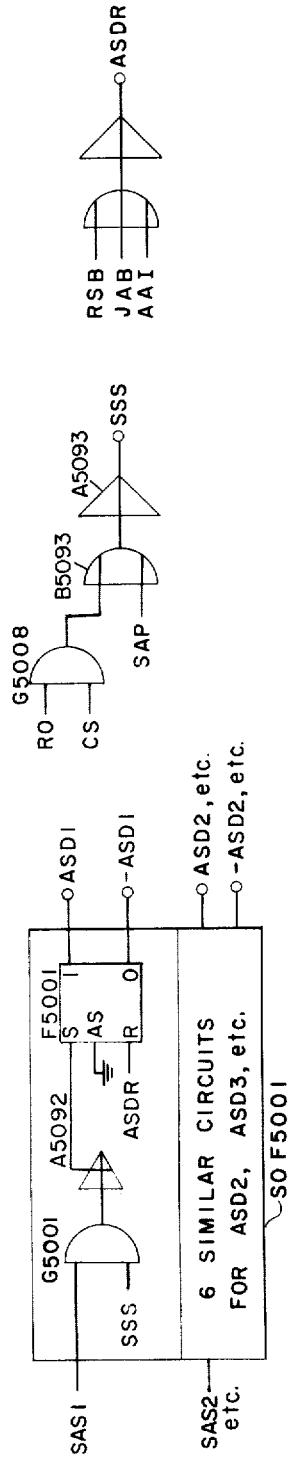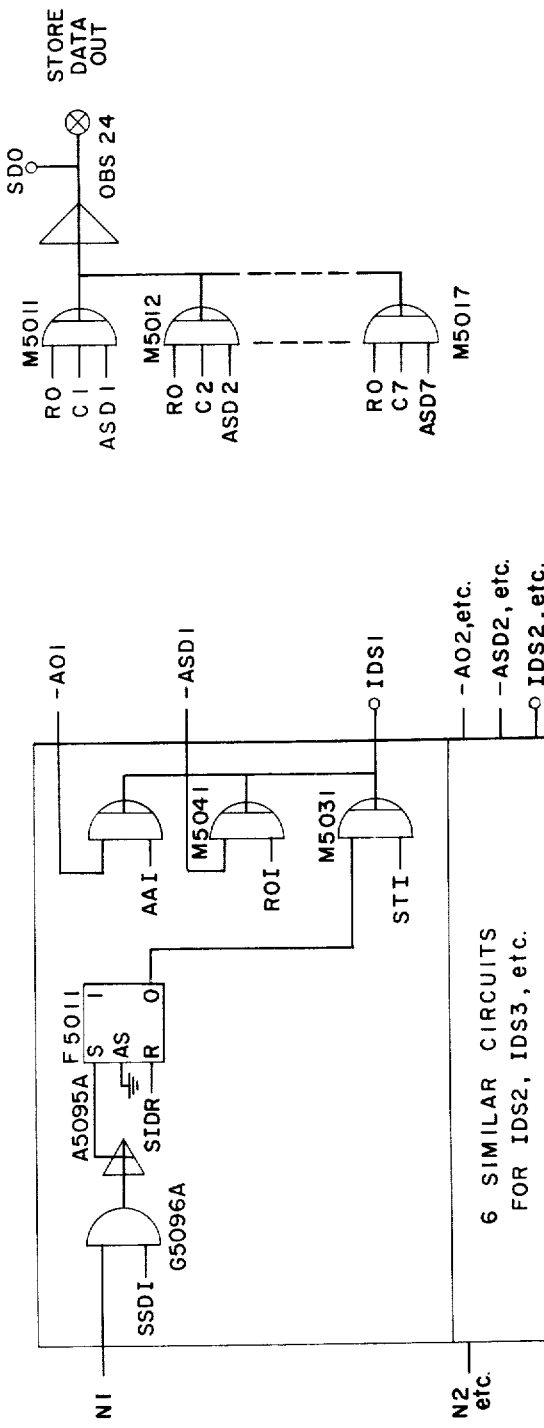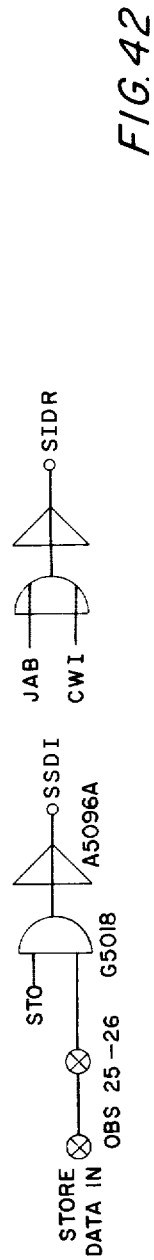
FIG. 42

ADDER ADDRESSING CIRCUITS

ADDER CONTROLS

ADDER UNIT
END-OF-FIELD CIRCUITS

ALGEBRAIC ADDER

FIG. 50 MANUAL CONTROLS

June 7, 1966  E. LEONARD ET AL  3,255,438

DATA PROCESSING SYSTEM

Filed June 13, 1962  64 Sheets-Sheet 56

3,255,438
DATA PROCESSING SYSTEM
Eugene Leonard, Sands Point, Marvin Shapiro, Huntington, and Robert F. Shaw, Locust Valley, N.Y., and Bruce B. Weber, Cleveland Heights, and Robert V. Zaman, Euclid, Ohio, assignors to Addressograph-Multigraph Corporation, Cleveland, Ohio, a corporation of Delaware
Filed June 13, 1962, Ser. No. 202,165
49 Claims. (Cl. 340—172.5)

TABLE OF CONTENTS

| | | Column |
|---|---|---|
| 1. | Introduction | 2 |
| | 1.1. Brief Description of Drawings | 6 |
| 2. | General Description of the System (FIGURE 1) | 8 |
| | 2.1. Tape Input Units (FIGURE 2) | 8 |
| | 2.2. Input Memory Unit (FIGURE 1) | 9 |
| | 2.3. Output Units (FIGURES 1 and 3) | 10 |
| | 2.4. Scan Assembly (FIGURE 1) | 11 |
| | 2.5. Operation Unit (FIGURE 1) | 11 |
| | 2.6. Other Units (FIGURE 1) | 11 |
| 3. | Representation of Data | 11 |
| 4. | Input Memory Unit (FIGURE 4) | 13 |
| | 4.1. Timers (FIGURES 5–8) | 14 |
| | 4.2. Input Memory Control, Data, and Addressing Circuits (FIGURE 1) | 17 |
| | 4.3. Memory Switching (FIGURE 9) | 17 |
| | 4.4. Tape Start Control (FIGURE 9) | 18 |
| | 4.5. Input Item Counter (FIGURE 10) | 19 |
| | 4.6. Controls for "End of Data" Operation (FIGURE 10) | 20 |
| | 4.7. Data Circuits (FIGURE 11) | 21 |
| | 4.8. Addressing Circuits | 23 |
| | 4.9. Addressing by Item and by Character | 23 |
| | 4.10. Details of Addressing Circuits (FIGURES 12 and 13) | 24 |
| 5. | Scan Circuits | 27 |
| | 5.1. Item Scan Counter (FIGURE 14) | 27 |
| | 5.2. Field Definition (FIGURES 15 and 16) | 28 |
| | 5.3. Scan Controls (FIGURE 15) | 29 |
| | 5.4. Item Scan Control | 30 |
| | 5.5. Beginning and End of Scan Controls (FIGURE 17) | 30 |
| | 5.6. Selection of Timer (FIGURE 17) | 31 |
| | 5.7. Interlocks (FIGURE 17) | 32 |
| | 5.8. Fixed Character Circuits | 33 |
| 6. | Data Transfer Circuits (FIGURE 18) | 33 |
| 7. | Output Memory Unit | 36 |
| | 7.1. Memory Switching (FIGURE 19) | 36 |
| | 7.2. Tape Motion Control (FIGURE 20) | 37 |
| | 7.3. Timer (FIGURE 20) | 38 |
| | 7.4. Addressing Circuits (FIGURE 21) | 38 |
| | 7.5. Data Circuits (FIGURE 22) | 39 |
| | 7.6. End of Data Circuits (FIGURE 20) | 39 |
| 8. | Output Control | 41 |
| | 8.1. Tape Motor Control (FIGURE 23) | 41 |
| | 8.2. End of Data and Rewind Controls (FIGURE 24) | 42 |
| 9. | Operation Control Plugboard (FIGURES 25A and 25B) | 43 |
| | 9.1. Scan Field Exit Hubs | 43 |
| | 9.2. Scan Field End Hubs | 43 |
| | 9.3. Memory Data Out | 44 |
| | 9.4. Comparators | 44 |
| | 9.5. The Digit Analyzer | 44 |
| | 9.6. AND Circuits | 44 |
| | 9.7. OR Circuits | 44 |
| | 9.8. Switches | 44 |
| | 9.9. Group Switch Resets | 45 |
| | 9.10. Select Memory | 45 |
| | 9.11. Selected Data | 45 |
| | 9.12. Item Step | 45 |

TABLE OF CONTENTS—Continued

| | | Column |
|---|---|---|
| | 9.13. Select Output Tape Unit | 45 |
| | 9.14. Auxiliary Storage | 46 |
| | 9.15. Modify Circuits | 46 |
| | 9.16. Fixed Character Outs | 46 |
| | 9.17. Select Scan | 46 |
| | 9.18. Addition | 46 |
| | 9.19. Subtraction | 47 |
| | 9.20. Inverters | 47 |
| | 9.21. Amplifiers | 47 |
| | 9.22. Halt | 47 |
| | 9.23. Miscellaneous Hubs | 47 |
| 10. | Description of Symbols | 47 |
| | 10.1. Gate (FIGURE 26) | 48 |
| | 10.2. Buffer (FIGURE 27) | 49 |
| | 10.3. Mixer Gate (FIGURE 28) | 50 |
| | 10.4. Amplifier (FIGURE 29) | 50 |
| | 10.5. Counter Reset (FIGURE 30) | 51 |
| | 10.6. Counter (FIGURE 31) | 52 |
| | 10.7. Binary Counter (FIGURE 32) | 54 |
| | 10.8. Monostable Multivibrator Type Circuits | 55 |
| | 10.9. The Delay Flop (FIGURE 33) | 55 |
| | 10.10. Gated Delay Flop (FIGURE 34) | 57 |
| | 10.11. Retriggerable Delay Flop (FIGURE 35) | 57 |
| | 10.12. Blocking Oscillator (FIGURE 36) | 59 |
| | 10.13. Decoder (FIGURE 37) | 59 |
| | 10.14. Gated Multivibrator (FIGURE 38) | 60 |
| 11. | Auxiliary Storage Unit | 61 |
| | 11.1. Addressing Circuits (FIGURES 39 and 40) | 61 |
| | 11.2. The Storage Operation (FIGURES 41 and 42) | 61 |
| | 11.3. Read-Out Operation (FIGURES 41 and 42) | 62 |
| | 11.4. Adder Register Circuits (FIGURES 43 and 44) | 63 |
| | 11.5. Addition Operation (FIGURES 45 and 46) | 64 |
| | 11.6. Algebraic Adder (FIGURE 47) | 66 |
| | 11.7. Subtraction (FIGURE 48) | 67 |
| 12. | Miscellaneous Circuits | 67 |
| | 12.1. OC Plugboard Circuits (FIGURES 49A and 49B) | 68 |
| | 12.2. Control Panel (FIGURE 50) | 69 |
| 13. | Examples of Plugboard Wiring | 70 |
| | 13.1. Passing Data Through the System (FIGURES 51 and 52A and 52B) | 70 |
| | 13.2. Selecting Records on the Basis of Digit Analysis (FIGURES 53 and 54A and 54B) | 71 |
| | 13.3. Selecting Records on the Basis of a Comparison (FIGURES 55 and 56A and 56B) | 72 |
| | 13.4. Modifying Records with Aligned Memory Fields (FIGURES 57 and 58A and 58B) | 73 |
| | 13.5. Adding (FIGURES 59 and 60A and 60B) | 74 |
| 14. | Conclusion | 75 |

1. INTRODUCTION

Our invention is concerned with certain improvements in digital data processing systems, and more particularly with systems for processing relatively large volumes of data recorded on such input media as punched cards, paper or magnetic tape, or magnetic drums or discs and for recording the processed data on such media or in printed form. Since magnetic tape is widely used as a bulk storage medium for digital data, and since the system to be described was developed primarily for use with this medium, the system will be described with reference to magnetic tape input and output systems, it being understood that the input and output systems may employ other storage media.

It has been customary in the past to use a so-called "general purpose stored program computer" for practically all processing of data stored on magnetic tape. The only common exceptions have been certain simple "editing" operations, such as the addition or deletion of certain parts of a record or the translation from one code to another, performed in connection with the transcription of data between magnetic tape and other recording media. General purpose stored program computers offer extreme flexibility, their ability to perform complex mathematical and logical operations being for all practical purposes limited only by the extent of their internal storage facilities (memories) and the ingenuity and time devoted to preparation of the "program"—that is, the list of internally stored instructions which cause the computer to carry out, step by step, the desired operations.

Programming a modern computer, with its vast capabilities, is a complex operation requiring a high degree of skill and a large amount of time. This is particularly true if, as was universally done in the early stages of development of the art, the programmer must reduce every process to the fundamental operations or "instructions" which make up the stored program. In an attempt to alleviate the programmer's task much work has been done in the development of "automatic programming," in which the programmer uses a simplified symbolic representation of the desired operations (sometimes even describing them in the English language), and the computer itself interprets the symbolic language and from it compiles the detailed program in "machine language."

While automatic programming has certainly made a contribution to the wider and more efficient use of computers in many situations, it has definite limitations. For example, the reduction in programming time is often achieved at the expense of increased machine time, since the automatically compiled program is in many cases not the most efficient, either in time or memory utilization. Even the symbolic systems require a fairly large amount of skill on the part of programmers for efficient application to the solution of a programming problem. Attempts to develop a common symbolic language applicable to several types of computers have further reduced the efficiency of the final program, and have limited the ability to take advantage of improvements in computer technology.

Another serious problem in the use of stored program computers is the difficulty encountered in making changes in a completed program. Such changes are unavoidable, as even if a perfect program has been constructed (which, unfortunately, seldom happens, at least on the first attempt), changes in requirements frequently arise after a program has been in use for some time. In many cases it is extremely difficult to make even a minor change in one part of a program without affecting other parts; thus the ramifications of a small change are often out of proportion to its inherent significance. Since every change introduces new opportunity for programming errors, changes can result in much lost time.

The present invention results from an attempt to achieve a radical simplification in programming methods. Such a simplification has in fact been achieved partly by making automatic many of the so-called "housekeeping" operations which in many cases account for more than 50% of a conventional stored program, and partly by making all the functional parts of the processor, such as comparators, adders, internal storage, etc. directly and simultaneously available to the programmer through use of a plugboard.

It is thus a principal object of the invention to simplify the programming of a data processing system by causing certain operations to occur automatically as a consequence of the programming of related operations.

It is also an important object of the invention to provide the programmer with means for causing several operations to occur simultaneously, thus reducing processing time.

It is a further important object of this invention to minimize as far as practicable the consequence of changes in a program. In this connection, for example, in the system here described it is possible to change the length of a record or the size of a field within a record or the position of a field within a record without affecting the plugboard wiring defining the operations to be performed, since record length and field definition are controlled by means separate from the operation control plugboard.

Thus it is a further object of the invention to simplify the selection of certain groups of contiguous characters of an item or record (i.e., certain "fields" of the item) for the performance of such operations as comparison or addition.

A still further object is to provide a simple means for scanning through the characters of an item several times before proceeding to the next item.

Therefore, an aspect of the invention contemplates a data processing system for processing items which consist of serially addressable characters on the basis of a group of contiguous characters within an item, i.e. a field to be scanned. In order to select only the field for initial processing and to ignore the remainder of the item in such processing there is provided means for generating timewise spaced character count signals occurring sequentially with each of the signals representing the address of a different character in an item. Means are provided for selecting one of the count signals related to the character at the start of the field and means are provided for selecting another of the count signals related to the character at the end of the field. Means are responsive to both of the selecting means to generate a field-scanning signal which indicates when the desired field of the item is available for processing.

Another object of the invention is to provide for the automatic selection of the most rapid internal data handling rate appropriate to the function being performed at the moment.

Accordingly, another aspect of the invention contemplates that a data processor have a plurality of subsystems which are operable in plural operational modes. Means are provided for generating signals corresponding to the plurality of operational modes of a given subsystem. Timing signal generating means are provided for generating timing signals at a plurality of different rates. There are a plurality of gating means actuatable in response to respective operational-mode-signals to activate a gating means according to the operational mode of the subsystem. The activated gating means receives and transfers timing signals to the subsystem at a rate so that the system executes the operational mode at optimum speed.

Features of this aspect of the invention are concerned with the subsystems being memory units and the operating modes being data transfers between the memory units.

A significant object is to provide the programmer with means for routing data and control signals directly through physical connections to and from functional elements of the processor. While the routing of data through plugboard wiring is well-known, particularly in punched card equipment, it has been customary in such equipment to handle the characters of a field in parallel, thus requiring a separate wire for each character. In the system here described, the characters of a record or field are handled serially but the bits of a character are wherever possible handled in parallel, thus transferring data at a rapid rate between memories and tapes and between memories and memories. Where data must be processed otherwise than by transferring—for example, where two fields must be compared or added, the wiring of a suitable control signal to call for such operation results also in the automatic change from bit-parallel to bit-serial transmission, so that a single plugboard wire can carry data from any given source to one or more destinations. The amount of plugboard wiring is thus reduced, without a corresponding reduction of data transfer rates in operations not requiring the routing of data through the plugboard.

Another object of the invention is to reduce by a significant amount the amount of switching circuitry required in routing data through the system from input to output.

Accordingly, this aspect of the invention contemplates a source of informaton and at least two information storage devices each having a plurality of registers. Each register is of the type wherein when information is fed to the register it replaces the previously stored information. At any one time information fed from the source is to be stored in one of the storage devices. Means are provided to feed the information from the source to a register of each of the storage devices. Therefore, the available register of each storage device receives the information. However, after the transfer only the storage device which was selected to receive the information disconnects the register which received the information from the source and presents another register thereto. Hence, the appropriate register now contains the information it was to receive and is no longer accessible. When the source transmits further information it cannot affect the information in the appropriate register but can "write over" the informaton in the register of the previously unselected storage device.

Still another object is to provide the equipment savings resulting from serial operation without requiring the operator to be concerned with the order of significance in which data occur, regardless of the number of characters being handled. There are many advantages to the handling of data most significant digit or character first, one of the most important being the fact that this order corresponds to the customary order of writing both numbers and alphabetical lists of data. Arithmetic operations such as addition, however, require that if data are handled serially they must occur least significant digit first, because the carry-overs resulting from addition must progress into more significant digits. This conflict has customarily been resolved in computers whose internal operation is serial, by dividing data into fixed-length character groups called "words," whereas it would be more efficient to use "fields" of characters whose lengths are whatever is appropriate for the job at hand. In the system here described, provision is made for the operator to route fields of any number of characters (within the capacity of the circuits concerned) into the adder unit, while the latter handles the necessary reversal of character significance internally and automatically; thus as far as the operator is concerned, data appear always to be handled most significant digit first.

One of the objects of our invention is to reduce the amount of equipment required in a system having several otherwise independent memories by using a common addressing circuit for all memories during internal operations.

Accordingly another aspect of the invention contemplates at least two addressable memories responsive to addressing signals for accepting and delivering data. There is a common primary counter which emits a group of primary status signals indicative of the current state of the primary counter. There is a secondary counter for each of the memories which emits a group of secondary status signals indicative of the state of the secondary counter. Each of the memories has an addressing signal generator associated therewith. Each of the addressing signal generators receives the primary status signals from the primary counter and the secondary status signals from the secondary counter associated with its memory to generate addressing signals.

A feature of this aspect of the invention contemplates a single addressable memory having a plurality of addressed storages. Each storage is selected by a unique addressing signal. There are first and second multi-stable state address registers which emit respectively first and second distinctive signals for each of their states. A combining circuit receives these distinctive signals to generate one of the unique addressing signals in response to each possible combination of the first and second distinctive signals.

According to another aspect of the nvention there is contemplated a data processing system which includes a memory for storing a plurality of items for processing. There is provided an item counter which counts items being processed and whose count at any time indicates a particular item in the memory which is to be processed. Means are included which generate a signal that is fed to the item counter whenever the processing of an item is completed so that the counter is stepped to indicate another item in the memory is to be processed. Other means are provided to indicate the item count related to last item in the memory which is to be processed. Means compare the present item count of the item counter and the item count indicated by the other means for generating a signal when the item counts match to indicate that the last item in the memory is being processed. Means are responsive to the matching signal and the next occurring stepping signal for causing the memory to be reloaded with a new set of items.

According to a further aspect of the invention there is contemplated a data storage means which communicates with a transportable record medium. The data on the record medium is recorded in blocks which are separated from each other. Means are provided which during the transfer of data counts the block separations and when a particular count is attained halts the transfer of data.

A still further aspect of the invention contemplates a data processing system in which data transfer cycles alternate with data processing cycles. During either cycle a given same number of discrete data groups are manipulated (processed or transferred). A storage means operates during one of the cycles to record the number of groups manipulated during that cycle and during the alternate cycle terminates the cycle when the number of groups whose number is recorded in the storage means have been manipulated on.

Other objects of the invention will be stated in the detailed specifications which follow or will become apparent to those skilled in the art upon a study of that specification in conjunction with the accompanying drawings, a brief description of which now follows.

1.1. Brief description of drawings

Figure 5:
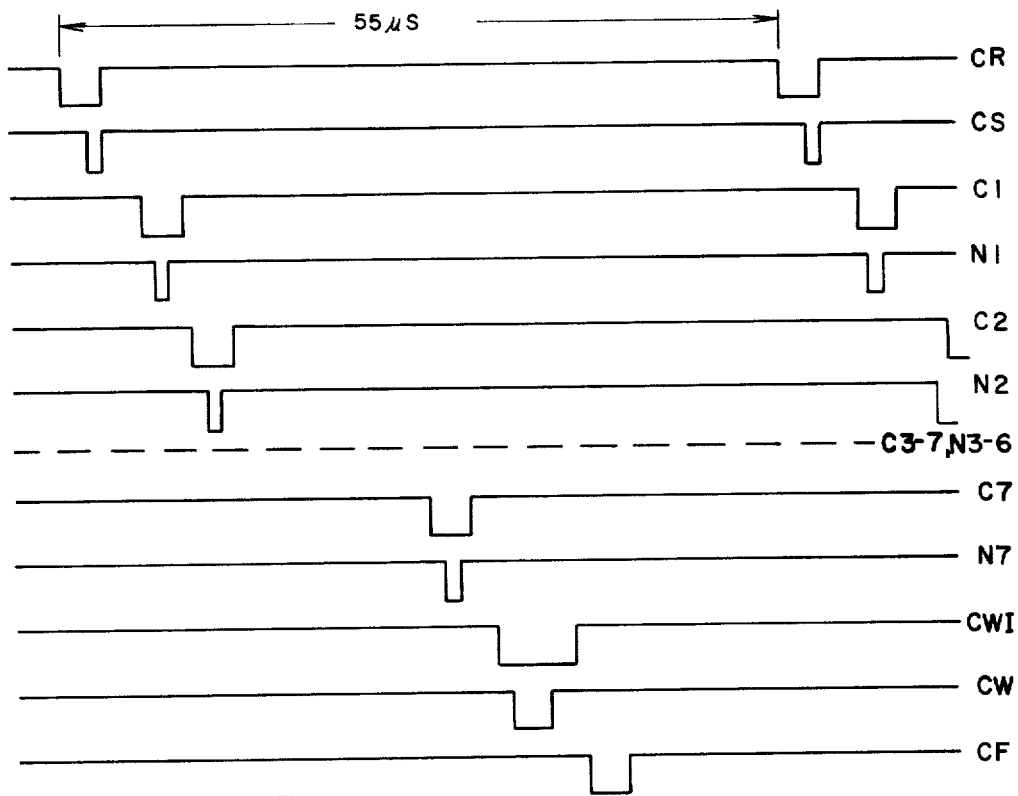
FIGURE 5 is a timing diagram of the signals required for operation of the memory unit, for serializing the bits of a character, and for certain other purposes.
Figure 7:
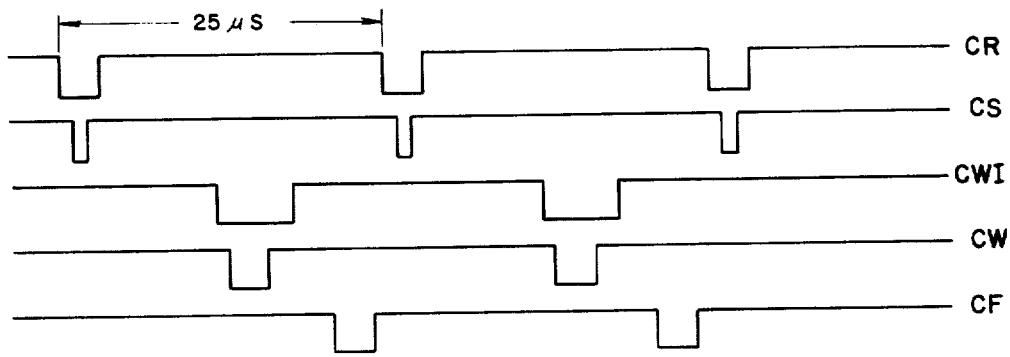
Figure 8:
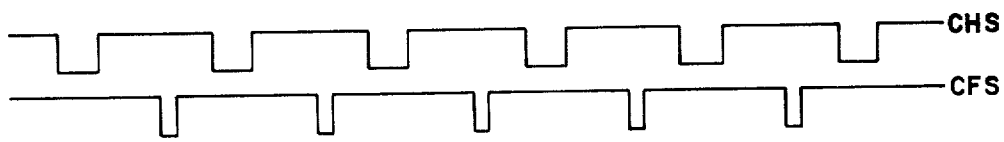
Figure 6B:
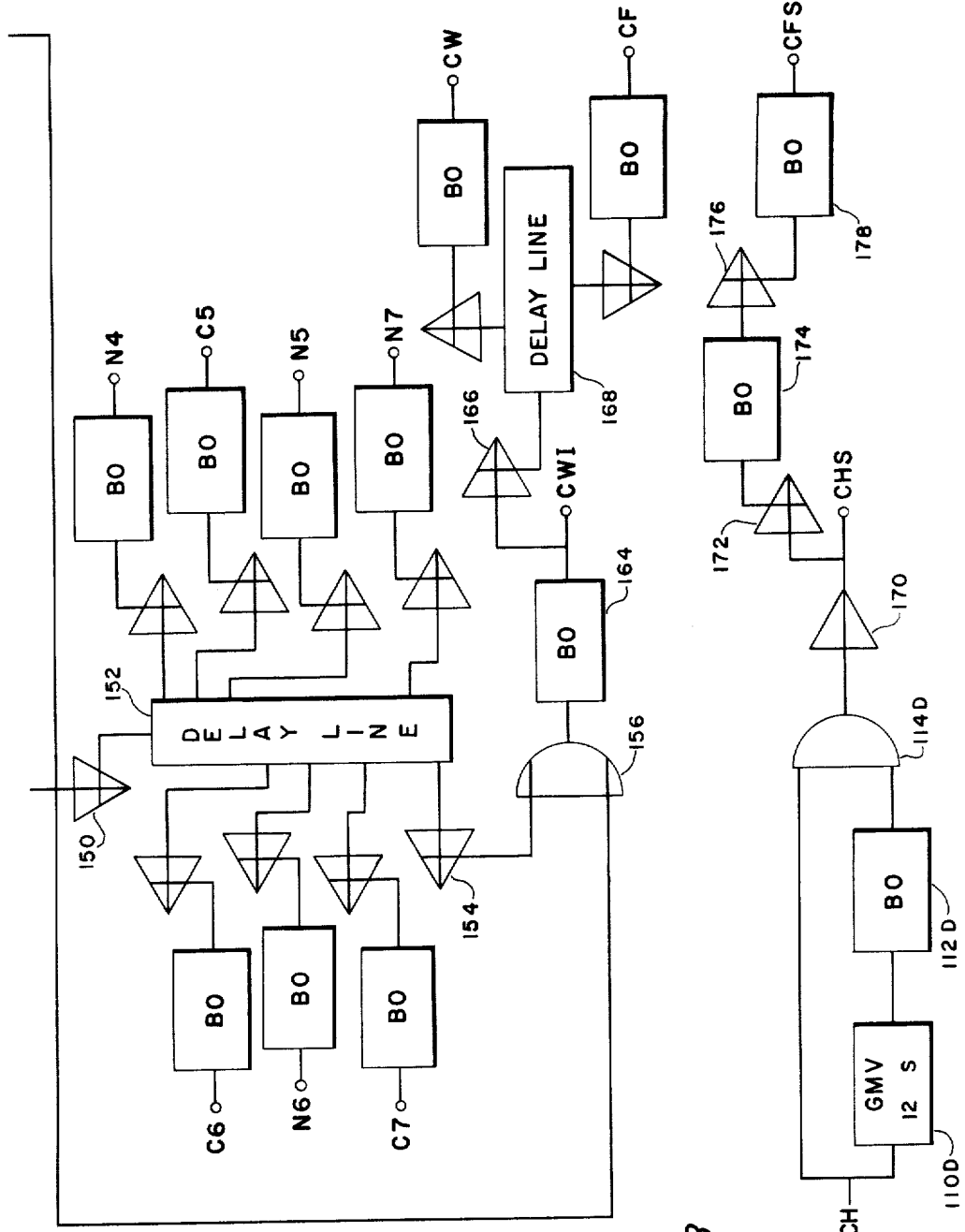
Figure 11:
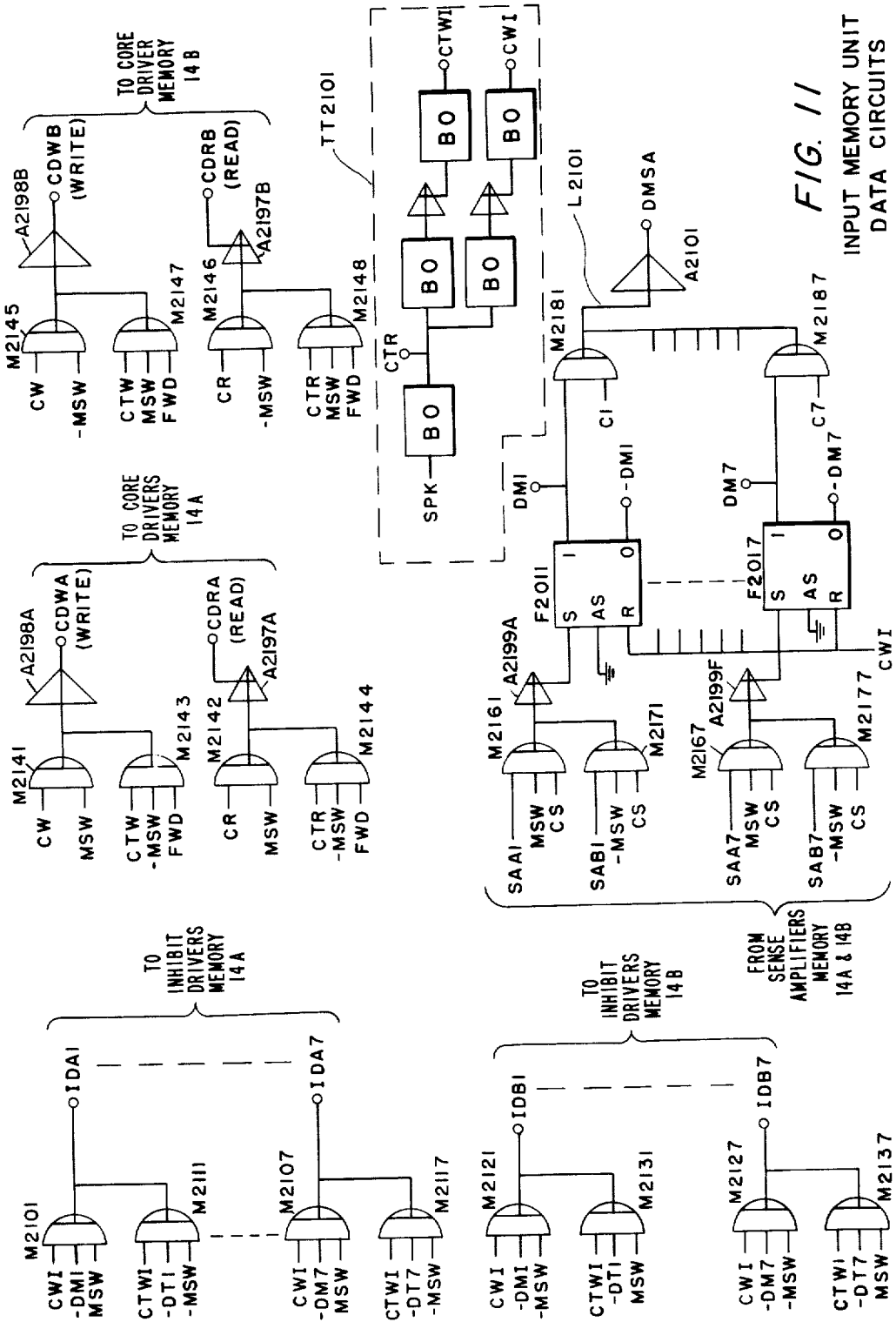
Figure 12:
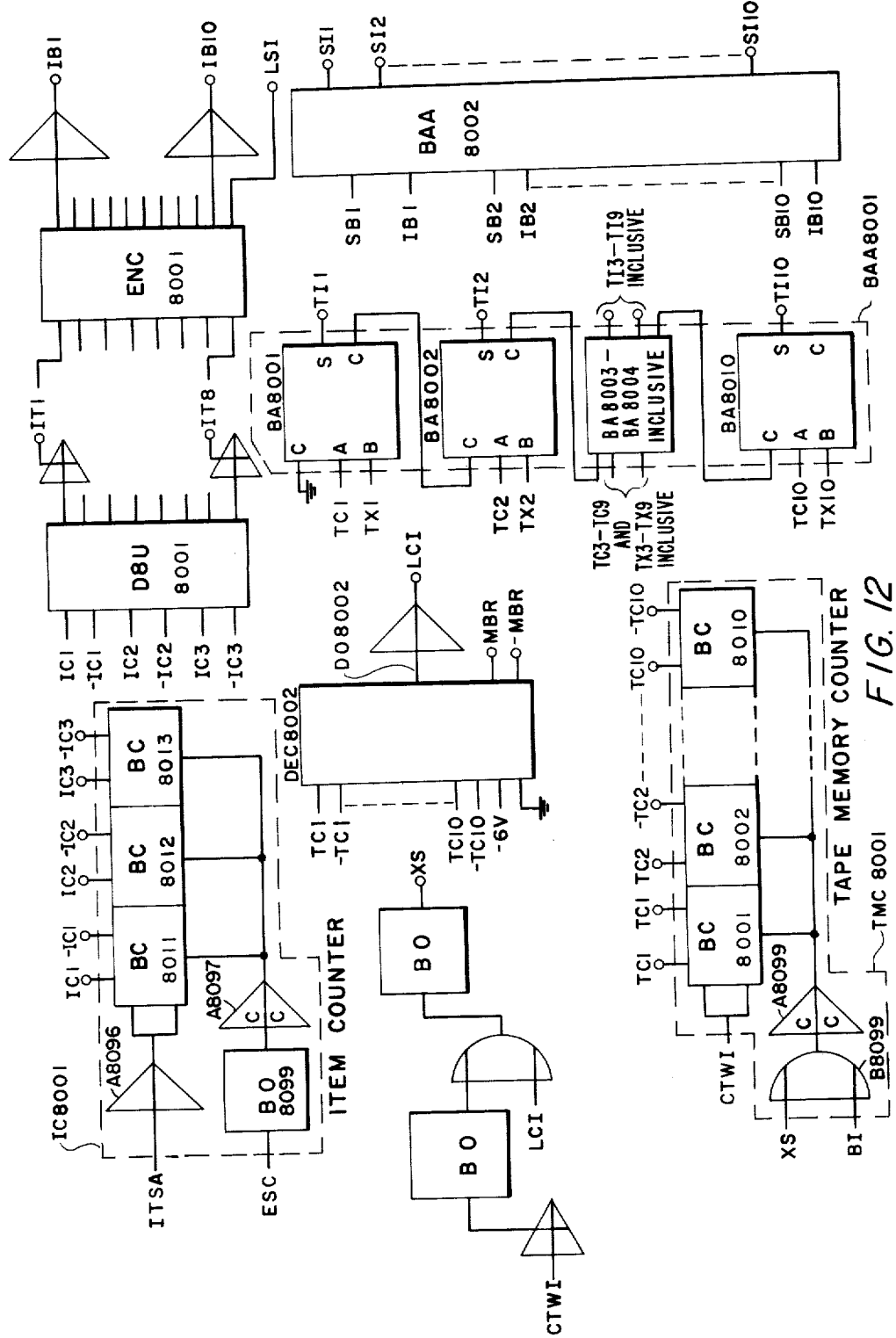
Figure 13:
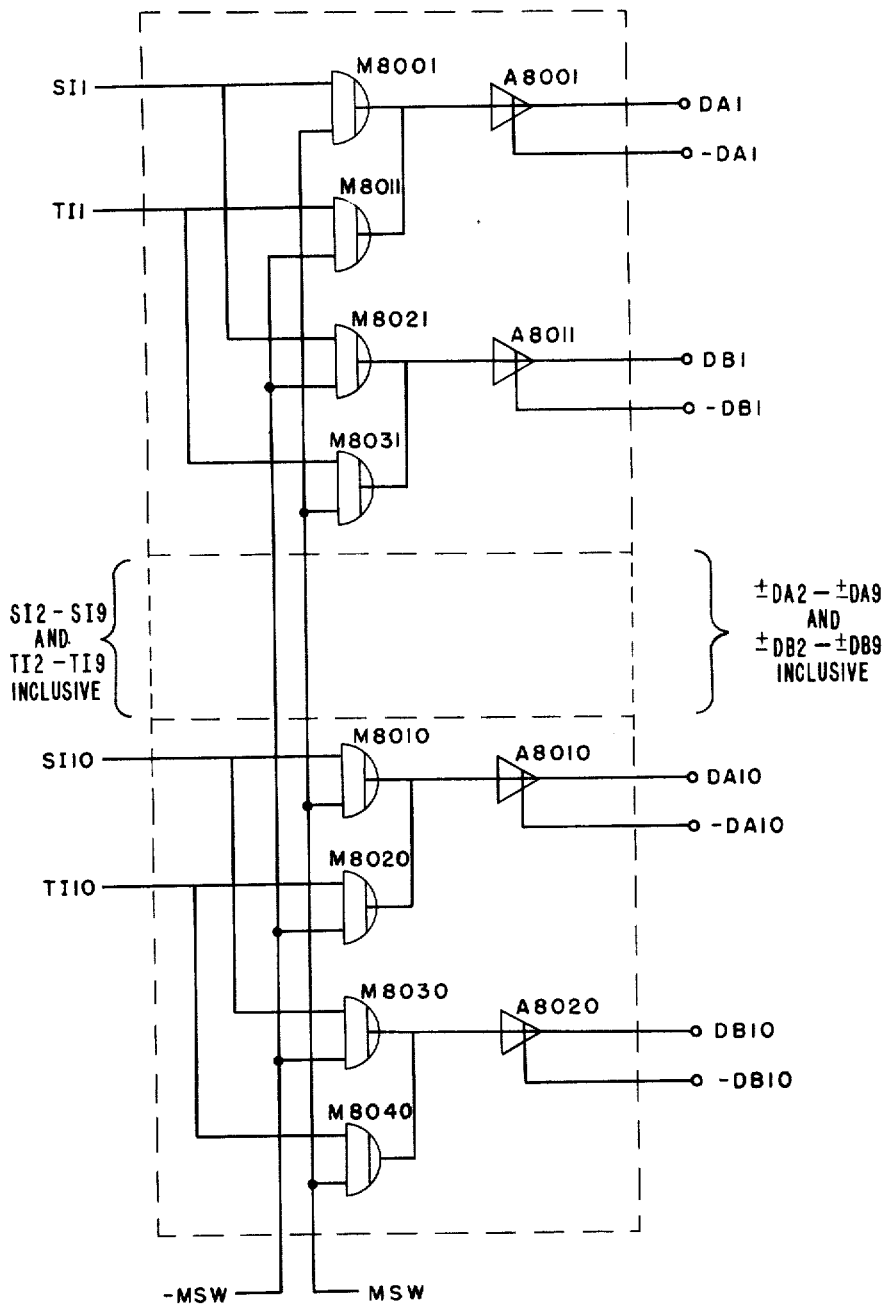
Figures 14, 14A:
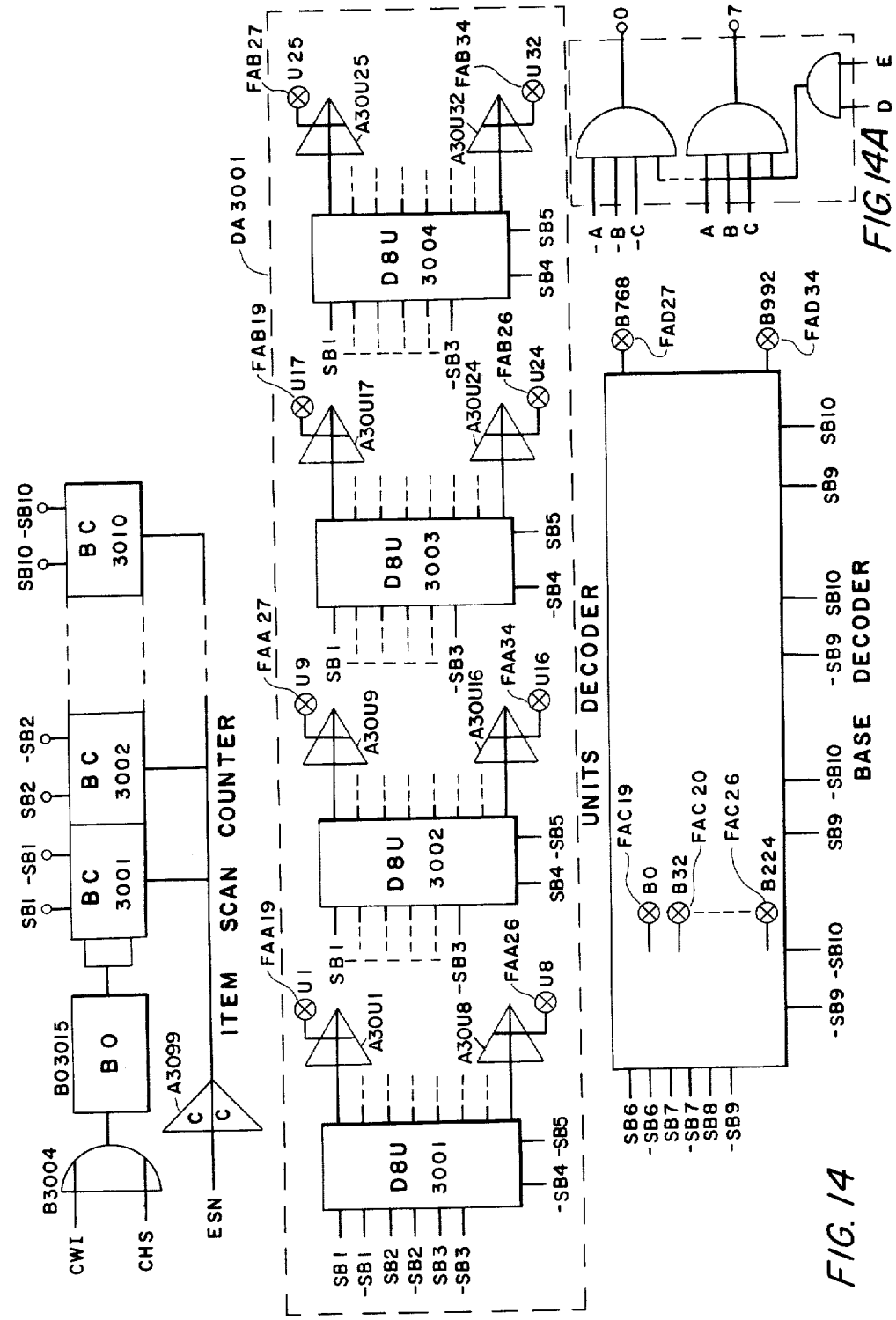
Figure 17:
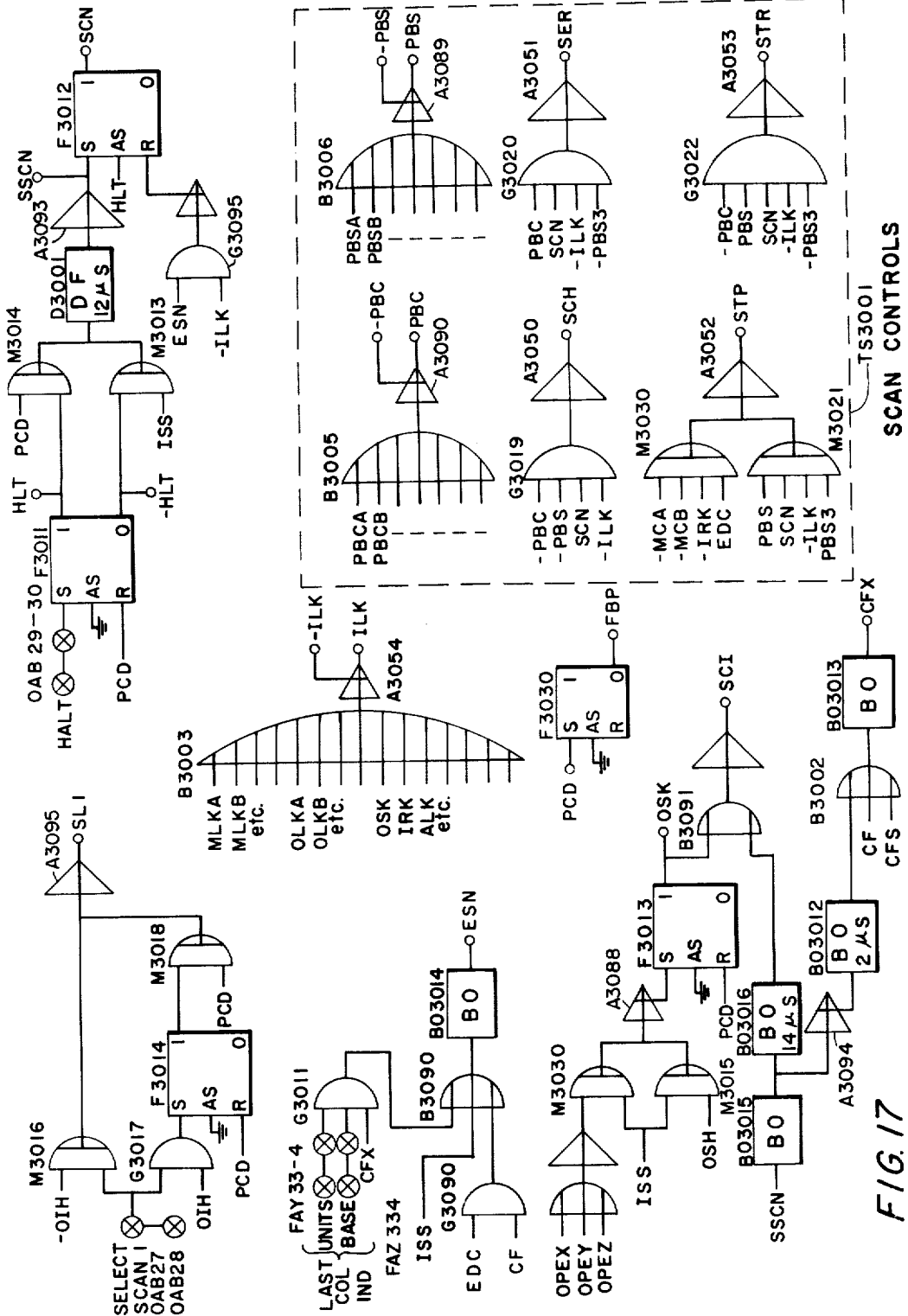
Figure 18:
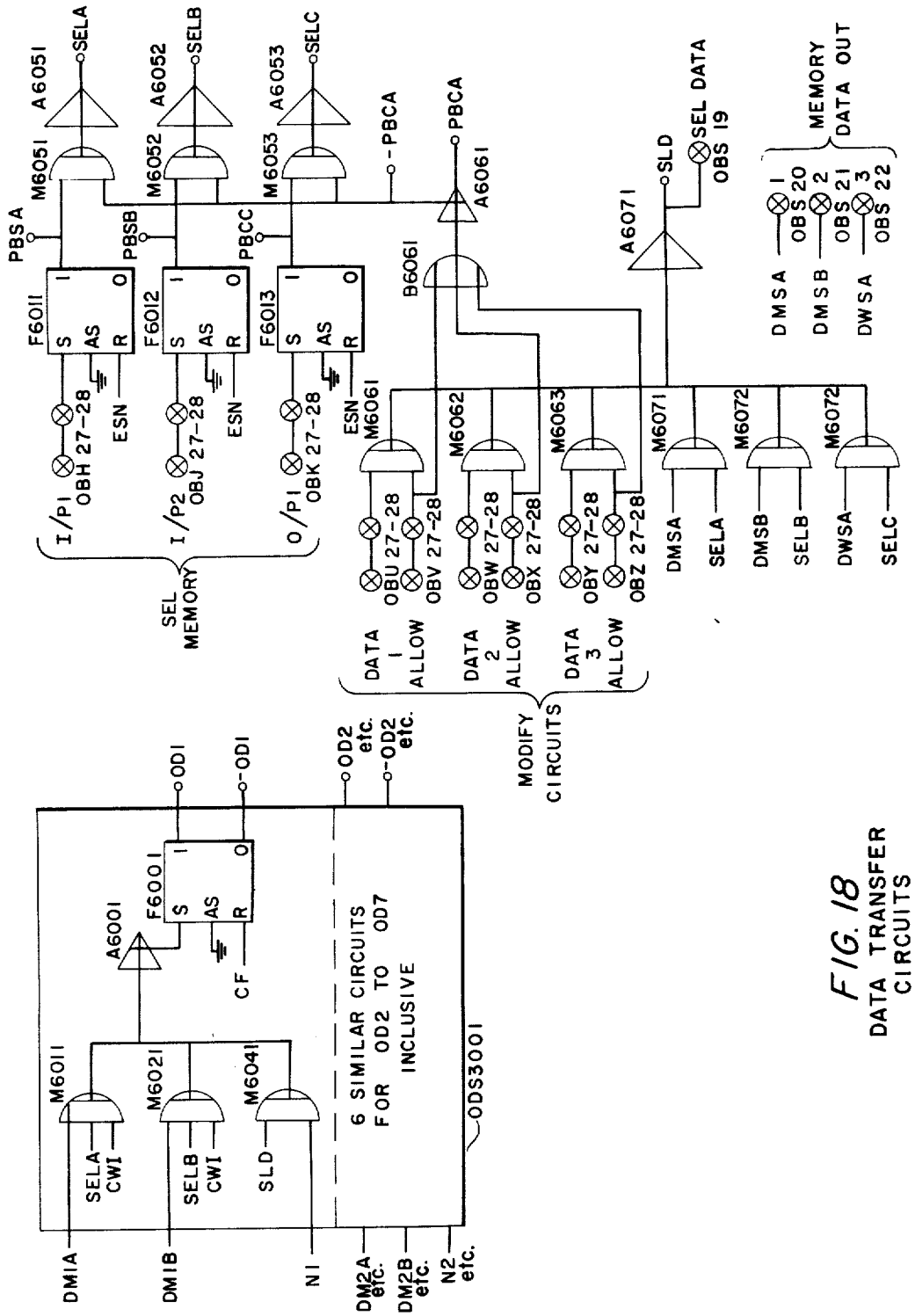
Figure 19:
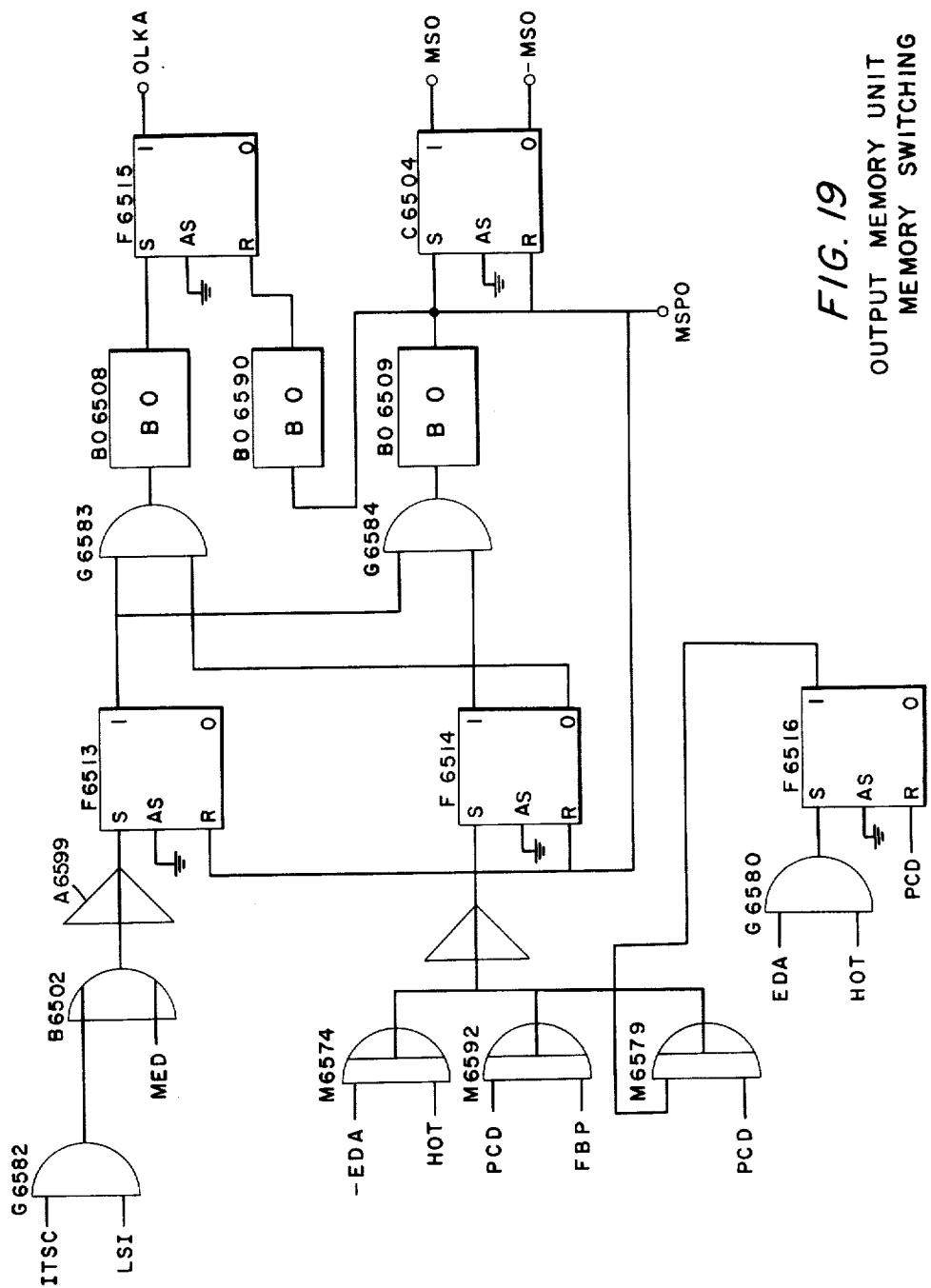
Figure 20:
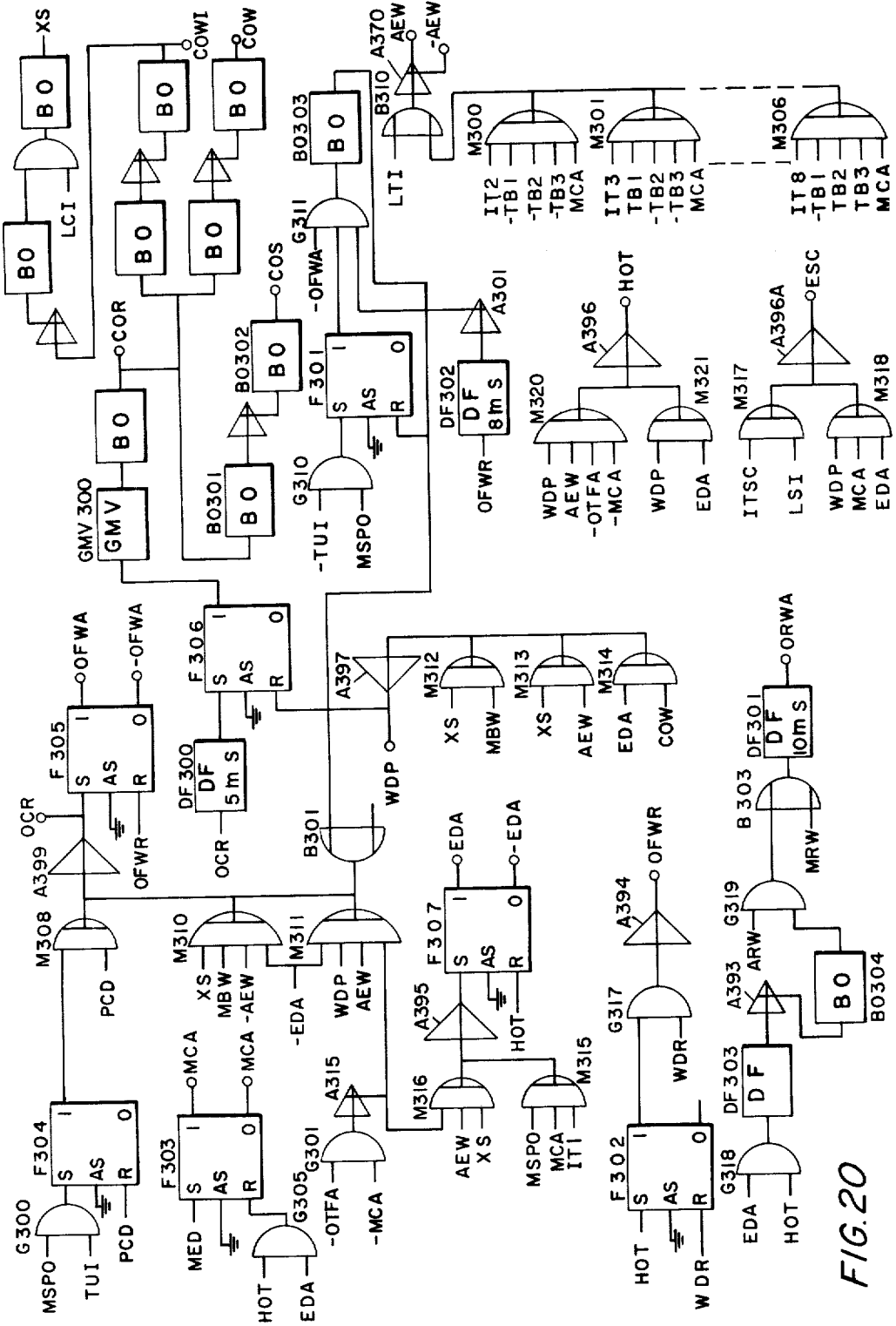
Figure 21:
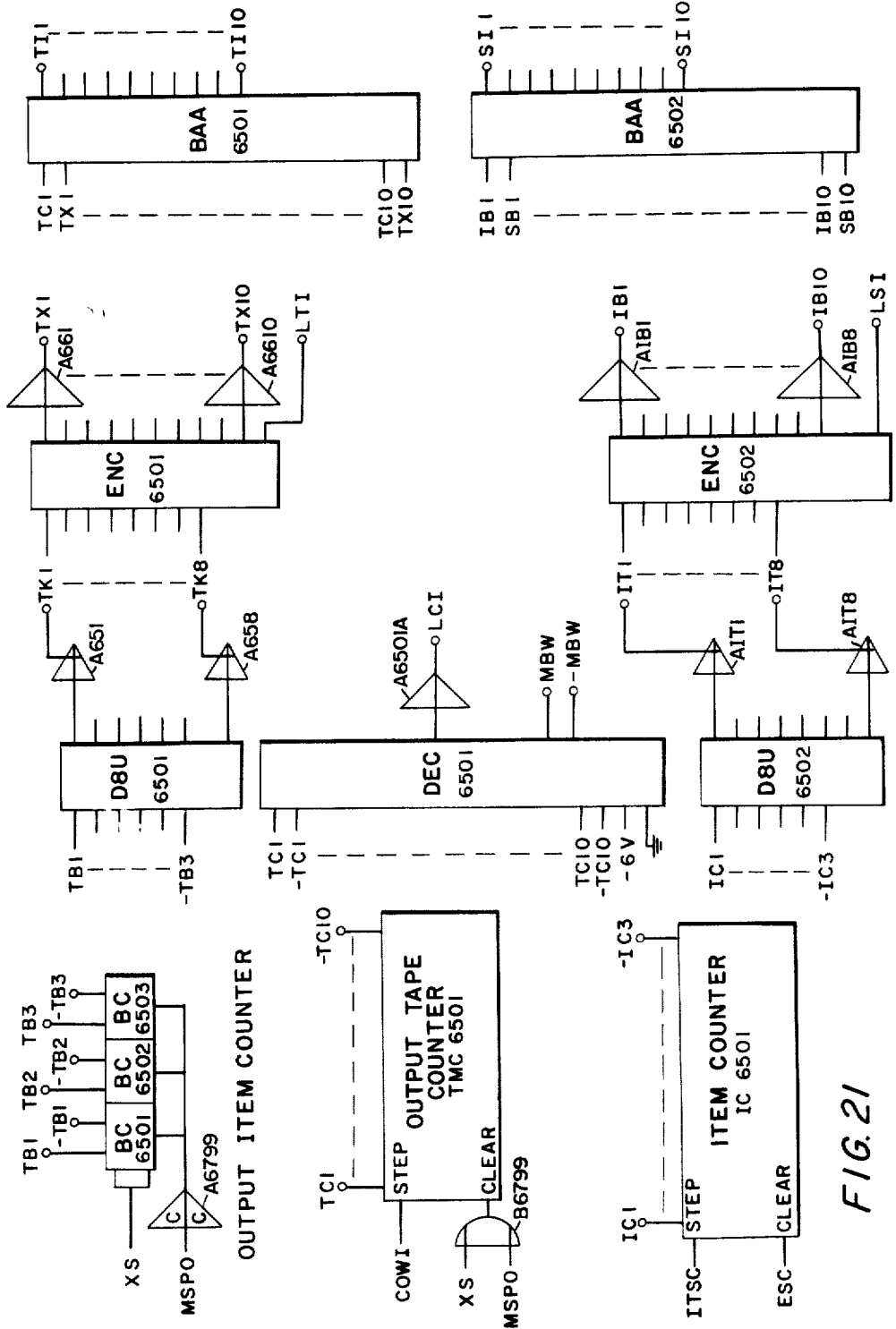
Figure 23:
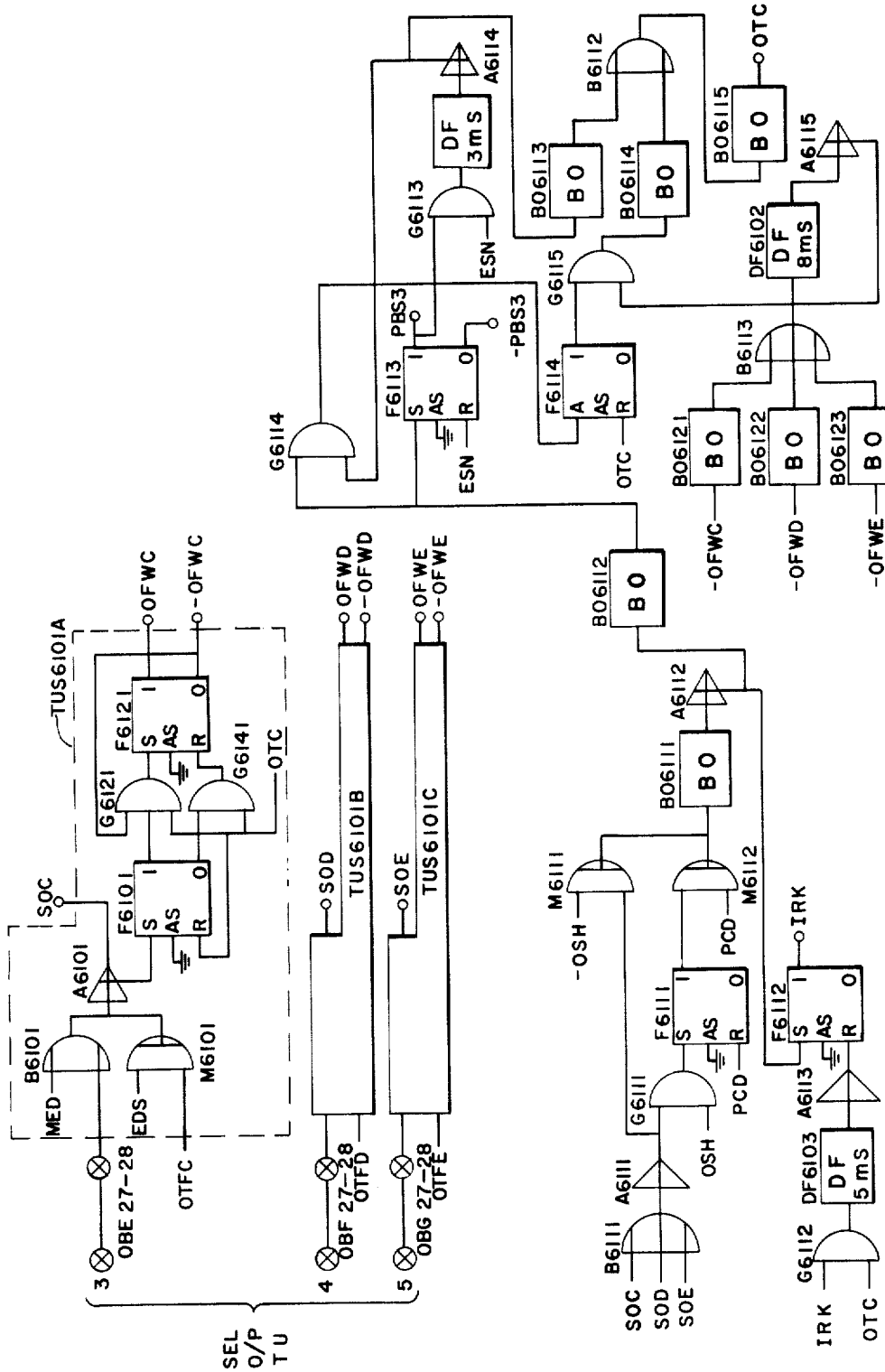
Figure 25A:
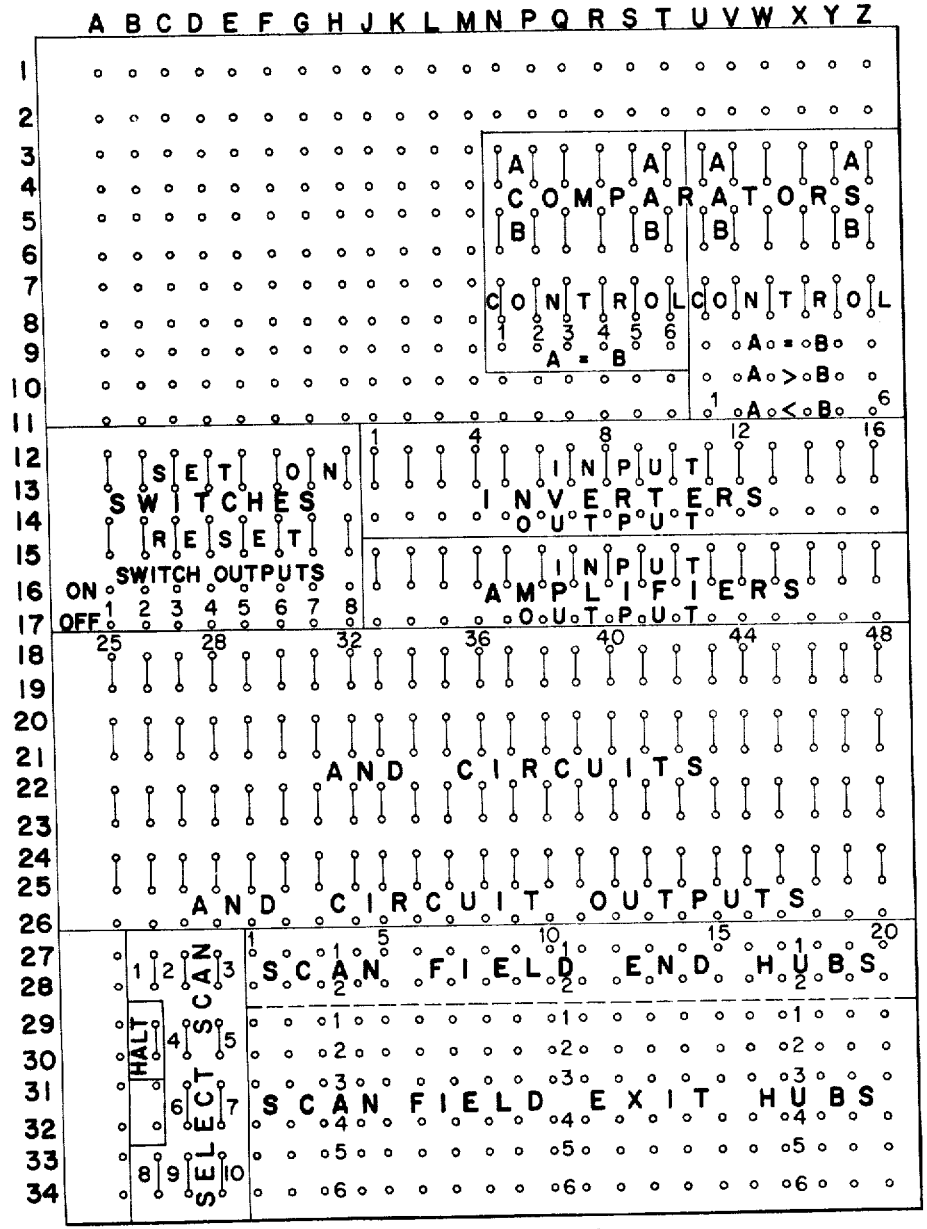
Figure 25B:
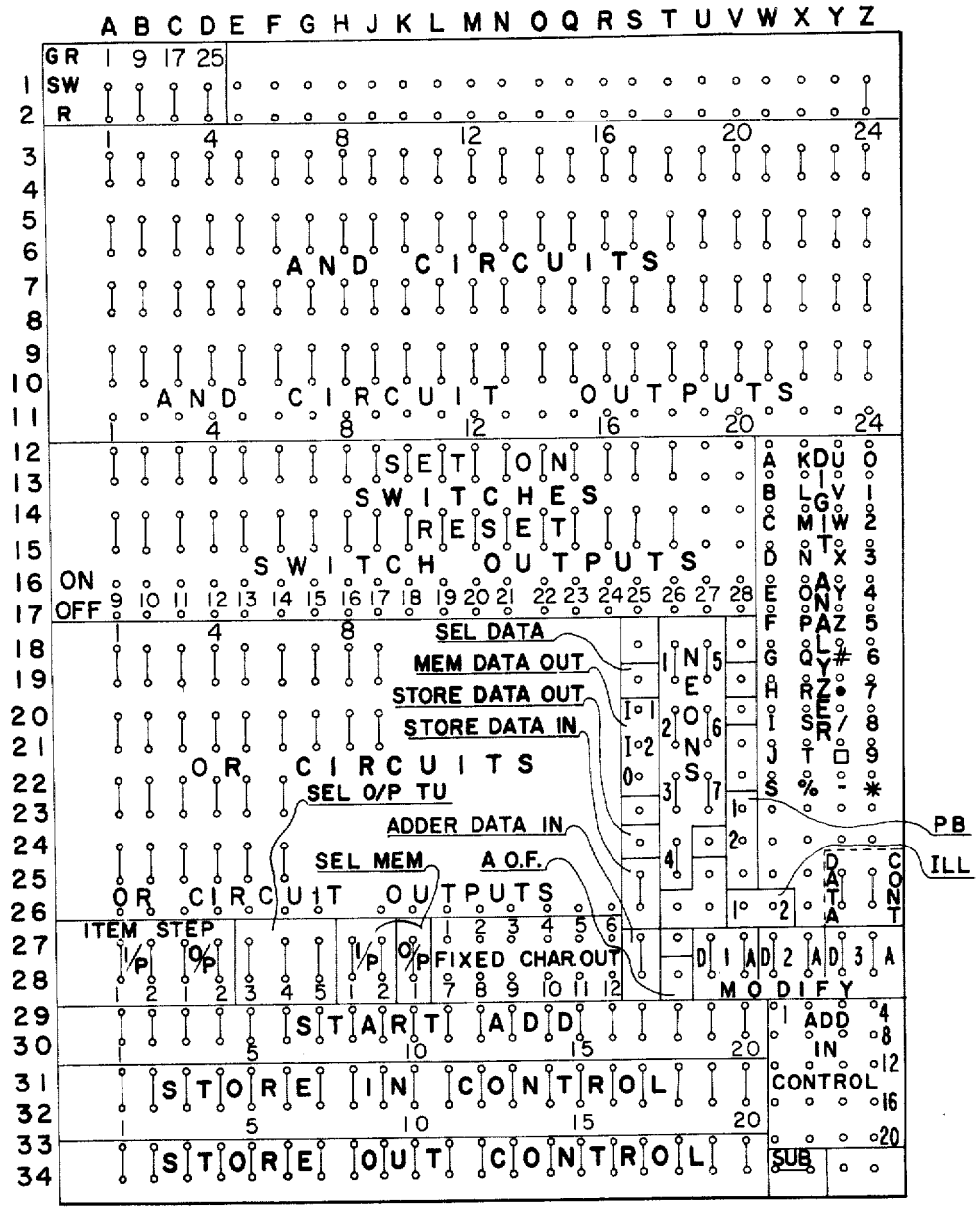
Figure 43:
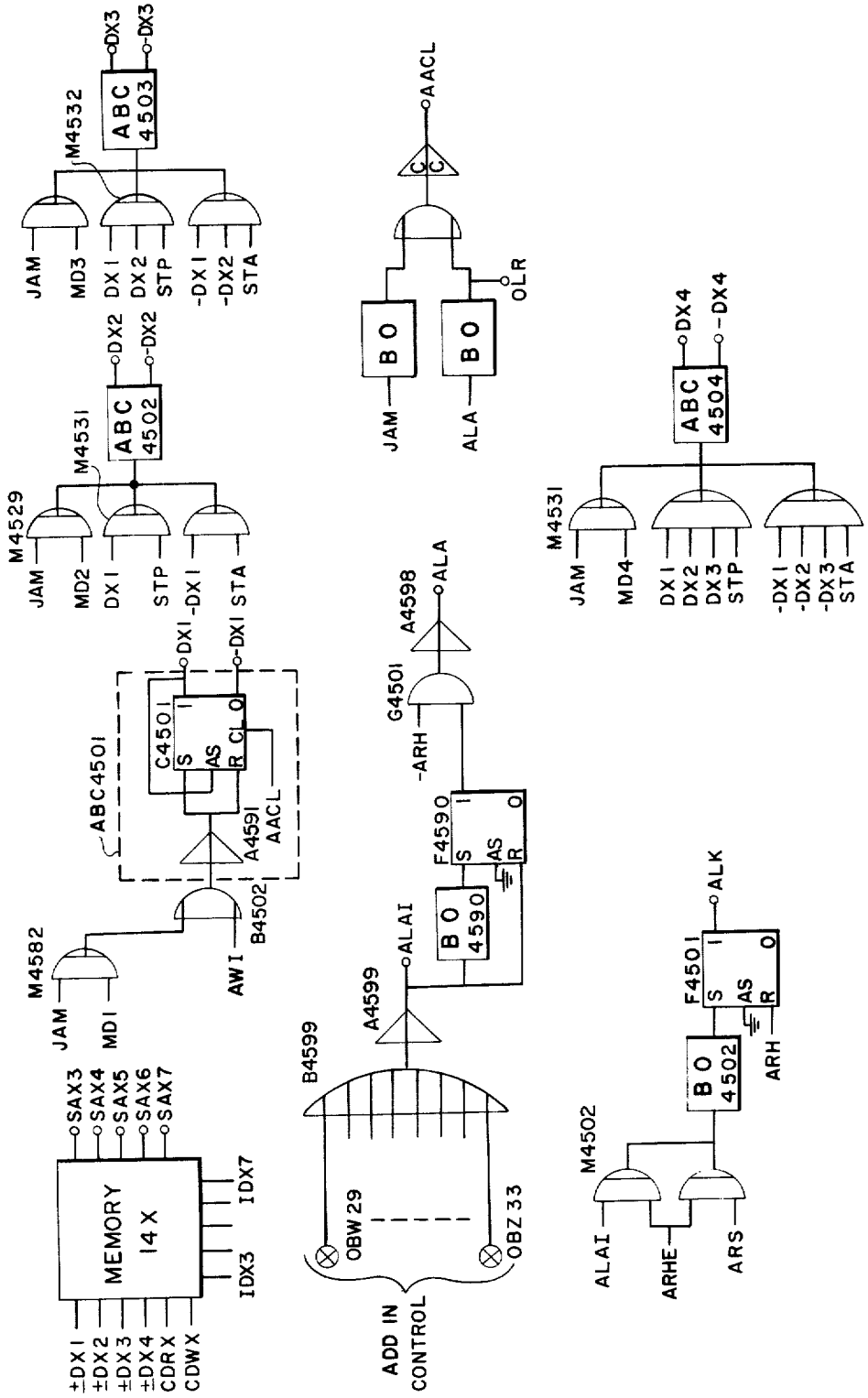
Figure 44:
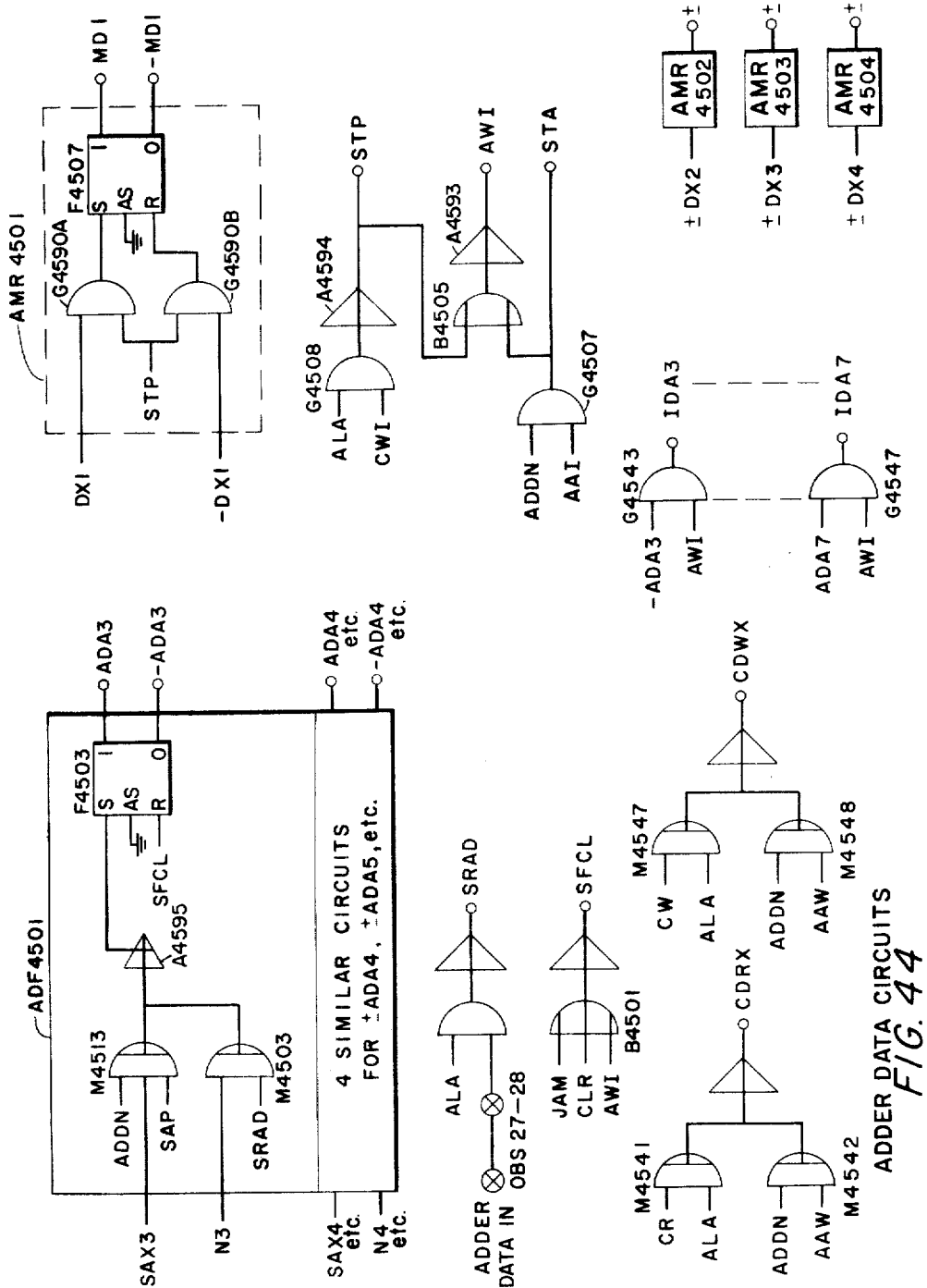
Figure 45:
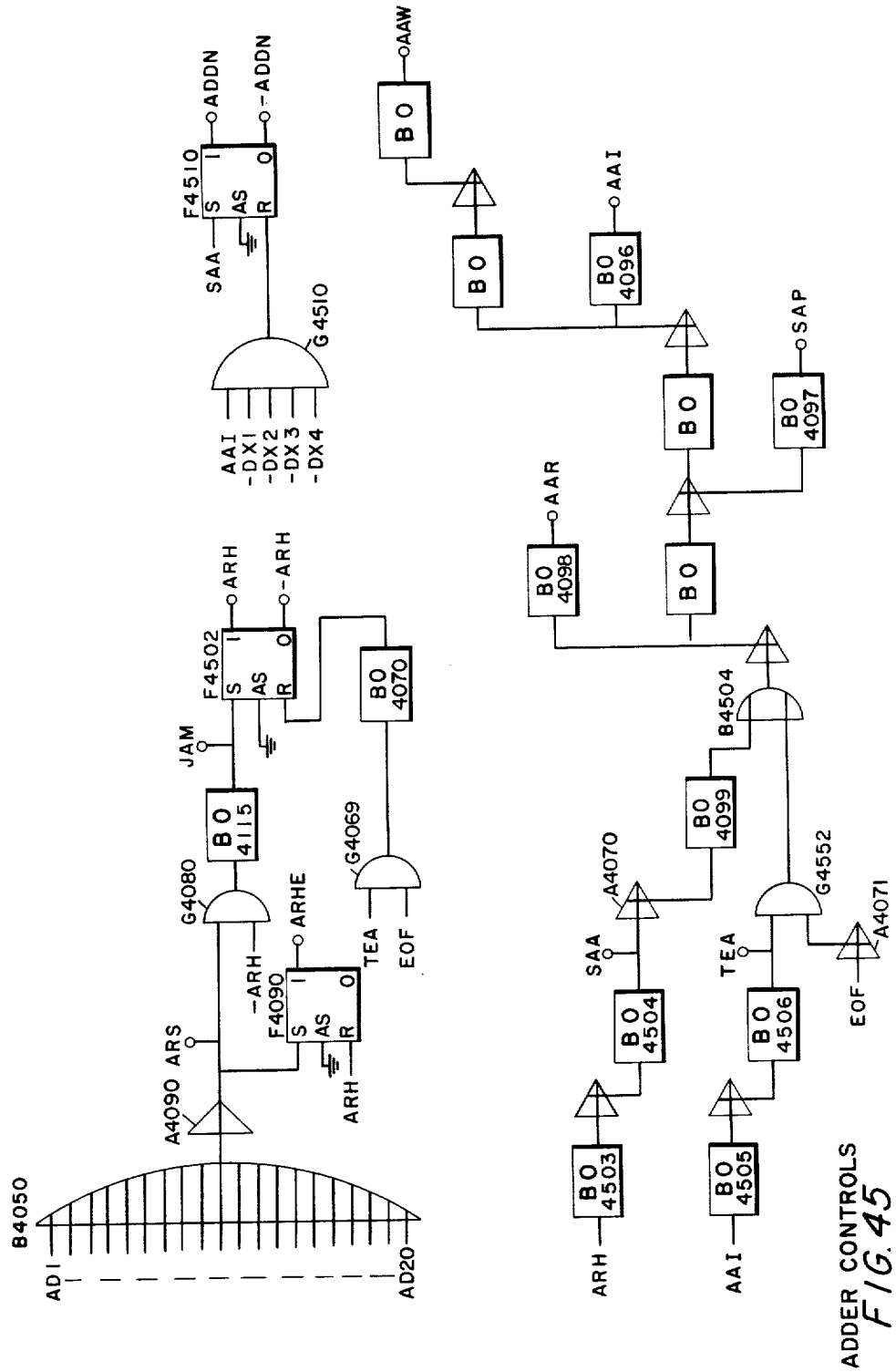
Figure 46:
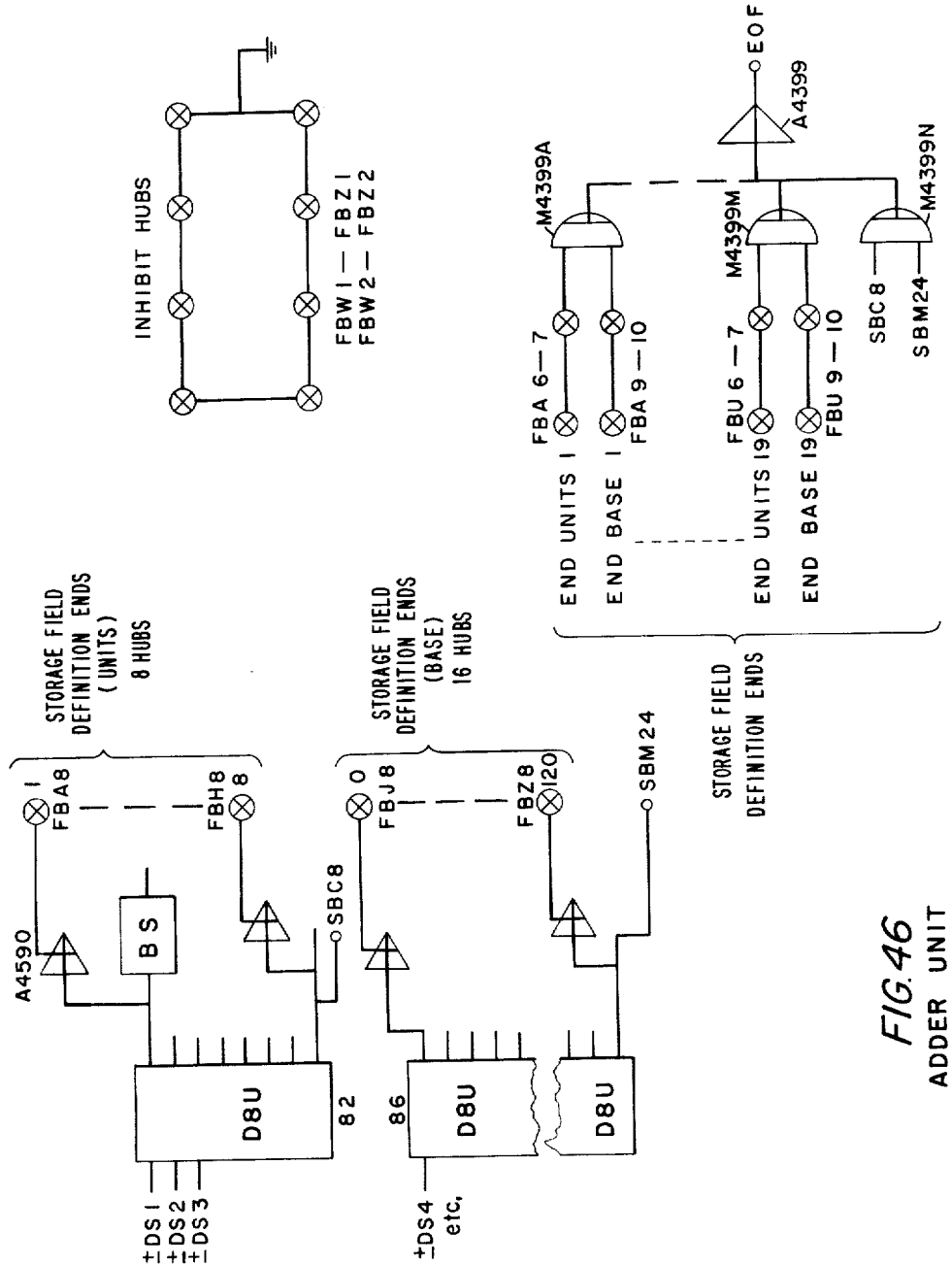
Figure 47:
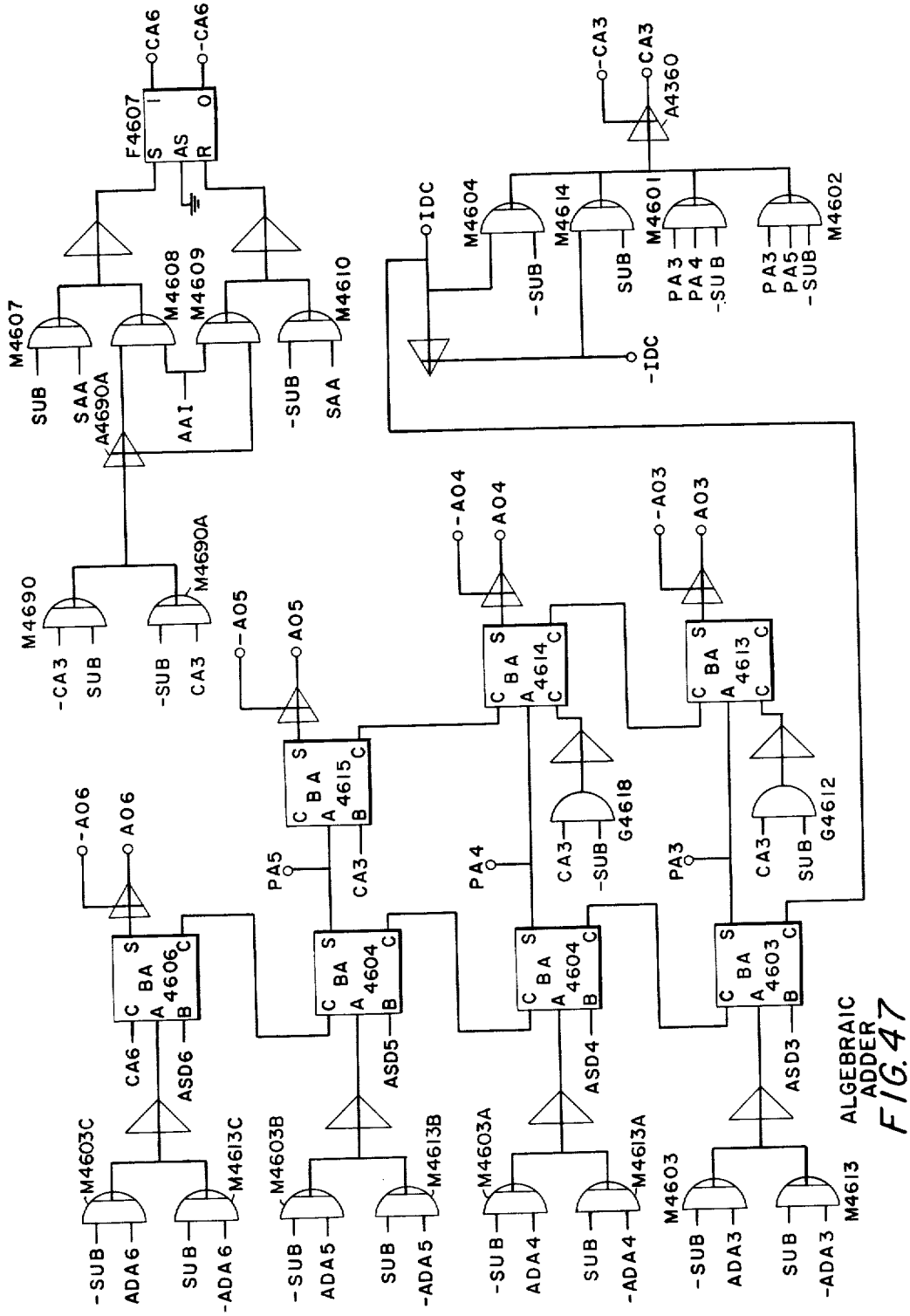
Figure 48:
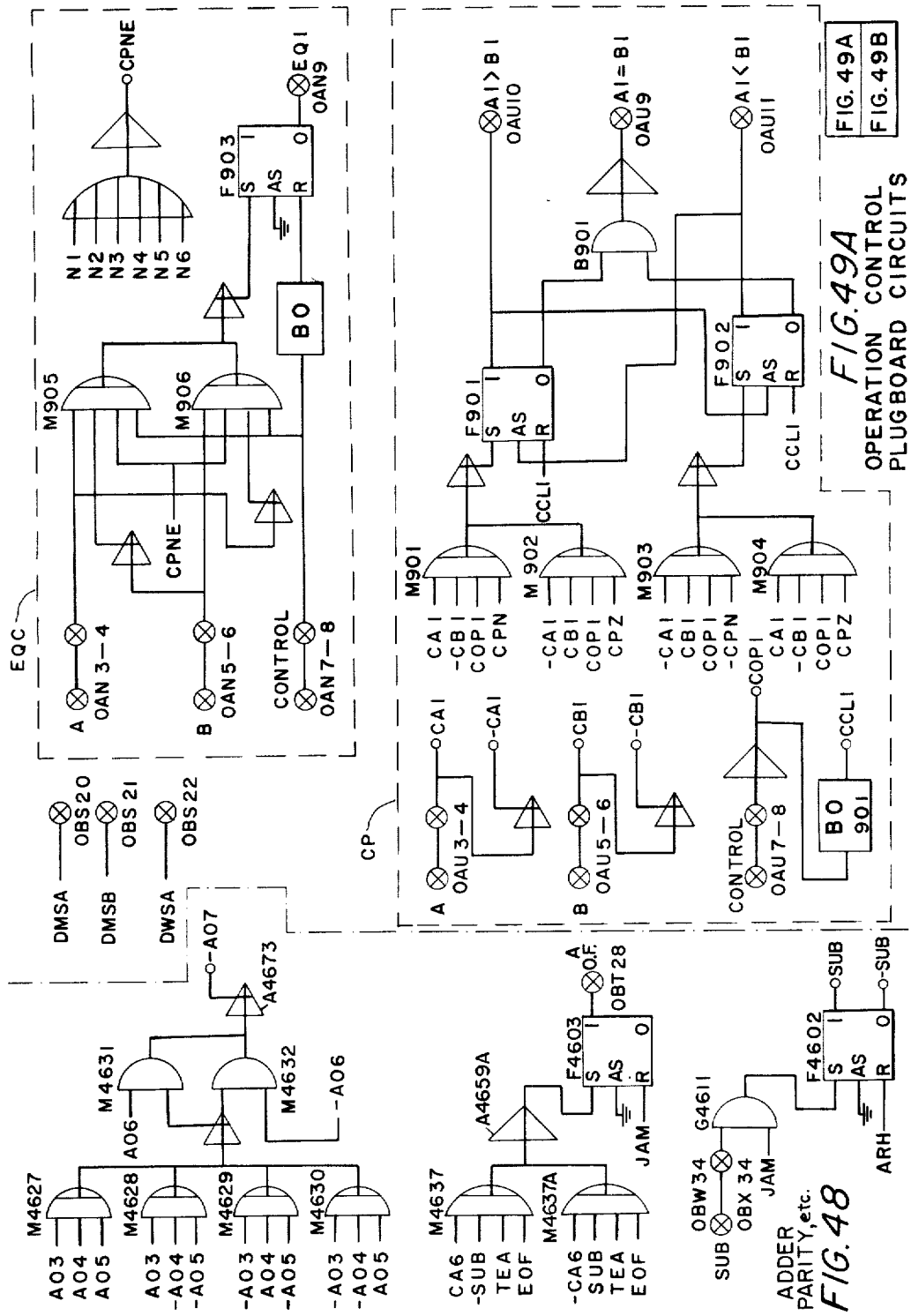
Figure 50:
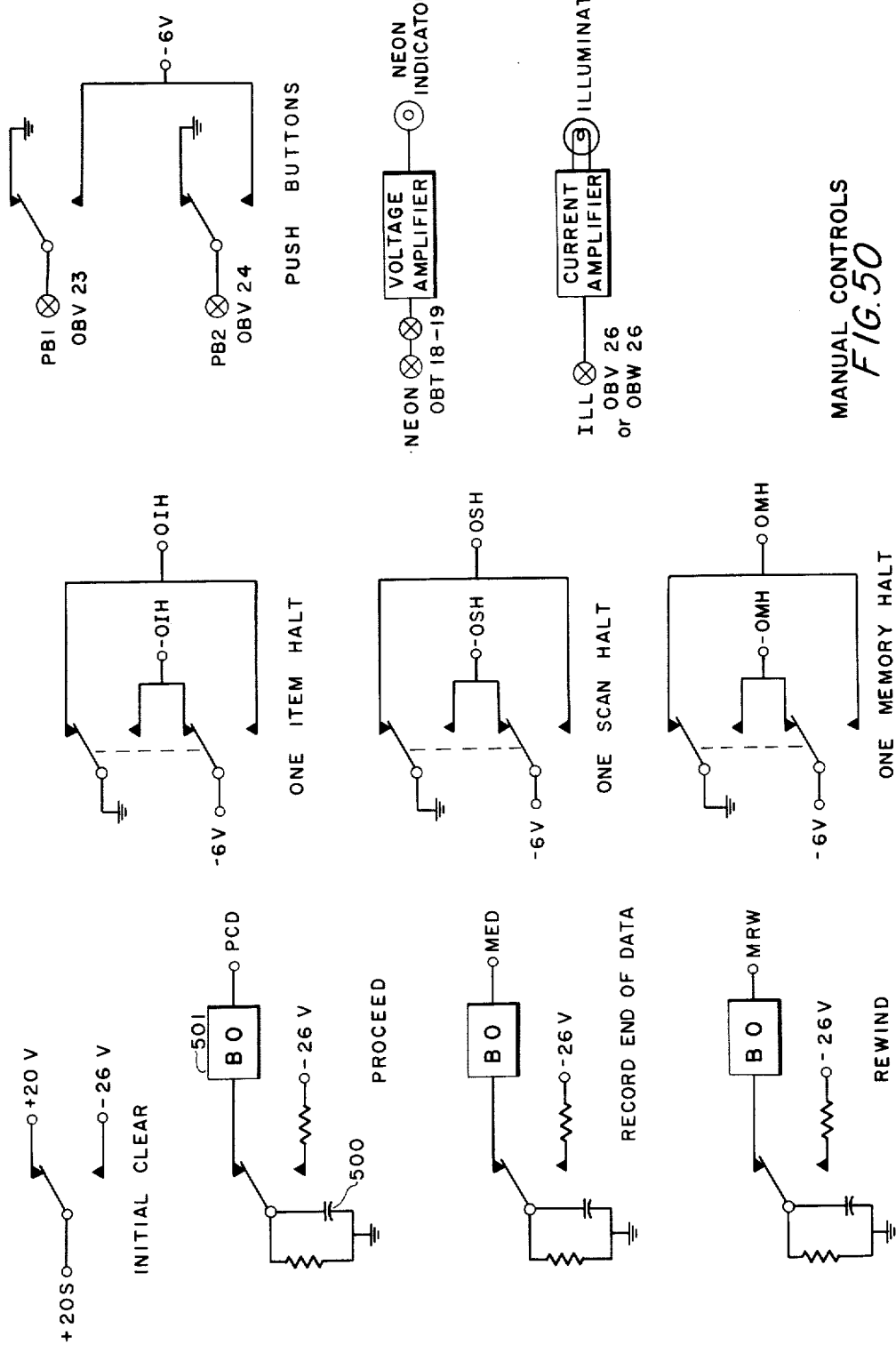
Figure 51:
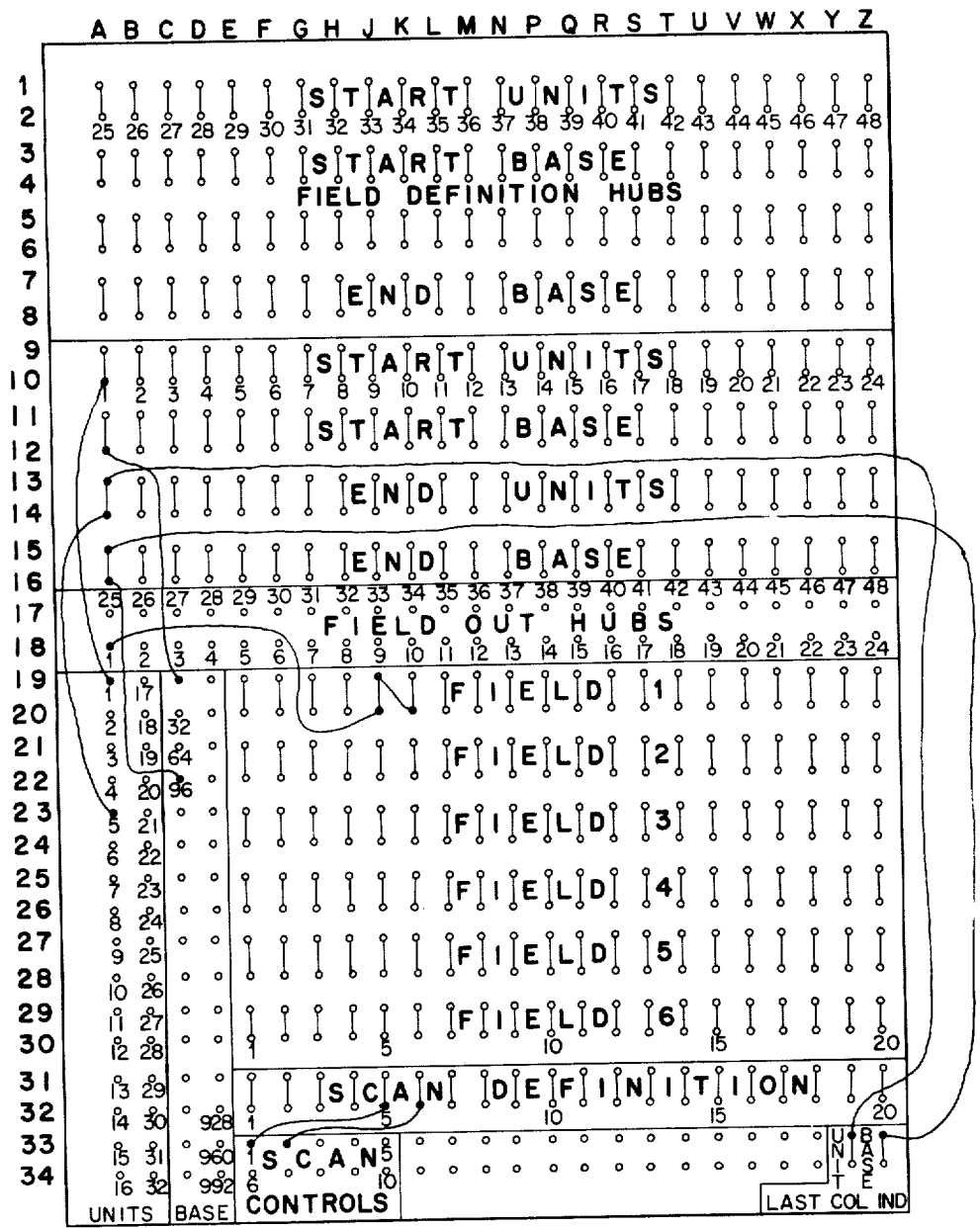
Figure 52A:
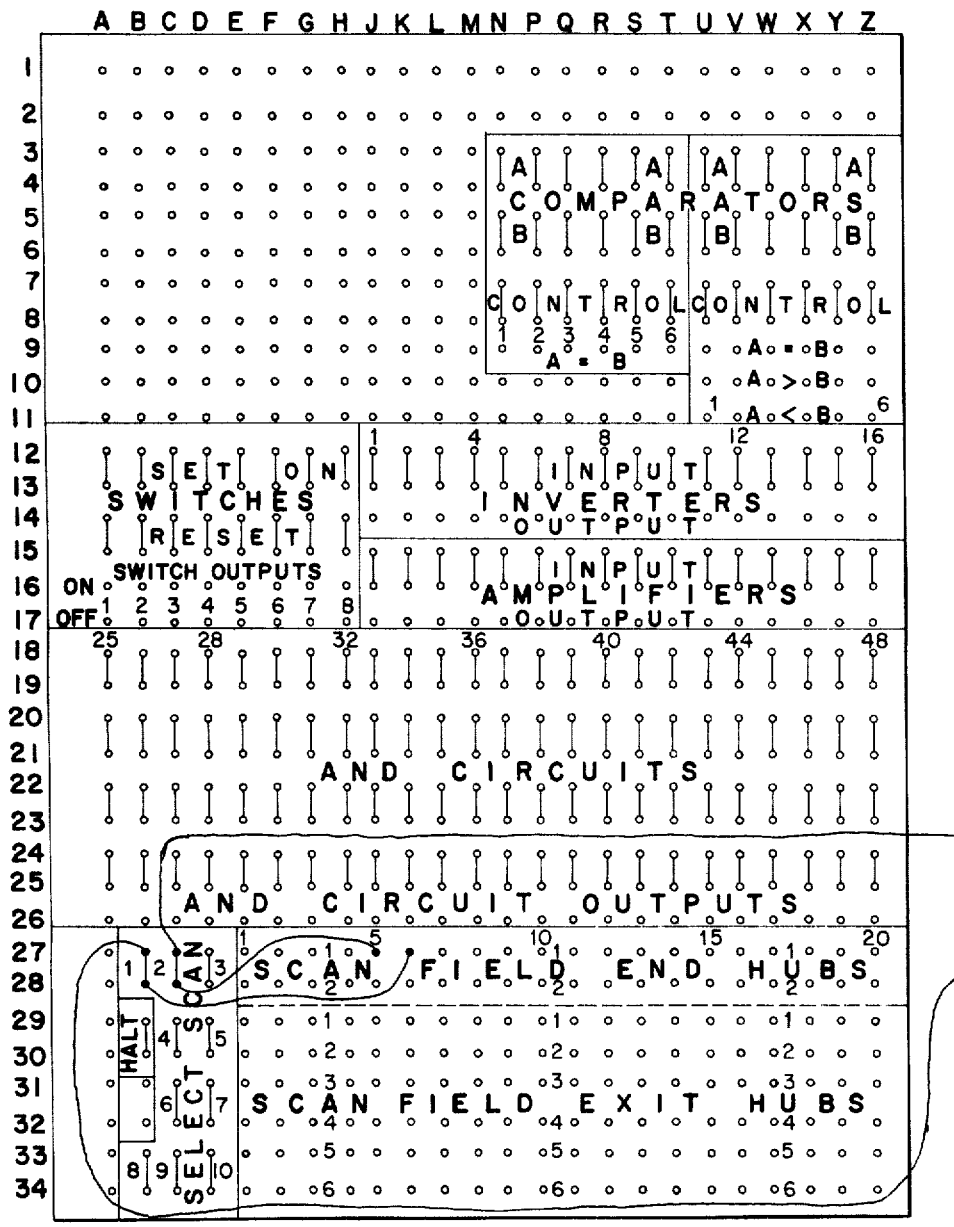
Figure 52B:
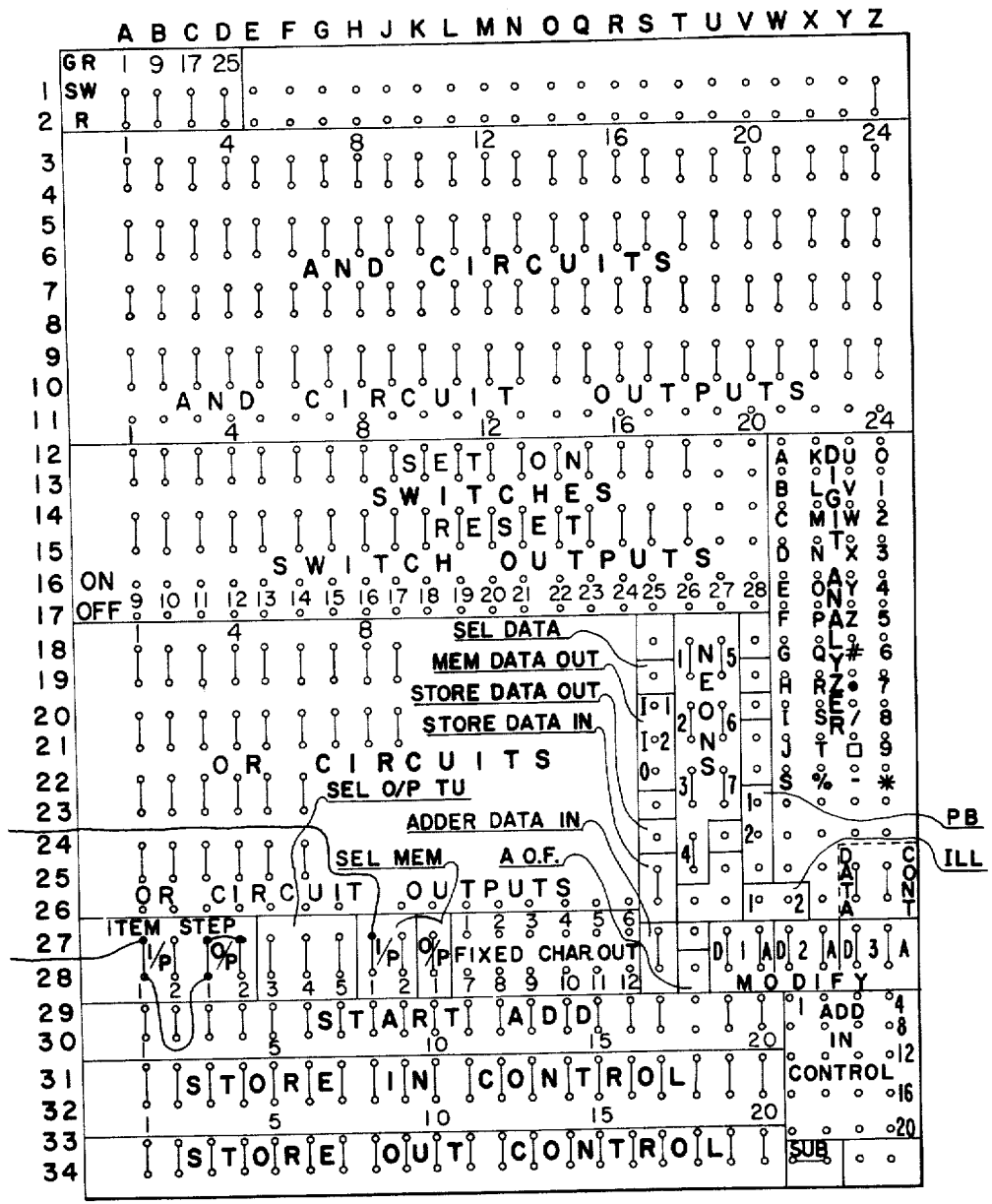
Figure 53:
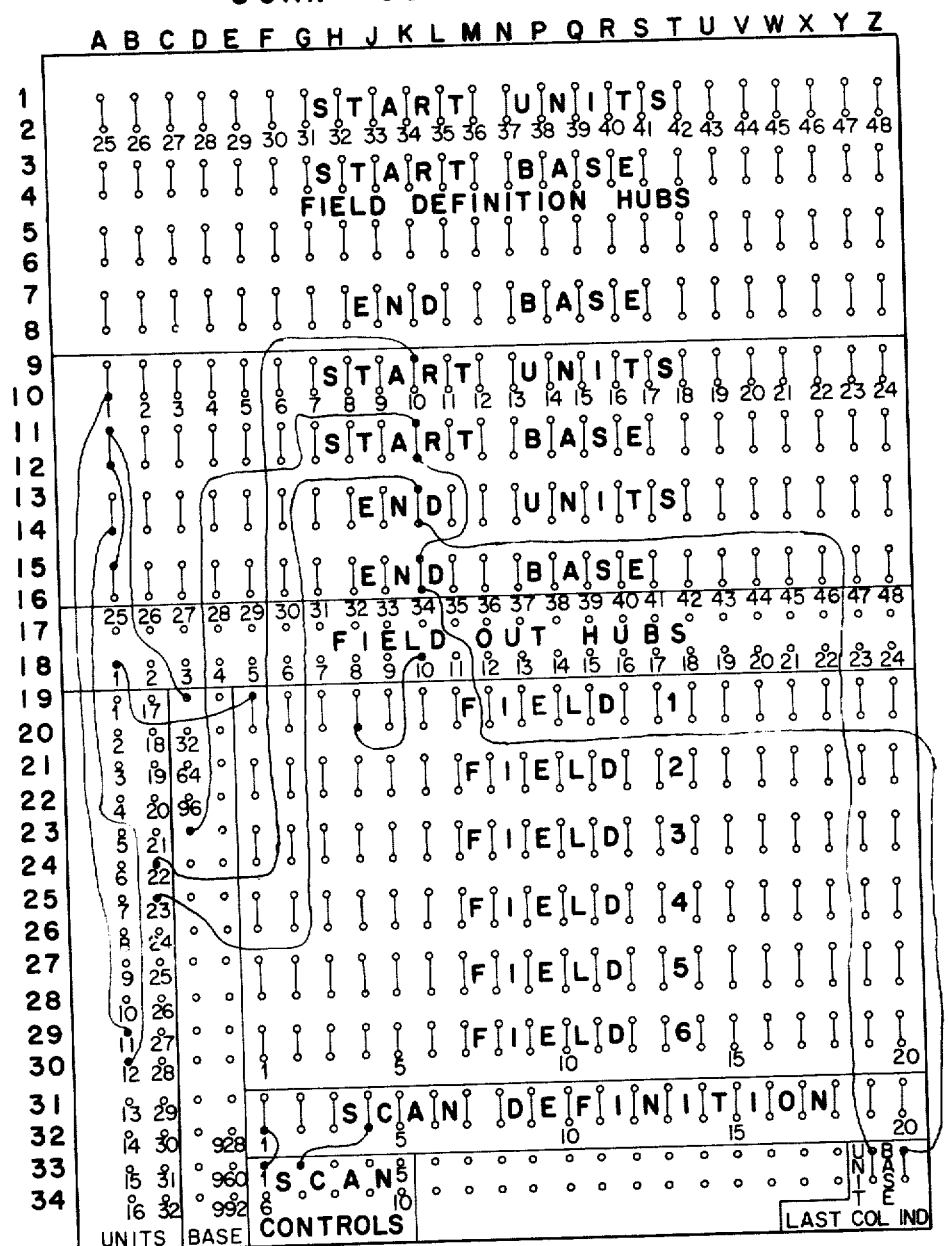
Figure 54A:
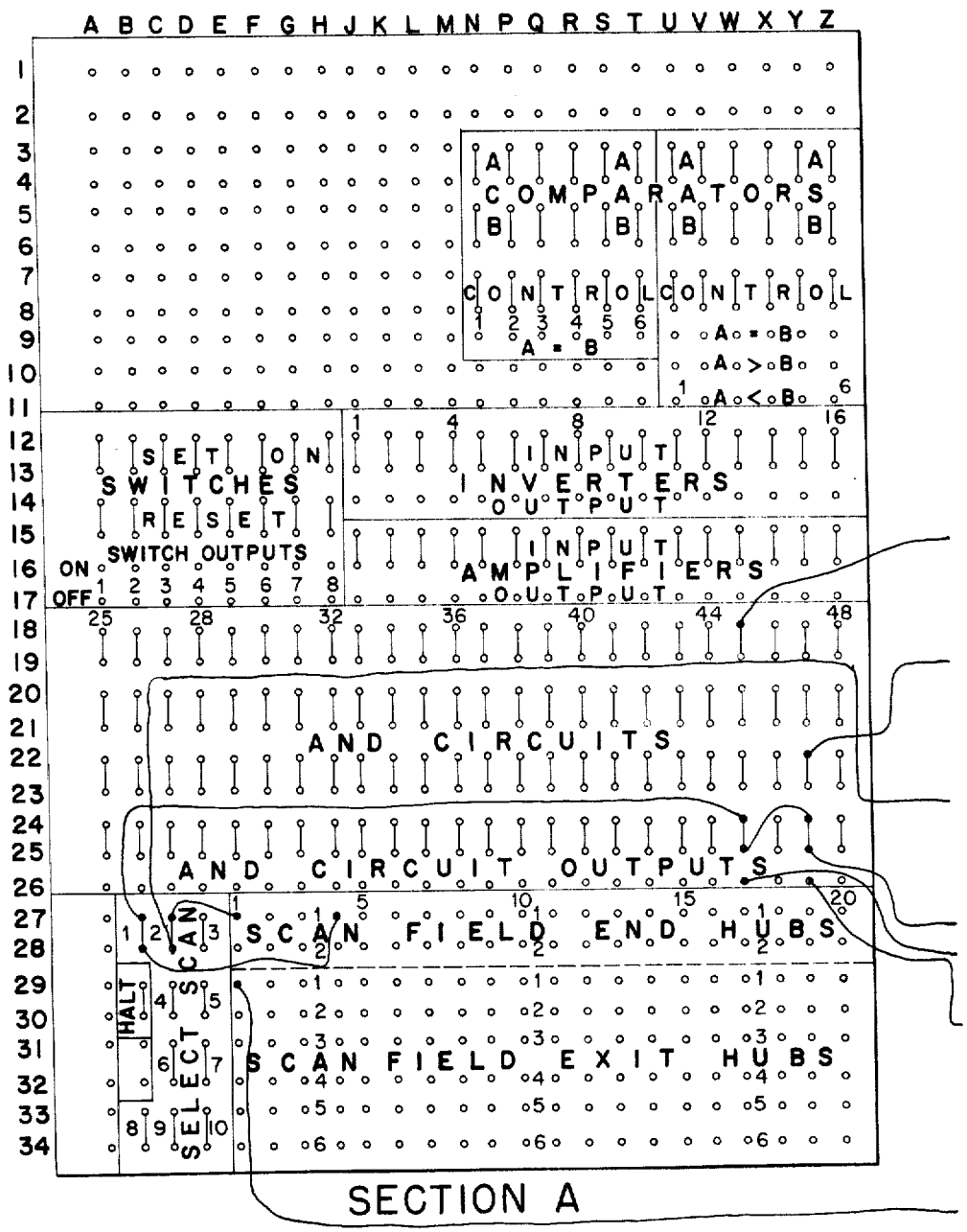
Figure 54B:
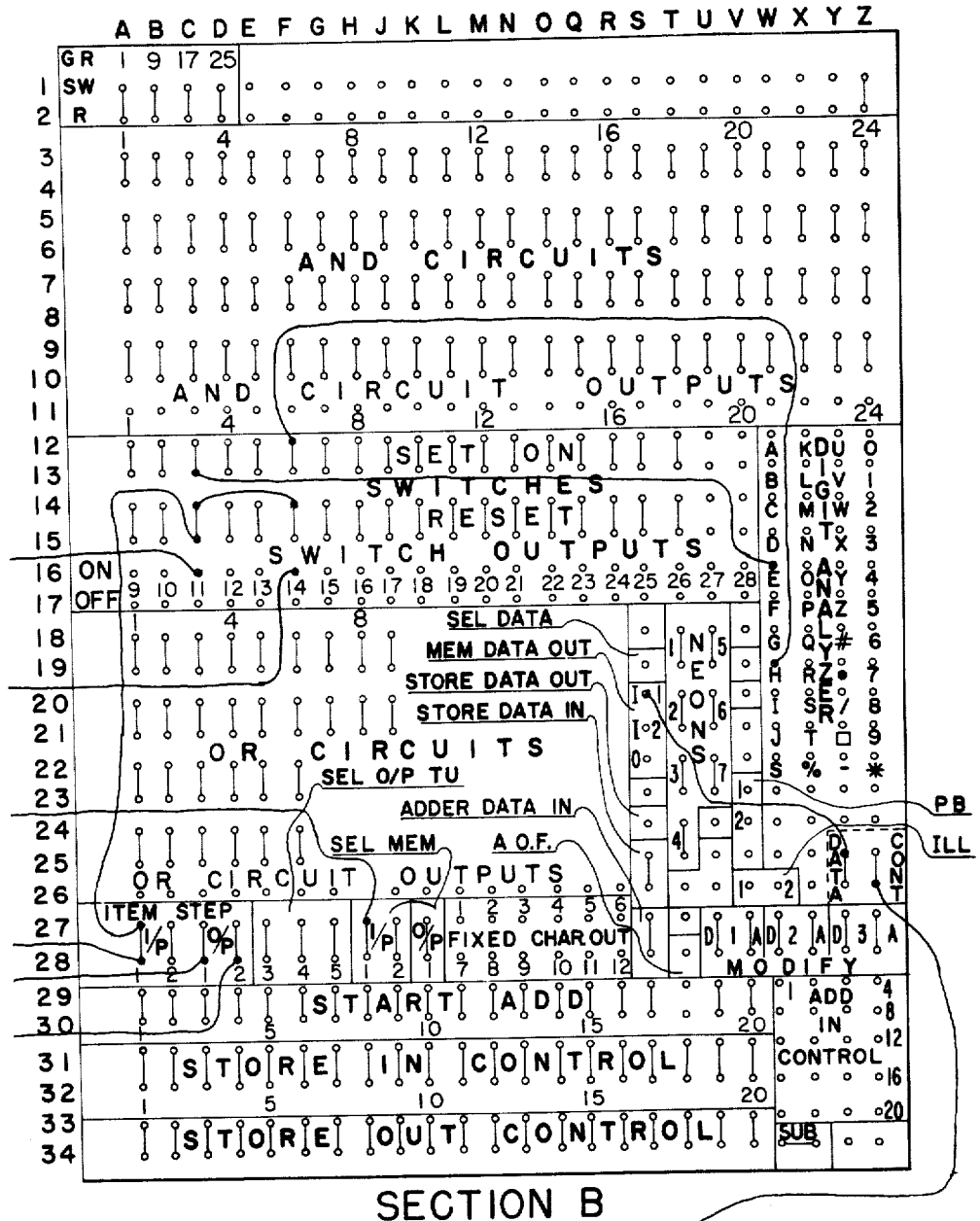
Figure 55:
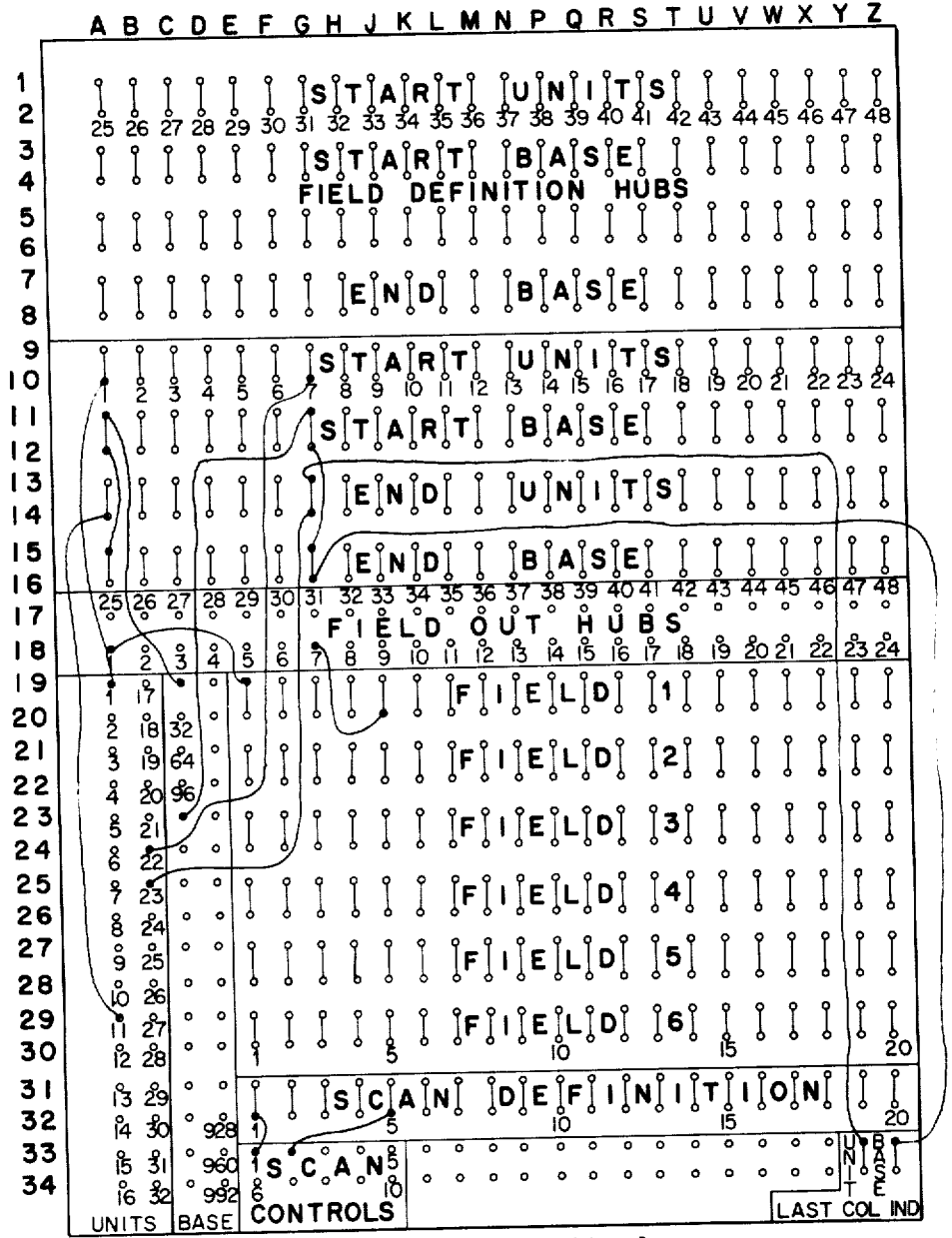
Figure 56A:
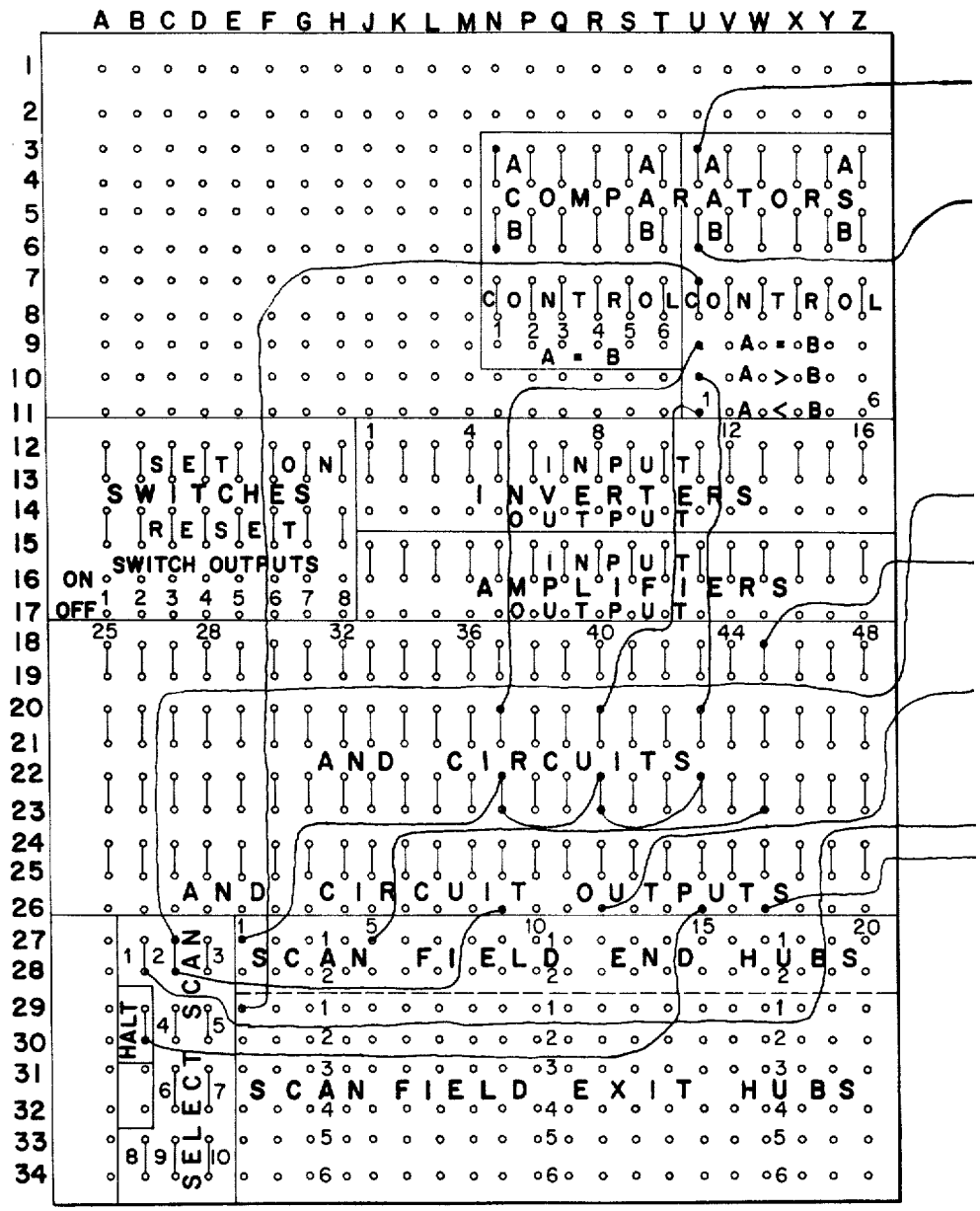
Figure 56B:
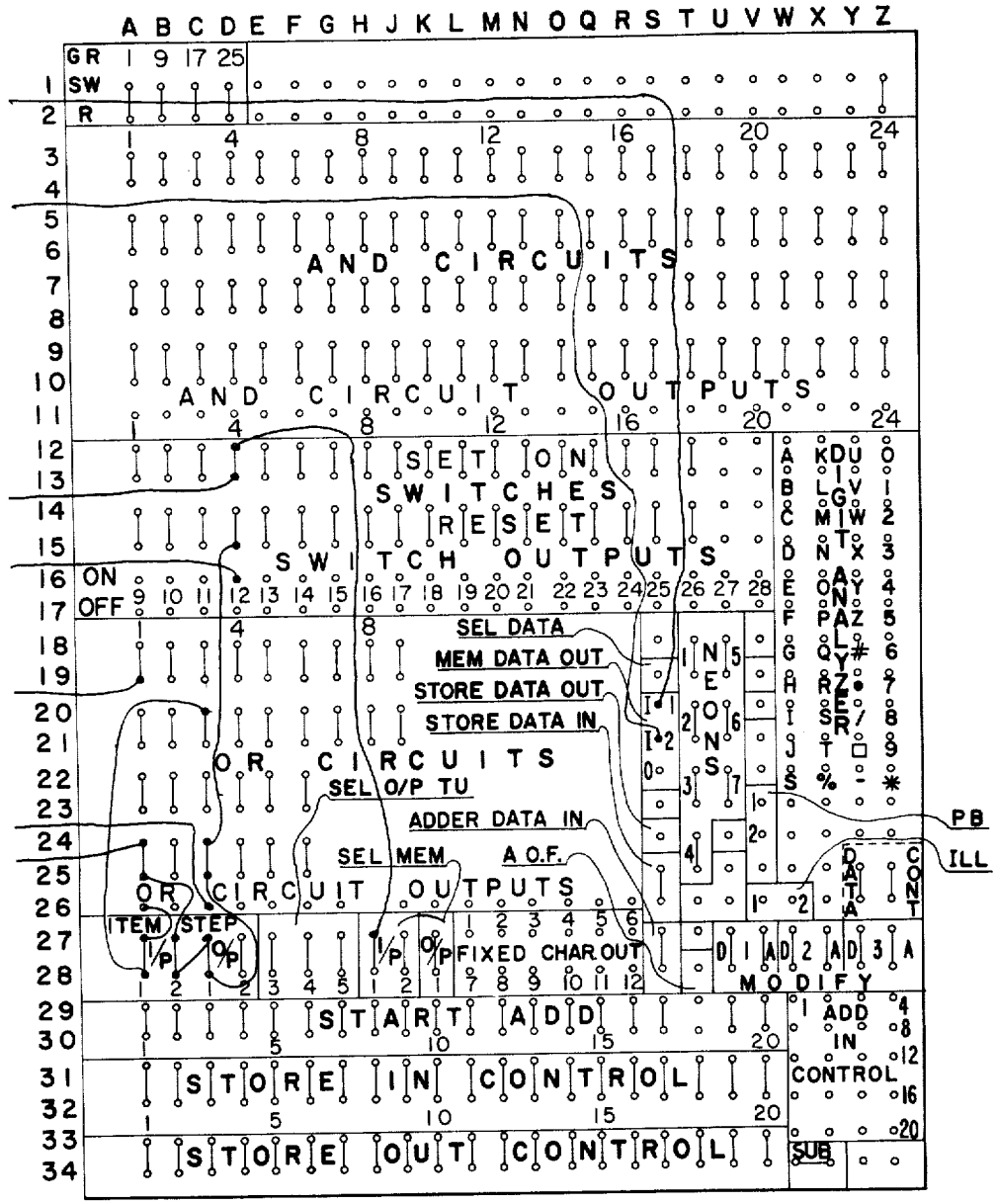
Figure 57:
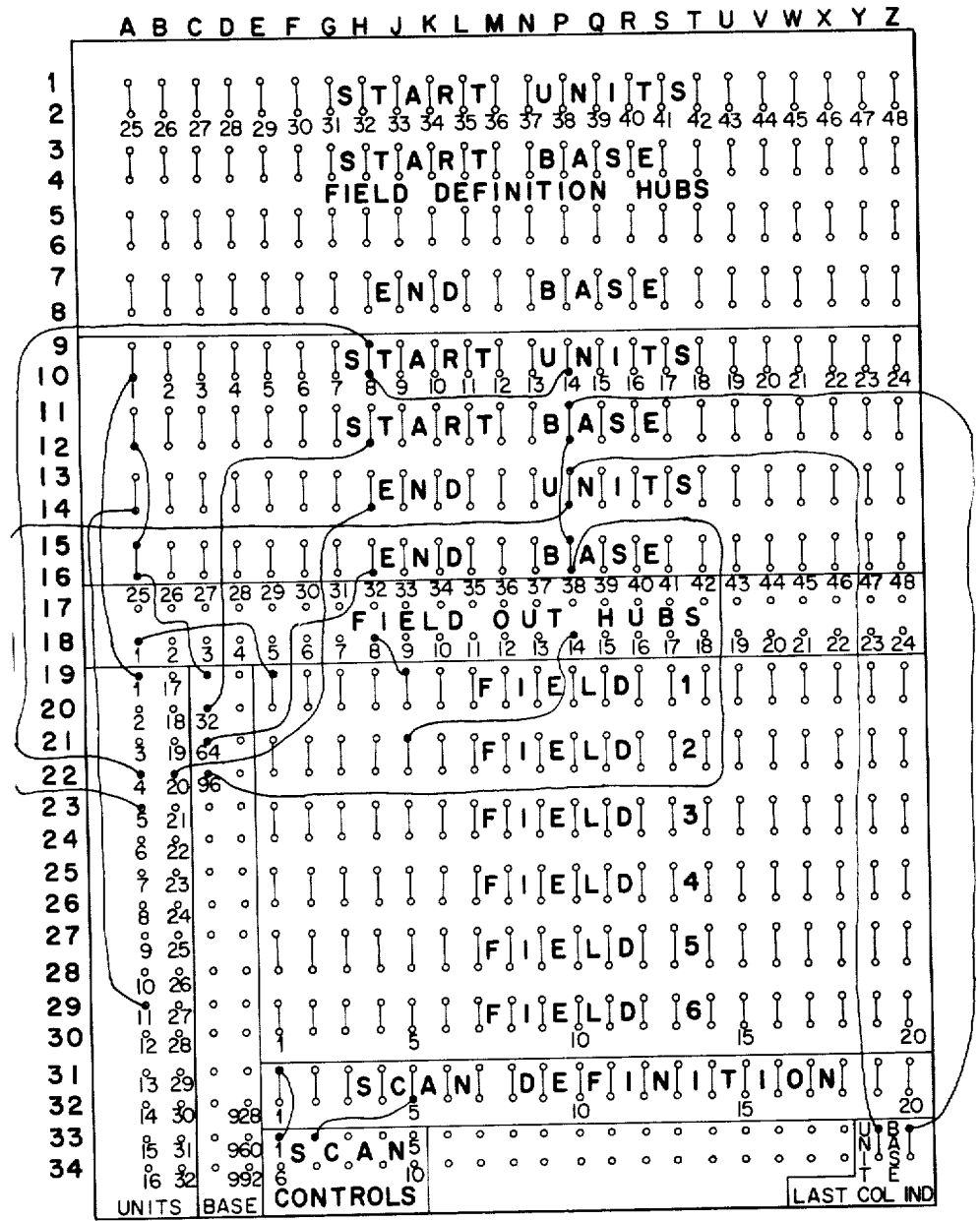
Figure 58A:
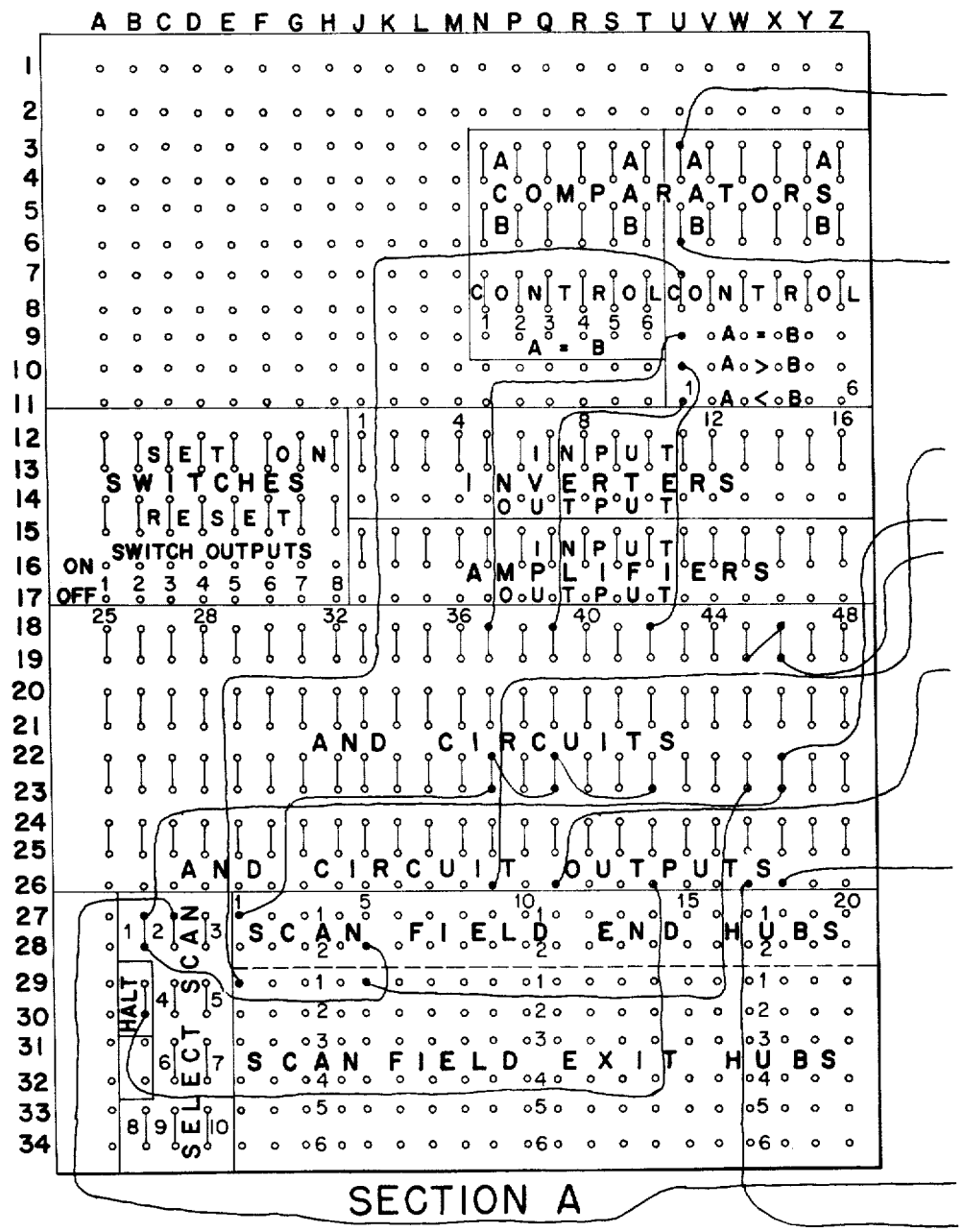
Figure 58B:
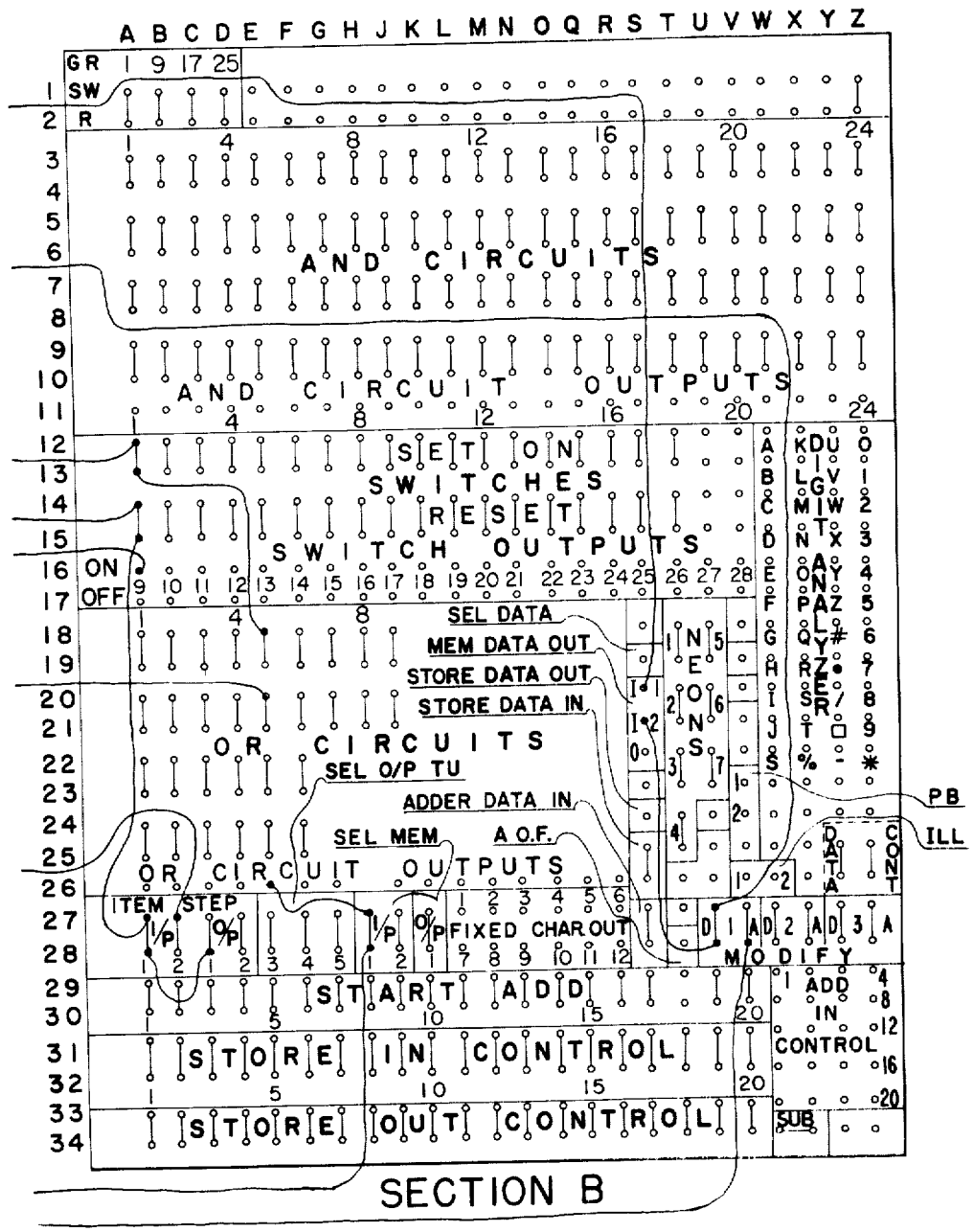
Figure 59:
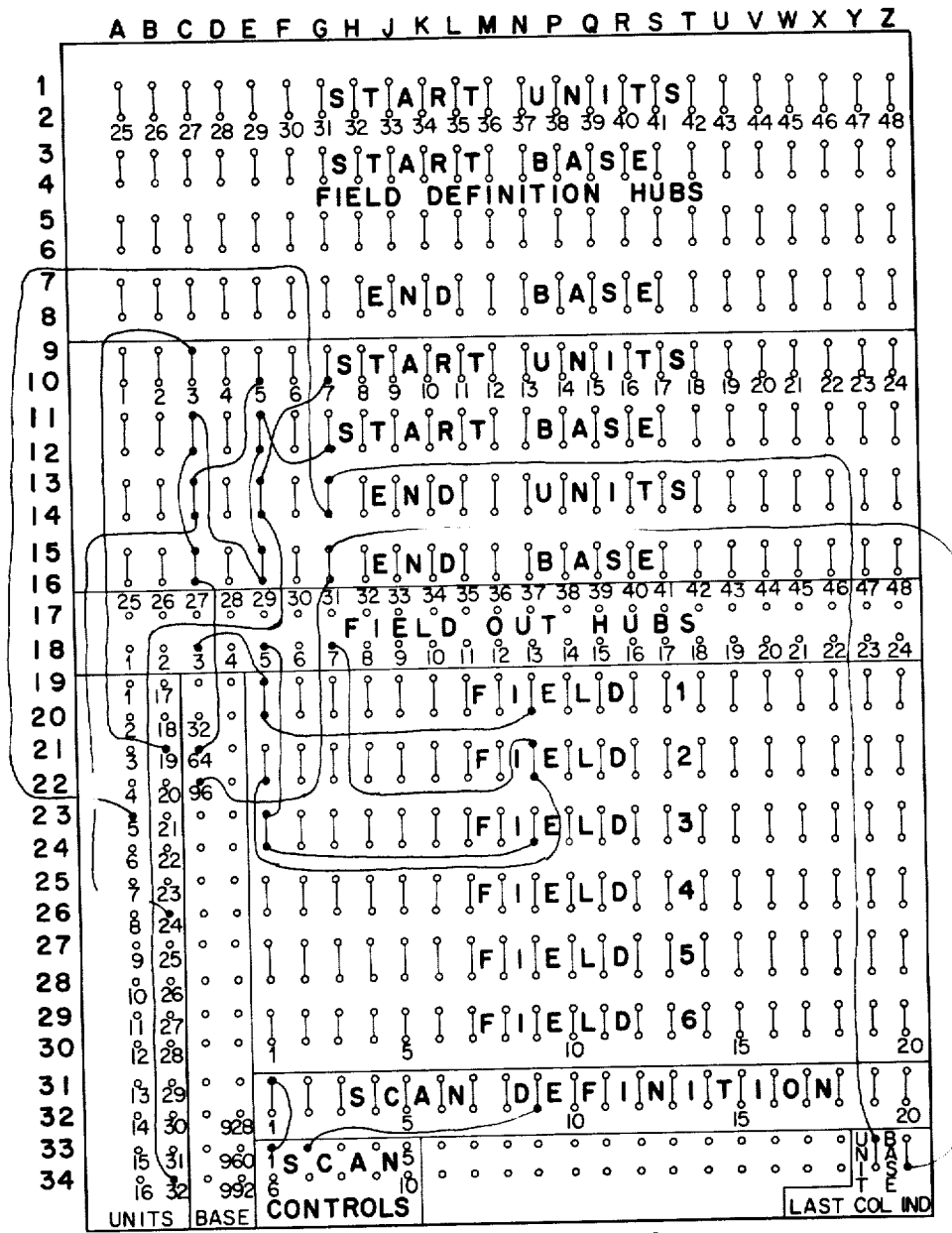
Figure 60A:
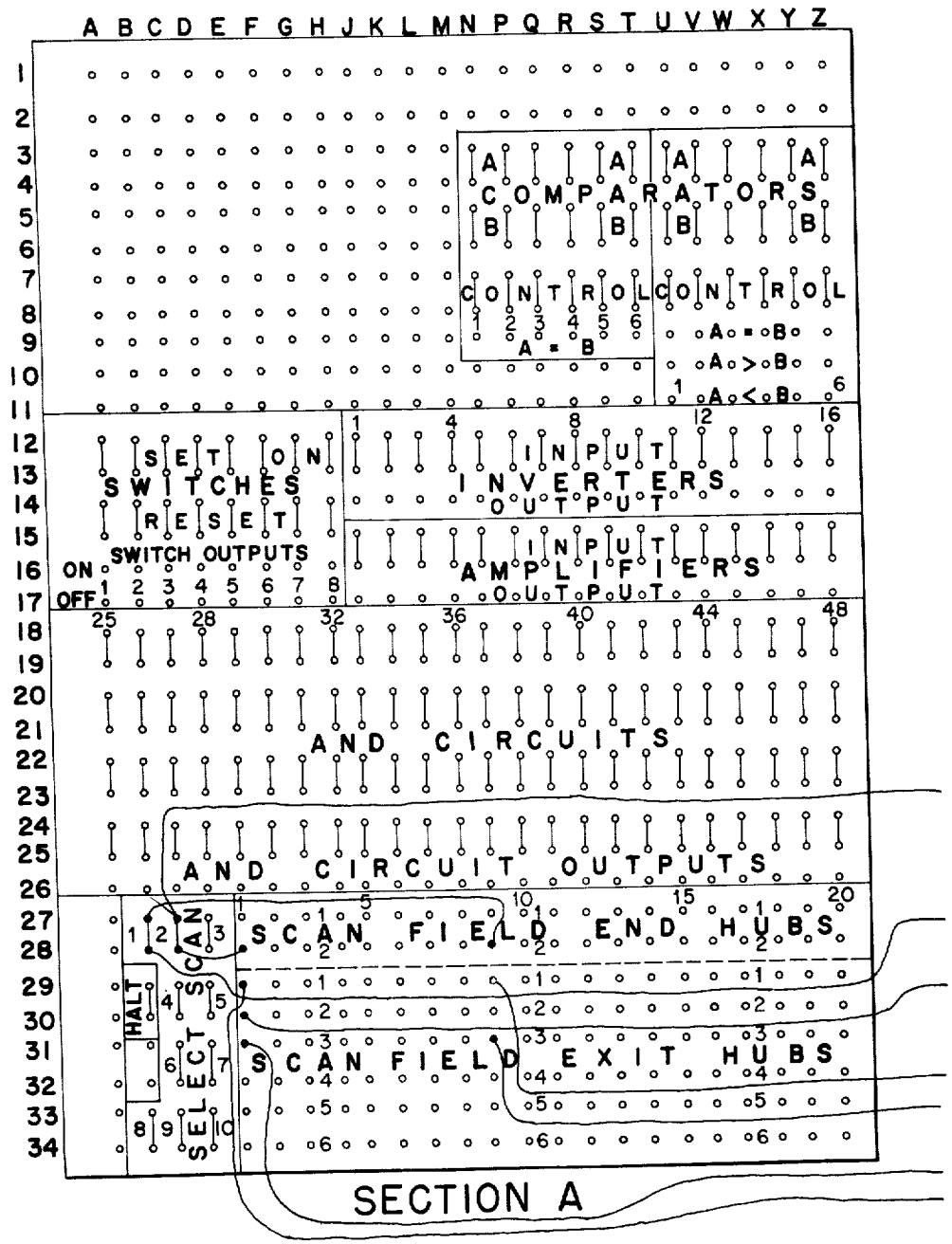
Figure 60B:
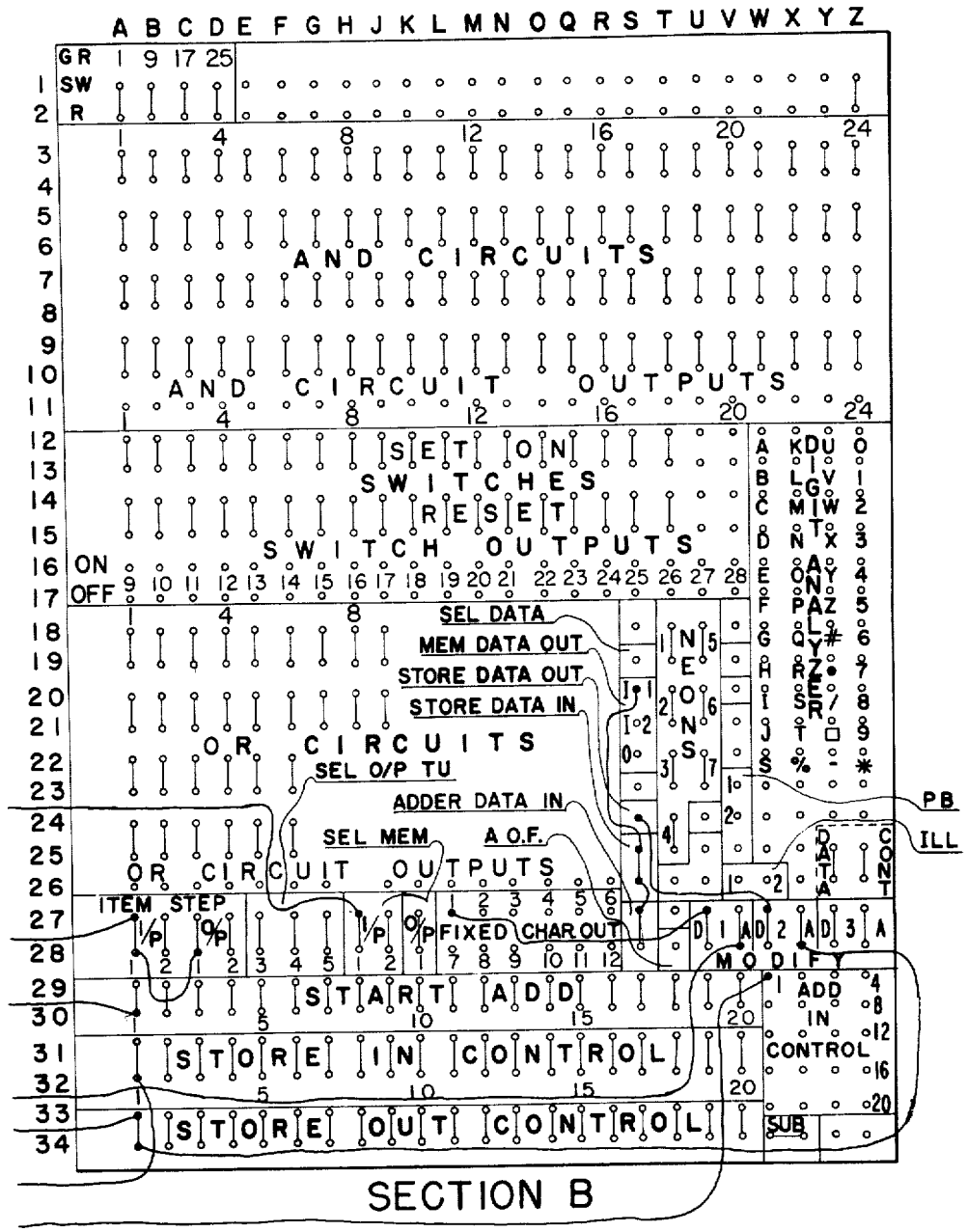

FIGURE 6, a composite of 6A and 6B, are logical diagrams of a scan timer, consisting actually of several alternative timers, for generating signals such as those of FIGURE 5 and other signals;

FIGURE 7 is a timing diagram showing the signals produced by the scan timer when transferring data from one memory to another;

FIGURE 8 is a timing diagram showing the signals produced by the timer during the "search" mode of operation;

FIGURE 9, a composite of 9A and 9B, show the memory selection and input tape starting controls of the input memory unit;

FIGURE 10, a composite of 10A, 10B and 10C, show the input item counter of the input memory unit;

FIGURE 11 shows the data circuits of the input memory unit;

FIGURE 12, a composite of 12A and 12B, show the counters and adders of the input memory addressing circuits;

FIGURE 13 shows the address switching circuits of the input memory unit;

FIGURES 14 and 14A show the scan counter;

FIGURE 15 shows the field definition and scan selection circuits;

Figure 16A:
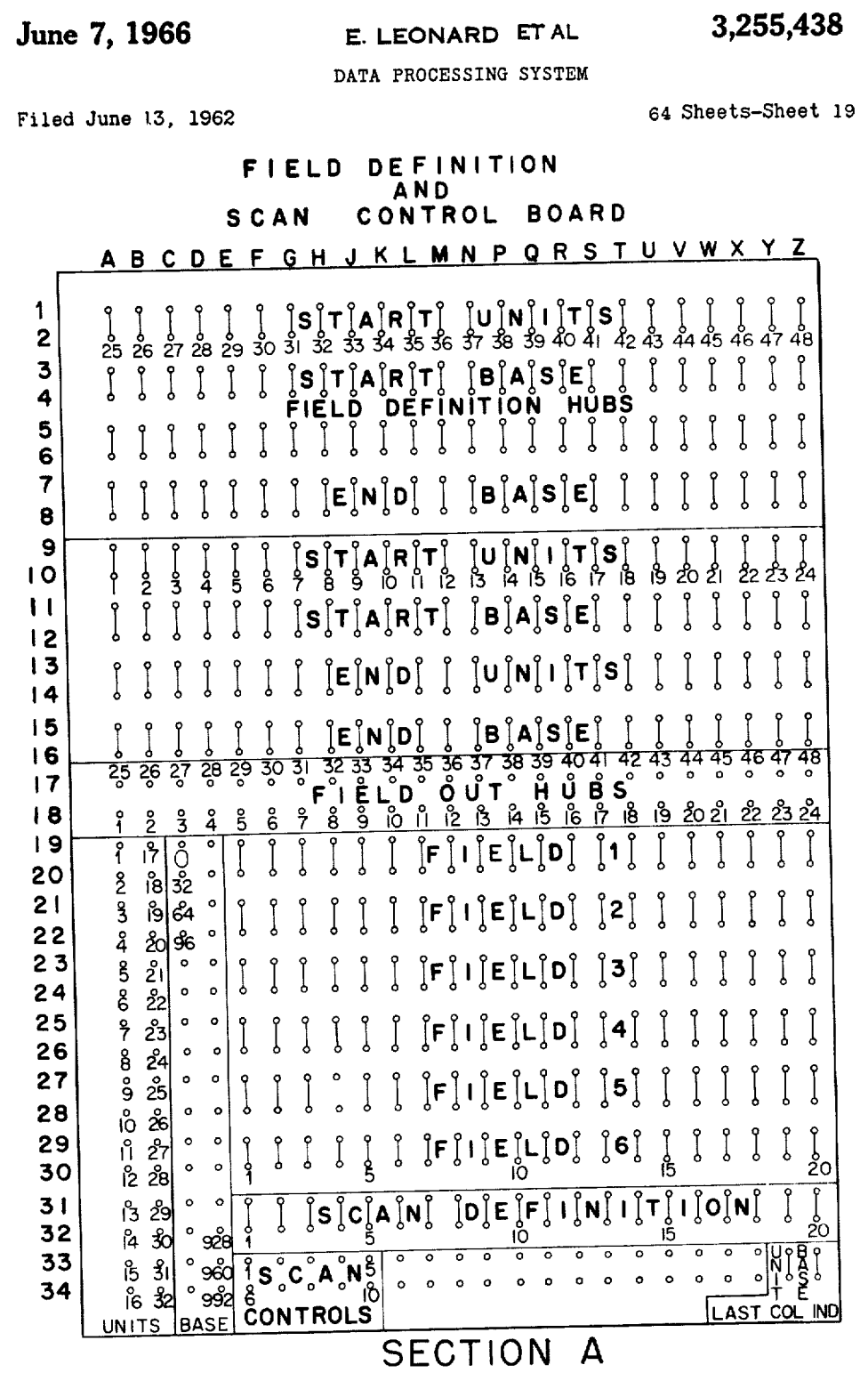
Figure 16B:
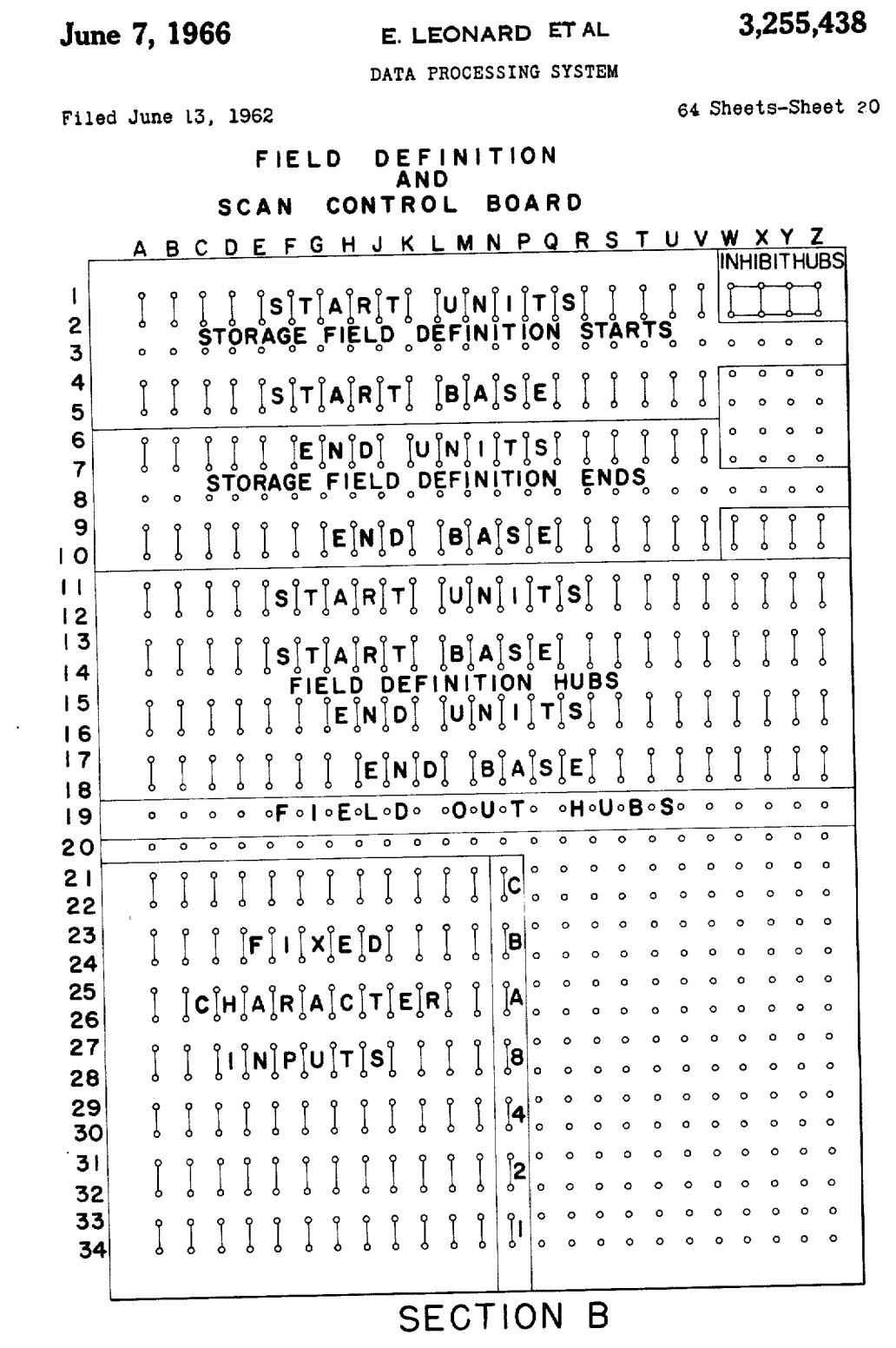

FIGURE 16, a composite of FIGURES 16A and 16B show the field definition and scan control plugboard;

FIGURE 17 shows the scan controls;

FIGURE 18 shows the data transfer circuits;

FIGURE 19 shows the memory switching circuits of the output memory unit;

FIGURE 20 shows the control circuits of the output memory unit;

FIGURE 21 shows the output memory addressing circuits;

FIGURE 22, a composite of FIGURES 22A and 22B show the data circuits of the output memory unit;

FIGURE 23 shows the tape motion controls of the output control;

FIGURE 24 shows the end-of-data and rewind circuits of the output control;

FIGURES 25A and 25B show the operation control plugboard;

FIGURES 26A and 26B show respectively the logical symbol and the schematic diagram for a gate;

FIGURES 27A and 27B show respectively the logical symbol and the schematic diagram for a buffer;

FIGURES 28A and 28B show in logical symbols a mixer gate;

FIGURES 29A and 29B show respectively the logical symbol and the schematic diagram for an amplifier;

FIGURES 30A and 30B show the logical symbol and the schematic diagram for a counter reset amplifier;

FIGURES 31A and 31B show the logical and schematic diagrams respectively of a counter employed throughout the system (when the portions thereof within the dotted lines are deleted, the element is termed a flip-flop);

FIGURES 32A and 32B show the logical symbols for a two stage binary counter;

FIGURES 33A and 33B show the logical symbol and the schematic diagram for a representation delay flop;

FIGURES 34A and 34B show the symbols for a gated delay flop;

FIGURES 35A and 35B show the logical symbols and schematic diagram for a retriggerable delay flop;

FIGURES 36A and 36B show by means of logical symbols a "blocking oscillator" of the system;

FIGURES 37A and 37B show the block symbol and the logical details of a decoder of the system;

FIGURES 38A and 38B show the symbol and the logical elements of a gated multivator employed by the system;

FIGURE 39 shows the column counter and certain other circuits of the auxiliary storage unit;

FIGURE 40 shows the row counter and certain other circuits of the auxiliary storage unit;

FIGURE 41 shows the controls of the auxiliary storage unit;

FIGURE 42 shows the data circuits of the auxiliary storage unit;

FIGURE 43 shows the addressing circuits of the adder unit;

FIGURE 44 shows the data circuits of the adder unit;

FIGURE 45 shows the controls of the adder unit;

FIGURE 46 shows the end-of-field control for the adder unit;

FIGURE 47 shows the algebraic adder of the adder unit;

FIGURE 48 shows the parity, subtraction, and overflow circuits of the adder unit;

FIGURES 49A and 49B show miscellaneous circuits associated with the operation control plugboard;

FIGURE 50 shows certain circuits associated with the control panel;

FIGURE 51 and FIGURES 52A and 52B show wiring of the field definition and operation control plugboards, respectively, for passing data through the system;

FIGURE 53 and FIGURES 54A and 54B show wiring of the same plugboards for selecting records on the basis of digit analysis;

FIGURE 55 and FIGURES 56A and 56B show the wiring of the same plugboards for selecting records on the basis of a comparison;

FIGURE 57 and FIGURES 58A and 58B show the wiring of the same plugboards for modifying records with aligned memory fields;

FIGURE 59 and FIGURES 60A and 60B show the wiring of the same plugboards for a problem involving addition.

In the following description the term "data processing," or simply "processing," will occur frequently. It is advisable to indicate at this point that the term "processing" is used in a broad sense. Thus it covers simple transfers of data from one part of the system to another, and also includes in particular one operation which does not actually involve the handling of data, but is a necessary adjunct to data handling in the present system—namely the "search" operation. In the present system, the characters of a record or "item" are always handled sequentially, and thus some simplification is achieved by always starting the addressing at the first character of an item and stepping the address counter sequentially. Thus if the first character to be actually "processed" (for example, compared or added) is the 10th of an item, the address counter is stepped through addresses 1 through 9 before the 10th character becomes available, likewise, if characters 10 through 19 have been processed and the next character needed is the 25th, the counter must be stepped through addresses 20-24 inclusive before character 25 is reached. Because this "search" operation is an integral part of the processing of an item of data, it is convenient to include it among the "processing" operations as that term is used in describing the system and its functions.

2. GENERAL DESCRIPTION OF THE SYSTEM (FIGURE 1)

Figure 1:
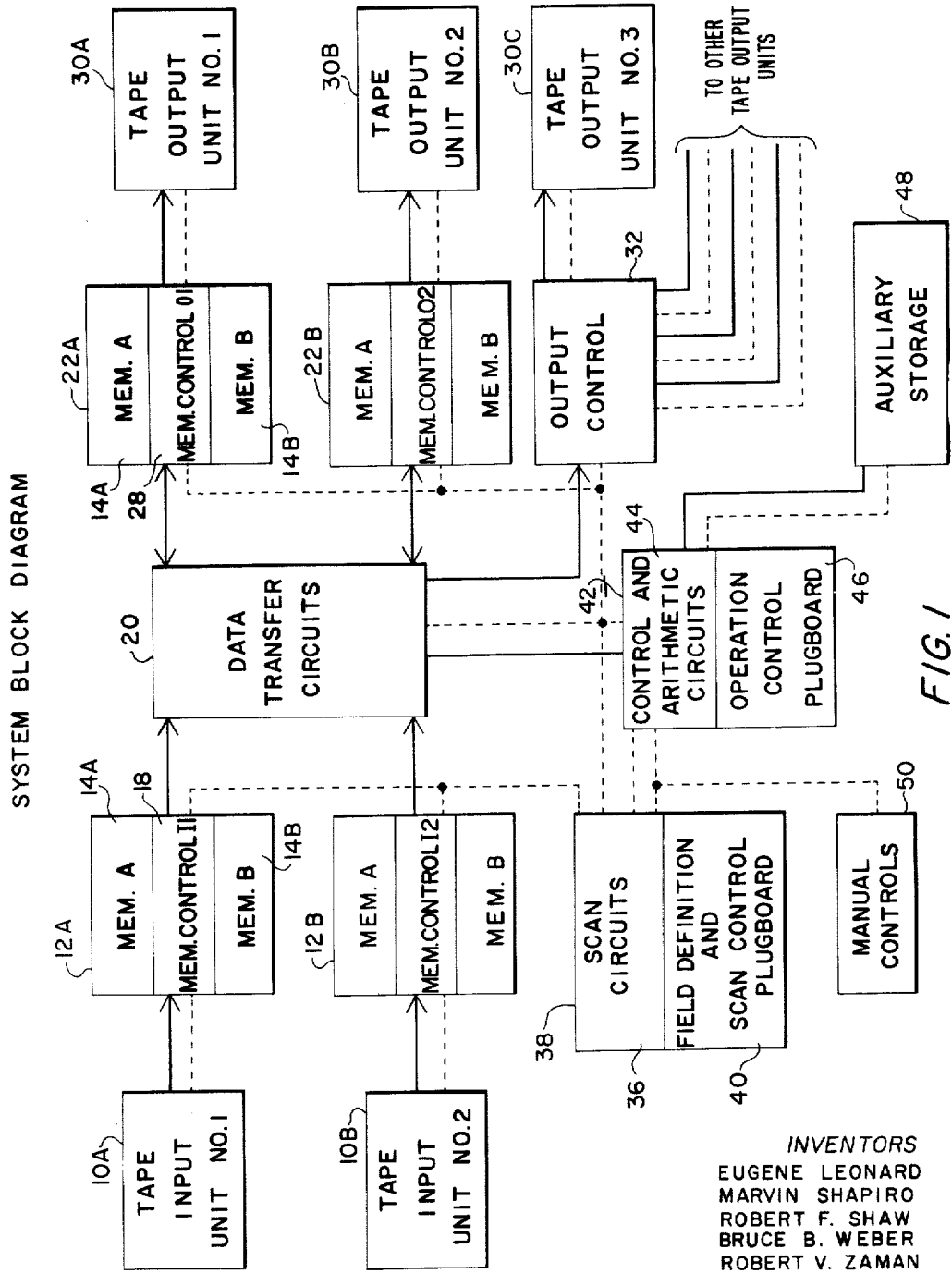
FIGURE 1 shows a functional block diagram of the data processing system.

FIGURE 1 shows in block diagram form a system according to a preferred embodiment of the invention.

2.1. Tape input units (FIGURE 2)

Data are introduced into the system from magnetic tapes read by either of the tape input units 10A and 10B. A typical unit 10A consists of a tape transport for moving the tape past a reading head, and associated electronic circuits for controlling tape motion and for converting signals read from the tape into signals having electrical characteristics similar to those of signals in other parts of the system. Such tape input units are commonly used in data processing systems and are well known in the art, but to clarify the nature of signals required by and supplied by such a unit, FIGURE 2 has been included.

Figure 2:
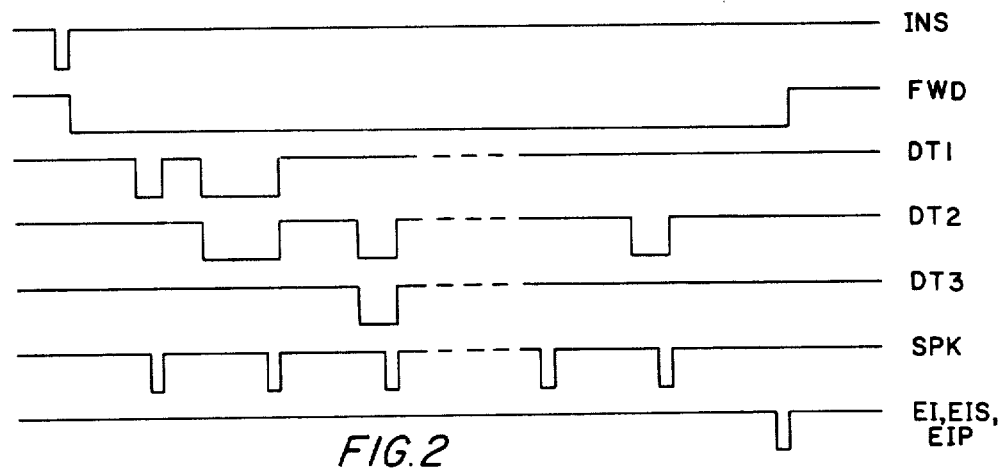
FIGURE 2 shows the time relationship of data and control signals in a typical tape input unit of a type appropriate for use in the system.

Referring now to FIGURE 2, tape motion is initiated by supplying to tape input unit 10A a tape starting pulse INS. (It is assumed that an interlock signal TUI will be supplied by tape unit 10A to prevent generation of INS if tape input unit 10A is not in condition to read tape; for example, if the operator is changing tape reels.) The INS pulse starts the tape moving forward, and as long as forward motion continues tape input unit 10A produces a steady signal FWD.

Data read from the tape appear as a plurality of signals DT1, DT2, etc., there being as many DT signals, each on a separate line, as there are data channels on the tape (seven, for example, including a parity channel). Only three are shown in FIGURE 2. Tape input unit 10A also generates, as a result of reading data from the tape, a "sprocket" pulse SPK corresponding to each character. The SPK pulse is timed to coincide with the DT signals but is delayed sufficiently beyond the leading edges of the DT signals to assure that the latter have reached full amplitude before the SPK pulse occurs; thus the SPK pulse can be used to generate a signal for sampling the DT signals, which in turn disappear or are cleared following the sampling signal, clearing the way for reading of the next character.

Figure 2A:
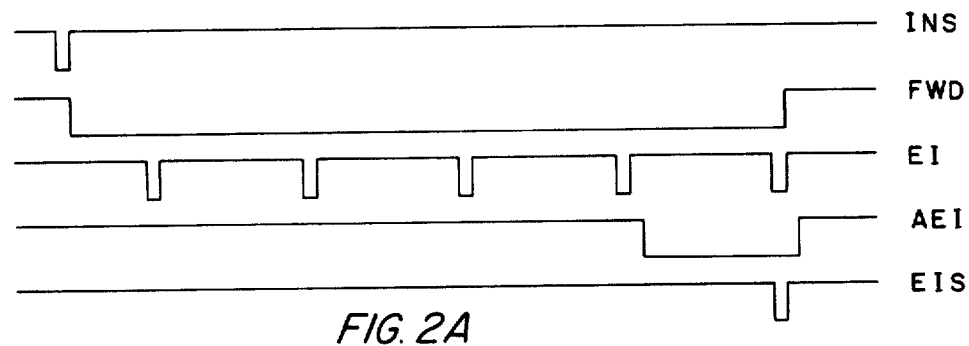
FIGURES 2A and 2B show certain additional details of signals accompanying those of FIGURE 2 under certain conditions.

Data recorded on tapes are normally recorded in blocks of characters, the number of characters in a block being usually at least 100, although shorter blocks may sometimes be used. Blocks are separated by an "interrecord gap" on the tape, and tape input unit 10A delivers a pulse EI (FIGURE 2A) at the end of each block, and also a pulse EIS at the end of a block, provided a signal AEI is present, supplied to tape input unit 10A from another part of the system. If AEI signal is not present, tape input unit 10A will continue to move the tape to read block after block. Thus by means of AEI signal the system can determine whether tape input unit 10A reads one block at a time and stops, or reads several blocks before stopping, as shown in FIGURE 2A. When the EIS signal appears, the tape stops and the FWD signal disappears.

Tape input unit 10A includes conventional parity checking circuits which will generate a signal TE (FIGURE 2B) if a parity error is detected while reading tape. Tape input unit 10A also includes conventional facilitates for automatically backing up the tape and rereading a block or group of blocks containing an error. In such cases a signal REV is generated by tape input unit 10A during the period when the tape is in backward motion, corresponding to the FWD signal during forward motion. Also a pulse signal EIP is generated, corresponding in time to EIS but occurring only at the end of a block or group of blocks which contain no error. Tape input unit 10A also delivers a pulse signal TFR at the beginning of each forward tape motion, and a signal BI, at the beginning of either forward or reverse motion.

Figure 2B:
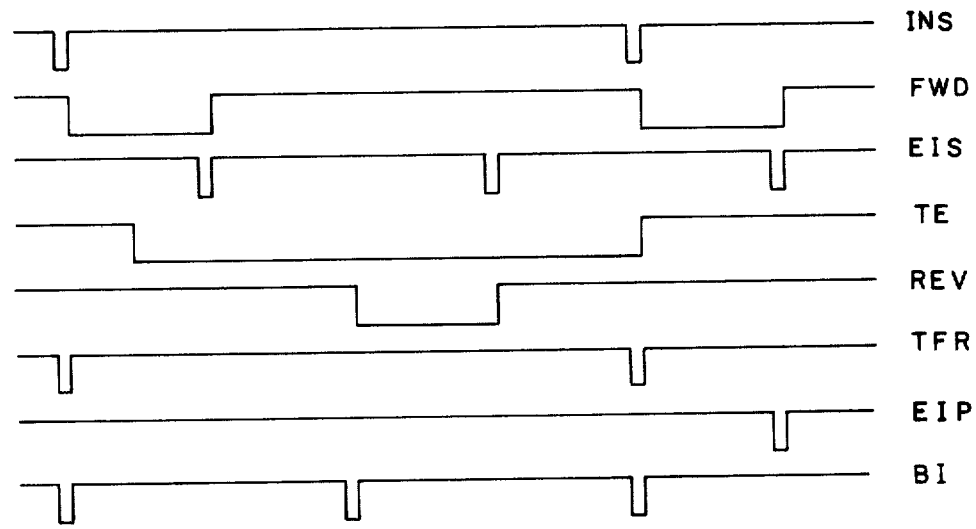

In addition to the signals shown in FIGURES 2, 2A and 2B the tape input unit 10 also supplies a signal EID) (end of input data) to indicate the other circuits that the last data recorded on the tape has either been read or will have been read when the next reset EIP signal occurs.

2.2. Input memory unit (FIGURE 1)

Data read from an input tape by means of a tape input unit such as 10A are stored in an input memory unit 12A (FIGURE 1); similar units 12b, etc. are associated with other tape input units 10B, etc., respectively. Input memory unit 12A, in the embodiment of the invention to be described, is of the "double bucket" type, having two identical memory units 14 of the core matrix type, designated 14A and 14B and a group of control and addressing circuits 18. The use of two memory sections 14A and 14B permits data from the section to be processed internally while subsequent tape data are being read into the other section. It should be noted that in systems where the increased operating speed does not justify the additional cost of a second memory section 14B, the latter can be eliminated with a consequent simplification of the addressing and control circuits 18; in this case, reading of a new group of data from tape must await completion of processing of the preceding block.

Figure 3:
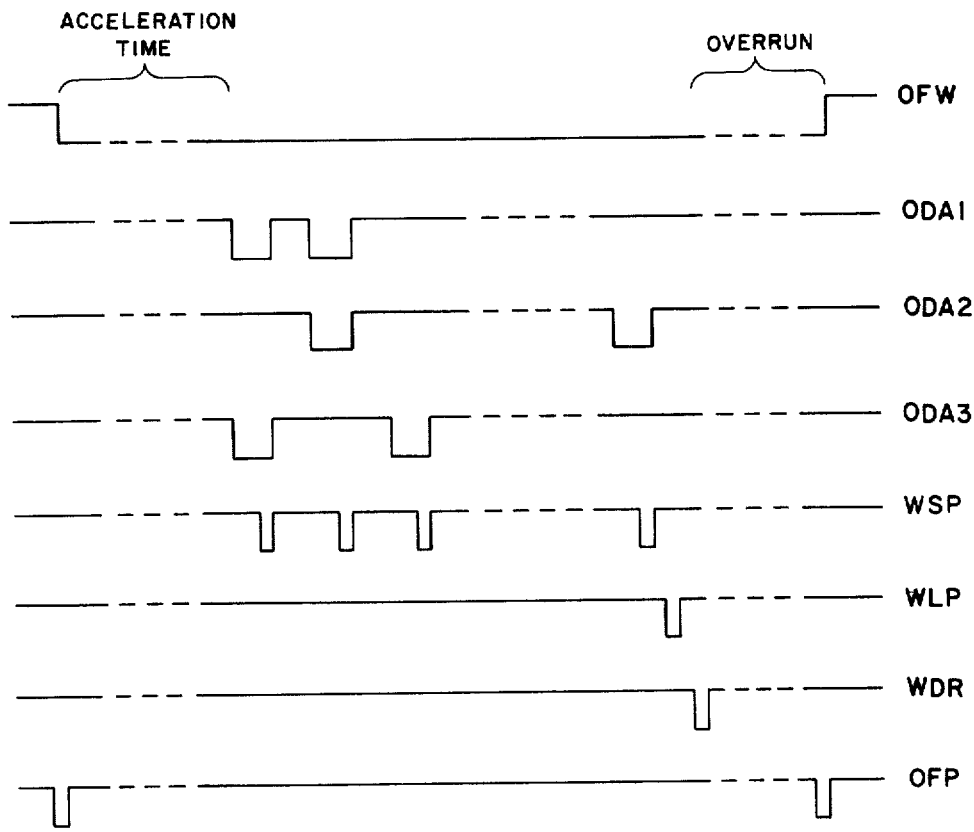
FIGURE 3 shows the relative timing of signals required by a typical output tape unit.

2.3. Output units (FIGURES 1 and 3)

Data to be recorded on an output tape is preferably accumulated in an output memory unit 22A (with additional units 22B, etc. as needed). It should be noted that by the addition of synchronizing means data can be transferred to an output tape unit 30 directly from an input memory unit 12, using an output control 32. In either case, the transfer of data from input memory unit 12 takes place through a group of data transfer circuits 20.

Output memory unit 22A employs core matrix memories 14 of the same type used in input memory unit 12A. The addressing part of the control and addressing circuits 28 is quite similar to that of 18, although the controls differ appreciably. Like memory unit 12A, the output memory unit 22A is preferably of the "double bucket" type. Output memory unit 22B is similar to output memory unit 22A.

Like the tape input units 10, the tape output units 30 are of a conventional type commonly used in data processing systems. Each consists of a tape transport for moving the tape past the writing head (often identical to the transport used in tape input unit 10), circuits for transforming standard data signals from other parts of the system into signals having suitable electrical characteristics for recording on tape, and circuits for detecting the end of a reel of tape, rewinding a reel on demand, generation and recording of longitudinal parity check characters and end-of-data indications on demand when required, and, preferably, provisions for "read after write" checking. Although the tape outlet unit 30 will not be described in detail, some of the signals required by and furnished by it are shown in FIGURE 3.

A starting pulse OFP and a motion signal OFW are supplied to output tape unit 30 and the signal OFW is maintained as long as any data remain to be recorded, and for a short time after the last character is recorded. An acceleration time, its exact duration depending on characteristics of the tape transport but typically 3 to 5 milliseconds, is allowed before before any data are released, in order to permit the tape to reach operating speed. Data signals ODA1–ODA7, on 7 parallel lines (of which three are shown in FIGURE 3) are then supplied, accompanied by a write sprocket signal WSP. The signal WSP causes the ODA signals to be transferred to the actual recording circuits. The rate at which characters, each accompanied by a WSP signal, are supplied to tape output unit 30 depends on the latter's characteristics, but is typically 15,000 to 75,000 per second. In the present system, as will be noted later in the discussion of the timers, it is assumed that this rate is less than 18,000 per second, which is the system's lowest internal data transfer rate.

Data are recorded in blocks, and a signal WLP is supplied to tape output unit 30 at the end of a block. Signal WLP is used in the tape output unit 30 to cause writing of a longitudinal parity check character. Tape output unit 30 returns a pulse WRP shortly after receipt of a signal WLP.

An OFW signal is held on for a short time, say 3 milliseconds, following a WLP signal in order to avoid stopping the tape too soon after the end of the block; this is important particularly when the tape output unit 30 includes read after write checking with facilities for rewriting a block in which an error is detected.

In addition to the signals shown in FIGURE 3, each output tape unit 30 will supply a signal OTF when the tape is nearly at its end; signal OTF occurs early enough to permit completion of the recording of a block, and remains on for a period sufficient to permit such recording. Also, a signal ED supplied along with one or more WSP pulses to output tape unit 30 will cause the recording of an "end of data" character or group of characters.

Tape unit 30 preferably includes a parity checking circuit which will supply a signal OPE when the data signals ODA1–7 represent a character with the wrong parity. This indication is, for example, used to cause the system to halt, permitting manual intervention. Tape output unit 30 preferably includes a circuit for automatically recording a distinctive "error character" in place of any data character having the wrong parity.

Finally, on receipt of a signal ORW, output tape unit 30 will initiate a rewind operation.

2.4. Scan assembly (FIGURE 1)

The scan assembly 36 consists of a group of scan circuits 38 and a field definition and scan control (FDSC) plugboard 40. In addition to supplying the internal timing signals required for memory operation, the scan circuits 38 provide, through the FDSC plugboard 40, means for addressing all the memories simultaneously character by character from the beginning to the end of an item, and means for defining certain contiguous groups of characters (fields) within the item, thus enabling these fields to be singled out for analysis or modification.

2.5. Operation unit (FIGURE 1)

The operation unit 42 includes the control and arithmetic circuits 44 and the operation control (OC) plugboard 46. In this unit are included circuits for comparing data, interpreting results of comparisons, supplying control signals to other units of the system, and performing arithmetic operations such as at least addition and subtraction.

2.6. Other units (FIGURE 1)

The auxiliary storage unit 48 is an auxiliary memory unit similar to that used in the input memory unit 12 and output memory unit 22, but with a somewhat more flexible addressing system. It is used for temporary storage of characters, fields or items during processing, including addition, providing a means for holding pieces of information until they are required. The manual controls 50 consist primarily of switches needed for starting an operation and for testing and servicing the system.

3. REPRESENTATION OF DATA

Since the data to be handled by the system will in many cases be read from and recorded on magnetic tape, the method of representation chosen for internal operation in the particular embodiment of the system described herein is one consistent with current customary magnetic tape practice. Specifically, a data character entering or leaving the memory units of the system is represented by coded signals on a number of parallel lines, preferably seven in number. Signals on these lines represent the "ones" and "zeros" of a binary coded character, with a voltage of 0 volts representing "zero" and a voltage of −6 volts representing "one." These voltage levels are purely representative and other levels could just as well be employed. Six such lines are used to represent the bits of an alphanumeric character, while a seventh line carries an additional bit chosen such that the total number of "ones" in the character is always even (or always odd, in certain systems or parts of systems.) The seventh bit is known as a "parity" bit, and by checking for the expected evenness of the bits of a character it is possible to detect certain types of errors; such "parity checking" is well known in the data processing art and is widely used.

In certain parts of the system, instead of transmitting the seven bits of a character simultaneously on seven lines, they are transmitted serially on a single line. The serial form of transmission is used in cases when data must be routed through the plugboard, thus making possible the handling of data through a single plugboard connection; it is also advantageous in that less equipment is required where data from two or more sources must be compared, added, subtracted, or otherwise subjected to logical or arithmetic operations.

The specific code used to represent numbers, alphabetic characters, and special symbols can be any one of those commonly used in data processing systems, the only requirement being the usual one that numbers be in a form suitable for the easy performance of arithmetic operations, and that both numbers and letters be coded such that relatively simple comparison circuits can be used in operations designed to rearrange random items of information into logical arithmetic or alphabetic sequence.

Following is a typical code, used in the particular embodiment of the system herein described. In the following list the six data bits are, as is customary in binary notation, written from left to right in decreasing order of significance; thus A, represented by 11 0001 (not counting the parity bit) appears to be smaller than B, represented by 11 0010, but larger than J, represented by 10 0001. The consequences of this in comparing two quantities are discussed later (see the section on "Miscellaneous Circuits").

Characters are always transmitted serially, most significant first—thus the digits of a number such as 31452 are transmitted in that sequence—first 3, then 1, then 4, etc. In the operation of the adder and other arithmetic circuits, the particular numbers or "fields" being added must have their digits handled in reverse sequence, as more fully described in connection with the adder circuits; this is done automatically, however, and as far as the operator is concerned, he can assume that data are always handled in the same sequence as in normal writing or typing.

The bits of a character, if they are serialized for transmission on a single line, are also handled most significant first—thus the bits of the letter A, namely 110001, are transmitted just as they are written—first 1, then 1, then three zeros, and finally the other 1, followed by the parity bit. It is convenient in referring to the bits of a character to number them from 1 to 7, bit 4 being the most significant numeric bit, to the least significant, and bit 7 the parity bit.

Note that for convenience, the two most significant bits have been set off from the four least significant bits with a space, although in the electrical representation the six pulse signals form an unbroken sequence. The two most significant bits are usually called the "zone" bits, since their four possible configurations (11, 10, 01, 00) serve to divide the alphabet into three zones and distinguish it from numbers, which form a fourth zone. Note also that the four least significant bits, called the "numeric" or "sector" bits, can have 16 possible combinations ranging from 0000 to 1111, but that the numerals and alphabet use combinations in the range 0000 to 1001 inclusive, combinations from 1010 to 1111 being used only for punctuation marks and other special symbols. Finally, note that the parity bit is not used in comparison or arithmetic operations, as it would upset the orderly sequence of alphabet and numerals; it is used for checking transfers in and out of the memory and to or from tapes. Thus it is omitted from the following table:

Numeric zone:
```
    00 0000—0 (zero)
    00 0001—1
    00 0010—2
    00 0011—3
    00 0100—4
    00 0101—5
    00 0110—6
    00 0111—7
    00 1000—8
    00 1001—9
    00 1010 etc.—symbols
```

First zone:
```
11 0001—A
11 0010—B
11 0011—C
11 0100—D
11 0101—E
11 0110—F
11 0111—G
11 1000—H
11 1001—I
11 1010 etc.—symbols
```
Second zone:
```
10 0001—J
10 0010—K
10 0011—L
10 0100—M
10 0101—N
10 0110—O
10 0111—P
10 1000—Q
10 1001—R
10 1010 etc.—symbols
```
Third zone:
```
01 0010—S
01 0011—T
01 0100—U
01 0101—V
01 0110—W
01 0111—X
01 1000—Y
01 1001—Z
01 1010 etc.—symbols
```
(11 0000, 10 0000, 01 0000, and 01 0001 are also available for use as symbols or punctuation marks.)

For convenience in reference, the six bits of a character, reading from left to right as shown above, are referred to as the B, A, 8, 4, 2, and 1 bits respectively, while the parity bit is called the C bit. Thus the latter indicated timer pulses C1–C7 correspond respectively to the B, A, 8, 4, 2, 1, and C bits respectively.

4. INPUT MEMORY UNIT (FIGURE 4)

Figure 4:
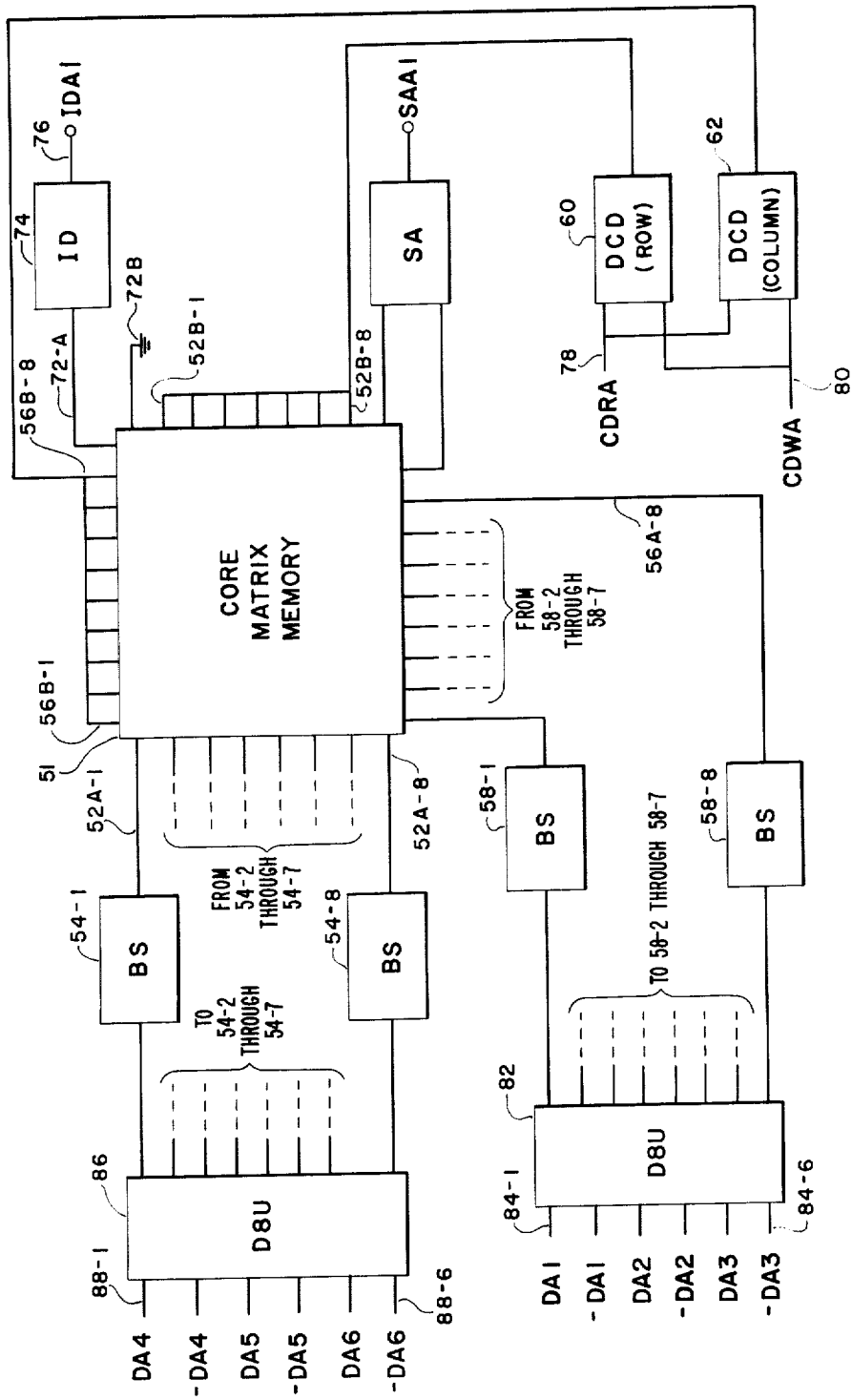
FIGURE 4 shows a logical diagram of a core matrix memory of a type appropriate for use in the system to be described.

The input memory unit 12 consists of two identical core matrix memories 14A and 14B. Such units are widely used in data processing systems and their construction and operation is well known in the art. Nevertheless the significant features of a typical core matrix memory are shown in FIGURE 4.

The memory 14A consists of a number of arrays 51 of ferrite cores, each array in the example shown having 64 cores arranged in 8 rows and 8 columns. Each row of cores is threaded by a wire whose ends are labelled 52A–1 and 52B–1 respectively for row 1, 52A–2 for row 2, etc. Each column is threaded by a similar wire such as the one whose ends are labelled 56A–1 and 56B–1 respectively. All cores in a given array are threaded by a sense winding whose ends are labelled 66A and 66B, and an inhibit winding whose ends are labelled 72A and 72B.

Each array is capable of storing 64 bits of data, one for each core. To store a bit of data a signal is applied to one of the row bilateral switches 54–1 to 54–8 inclusive and one of the column switches 58–1 to 58–8 inclusive, and signals IDA1 and CDWA respectively are simultaneously applied at 76 to the inhibit driver 74 and to the "write" input 80 of the row and column drivers 60 and 62. The result is to change the magnetic state of the core selected by the row and column switches, and the magnetic properties of the core are such that it remains in the new state after removal of the signals.

To read out the data, one of the cores is again selected by energizing its particular row and column, and a "read" pulse CDRA is applied to input 78 of the drivers 60 and 62. If a data bit has previously been stored in the selected core, the read pulse CDRA causes the core to return to its original (pre-write) magnetic state, causing a signal to appear on sense winding 66. This signal is amplified by sense amplifier 68 and appears on the output line 70 as the signal SAA1. If, on the other hand, nothing had previously been written into the selected core, no signal appears on line 70 when CDRA is applied to input 78.

It should be noted that reading destroys the stored data. Thus if the same data must be read out more than once, they must be written back into the memory after being read out.

While the single array shown in FIGURE 4 can store 64 bits, it is the usual practice to use the same row and column selection and read-write circuit for a number of arrays, typically 7. Thus in a single operation the 6 bits of an alphanumeric character (see "Representation of Data") can be stored or read. In such cases corresponding row and column wires of all arrays are connected in parallel, but each array has a separate inhibit driver 74 and sense amplifier 68. Thus in storing a character, its respective bit IDA1 through IDA7 are simultaneously applied to 7 inhibit drivers, and, in reading out, the 7 bits appear as the signals SAA1 through SAA7.

As will be more fully described later, selection of a location in the memory is made by means of a multistage binary counter. In the memory of FIGURE 4, for example, a 6-stage counter is needed to select the 64 possible locations. In order to select one row and one column it is necessary to decode the outputs of (in the example at hand) 3 counter stages to get the row signal, and to decode separately the outputs of the other 3 stages to get the column signal. The decoders 86 and 82, described in detail in Section 10.13, FIGURE 37 respectively, are used for this purpose; their inputs are the signals ±DA1, ±DA2, etc. from the address counter.

It should be noted that by including additional counter stages and decoder, it is possible to select rows and columns of larger memory arrays; in the system according to the preferred embodiment of the invention, 10-stage counters are used to address 1024-bit memories.

Memory 14B is identical to memory 14A, but to avoid confusion the signals to and from it are given different letters:

| Memory 14A: | Memory 14B |
|---|---|
| ±DA1, ±DA2, etc. | ±DB1, ±DB2, etc. |
| CDRA | CDRB. |
| CDWA | CDWB. |
| IDA1, etc. | IDB1, etc. |
| SAA1, etc. | SAB1, etc. |

It is suggested that the reader, before proceeding to Section 4.1, consider briefly at least the introductory paragraphs of each of Sections 10 to 10.14.

4.1. Timers (FIGURES 5–8)

In describing the memory unit it was noted that a "read" signal CDRA and a "write" signal CDWA are applied to the memory unit to cause stored data to be read out and to cause data to be stored, respectively. Principal source of these read and write signals during internal operation of the system is the group of scan timers shown in FIGURE 6, which produce timing signals as shown in FIGURES 5, 7, and 8.

Typically, data are read from or written into a memory serially by character, using consecutive memory locations selected by stepping the address counter between characters. Thus, referring to FIGURE 5, the first timing pulse required would be a "read" pulse, CR, which after passing through suitable gating circuits would become CDRA pulse. Now the shape of the data pulse SAA1, for example, as obtained from the sense amplifier is somewhat variable, and furthermore there is a certain amount of "noise" or spurious signals appearing as a result of action of the CDRA pulse on memory cores even when they contain no data, so for reliable operation the SAA1 signal is examined or sampled after these spurious signals have died out, and the sampling pulse gives the good rise time needed for reliable setting of flip-flops which serve as storage for each character read from the memory. Thus a sampling pulse CS is also generated by the timer, occurring typically about 3 microseconds after the leading edge of CR pulse.

Following the CS pulse are 7 pulses designated C1–C7 inclusive, whose purpose will be described more fully in discussing the handling of serial data, as will the purpose of the narrow pulses N1–N7 inclusive which are so timed that they are approximately centered in the corresponding C1–C7 pulses, as shown in FIGURE 5.

Following the C7 pulse is a pulse CWI, which is somewhat wider than the other pulses, and a "write" pulse CW centered in the CWI pulse. The pulse CW becomes a pulse CDWA after suitable gating, and thus is used for writing data into the memory. The pulse CW1 is used to gate data into the inhibit driver 74; thus the signal IDA1 into drive 74 (FIGURE 4) is produced by means of a gate whose principal inputs are the CWI pulses and the negative of the data signal. The reason for using the negative of the data signal rather than the data signal itself is that the pulse CW will write a "1" into the memory unless inhibit driver 74 is delivering a signal to inhibit winding 72; thus to write a "1" it is necessary to prevent the pulse CWI from reaching inhibit driver 74, but to write a "0" it is necessary to permit the pulse CWI to reach inhibit driver 74. Since by normal convention a "1" is a permissive signal and a "0" is an inhibitory signal at a gate, it follows that the negative of the data signal must be used to gate the pulse CWI into inhibit driver 74.

To recapitulate, then, the pulse CR causes a character to be read from memory into a flip-flop storage, and the pulse CW causes the same character to be written back into the memory (regenerated), written into another memory, or causes new data to be written into first memory. Since this completes the read-write cycle for one character, the next requirement is to step the address counters of the memories to the next character position (by means of the trailing edge of the pulse CWI), and, when required, switch to another operation. This is accomplished by the pulse CF, which is timed to follow CW and CWI pulses.

Typical pulse widths of the signals of FIGURE 5 are the pulse CR, 4 microseconds; the pulse CS, 1 microsecond, starting 2 to 3 microseconds after the beginning of the pulse CR; the pulses C1–C7, 3 microseconds each, spaced a little over 3 microseconds from beginning of one to beginning of the next; the pulses N1–N7, 1 microsecond each, approximately centered with the corresponding C1–C7 pulses; the pulse CWI, 8 microseconds; the pulse CW, 4 microseconds, positioned a little before the center of the pulse CWI; the pulse CF, 4 microseconds, starting about 2 microseconds after the end of the pulse CWI.

Referring now to FIGURE 6, the circuits for generating the timing signals will be illustrated. To produce the signals of FIGURE 5, a signal SER is applied at gated multivibrator 110A and gate 114A. Application of the signal SER, which is a steady signal lasting as long as required for reading and writing a series of characters, causes multivibrator 110A to generate pulses of about 4 microsecond width and having a repetition rate of one per 55 microseconds; these are converted to pulses having the same repetition rate by blocking oscillator 112A. Passing through gate 114A and buffer 122, each pulse from block oscillator 112A causes blocking oscillator 124 to generate a CR pulse. The 55 microsecond period is sufficient to permit generation of all timing pulses including CF pulse before another CR pulse occurs.

The pulse CR passes through gate 126 and amplifiers 128 and 130 and buffer 132 to blocking oscillator 134, which has about a 2 microsecond pulse width; at the end of this time the trailing edge of the signal from blocking oscillator 134 triggers blocking oscillator 138, via amplifier 136, to give a pulse CS. Meanwhile the pulse CR also appears, via amplifier 128, as a driving pulse at the input of a tapped electrical delay line 140, which has a total delay of about 15 microseconds. Pulses C1–C4 and N1–N3 inclusive are generated by blocking oscillators such as 144 and 148, and their timing is determined by appropriate placement of taps on line 140. Signals from the taps are amplified by such amplifiers as 142 and 146, which improve the rise time of signals from line 140 and lead to more accurate timing.

Since electrical delay lines introduce an appreciable amount of distortion and attenuation in signals passing through them, and this distortion increases with line length (other things being equal), line 140 is made only 15 microseconds long and a second delay line 152 is used to supply timing adjustment for the remaining signals up to and including pulse CWI; pulses CW and CF are taken from taps on a third line 168.

In certain operations the pulses C1–C7 and N1–N7 are not required. Thus, since these pulses require a time interval of almost 30 microseconds between pulse CR and pulse CWI, and since characters can be read from and written into memory only as fast as the rate at which timer signals occur, it follows that if the period of the timer signals can be reduced by eliminating the C1–C7 pulses, the data transfer rate can be correspondingly increased. This is done as follows:

When C1–C7 pulses are not needed, the timer is actuated by a signal STR instead of the signal SER. Like the signal SER, the signal STR also actuates a gated multivibrator; this one is 110C having a period of only 25 microseconds. A delay flop 116 and an inverter 118 prevent the start of timing signals for a short period after application of the signal STR. Once delay flop 116 recovers, however, blocking oscillator 120 starts emitting pulses once every 25 microseconds—a rate more than twice that produced by the signal SER.

Each pulse from block oscillator 120 acts through buffer 122 to produce a pulse CR, as previously described. In this case, however, a signal −STR at gate 126 prevents any CR pulse from reaching delay line 140, so no C1–C7 or N1–N7 pulses are generated. The original path by which the pulse CR generated the pulse CS (namely, via amplifiers 128 and 130) is also blocked at gate 126, so the signal from blocking oscillator 120 is also fed into buffer 132 to generate the pulse CS.

Previously the pulse CWI was generated by a signal from the last tap on delay line 152. Now the pulse CWI, and consequently the pulses CW and CF, are generated by feeding the pulse from block oscillator 120 through blocking oscillators 158 and 162 and inverter 160; the net effect is to cause the pulse CWI to occur very soon after the pulses CR and CS. The result is a group of timing signals as shown in FIGURE 7.

There are times when it is necessary to step the address counters through their various positions consecutively, but no memory reading or writing is necessary. It is desirable under these circumstances to step the counters as rapidly as possible, and as no memory read-write operation is involved it becomes possible to shorten the timer period from 25 microseconds to 12 microseconds, thus gaining another factor of 2 in speed. The timer used to generate the counter-stepping pulses is actuated by the signal SCH, the "search" signal which acts on gated multivibrator 110D and associated circuits to generate the signals CHS and CFS, illustrated in FIGURE 8.

From the foregoing discussion it will be seen that by providing more than one timer, each adapted to supply signals at the most rapid rate possible for a particular type of operation, it becomes possible to transfer data (or to step memory address counters when no data transfer is required) at an appreciably higher average rate than would be possible if a single timer were used for all operations, since in the latter case the timer would have to be adjusted to accommodate the slowest operation.

A fourth timer is shown in FIGURE 6, although it is not used strictly for internal operations. This is the circuit consisting of gated multivibrator 110B, blocking oscillator 112B, and gate 114B. This circuit feeds into buffer 122 and produces the same signals shown in FIGURE 5, but not necessarily with a period of 55 microseconds. It is actuated by the signal STP, and is used when transferring data directly to a tape output unit 30 without the intervention of an output memory. The period in microseconds, designated by the symbol "$p$" in 110B, is determined by the tape speed of the output tape transport and the desired recording density. This mode of operation will be more fully described later.

Timing signals for the memory during certain other operations, such as reading from tape or writing from an output memory to tape, are of the same general nature as those described, and are supplied by timers associated with the corresponding input or output memory controls. They will be described in connection with the latter units.

4.2. Input memory control, data, and addressing circuits (FIGURE 1)

This unit, shown as 18 in FIGURE 1, includes circuits to supply the tape control signals such as INS signals required by the tape input unit 10. An important part of the control section of 18 is the circuit for determining which of the memories 14A or 14B will at any given time receive data from tape input unit 10A, and consequently which memory will be available for delivering data to other parts of the system.

The control and addressing circuits 18 also supply the memory addressing signals ±DA1, ±DA2, ±DB1, etc., required by the memories 14A and 14B, and finally the circuits 18 control the flow of data into and out of the memories 14A and 14B.

Memory switching controls, for switching between memories 14A and 14B, and tape motion starting control are shown in FIGURE 9.

4.3. Memory switching (FIGURE 9)

Consider first the determination of which memory, 14A or 14B, is to receive data from tape and which is to deliver data to the other parts of the system. As will be shown later in more detail, the signal which determines memory selection is MSW, the "memory switch" signal.

Signal MSW is produced by a binary counter C2014 consisting of a single counter stage. Switching of the memories should occur only after (A) a block of data has been read into one of the memories from the tape and (B) processing of data from the other memory has been completed. Completion of the reading of a block from the tape (or, in the case of multi-block read, completion of the reading of a group of blocks) is indicated by the occurrence of EIP, the "end of input pulse," which will set flip-flop F2001, remembering that the block or blocks being read from the tape has been completely entered into the memory. Completion of the processing of data in the other memory will be indicated by occurrence of the ESC signal (end of scan cycle), which will be described later. Signal ESC fed via diode O2000 and amplifier A2098 is used to set flip-flop F2002. Thus the setting of both flip-flops F2001 and F2002 is an indication that memory switching should take place. Both flip-flops F2001 and F2002 have their "one" outputs at gate G2044, so that when both are set blocking oscillator BO2002 will be triggered and its output, the MSP pulse, will change the state of counter C2014, switching the memories to the configuration which is the reverse of the one previously existing.

If flip-flop F2002 is set before flip-flop F2001, it is an indication that the internal operation has been completed before a new memory load of data has been read from the tape. In this case, it is necessary to hold up further internal operations until the tape reading operation is completed. This is accomplished by generating a pulse at blocking oscillator BO2001 if flip-flop F2002 is set while flip-flop F2001 still remains reset. Such a condition is detected at gate G2042. The pulse from blocking oscillator BO2001 is used to set a "scan interlock" flip-flop F2003, which will be reset (permitting internal operations to resume) whenever MSP occurs indicating completion of the input operation. F2003 produces the signal MLKA. When operation of the processor is first initiated, there is no input operation present to give an ESC signal. In this case flip-flop F2002 must be set in some other fashion. This is accomplished by using the manual "proceed" signal PCD, as gated by signal FBP, a signal which is present only at the beginning of operations. The gating occurs at mixer gate M2045.

Normally, the occurrence of the pulse MSP resets both flip-flops F2001 and F2002 in preparation for a new test of conditions for switching memory. An exception is made in a case where an "end of data" indication is detected, as shown by occurrence of the signal LTB or "last tape block" signal. If LTB occurs on the first block read in a group, it is gated at M2046 and the resulting signal is inverted by amplifier A2021 and fed to one input of gate G2099 to block resetting of flip-flop F2002 by the next MSP signal. Thus the condition for scan interlock is set up and further internal operation is blocked at this point. Operation will resume, after manual tape change takes place, after reading of the first block from the new input tape.

4.4. Tape start control (FIGURE 9)

A start pulse called INS or "input start" is generated by amplifier M2099 under various conditions whenever it is necessary to start the input tape. At the beginning of a sequence of operations, when starting is to be accomplished manually, mixer gate M2051 is used. This gate passes the manual "proceed" pulse PCD in the presence of the first block or FBP signal, which is present only at the start of a series of operations. Subsequent starting of the tape under normal conditions is accomplished at mixer gate M2050. Here the occurrence of the pulse MSP is used to restart the tape. This is proper, since the occurrence of the pulse MSP means that the memory which has been in use for internal operations has had its contents completely used and is therefore free to receive new information from the tape after switching. Restarting will be prevented if: an EID signal is present, indicating that the end of data on the tape has been reached; if the OMH signal is present, indicating the equipment is in a test mode calling for a halt after reading one block or group of blocks; or if the tape unit interlock signal TUI is present indicating that for some reason the tape unit is not in condition to supply data.

Pulse MSP sets flip-flop F2050 via amplifier A2097 and gate G2050 if none of the foregoing conditions prevents it. If pulse MSP should occur for any reason while the tape is still moving forward (as indicated by the presence of signal FWD), signal —FWD will block mixer gate M2050 and prevent generation of INS until FWD disappears. Similarly, generation of INS is delayed for 8 milliseconds after occurrence of EIS by the action of delay flop DF2001, whose output is inverted by amplifier A2050 to block mixer gate M2050 during this interval.

Finally, manual restarting of operations after the occurrence of an "end of data" indication, or in the "one memory halt" mode previously described, or in the case where a "tape unit interlock" prevents automatic restarting, is accomplished by means of the "proceed" button generating the PCD signal acting through mixer gate M2049. In order to assure that the internal operation has been completed, mixer gate M2049 will not pass a "proceed" pulse unless the MSP pulse has previously occurred and has set flip-flop F2004. Flip-flop F2004 will be set if pulse MSP occurs at a time when EID or OMH or TUI is present at buffer B2050 whose output is fed via amplifier A2097 to gate the pulse MSP at mixer gate M2097. The output of mixer gate M2097 is connected via amplifier A2096 to the set input of flip-flop F2004. It will be reset by the INS pulse resulting from pressing the proceed button under these conditions. Similarly F2004 will be set via mixer gate M2052 when a parity error occurs, and if the re-read is unsuccessful and the machine halts, F2004 will remain set allowing tape restart via M2049 as above.

4.5. Input item counter (FIGURE 10)

Input data may be arranged in three different ways. First, there may be one item per block and only one block may be read at a time. This situation will normally exist with fairly long items which occupy a considerable part of the memory. Second, the single block may contain more than one item, subject to the restrictions that all items are of the same length. For example, a 720 character block may contain six 120 character items. Again, one block at a time is read. The third condition is that in which each block represents a separate item but such blocks are so short that economical use of the memory requires several to be read at one time. For example, as many as eight 120 character items may be read during a single input operation, filling the memory with 960 characters.

Figure 10B:
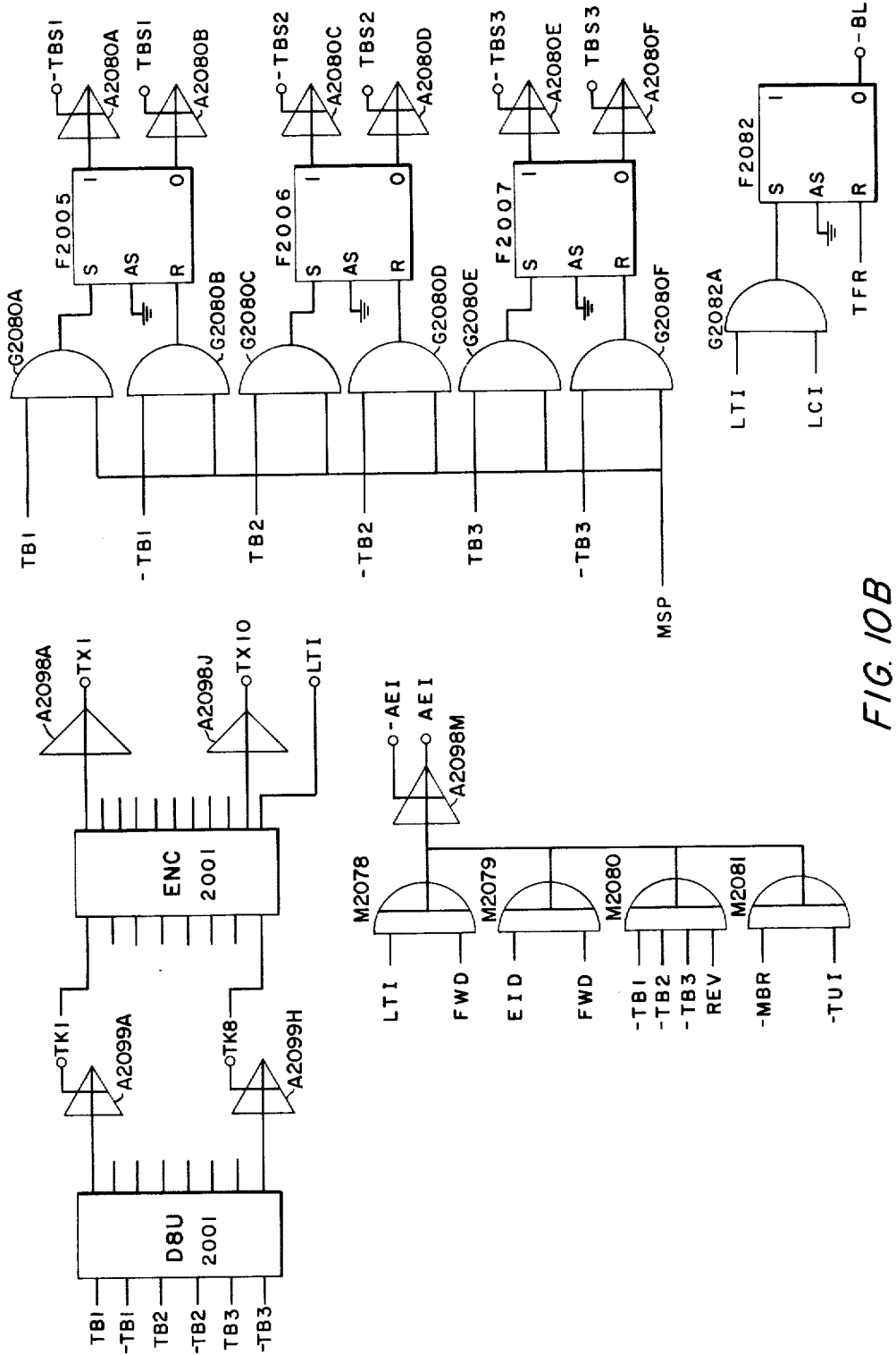
Figure 10C:
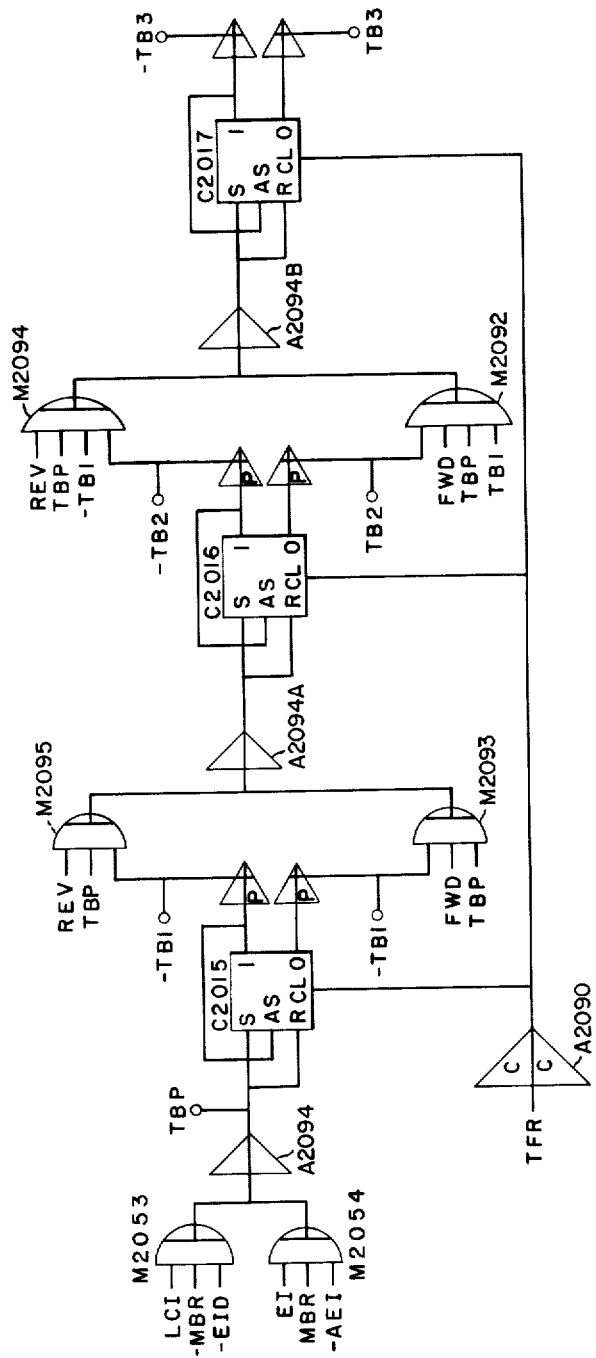

An input item counter, shown in FIGURE 10, is used to control the input operation. This counter consists of three binary counter stages C2015 through C2017 (FIGURE 10C). The counter is stepped by the EI or "end of input" signal at mixer gate M2054 when MBR is present, indicating that more than one tape block is to be read during each input operation. It is also used to count items per block if —MBR indicates only a single block is to be read on each input operation; in this case it is stepped by the LCI or "last character of item" signal at mixer gate M2053. The outputs of these mixer gates is fed to the amplifier A2094 which generates the TBP stepping signal.

One purpose of the input item counter is to control tape motion in cases where multiple blocks are being read on a single input operation, and to assist in directing characters read from the tape into the proper places in memory 14A or 14B. The outputs of the three stages of this counter are decoded into their eight possible states by the D8U decoder D8U200I (FIGURE 10B). Encoding of the resulting signals TK1–TK8 inclusive into the ten signals TX1–TX10 will be described later in connection with the addressing function of the input item counter. For control of tape motion one of the signals TK1–TK8 is connected through encoder ENC2001 (see also FIGURE 10A) to give the LTI signal. For example, if there are 6 blocks to be read per input operation TK6 will be wired to give LTI as shown in FIGURE 10A. Note that the circuits shown in FIGURE 10A are wired to a plug-in unit having a plug PL2001 which plugs into a socket SK2001 to which the source signals TK1–TK8 and the output signals TX1–TX10 and LTI are wired; thus to change the number of blocks to be read on each input operation it is only necesary to plug in a different encoder.

To recapitulate, then, when operation calls for the reading of more than one block during a single input cycle, the outputs of the input item counter are decoded to give the signal LTI during the last block of the group. In this connection it should be remembered that the counter is stepped at the end of each block by the EI signal. The signal LTI is gated by the forward or FWD signal at mixer gate M2078 (FIG. 10B) to give an AEI signal or "allow end of input" signal to the input circuitry. Presence of the AEI signal in input tape unit 10 will allow the EI signal occurring at the end of this block to stop the tape motion and produce an EIS signal or "end of input signal" which indicates to other circuits that the tape reading is complete.

It is also necessary to count blocks on the reverse motion of the tape in case of a re-read caused by detection of a tape error. In order to facilitate this the counter is not stepped by the last EI, this being prevented by application of the signal —AEI to mixer gate M2054 (FIG. 10C). Thus on the reverse cycle an EI signal again will step the counter but the counter will be in its reset or cleared state as the last block is being read on the reverse cycle. This happens by virtue of the fact that the counter is connected to work in the backward direction as well as the forward direction. The direction of counting is controlled by the "forward" or FWD signal, or the "reverse" or REV signal, as the case may be, acting at mixer gates M2092 or M2094 which interconnect the successive stages of the counter. Thus if six blocks at a time are being read and a tape error occurs, the tape will be backed up and the counter will be in its zero state as the sixth block is read in the reverse direction, thus indicating that the tape is approaching the starting point of the previous forward motion and likewise indicating that the EI signal which occurs at the end of the current block should be used to stop the tape. Mixer gate M2080 (FIG. 10B), actuated by the "reverse" or REV signal and by the signal —TB1, —TB2, —TB3, representing the cleared state of the counter, is used to produce the AEI signal or "allow end of input" signal under these conditions.

Regardless of the state of the input item counter, occurrence of an "end of data" indication should permit the stopping of the tape at the end of the current block. Therefore, the mixer gate M2079 is used to give AEI signal provided the EID and FWD signals occur at the same time. Finally, if it is known that only one block at a time is to be read the signal —MBR will be present and this signal is also used to produce an AEI signal, via mixer gate M2081, unless the signal TUI indicates that a tape output unit 10 is not ready for operation. Thus the tape will stop after reading a single block regardless of the state of the input item counter.

The input item counter is cleared at the beginning of every tape reading operation by the TFR pulse fed to amplifier A2090, which occurs at the beginning of forward motion of the tape.

4.6. Controls for "end of data" operation (FIGURE 10)

When more than one item is being read on a single input cycle, regardless of whether multiple items are in a single input block or are in separate blocks, it is necessary to keep a record of the number of legitimate items in the last group read in. This is true because an internal operation normally continues until all items in the memory have been processed, giving a pulse ESC to indicate completion only when a signal ITSA coincides with a signal LSI (last scan item) at mixer gate M2070 (FIGURE 10A). Thus, if a full complement of items is not read in on input, means must be provided for earlier generation of the pulse ESC on the next following internal operation.

When the signal EID, the "end of input data" signal, occurs, it gates the EIP pulse, corresponding to the end of the block in which the signal EID was produced at mixer gate M2082 (FIG. 10A) to set the flip-flop F2008, giving the LTB signal to remember the fact that the end of data indication occurred during this input cycle. Meanwhile, as soon as the signal EID occurs, the signal —EID blocks mixer gate M2053, (FIG. 10C), preventing any further stepping of the input item counter. Thus the input item counter registers the number of items which has been read in on the input cycle prior to occurrence of the signal EID. When the pulse MSP occurs, indicating that both the input cycle and the current scan cycle have been completed, the fact that flip-flop F2008 has been set will cause the pulse MSP to set flip-flop 2009, since the 0 output of flip-flop F2008 will activate the AS input of flip-flop F2009. This will give the SHS or "short scan" signal. The pulse MSP will also reset flip-flop F2008.

Pulse MSP will also transfer the current of setting the input item counter to a group of three storage flip-flops F2005 through F2007 via gates G2080 (FIG. 10B). This will leave the input item counter free to start counting items on the first input cycle for the new tape to which changeover, either automatic or manual, takes place, meanwhile remembering its setting for control of the new current scan cycle.

Signal SHS, acting at gate G2069 (FIG. 10A) gates the ITSA pulse which steps the item counter in the scan circuitry, via amplifier A2091 into a set of test mixer gates M2071 through M2077. These gates compare the number of the item being scanned with the setting of the three storage flip-flops F2005 through F2007. When these two numbers are equal, it is an indication that the last legitimate item read on the previous input cycle is being scanned and that therefore the scan cycle should end; this is accomplished by generation of the ESC or "end of scan cycle" pulse at the end of the scanning of this item. Thus the outputs of the test mixer gates M2071 through M2077 are fed into blocking oscillator BO2005 which generates ESC, giving this ESC signal on completion of the scanning of the item in question. Thus the scan cycle is cut short only after the legitimate items in the current input memory load have been processed. Since flip-flop F2008 has meanwhile been reset by the preceding MSP pulse, the next MSP pulse which follows occurrence of both ESC pulse and completion of the reading of a new block of data into the memory will be gated at gate G2082, resetting flip-flop F2009 and ending the SHS signal.

In the special case where the end of data block happens to be the first block of a group to be read, the storage flip-flops F2005 through F2007 (FIGURE 10B) will all be in the reset state, since the input item counter under these conditions will not have been stepped. In this case signals —TBS1, —TBS2, and —TBS3 will all be present and will gate the LTB signal at gate G2046 (FIGURE 9A). The output of G2046 is inverted by amplifier A2021 and prevents resetting of flip-flop F2002 by MSP. This is necessary because no ESC pulse would occur to set flip-flop F2002 and permit completion of the combined input and internal cycles under these conditions. By preventing resetting of flip-flop F2002, the conditions which would exist if an ESC pulse had occurred to set flip-flop F2002 are set up, and therefore on completion of the next input cycle an MSP pulse is allowed to occur and normal operation proceeds.

When signal —MBR is present, indicating that only one block is to be read on each input operation, and when there is normally more than one item per block, the last block on a tape may contain fewer than the normal number of items. In this case, also, signal LTB (FIGURE 10A) must be generated to give signal SHS. This condition will be indicated by the occurrence of signal EIP before signal LTI has occurred. Mixer gate M2083 is used to set F2008 in this case via amplifier A2090. If signal LTI occurs, indicating that the normal number of items has been read from tape during the current input operation, it will gate signal LCI at gate G2082A, (FIG. 10B) and the resulting —BLC signal will block mixer gate M2083 (FIG. 10A), preventing signal EIP from setting flip-flop F2008, but if signal EIP occurs before signal LTI, indicating a short block, flip-flop F2082 will not have been set when signal EIP occurs and the latter pulse will be gated at mixer gate M2083.

4.7. Data Circuits (FIGURE 11)

These circuits handle data read from memories 14A and 14B, and data written into these memories. They are shown in FIGURE 11.

Sense amplifier outputs from memory 14A are taken to a group of mixer gates M2161 through M2167, of which M2161 and M2167 are shown in detail, and those of memory 14B are taken to a set of mixer gates M2171 through M2177, of which M2171 and M2177 are shown in detail. One or the other set of these gates is selected in accordance with the MSW or "memory switch" signal. The outputs of the mixer gates are buffed together in pairs corresponding to the seven data bits and after inversion by amplifier A2199A to A2199F these outputs are used to set the seven data flip-flops F2011 through F2017, of which flip-flops F2011 and F2017 are shown in detail. These flip-flops are only used during the internal operation and not during reading in from tape. Therefore the gates which feed them are sampled with the CS or scan timer read strobe signal and the flip-flops themselves are reset by the CWI or clock write inhibit signal from the timer used for internal operations. Outputs of these flip-flops, labelled ±DM1 through ±DM7, represent data from the memory 14A or 14B, depending on whether —MSW or MSW, respectively, is present at the mixer gates.

For certain internal operations of the processor, such as data comparisons and arithmetic operations, it is necessary to take the parallel output data from the memory, in which all seven bits of a character appear simultaneously, and convert them to serial form. It is for this purpose that the signals C1–C7 inclusive were generated in the scan timer. A character will be set up in flip-flops F2011–F2017 when timer signal CS samples the outputs SAA1–SAA7 or SAB1–SAB7, from the sense amplifiers, at one of the sets of mixer gates M2161–M2167 or M2171–M2177. Reference to FIGURE 5 will show that pulse C1 follows pulse CS. Thus when pulse C1 and signal DM1 coincide at mixer gate M2181, the latter gate will emit a 1 or a 0 in accordance with the setting of flip-flop F2011. Next pulse C2 will gate the output of flip-flop F2012, and so on until pulse C7 samples signal DM7 at mixer gate M2187. Since the outputs of mixer gates M2181 through M2187 all go to a common output line L2101, the latter will carry a serialized form of the character set up in the seven flip-flops. This serial signal is amplified by amplifier A2101 to give the signal DMSA. If there is more than one input memory unit 12, each produces a respective signal DMSB, etc.

Input data to memory 14A can come from either of two sets of seven mixer gates each. During internal operations it is desirable to be able to read the same data out of the memory more than once, but since, as previously described, read-out is inherently destructive, the data read-out must be immediately written back in, as well as being used externally. Thus one set of mixer gates, M2101–M2107 inclusive, of which M2101 and M2107 are shown in detail, is used for this purpose, receiving as its data signals —DM1 through —DM7 from flip-flops F2011–F2017 inclusive. As this regeneration of data takes place during internal operations, the timer signal CWI from the scan timer is used at these gates. When reading in from tape, mixer gates M2111–M2117 inclusive are used, and in this case a tape timer signal CTWI is used. CTWI, along with signals CTR and CTW, are generated by a tape timer TT2101, which operates in almost exactly the same fashion as the scan timer circuits actuated by signal STR (FIGURE 6). Instead of receiving its stimulus from a multivibrator such as 110C, the tape timer TT2101 (FIGURE 11) is actuated by the tape sprocket signal SPK. Whenever signal SPK occurs, which means whenever a character is read from tape, timer TT2101 generates pulses CTR, CTWI, and CTW, which bear essentially the same time relationship to each other as pulses CR, CWI, and CO in FIGURE 7, except that pulse CTWI occurs sooner after pulse CTR than pulse CWI does after pulse CR. Note also that no tape timer signal corresponding to pulse CS is needed, since the latter signal is used for sampling data read from the memory, and in storing data from tape the data previously in the memory have served their purpose and are of no interest. Note also, however, that pulse CTR (corresponding to pulse CR) is required, as it is necessary to erase old data to make room for the new, and thus the destructive read-out effect of pulse CTR is used for this purpose.

If it is necessary to supply data to memory 14A from an external source other than tape, such as a manual keyboard or a card reader, one or more additional sets of mixer gates similar to M2101–M2107 and M2111–M2117 can be added.

Mixer gate sets M2121–M2127 and M2131–M2137 perform a similar function for memory 14B as M2101–2107 and M2111–2117 for memory 14A, but with inverted relation. Thus if signal —MSW is present, memory 14A will accept data from tape while memory 14B regenerates its own data and is thus adapted for internal operations, while if signal MSW is present the functions of the two memories 14A and 14B are interchanged.

Signals MSW and —MSW also select the read and write pulses from the appropriate timer. Thus if signal —MSW is present, indicating that tape data are to enter memory 14A and memory 14B is to be used for internal operation, pulse CTW from the tape timer will be used, via mixer gate M2143, to produce pulse CDWA at amplifier A2198A, and pulse CW from the scan timer will be gated at mixer gate M2145 to produce pulse CDWB at amplifier A2198B. At the same time mixer gate M2144 will cause pulse CTR to produce pulse CDRA at amplifier A2197A, and mixer gate M2146 will cause pulse CR to produce pulse CDRB at mixer gate A2197B. Presence of signal MSW instead of signal —MSW will cause interchange of the signals.

4.8. Addressing circuits

Unlike the control and data section of input memory unit control 18, the addressing circuits of this unit are in many ways similar to the addressing circuits of output memory control 28. The addressing circuits will be described in detail with reference to the input memory 12, and later, in discussing the output memory unit 22, the differences, chiefly in notation, will be pointed out.

It was already noted, in connection with the description of memory unit 14, that address selection was made by means of a set of signals ±DA1, ±DA2, etc. for memory 14A, and corresponding signals ±DB1, ±DB2, etc. for memory 14B. These signals are taken directly from the outputs of the stages of a multistage binary counter; when the memory has a capacity of 1024 characters, for example, a 10-stage counter selects uniquely any of the addresses. When reading in a block of data from tape into such a memory, normally the counter is cleared to its zero state (corresponding to the binary number consisting of ten zeros), and then after each character has been stored in the memory from tape the counter is stepped to its next position in preparation for storing the next character.

4.9. Addressing by item and by character

In many data processing operations, it is necessary to pack several "items" or "records," each containing a fixed number of characters, into a single tape block. Thus 8 items, each containing 120 characters, are packed into a single 960 character block. This results in more efficient use of tape, both in time (since starting and stopping the tape takes place only once every 8 items), and in space, since an interrecord gap is needed only after every 8th item.

When it comes to internal operation, however, this leads to problems. Often in processing an item it is necessary to read the item several times from memory. Now if the item occupies addresses 160–239 inclusive, for example, a way must be found to restore the address counter to the setting 160 each time the item is read; after completion of processing of that item, the counter must be reset to position 240 several times to process the next item, and so on. One way to do this is to store (in a group of flip-flops, for example) the starting address of an item, transferring this setting to the address counter before each read-out of the item. This leads to a large amount of storage and gating circuitry. The system accomplishes the same result in a simpler way, as follows:

In addition to the address counter, a second counter called an "item counter" is used. In the example shown, a maximum of 8 items per block is assumed, so a 3-stage counter is sufficient for the item counter. Through a decoder-encoder combination the 8 possible states of the item counter are encoded into 8 sets of signals representing binary numbers which correspond to the first character location of each item in the memory. Finally, using a static array of binary adders, the encoded item counter signals are added to the address counter outputs to form the binary signal groups needed for address selection.

For example, using decimal numbers to simplify the explanation, suppose the system is dealing with 80-character items. The 8 possible output combinations of the item counter would be translated into the binary numbers corresponding to 0, 80, 160, 240, 320, 400, 480, and 560. The memory address selected by a particular setting of the address and item counters would be equivalent to the sum of the address counter setting and the translated item counter setting. For example, if the address counter steps through positions 0, 1, 2, and 3, it would select memory addresses 0, 1, 2, and 3, or 80, 81, 82, and 83, or 160, 161, 162, and 163, etc., depending on the item counter setting. This means in effect that by stepping the address counter through its setting it becomes possible to select the 1st, 2nd, 3rd, 4th, etc. characters of item 1, or of item 2, or of item 3, etc., in accordance with the item counter setting.

Furthermore, suppose the item counter is set to item 3, giving a coded output of 160. Now, starting with the address counter in its cleared state, and stepping it along, addresses 160, 161, 162, etc. will be selected in sequence. When address 239 has been selected, representing the last character of this item, or in fact when any point has been reached, such as the 10th character of the item (i.e., address 169), it is only necessary to "clear" the address counter —i.e., reset it to zero, a very simple operation —to start again from address 160, the first character of the same item. Furthermore, regardless of the position of the address counter, clearing the latter and stepping the item counter to its next setting will select the first character location (240) of the next item. Thus it becomes very easy to scan an item character by character, starting with its first character, as often as desired, and at any point proceed to the first character of the next item.

While there are many possible variations of the system possible, such as the application to variable length items, certain simplifying assumptions have been made—specifically, in the system described it is assumed that all items are of the same length (although the operator may choose any desired item length within the limitations of memory capacity by plugging in suitable item length encoders), and it is also assumed that a block contains a maximum of 8 items.

4.10. Details of addressing circuits (FIGURES 12–13)

There are actually two sets of addressing circuits. These are connected, however, in such a way that either set of addressing circuits can be used with either memory. In this way, one memory is available for receiving information from the tape, this memory having its own addressing circuits, while the other memory is being used for internal operation. After data in the memory being used for internal operations have been exhausted, the addressing circuits are switched so that the other memory, which meantime has been filled from the tape, can in turn supply data to other circuits in the device being served. (See foregoing description of generation, of the MSW signal.) An interlock is provided to assure that a memory is not called upon for internal use until it has been filled from the tape; this is the MLK signal previously mentioned.

The addressing circuit associated with the tape (see FIGURE 12) includes a ten stage binary counter BC8001 through BC8010, known as the tape memory counter. This counter is cleared by BI fed via buffer B8099 and amplifier A8099 to clearing inputs of the counters at the beginning of reading of a block or an unbroken sequence of blocks from tape, or by signal XS also fed to an input of buffer B8099 at the end of an item if more than one item is to be read on each input operation, and is stepped by CTWI, the write inhibit pulse from the input tape timer. Signal ±TC1, ±TC2, etc., are the outputs of the binary counter stages, signals ±TC1 being the outputs of the least significant stage.

Figure 12B:
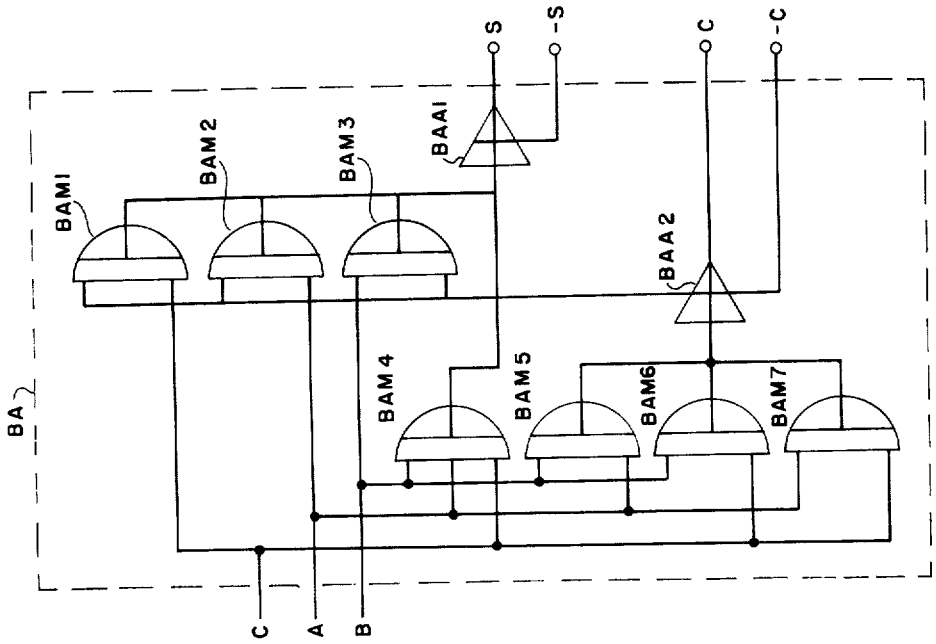
Figure 12A:
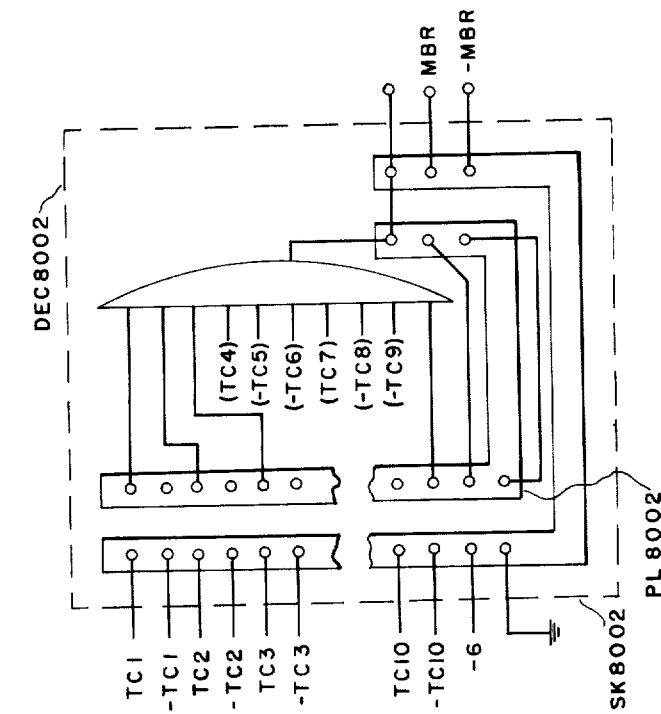

A signal from this counter is required which will occur at the time the last character of any item is being received from or written on the tape. This signal is obtained from a plug decoder DEC8002, which contains a gate whose 10 inputs are wired to the combination of TC signals corresponding to the last character of the item. For example, as shown in FIGURE 12A, if there are 80 characters in an item, numbered 0–79 inclusive, the gate is wired to TC1, TC2, TC3, TC4, and TC7, and to —TC5, —TC6, etc. The output of this gate gives the LCI signal or "last character of item" signal. The jumper connections in this same plug decoder DEC8002 give the MBR and—MBR signals. The presence of signal MBR indicates that a "multiple block read" is called for—in other words, that more than one tape block will be read or written at a single operation. For example, in reading tape which is recorded with 120-character blocks, each block being an item, as many as eight blocks may be read into the input memory in one reading operation. In this particular instance, for example, signal LCI will occur eight times, corresponding to the 120th character of each block. In this situation, since more than one block is being read at a time, the plug jumpers will be arranged to give the MBR signal. Note that all external connections are made to a socket SK8002 (FIGURE 12A), and the gate and jumper connections are on a removable plug PL8002, making it a simple operation to change item length or to change from single to multiple block readings.

Now referring back to FIGURE 10A, it will be seen that the 8 signals TK1–TK8 corresponding to the 8 possible states of the input item counter are wired to a group of buffers in the plug encoder ENC2001, generating a group of signals TX1–TX10 inclusive. These signals represent in binary form (signal TX1 least significant) the address of the first character of each item in the memory. For example, with 80 character items, item 1 would start at address 0 (this is generally true regardless of item length), item 2 would start with 80 (binary 01010000, and therefore requiring signal TK2 to feed into the buffers B2085 for signals TX5 and TX7), item 3 would start with 160 (10100000, corresponding to signals TX6 and TX8) and so on. In the example shown it is assumed that 6 items are to be read on each input operation, and therefore signal TK6, in addition to being wired into buffers B2085 for signals TX5, TX8, and TX9 (binary 110010000 or decimal 400) is also wired to give signal LTI to control tape stopping by giving signal AEI, as previously described.

Thus signals TX1–TX10 are the binary representation of the starting address of whichever item is currently indicated by the position of the input item counter, and signals TC1–TC10 are the binary outputs of the tape memory counter. Adding these together, as already explained, will give the signals required for memory addressing. The addition is performed by an array BAA8001 of 10 binary adders BA8001–BA8010 inclusive, wired as shown in FIG. 12. FIGURE 12B shows a typical 3-input binary adder stage such as BA8001. The sum (S) output is present if any of the inputs C, A, or B is present, unless two of these inputs coincide, in which case a carry (C) output is produced via one of the mixer gates BAM5–BAM7 inclusive and the sum output is blocked by the negative output of amplifier BAA2 acting at mixer gates BAM1–BAM3 inclusive. If all 3 inputs are present, mixer gate BAM4 passes a signal and both sum and carry outputs are produced. These actions follow the rules of binary addition.

The outputs TI1–TI10 from adder array BAA8001 thus represent the sum of the numbers represented by settings of the input item counter and tape memory counter. They will be used, as described below, to generate the signals ±DA1, ±DA2, etc., to select the memory address.

Addressing of that memory which is being used for internal operations is handled primarily by the scan counter, which is not shown on these circuits because it is common to all memories in the system; it will be discussed later. The setting of the scan counter, however, is modified by means of an item counter which is a part of the input memory addressing circuits 18. The item counter consists of stages BC8011 through BC8013, the three stages being capable of counting up to eight. This counter is cleared by the ESC signal fed via blocking oscillator BO8099 and amplifier A8097 to the clear inputs of the counters which under normal circumstances is generated at the end of the last scan of the memory during an internal operation, and stepped by the signal ITSA fed to amplifier A8096.

In all internal operations, the setting of the scan counter is modified by adding to it, as in the case of the tape memory counter, a number encoded from the item counter setting. Thus, for example, if items of 80 characters each are being handled and three such items have been processed, the item counter will be used to add the number 240 to the setting of the scan counter. The result of this will be to make the scan counter scan addresses 240 and up, returning to 240 each time it is cleared, in order to scan the fourth item in the memory as many times as necessary without having to retrace scanning of the first three items. Thus, in a manner similar to that used with the input item counter, the outputs of the item counter are decoded into eight signals IT1 through IT8 by means of a decoder D8U8001 and then encoded by using a plug encoder ENC8001 to give the ten bits IB1–IB10 inclusive. The ENC8001 is similar to that shown in FIGURE10A. Corresponding to signal LTI in FIGURE 10A, encoder ENC8001 gives a "last scan item" signal LSI, which is wired directly from one of the signals IT1–IT8 inclusive.

The signal outputs of the ten stages of the scan counter, labeled SB1 through SB10, are added to signals IB1 through IB10 by means of an array BAA8002 of ten binary adders to give the signals SI1 through SI10. The latter signals represent the address to be employed for the memory being used for internal operations, in the same way that the signals TI1 through TI10 represent the address to be used in the memory associated with the tape.

The two sets of signals TI1 through TI10 and SI1 through SI10 are taken to an array of mixer gates M8001 through M8040 (FIGURE 13). These mixer gates are arranged in ten groups of four (two such groups are shown in detail), each such group (such as, for example, mixer gates M8001, M8011, M8021, and M8031) acting as a reversing switch. The common push-pull signal MSW and —MSW is applied to the other inputs to these mixer gates in such a way that, for example, in the group of four mixer gates mentioned, the presence of signal MSW will cause signal SI1 to be gated into amplifier A8001 and signal TI1 to be gated into amplifier A8011, while signal —MSW will cause signal SI1 to be gated into amplifier A8011 and signal TI1 to be gated into amplifier A8001. Similar action takes place in the other reversing circuits.

The outputs of amplifier A8001 are the signals DA1 and —DA1 respectively, while the outputs of amplifier A8011 are the signals DB1 and −DB1, respectively. In similar fashion the remaining signals DA2 through DA10 and DB2 through DB10, together with their negative equivalents, are generated. The DA signals are applied to the address decoders for memory 14A, whereas the DB signals are applied to the address decoders for memory 14B.

Thus application of the signal MSW has the effect of reversing the respective connections of the combination of the tape memory address counter and input item counter on the one hand, and the combination of the scan counter and item counter, on the other hand, to the two memories 14A and 14B.

5. SCAN CIRCUITS

In processing an item in the system, various operations must be performed, such as transferring the item from an input memory to an output memory or tape, comparing certain fields (groups of contiguous characters) in one item with corresponding fields of one or more other items, adding a field of one item to a field of another or to stored data, and various other similar operations. All these operations have one thing in common—they involve reading the selected item, or certain fields of it, serially (i.e., character by character) from a memory, and in certain cases storing the respective characters in another memory, or memories.

5.1. Item scan counter (FIGURE 14)

Comparisons form an important class of operations in the system, and in this case corresponding fields of characters must be read simultaneously from two or more memories. Likewise, in transferring data from one memory to another, both memories must be simultaneously and sequentially addressed. Thus there are numerous situations where a single addressing counter can be made to serve two or more memories, and one of the features of this invention is the use of a single addressing counter for all internal operations. It should be noted, however, that this common counter only serves for selecting sequentially the characters within an item; each memory, such an input memory unit 12A already described, has its own item counter, which is used to modify the setting of the common counter, so that the latter, hereafter called the "item scan counter" or simply the "scan counter," may, for example, be selecting addresses 0–79 in one memory and 160–239 respectively in another; this assuming that 80-character items are being used and the item counter of the first memory is on item 1 and that of the other memory is on item 3.

A ten stage counter consisting of counter stages BC3001 through BC3010 (FIGURE 14) is used as the item scan counter. It is reset at the end of every item scan by the ESN fed to amplifier A3099 or "end of scan" signal. Since it is used for memory addressing it is stepped once per character and the signal used for this purpose is either the CWI or "clock write inhibit" signal from the scan timer, or the CHS signal, which is the counter step pulse from the search timer. These two signals are combined at buffer B3004 and shaped by blocking oscillator BO3015 to step the counter.

Outputs of the item scan counter are labeled SB1 through SB10 with their corresponding negative values. They are used partly to define the fields of an item, and are used also as previously described to control addressing of the memories.

In using these signals to define the fields they must first be decoded by a decoder assembly DA3001 of four decoder cards D8U3001-D8U3004 which decode signals SB1 through SB5, both positive and negative, into a group of 32 signals which are inverted by amplifiers A30U1 to A30U32 to give signals marked U1-U32 inclusive. These signals are brought out to the correspondingly-numbered "Units" hubs on the field definition and scan control (FDSC) plugboard.

The D8U decoders used in the decoder assemblies DA3001 and DA3002 differ slightly from the example shown in the symbol section (FIGURE 37), in that they have provision for 8 control signals instead of 6 (see FIGURE 14A). The two additional inputs D and E provide the equivalent of two more inputs to each of the 8 decoder gates; they are used in assemblies of several D8U decoders, and allow the latter to decode a total of more than three binary signal. Inputs to D and E are common to all gates on a D8U decoder, but differ from one D8U decoder to another in an assembly, permitting selection of a particular D8U decoder in the assembly by means of the D and E inputs, while the A, B, and C inputs select one of the 8 outputs of the selected D8U decoder. For example, in decoder assembly DA3001, presence of signals SB4 and −SB5 will select decoder D8U3002, while the particular combination of signals ±SB1, ±SB2, and ±SB3 will determine which of the signals U9–U16 is generated.

5.2. Field definition (FIGURES 15, 16)

All operations performed on data passing through the system require the presence of control signals to determine which characters of an item are to be affected. For example, in a sequencing operation it is assumed that each item includes among its characters a particular group which identifies it and distinguishes it from other items; such an identifying group, often called a "designator" or "key," might be an account number, or a stock number, or a person's social security number, for example. Sequencing implies taking items in random order and arranging them in sequence according to their designators, and to do this requires comparison of designators. Thus in data processing, when one speaks of "comparing items," one really means "comparing designators." Now in order to compare designators, it is necessary to obtain a control signal which is present, during the scanning of an item, only at times corresponding to the characters of the designator.

The designator is probably the most common example of a "field," which is a group of contiguous characters within an item. (So-called "split fields," in which characters are non-contiguous, may for most practical purposes be considered to consist of two or more fields.) Thus to control comparisons, it is first necessary to provide a way of defining fields, in order to lay the foundation for deriving the necessary control signal. Since a field consists of several contiguous characters, it can be defined in terms of its first and last characters. The field definition signal can then be obtained by setting a flip-flop before generating the timer signals for memory read and write while the scan counter is registering the address of the first character of the field, and resetting the flop-flop after completion of the timing signals occurring when the scan counter is registering the address of the last character of the field. A circuit for defining a field is shown in FIGURE 15.

Before describing the field definition circuit, however, it is desirable to discuss briefly certain features of the field definition and scan control (FDSC) plugboard. In the particular system here described, the FDSC plugboard (FIGURE 16) has hubs arranged in 48 columns and 34 rows, and for convenience is divided into left and right hand (A and B) sections of 24 columns each. The "Units" and "BASE" hubs which emit decoded outputs from the scan counter are in columns A, B, C, and D of section A, row 19–34 inclusive. For convenience in referring to hubs, they will be identified by section, column, and row— thus FAB12 means FDSC plugboard, section A, column B, row 12.

Rows 1–16 of section A and rows 11–18 of section B are field definition hubs, all being double hubs (i.e., pairs of hubs connected together) to facilitate "chain wiring" as commonly used on data processing plugboards. The advantage of double hubs will be more apparent from examples of plugboard wiring to be given later. Rows 17 and 18 of section A and 19 of section B are "field out" hubs. The remaining hubs will be discussed as the occasion arises.

Returning now to FIGURE 15, one of 72 field definition circuits is shown. All 72 circuits are identical, differing only in the location of the plugboard hubs to which they are wired. There is no specific reason for choosing 72 field definition circuits; in some installations a considerably smaller number would be adequate, while a system required to perform complicated processing functions might require so many as to require a larger plugboard.

The beginning of a field is defined by wiring on the plugboard from a "units" hub to a "start units" hub and from a "base" hub to a start "base" hub. In choosing "units" and "base" hubs, the convention is that the character number is equal to the sum of the units and base numbers chosen. Thus if a field is to start with character 37 of the item, the "base" hub #32 (FAC20) would be wired to the "start base" hub of the field definition group (for field 2, for example, this would be hub FAB11 or FAB12), while the "units" hub #5 (FAA23) would be wired to the "start units" hub of the same field definition group (in this case hub FAB9 or FAB10).

Now when the scan counter is registering position 37 and the signal CFX occurs, the latter will be gated by gate G3101 and inverted by amplifier A3101 and will set flip-flop F3101. The result will be that a signal will appear at the corresponding "field out" hub (for field 2 this would be FAB18). This signal will continue until flip-flop F3101 is reset by the coincidence of signal at gate G3201 which is inverted by amplifier A3201 and fed to the reset terminal of flip-flop F3101. Suppose the desired field extends from character 37 through character 45. For timing reasons, as will be shown later, the "end" hubs are always wired for the next character following the end of the desired field, thus if the field ends with character 45, the "end base" hub FAB15 will be wired to "base" hub 32 (or, in practice, if base hub 32 was wired to hub FAB11, the connection to hub FAB15 will be taken from hub FAB12), and the "units" hub 14 (FAA32) will be wired to the "end units" hub of field 2 (FAB13 or FAB14). Then the signal on "field out" hub 2 (FAB18) will encompass characters 37 through 45.

5.3. Scan controls (FIGURE 15)

The scanning of an item is initiated by means of a plugboard connection. Provision is made for setting up to as many as 10 different scans in the system being described. These are initiated in any desired sequence; thus, for example, under certain circumstances an item may be scanned only once, while under different conditions it may be scanned a number of times, possibly as many as 10. Alternatively, under some conditions certain scans may be used and under different conditions other scans may be used. In any case, any one of the 10 possible scans is initated by pulsing a "scan select" hub on the operation control (OC) plugboard (to be described later). The scan select hubs for scans 2 through 10 are designated SL2 through SL10. A typical one of these signals SL goes into a blocking oscillator BO3001 which is used to set a scan flip-flop F3001. A slightly different circuit is used to generate SLI on scan one; this circuit will be described later. The setting of any scan flip-flap F3001 will also reset any other scan flip-flop which may have been set previously. This is accomplished by bringing the scan select signals SLI through SL10 to buffer B3001, where they are reshaped by blocking oscillator BO3011 to give the ISS or "item scan start" pulse, which is used to reset any of the flip-flops F3001 which may be set at the time.

The "one" output of a scan flip-flop F3001 is gated by gate G3001 and fed to amplifier A3001 to give one of the signals labeled "scan 1" through "scan 10," which are taken to "scan control" hubs on the FDSC plugboard (column E, F, G, H, J; rows 33 and 34, section A). A common interlock signal is applied to the second inputs of the gate G3001 to prevent the generation of signals at the scan hubs if signal EDC (end of data) occurs when going directly to tape without an output memory. Signal EDC acts via buffer B3003, which also receives a signal from gate G3003 to prevent generation of a scan after a memory interlock signal MLK occurs which is fed via buffer B3002 and amplifier A3098 to set flip-flop F3002, on the "one scan" mode (SCI present).

A signal from one of the "scan control" hubs can be connected to one or more "scan definition" hubs (column D–Z, rows 31–32). These hubs, when stimulated by signals from "scan controls," make it possible to combine the scan signal with one or more field signals in order to give signals corresponding to those fields which are to be operated on or examined during that particular scan. Thus each scan field group, of which there are twenty, has a "scan definition" input and six "field inputs ("field 1" through "field 6"). All those inputs originate at double plugboard hubs. In the typical scan field group SFG3301, the output of amplifier A3301 from the "scan definition" hub goes to a series of six gates each of which has as its other input one of the "field" hubs. Two of the six gates, those connected to hubs "field 1" and "field 2" are exemplified by gate G3301 and are connected to inverters such as amplifier A3302, whose output is again inverted by amplifier A3303 to give an output signal called "scan field exit," and the output of amplifier A3302 is also taken to a blocking oscillator BO3301 to give a "scan field end" pulse. The latter is done on only two of the six field circuits in a scan field group because in many cases a field end pulse is not required, and of course extra equipment is required to produce it. The other four gates in the scan field group, such as gate G3302, are connected to amplifiers such as amplifier A3304 which go to "scan field exit" hubs in the same way as the output of amplifier A3303. The "scan field exit" and "scan field end" hubs are on the operation control (OC) plugboard, to be described later.

The action of the scan field group, therefore, is to produce a maximum of six signals, each of which corresponds to the occurrence of a different field during one scan. These signals are used for gating information to comparators, for controlling the transfer of information from input to output memories, and for the control of other processing operations. Since one "scan control" can be connected to two or more "scan definition" hubs, 12 or more fields can be defined on one scan.

5.4. Item scan control

A number of controls are associated with the beginning and end of each scan and with the selection of the proper timers to be used at different times during the scan, and various interlocks have to be provided. Those are shown in FIGURE 17.

5.5. Beginning and end of scan controls (FIGURE 17)

One mode of operation provided primarily for test purposes allows one item to be processed after which the machine will halt and will not resume operation until a "proceed" button is pressed. It is in connection with this mode of operation, which may be referred to as the "one item halt" mode, that the special treatment previously mentioned is required for scan number one. If the controls are not set for the "one item halt" mode, the signal from the "scan number one select" hub (OAB27–28) on the operation control board is gated directly through mixer gate M3016 and amplified to give the LS1 or "select scan 1" signal. In the "one item halt" mode, on the other hand, signal OIH will present, signal −OIH will block mixer gate M3016, and a signal applied to the first scan select hub will instead be gated through gate G3017 to set flip-flop F3014. Flip-flop F3014 must serve as a memory of the fact that the first scan select hub has been pulsed, but no immediate action takes place. Pressing of the "proceed" button, however, will give the PCD signal, which is gated through mixer gate M3018 provided F3014 has been set, and after being amplified by amplifier A3095 gives the SLI signal to start scan one. Signal PCD also resets flip-flop F3014. The CFX signal, previously mentioned in connection with the setting and re-setting of the field flip-flops, is obtained in most cases from either the scan timer, which gives the signal CF, or the search timer, which gives the signals CFS. These are combined at buffer B3002 and shaped by blocking oscillator BO3013 to give signal CFX. It is necessary, however, to generate a CFX signal corresponding to the first character of the item and this is done by using the SSCN pulse, which occurs at the beginning of every scan. Pulse SSCN is delayed 8 microseconds by passing it through blocking oscillator BO3015 and inverting the latter's output by amplifier A3094 to trigger blocking oscillator BO3012 with the trailing edge of the signal from blocking oscillator BO3015.

Normally a scan is terminated whenever a new scan is started. Since the start of a new scan is characterized by occurrence of the signal ISS, this latter signal is taken through buffer B3090 into blocking oscillator BO3014 to give the "end of scan" signal ESN. The last time an item is scanned, however, no new scan is started for that item; therefore it will be necessary to find some way of terminating this scan by giving the ESN signal. This is done by plugging signals from the "units" and "base" hubs of the scan counter decoder to the "last col. ind." hubs which are inputs of gate G3011, where they are sampled by means of the CFX signal. This will result in generation of the ESN signal after the last character of an item, regardless of whether a new scan is started on that item. Finally, if signal EDC is present, indicating an "end of data" from output tape without an output memory, signal CF will be gated at G3090 to give ESN.

Signal ISS, unless a halt or HLT signal is present from flip-flop F3011, will be gated through mixer gate M3013 to trigger a delay flop D3001, which, after a 13 microsecond delay, will pass a pulse via amplifier A3093 to set flip-flop F3012, giving the "scan" signal SCN. Flip-flop F3012 is reset by ESN unless interlock ILK prevents it at gate G3095. Thus the signal SCN is present for the duration of any scan.

If a "halt" signal has set flip-flop F3011, ISS will not produce the SCN signal. When the "proceed" button is pressed, giving the "PCD" pulse, however, pulse PCD will be gated at mixer M3014 to trigger delay flop D3001 and set F3012 flip-flop, giving SCN. Signal PCD will also reset flip-flop F3011.

*5.6. Selection of timer (FIGURE 17)*

In order to provide maximum possible speed of operation, three different timers are provided for use during the internal processing. The fastest of these, the search timer, is used where it is necessary to step the scan counter up to a point where some actual internal operation must begin. The search timer operates at a rate which would be too high for reading and writing in the memory. Where serial operation is required, which would be the case, for example, in making comparisons between data from two memories, a serial timer is used. This operates at a relatively low rate in order to provide time not only for reading and writing in the memory but also for serializing the bits of each character. When transferring data from an input memory to an output memory, a transfer timer is used which operates slowly enough to permit reading and writing but at the same time does not take the extra time which would be required for serializing. Finally, in the particular case where no output memory is used but where data are transferred directly from an input memory to tape, the tape rate timer is used. This operates at a data rate appropriate to the tape being used for output, for example, 15 kcs. The proper timer is selected by the timer select circuits TS3001.

Unless some internal operation requires a different selection, the timer giving the fastest operation is selected. This, as previously mentioned, is the search timer, which is selected by gate G3019. The presence of the SCN or "scan" signal will actuate this gate unless one of the signals PBC, PBS, or ILK is present. The output of gate G3019, amplified by A3050, is the SCH signal.

If any internal operation requires serial data transfer, a control hub will be plugged up during that particular field, giving one of the signals PBCA, PBCB, etc. This signal through buffer B3005 will give the PBC signal from amplifier A3090. In this case gate G3019 will be locked but gate G3020 will be actuated, unless an "interlock" or ILK signal is present. The output of gate G3020, after amplification by A3051, gives the SER or "serial" signal to actuate the serial timer.

When transferring data to an output memory, where transfer is to take place at a high rate between input memory and output memory, gate G3022 will be used to give the STR signal from amplifier A3053. This gate will be actuated if a signal PBS is present and PBC is not. Signal PBS, like signal PBC, will be generated when certain hubs on the plugboard are actuated, giving signals through buffer B3006 which in turn produces signal PBS from amplifier A3089. Signal —PBS3 prevents generation of signal SER when going directly to tape and at the same time modifying output data, which would give signal PBC.

When transferring data directly from one of the input memories to an output tape, the signals PBS and PBS3 will both be present at mixer gate M3021. Actuation of mixer gate M3021 will give the STP signal from amplifier A3052, which will operate the regular serial clock. The presence of signal STP, however, will cause the serial clock to operate at a lower repetition rate, one which is appropriate to recording on the tape.

There may be instances in which the proper rate for recording on tape is higher than the rate associated with SER. In such cases the controls may be modified slightly to select the fastest timer in each instance.

*5.7. Interlocks (FIGURE 17)*

A number of interlocks are necessary to prevent operation at times when other situations would render such operation improper. The buffer B3003 combines various interlock signals to give the ILK signal. Signal —ILK as already noted blocks operation of any of the timers and also prevents generation of any scan signals. Those signals which can produce interlock are the "one scan mode" interlock OSK signal, the "interrecord gap interlock" IRK (used in those cases where direct output to tape is used without an output memory), and "memory interlocks MLKA, MLKB, etc., for all the input memories and OLKA, OLKB, etc. for the output memories. Other interlocks are provided for various arithmetic, comparison, auxiliary storage, and other circuits, wherever it is necessary to delay the scanning operation pending completion of any other operation. With the exception of signal OSK, all these interlocks signals are generated in circuits other than the scan circuits. Signal OSK, the "one scan mode" interlock, is generated when for test purposes it is desired to operate the machine one scan at a time, stopping after each scan and not resuming operation until the "proceed" button is pressed. This is accomplished by supplying from a manual switch the signal OSH or "one scan halt." Signal OSH will gate signal ISS each time it occurs through mixer gate M3015, setting flip-flop F3013 via amplifier A3088 to give the signal OSK. Pressing the "proceed" button will reset F3013 so that signal OSK disappears. Signal OSK will also be generated if an output parity error occurs on an output to tape without an output memory; in this case one of the signals OPEX, OPEY, OPEZ, etc. will be present at buffer B3088 and amplifier A3087, acting at mixer gate M3030 to cause signal ISS to set flip-flop F3013.

At the beginning of a normal sequence of operations it is desirable to have a "first block" signal FBP which will enable pressing the "proceed" button to initiate an input operation, as indicated in the discussion of the input memory controls. This signal is supplied by flip-flop F3030, which gives signal FBP when in its reset state. Flip-flop F3030, like other flip-flops and counters, is reset at the beginning of an operation by pressing an "initial clear" button; thus signal FBP appears when "initial clear" is pressed. Now when the "proceed" button is pressed, the resulting PCD pulse resets flip-flop F3030, but not until pulse PCD has been gated by signal FBP into various circuits where it is required. Subsequent PCD pulses will not actuate these circuits, since signal FBP has disappeared.

5.8. Fixed character circuits

It is often necessary to generate certain fixed characters or "constants," such as, for example, zeros for clearing a field in an item. This is accomplished by using the C1–C7 signals from the scan timer, feeding into a 7-input buffer ("or" circuit) whichever C pulses correspond to "ones" in the desired character (see "Representation of Data"). The C1–C7 signals are brought out to pairs of hubs labeled B, A, 8, 4, 2, 1, and C, respectively, in column N, section B, rows 21–34 inclusive of the FDSC plugboard (FIGURE 16). Twelve OR circuits of the type described later (see "Miscellaneous Circuits"), each having 7 double-hub inputs, are provided in columns A through M, rows 21 through 34 of section B of the FDSC plugboard. The outputs of these OR circuits appear as the FIXED CHARACTER OUT hubs (L through R, 27 and 28) of section B of the OC plugboard (FIGURE 25).

To set up any desired character, wires from the hub pairs FBN21–34 corresponding to every "one" in the desired character are wired to hubs in one of the 12 OR circuits; thus (see "Representation of Data") to generate the letter E, four wires are taken from hub pairs B, A, 1, and 4 in column N to four different hub pairs in say, column A of the fixed character hub group. In the present system an odd parity is used internally; thus if the total number of "ones" in the chosen character is even, as in the present example (four "ones"), an additional connection is taken from the C hub in column N to another hub pair in the same OR circuit. Now whenever the serial scan timer is actuated a serial signal corresponding to the letter E will be emitted from hub OBL27 on the OC plugboard.

6. DATA TRANSFER CIRCUITS (FIGURE 18)

The data transfer circuits 20 control the flow of data between input memories 12A, etc. on the one hand, and other output memories 22A, etc., where used, or output control 32 when feeding data directly from input memory to tape. Serial data from input memories 12A, etc. and output memory 22A, etc. are also carried through data transfer circuits 20 to the operation control plugboard, even though no switching is involved. The data transfer circuits are shown in FIGURE 18.

An output data selector ODS3001 is the principal element in routing data between memories. It consists of 7 identical circuits, one of which is shown in detail. In the typical circuit shown, data signal DM1A from input memory 12A or DM1B from input memory 12B can be gated into a flip-flop F6001 through mixer gate M6001 or M6021, respectively, in accordance with which of two selector signals SELA or SELB, respectively, is present. The data signal DM1A, for example, represents the most significant bit of a character from memory 12A; the other 6 bits are represented by signals DM2A, DM3A, etc., and are handled by the 6 other circuits identical to the one shown in detail.

If more than two input memories 12 are used, additional mixer gates such as M6011 and M6021 will be required.

A third mixer gate M6041 is provided for the case where data to be fed into the output memories are in serial form, as, for example, when the data come through a modify circuit for the purpose of replacing certain fields with fields from a source other than the selected memory or are being recirculated from an output memory. Such serial data are represented by the signal SLD.

At this point it should be stated that the reason for feeding data from an output memory through data transfer unit 20 and back into the output memories is to permit data already in the output memory to be recirculated for the purpose of analyzing or modifying them; while this could in most cases conceivably be done when the data are originally transferred from input memory to output memory, it is sometimes convenient for practical purposes to perform the desired operations on a later scan.

The CWI signal from the scan timer is used at mixer gates M6011 and M6021 to sample the incoming data. At mixer gate M6041, however, the same serial data signal SLD appears in all 7 identical circuit groups, and as each group must ultimately store a different bit of the 7-bit character, a differently timed sampling pulse must be used at that gate in each group. The sampling pulse in the group shown in detail is pulse N1; it coincides in time with pulse C1, which was used to sample the most significant bit of the character in generating the original serial data; thus pulse N1 will cause this partciular bit of the serial character to be stored in flip-flop F6001. In the other 6 circuit groups the timer pulses N2–N7 inclusive are used for sampling the serial data, thus causing a different one of the 7 bits to be stored in each flip-flop.

The output signals ±OD1, ±OD2, etc. thus represent in parallel form the selected data received by unit ODS3001, and are fed into the data circuits of all output memories 22 and to all output tape units 30, etc. associated with output control 32. This fact should be noted carefully. While it would be posible to direct the selected data from unit ODS3001 only to that output memory or memories 22 or (via output control 32) only to one or more specific output tape units 30, this would require a group of 7 input gates for every output memory unit 22 and for every output tape unit 30 associated with output control 32. Such ararngements have nevertheless been customary in data processing systems in the past.

In the present system the particular addressing scheme used for the output memories permits output data to be writen into all output memories. Suppose output memory 22A has its item counter on item 1, and output memory 22B has its item counter on item 3. At the start of a scan, assuming 80-character items, memory 22A will be set to address 0, and memory 22B to address 160. Now when an item destined for output memory 22A is transferred, it will go into memory 22A in addresses 0–79 inclusive, and into memory 22B in addresses 160–239 inclusive. Memory 22A now contains the desired item, but memory 22B also has it. Now, upon completion of the transfer, the item counter of memory 22A is stepped to 2, but that of memory 22B is left unchanged.

Suppose now that the next item to be transferred is destined for memory 22B. Since that memory's item counter has not been stepped, the item will again be stored in addresses 160–239, replacing the previous data. Since writing new data into a memory always replaces previous data in the same addresses, it does not matter that such previous data did not belong there in the first place. In memory 22A, however, the new item will now go into address 80–159 inclusive, and will not disturb the legitimate item previously stored in addresses 0–79. At the end of the new transfer, the item counter of memory 22B is stepped, since the latter memory now contains another legitimate item.

Thus, in summary, an item transferred to any output memory 22 also goes to all output memories, but upon completion of the transfer only the desired destination output memory or memories have their item counters stepped. The extraneous data in the remaining memories will eventually be replaced by legitimate data read into the same addresses.

Similar considerations apply to data sent through output control 32 to output tape units 30 without the use of an output memory. In this case only the desired output tape units 30 are set in motion, the others remaining at rest. Since data can only be recorded on tape if the tape is moved past the recording heads, no data will be recorded on output tape units 30 which are not moving their respective tapes, even though their recording heads are receiving data from transfer unit ODS3001. Thus again there is no need to provide gating to restrict the output data signals ±OD1, ±OD2, etc. to certain outputs.

The signals SELA, SELB, etc. are generated by wiring a FIELD END signal on the OC plugboard to one of the SEL MEMORY hubs. Transfer of data will then take place on the following scan, which is initiated by means of the same FIELD END pulse. When the FIELD END pulse is received at a SEL MEMORY hub, it sets a flip-flop—for example flip-flop F6011—giving in this case the signals PBSA and, subject to certain restrictions, SELA. The action of signal SELA has already been described. Signal PBSA is used in the timer selector circuits TS3001 to generate the PBS signal, which, in the absence of certain other signals, notably signal PBC, causes the STR signal to appear, selecting the timer having the fastest rate consistent with transfer of data from one memory to another. If the output memory is selected for recirculation, the resulting PBCC signal from F6013 selects the serial timer, and data signals DWSA appear as SLD signals via mixer gate M6073 and amplifier A6071.

It is often necessary to replace one or more fields of the item being transferred, using data from a source other than the selected memory. In this case a control signal from a SCAN FIELD EXIT hub on the OC plugboard is connected to the ALLOW hub on one of the MODIFY circuits, and the (serial) data from the alternative source are routed to the corresponding DATA hub. Whenever a signal from the SCAN FIELD EXIT hub appears at the MODIFY ALLOW hub, it will gate the alternative data to the SLD circuit by, for example, mixer gate M6061 and amplifier A6071. Since signal SLD goes to the 7 mixer gates such as M6041, it will be scanned by the N1–N7 signals and will appear ultimately as the ±OD1, ±OD2, etc. signals. At the same time the signal from the MODIFY ALLOW hub will go via buffer B6061 to amplifier A6061, whose negative output, −PBCA, will block mixer gates M6051–M6053 inclusive, thus interrupting the normal flow of selected data. Finally signal PBCA will act through the scan control circuits (FIG. 17), specifically the timer selector TS3001, to generate PBC; the resulting signal −PBC at gate G3022 will prevent generation of signal STR, and signal PBC at gate G3020 will generate signal SER instead, thus actuating the serial timer which among other signals produces signals C1–C7 which are needed to generate the serial data and also signals N1–N7 to sample the latter at mixer gates M6041, etc. (FIG. 18) in output data selector ODS3001. The net result is to substitute the alternative data entering the MODIFY DATA hub for the normal selected data from input memory unit 12 or output memory unit 22.

It is often convenient to have available a signal which represents whatever data have been selected for transfer to output, regardless of their source. This can save a considerable amount of plugboard wiring in cases where operations are to be performed on whatever data are selected for transfer to output, whether from a memory directly, or from an alternative source under a "modify" operation. Thus in addition to the alternative data in the "modify" operation, the serial data from all memories selectable for transfer to output are also fed into the SLD circuit. Data from the selected memory, in serial form, are designated DMSA, DMSB, etc. from input memories and DWSA, DWSB, etc. from output memories. They are gated by the SELA, SELB, etc. signals at mixer gates M6071, M6072, etc. Note that in the absence of a "modify" or other operation which generates signal PBC, no data will appear on the SLD line during normal transfers from input to output, because generation of serial data requires generation of signals C1–C7 inclusive, which are generated only if signal PBC is present to produce signal SER and operate the serial timer.

The serial output data signals DMSA, DMSB, etc. from all input memories 12 and DWSA, DWSB, etc. from one or more output memories 22 are also fed to plugboard hubs marked MEMORY DATA OUT, making such data available for analysis or modification whenever a signal from a SCAN FIELD EXIT hub actuates a control hub which is in turn connected to generate the PBC signal to actuate the serial timer.

In the foregoing description it has been assumed that there are two input memory units 12A and 12B, and that only one of the output memories, 22A, is connected for recirculation—i.e., for making available data already transferred to it on a previous scan, for further analysis or processing on a subsequent scan. It should be understood that if there are more than two input memory units (which would be designated 12C, 12D, etc.), they will also each require mixer gates such as M6011, M6021, M6071, and M6072, and selector circuits such as those employing flip-flops F6011 and F6012. Likewise, if data from more than one output memory unit 22 are to be made available for recirculation, additional mixer gates such as mixer gate M6073 and additional selector circuits such as those employing flip-flop F6013 will be required for each such additional output memory unit 22.

7. OUTPUT MEMORY UNIT

The output memory unit 22 is, as already noted, similar in many ways to the input memory unit 12, differing primarily in its controls. It uses exactly the same memory elements 14A and 14B as used in the input memory unit; as in the latter, the discussion here is based on units of 1024 character capacity. In the following discussion, notation appropriate to output memory unit 22A and its associated output tape unit 30A will be used, it being understood that suitable changes in notation would be made in describing a different output memory unit such as 22B and its associated output tape unit 30B.

7.1. Memory switching (FIGURE 19)

Switching of the output memory—that is, the interchange of memories 14A and 14B as to function, is accomplished in much the same way as the switching of the input memory. Since that circuit has been described in detail, the output memory switching circuit (FIGURE 19) will be described only briefly.

In order to provide memory switching or interchange it is necessary to assure that the contents of the memory being used for output to the tape has been exhausted and that the memory being used to receive data from the internal circuits has been completely filled. Emptying of the memory feeding the tape is indicated by occurrence of the signal HOT, which indicates the end of recording. In the case where the system is first started and therefore no recording has yet taken place on the tape, the combination of the "proceed" signal PCD and the "first block" signal FBP takes the place of signal HOT. In either case signal HOT at mixer gate M6574 or the signal from mixer gate M6592, where PCD and FBP are combined, is used to set flip-flop F6514. Completion of the loading of the memory from the internal circuits is indicated by coincidence of the signals ITSC and LSI, where at gate G6582 signal ITSC is the item step pulse from the OC plugboard circuits and signal LSI is the last item indication from the output memory addressing circuit. The coincidence of these two signals at gate G6582 results in the setting of flip-flop F6513 via amplifier A6399 and buffer B6502. In those cases where manual completion of an output operation is called for the signal MED at buffer B6502 takes the place of the signals ITSC and LSI in setting flip-flop F6513.

When both flip-flops F6513 and F6514 have been set the pulse signal MSPO, the memory switch pulse, is generated by blocking oscillator BO6509 fed by gate G6584 and this in turn causes interchange of the memory by its action on binary counter C6504 whose output is the signal MSO which is used in the output memory adressing circuits in the same way that MSW is used in the input memory.

7.2. Tape motion control (FIGURE 20)

Motion controls for the output tape unit 30A are shown in FIGURE 20.

Occurrence of signal MSPO, indicating that one of the memories has been filled and its contents are ready for recording on tape, is the usual indication for starting output tape motion. Assuming signal —TUI is not present (i.e., assuming the output tape unit 30A is ready to receive data), signal MSPO will set flip-flop F301 via gate G310, and unless gate G311 is otherwise blocked, this will trigger blocking oscillator BO303, giving a pulse via buffer B301 to produce the OCR pulse by amplifier A399, setting flip-flop F305 to give the tape motion signal OFWA. Gate G311 will prevent generation of signal OCR if the tape is already in motion, since then signal —OFWA will be present. Furthermore, if flip-flop F301 is set within 8 milliseconds after a pulse OFWR has reset flip-flop F305 to halt a previous tape motion, delay flop DF302 acting through inverter amplifier A301 will block gate G311, delaying generation of signal OCR until delay flop DF302 recovers. This prevents restarting the tape too soon after stopping—a precaution desirable for mechanical reasons.

When several items from the output memory are to be recorded in separate blocks on the output tape, a "multi-block write" signal MBW will be present. In this case signal XS, which is generated following the last character of each item in the manner described in connection with the input memory controls, will supply signal OCR via mixer gate M310. In this case signal OCR is not needed to start the tape, since the latter is not stopped, but signal OCR is neded to introduce an interrecord gap between blocks by its action on delay flop DF300. Mixer gate M310 operates unless signal —EDA indicates that the end of a reel has been reached or unless signal —AEW indicates that the block being recorded is the last one in the memory.

Mixer gate M311 permits generation of an OCR pulse to permit recording an "end of data" indicator following the last block if either signal OTFA indicates the end of a reel or signal MCA indicates a "manual complete" operation. The inverses of these signals are fed to gate G301 whose output is coupled to amplifier A315. This logical combination acts as a buffer circuit. Signal MCA is a steady signal produced by flip-flop F303 if the "record end of data" button on the control panel is pressed to give the MED pulse. Signal MCA remains on from the time signal MED is generated until HOT, the end of output pulse, occurs while EDA is present at gate G305. Signal EDA, then, is generated by flip-flop F307 at the end of the last data block if either signal OTFA or MCA is present (through action of mixer gate M316), or (through action of mixer gate M315) when signal MCA has occurred prior to start of an output operation, in which case signal EDA starts with signal MSPO.

If signal MSPO occurs when signal TUI is present, indicating that the tape unit 30A is not ready to receive data, gate G310 will prevent generation of signal OCR as already noted, but gate G300 will permit signal MSPO to set flip-flop 304, remembering that signal MSPO occurred. When the reel has been changed or tape unit 30A has otherwise been readied, pressing the "proceed" button to give signal PCD will also give signal OCR via mixer gate M308, and will reset flip-flop F304.

A signal WDP is generated by amplifier A397 following the writing of the last character of each block. On multi-block writing signal MBW will be present, and will gate signal XS at mixer gate M312 to give signal WDP after each time. In writing a single block, the AEW signal will be present during writing of the last item and will gate signal XS at mixer gate M313 to give signal WDP. If signal EDA is present, signal WDP will be generated via mixer gate M314 when the first COW signal occurs after signal EDA appears. Signal WDP is used as the WLP signal to the tape unit 30A, causing writing of the longitudinal parity character if one is required.

Another signal HOT is generated by amplifier A396 to indicate the end of recording operation. It is normally produced by gating signal WDP at mixer gate M320 with signal AEW, the "allow end of write" signal present during writing of the last item on an output operation. Signal HOT will not be generated if signal MCA has appeared (as a result of pressing the "write end of data" button) or if signal OTFA has appeared to indicate the the end of the tape is approaching. In these cases, as already noted, flip-flop F307 will be set by amplifier A395 to give signal EDA, and the signal WDP which appears after signal EDA comes on, which is to say the signal WDP corresponding to the writing of the "end of data" indicator, will be gated at mixer gate M321 to give HOT.

Tape motion is stopped by generating a pulse OFWR by amplifier A394. When HOT appears, it sets flip-flop F302. This gates signal WDR, the signal returned by tape unit 30A shortly after signal WDP, at gate G317 to give signal OFWR.

If signal EDA is present, it gates signal HOT at gate G318 to trigger delay flop DF303, which after a delay suitable for the characteristics of tape unit 30A, via amplifier A393 triggers blocking oscillator BO304 which, if signal ARW is present calling for automatic rewind, goes through gate G319 and buffer B303 to trigger delay flop DF301 and give a rewind initiating signal ORWA. The latter can also be produced manually if the "rewind" button is pressed to give signal MRW.

7.3. Timer (FIGURE 20)

The timer used with the memory unit 22 is controlled by a multivibrator GMV300 which in turn is controlled by flip-flop F306. The timer generates signals COR for reading, COS for strobing the memory, COW for writing and COWI for the write inhibit; relative timing of these signals is substantially similar to those shown in FIGURE 7.

The period of multivibrator GMV300 is chosen to give the desired recording density on the tape. The multivibrator is started by setting flip-flop F306 after a delay introduced by delay flop DF300 for the purpose of assuring the correct interrecord gap on the tape. Delay flop DF300 is triggered by the signal OCR which sets the tape motion flip-flop F305. Flip-flop F306 is reset by signal WDP at the end of the block. When recording multiple blocks on tape, flip-flop F306 is reset after each block by signal WDP and is not set again until after a delay again introduced by delay flop DF300. Thus although the tape continues moving, recording is interrupted long enough to produce an interrecord gap between blocks.

7.4. Addressing circuits (FIGURE 21)

The addressing circuits (FIGURE 21) of the output memory control and addressing unit 28 are identical to those described in connection with input memory unit 12, with a few exceptions noted below.

The output item counter consists of binary counter stages BC6501–BC6503, and differs from the input item counter in that it is not required to count in both directions. It is stepped by signal XS, the pulse which occurs after the last character of each item. The decoding and encoding of the output item counter by decoder D8U6501 and encoder ENC6501 produces signal LTI and IT1–IT10 inclusive, as in the input memory circuitry, encoder ENC6501 being identical to encoder ENC2001. Signal MSPO via amplifier A6799 is used to clear this counter at the end of an output operation.

In addition to the output item counter, there is a tape memory counter TMC6501 identical to tape memory counter TMC8001 in the input circuits. It is stepped by signal COWI and cleared by signals XS or MSPO fed to buffer B6799. Its setting is added to that of the output item counter to give the actual memory address during recording on tape, just as described in connection with the input memory unit. Its outputs are decoded by decoder DEC6501 to give the LCI signal as previously described, and to give signals MBW and −MBW, corresponding to signals MBR and −MBR, to control writing of multiple items, in the memory as separate blocks on tape or as a single block. Decoder DEC6501 is identical to decoder DEC8002 in the input memory circuits.

There is also an item counter IC6501 in the output memory unit which corresponds to item counter IC8001 in the input memory unit, and whose setting is added to that of the scan counter for addressing during internal operations, exactly as described in connection with the input memory unit 12. It is stepped by signal ITSC, the signal derived from the "item step" hub on the OC plugboard, and cleared by signal ESC at the end of a scan cycle.

Two binary adder arrays BAA6501 and BAA6502, corresponding to binary adder arrays BAA8001 and BAA8002 respectively, in the input memory unit, are used to add the respective counter outputs to obtain addressing signals as in the input memory unit 12.

With the exception of the substitution of signals ±MSO for ±MSW, the address switching circuits for output memory unit 22A are identical to those for input memory unit 12A shown in FIGURE 13 and previously described. Because of this similarity the address switching circuits for output memory 22A are not separately illustrated.

7.5. Data circuits (FIGURE 22)

The data circuits for output memory unit 22A are shown in FIGURE 22. As a comparison with FIGURE 11 will show, data circuits in input and output memory units are physically identical and differ only in the notation used for the respective signals and the inclusion in the latter circuits of a second set of flip-flops, required because read-out from both sections of the output memory may occur simultaneously. Because of the fact that the data circuits for input memory unit 12A have already been described, no further explanation of the output memory data circuits is needed beyond FIGURE 22, which shows the signal notation and wherein primed reference characters are used for similar elements.

7.6. End of data circuits (FIGURE 20)

When the end of a tape reel is reached the signal OTFA will be present from the output tape unit 30A. The presence of the signal OTFA will cause an output to occur from inverter amplifier A315 (FIGURE 20). Actually signal −OTFA is applied to gate G301 which acts as a buffer for negative signals and the resulting output of this gate is inverted by amplifier A315 and applied to mixer gate M316, which sets the flip-flop F307 at the end of the output operation to give the signal EDA or "end of data." Signal EDA goes to the output tape unit 30A where it generates the desired end of data character for recording on tape. Amplifier A315 also acts at mixer gate M311 to cause signal WDP at the end of the output operation to generate signal OCR introducing the delay for an interrecord gap and produce timer signals for recording the end of data indication. Signal −OTFA at mixer gate M320 prevents generation of the HOT signal, so the tape is not stopped.

In many cases a single character is used for end-of-data indication; thus mixer gate M314 gates the next COW pulse to give signal WDP. (Other arrangements can be made if multi-character end-of-data indications are required.) Signal WDP is gated by signal EDA at mixer gate M321 to give an HOT signal. Meanwhile signal −EDA at mixer gates M310 and M311 prevents restarting of the multivibrator. Signal HOT resets flip-flop F307 and signal −EDA at mixer gate M6574 (FIGURE 19) prevents signal HOT from activating the memory switch circuits. Instead signal EDA gates signal HOT at gate G6580 to set flip-flop F6516, thus remembering the fact that an end of data signal has occurred but holding up and switching of the memory until the operator has had time to change reels. After he has changed reels, putting a new reel of tape on the output drive in place of the one which has been filled, pressing "proceed" will give signal PCD through gate G6579, indicating to the memory switch circuits that the output is ready to receive more data.

It is also possible to write manually an end-of-data indication on all tapes. This is done by actuating a switch on the control panel which produces the signal MED or "manual end-of-data." MED sets flip-flop F6513 (FIGURE 19), which is a necessary operation because the output memory being filled from the internal circuits may not have been completely filled and therefore the memory switch may not have been released through action of gate G6582. If an output operation is in progress at the time "manual complete" is actuated it is allowed to proceed to completion without interference and in this case the end-of-data indication is recorded upon completion of the output operation in the manner previously described, just as if "manual complete" had not been present.

If, however, an output operation was not in progress on one of the outputs at the time "manual complete" was actuated, the MED signal applied to flip-flop F6513 permits the memory to switch over and start recording its output even through it has not been completely filled. If this happens with the MBW signal present, as it would be for multiblock write, it is necessary to permit the data, incomplete though it may be, to be written from the output memory before the end-of-data signal is recorded. Therefore, recording can proceed as if "manual complete" were not called for. In general, however, in such a case less than the normal number of blocks will be recorded before legitimate data come to an end. Therefore some means must be found for causing recording of the end-of-data signal immediately following the last block of legitimate data from the memory. This is accomplished by generating the AEW signal somewhat earlier than it normally would occur. The item counter IC6501 is used to indicate how far the memory has been filled before manual operation caused output to start. Item counter IC6501 feeds outputs to a series of mixer gates M300–M306 (FIGURE 20) of which three are shown. These are compared with the item counter in the output memory unit in the presence of the signal MCA and as soon as the proper number of legitimate data blocks has been recorded signal AEW is generated by amplifier A370. The resulting WDP signal at the end of the last legitimate block of data causes the end-of-data circuitry to go into action as previously described.

In the particular case where the output memory contained no legitimate data, the item counter will be in position IT1. In this case the signal MSPO which results from setting flip-flop F6513 with the MED signal will be gated by signal MCA through mixer gate M315 to set flip-flop F307 to give signal EDA without waiting for the XS signal to occur at mixer gate M316. The MSPO signal will start the tape by way of gate G310 as usual, and the end-of-data indication will be recorded.

8. OUTPUT CONTROL

The output control 32 is a group of circuits used for controlling output tapes when no output memory is used—i.e., when data are to be transferred directly from an input memory 12 to tape output units 30. The tape start controls for this unit are shown in FIGURE 23, which shows a group of controls for 3 tape output units 30C, 30D, and 30E.

8.1. Tape motor control (FIGURE 23)

Tape output units are selected by wiring a FIELD END hub on the OC plugboard to one or more of the SEL O/P TU hubs for the desired units. The same FIELD END hub should be wired to a SELECT SCAN hub, and the recording of data on the output tape or tapes will then take place during the selected scan, as follows, assuming output tape unit 30C is selected.

First, the pulse to a SEL O/P TU hub will go through buffer B6101 to give the signal SOC, and will set flip-flop F6101, remembering that tape output unit 30C was selected. Signal SOC will also go through buffer B6111 and amplifier A6111, and unless the system is in the "one scan halt" mode, through mixer gate M6111, blocking oscillator BO6111, and amplifier A6112 to set flip-flop F6112 giving the IRK signal. Signal IRK will act in the scan circuits at buffer B3003 (FIGURE 17) to give signal ILK, the scan interlock signal, thus preventing generation of any itming signals as long as flip-flop F6112 (FIGURE 23) remains set. Following the pulse from block oscillator BO6111, a pulse is generated by blocking oscillator BO6112 to set flip-flop F6113, giving the PBS3 signal. Signal PBS3 will remain on for the duration of the current scan, serving as an indication that during that scan data are being written directly on an output tape without the intervention of an output memory.

Signal PBS3 is used in the timer selection circuits TS3001 to generate the STP signal, which will select the tape timer, thus causing data to be read out at a rate appropriate for recording on tape. It should be noted that the C1-C7 and N1-N7 timer signals are generated under these conditions, permitting use of the modify circuits, if desired, during the transfer of data to tape.

The signal from block oscillator BO6112, in addition to setting flip-flop F6113, also goes through gate G6114 to set flip-flop F6114, which in effect remembers that some tape output unit 30C, etc. is to be started; as previously noted, flip-flop F6101 in one of the tape unit selectors remembers which one has been selected. Unless a signal at gate G6115 interferes, setting of flip-flop F6114 triggers block oscillator BO6114, which in turn acts through buffer B6112 to trigger block oscillator BO6115, giving the OTC signal.

Signal OTC is the pulse which actually initiates and halts tape motion. It acts in the tape unit selector TUS6101 to set any flip-flop F6121 if its companion flip-flop F6101 has been set by signal SOC, SOD, etc., to reset any flip-flop F6121 if its companion flip-flop F6101 has not been set, and to reset any flip-flop F6101 which has been selected. Thus signal OTC starts any tape or tapes selected for output, stops any tape or tapes not selected if they have previously been in motion, and, having made use of the data on tape selection provided by flip-flop F6101, resets the latter.

Signal OTC also performs another function. Because of mechanical inertia the tape cannot be accelerated instantaneously to normal recording speed, but requires a short time, say 1 to 5 milliseconds depending on the type of transport used, to reach proper speed. Signal IRK, provided by flip-flop F6112 as previously mentioned, prevents timer operation and hence transfer of data during this acceleration period. Thus signal OTC, via gate G6112, is used to trigger delay flop DF6103, which has a period equal to the required tape start time. Recovery of delay flop DF6103 at the end of this period resets flip-flop F6112, causing signal IRK to disappear so recording can start.

The only difference in generation of signal OTC on the "one scan halt" mode is that the output of amplifier A6111 is blocked at mixer gate M6111 and gated by OSH at gate G6111, so it sets flip-flop F6111, causing a delay in all operations until the "proceed" button is pressed. The latter operation gives signal PCD, which resets flip-flop F6111 and is also gated at mixer gate M6112, from which it goes on to generate signal OTC.

The end of a block being recorded is indicated by occurrence of the ESN signal (end of scan). This is gated by flip-flop F6113 at gate G6113 to trigger delay flop DF6101. The latter provides an "overrun" period by delaying stopping of the tape for a short time, say 3 milliseconds, beyond the end of the block. This is desirable in order to provide adequate separation between the last legitimate character and any "hash" which might be written on the tape accidentally while it is at rest between blocks; it is also important to provide acceleration space if there is a possibility of the tape being started up in the reverse direction in order to read a block just written, or to rewrite the block in case an error occurs on writing in a system having a "read after write" feature. When delay flop DF6101 recovers, it triggers via amplifier A6114 blocking oscillator BO6113 to give signal OTC, which as already seen terminates tape motion by resetting any flip-flops F6121 which has been previously set.

It may happen that, immediately upon completion of recording on an output tape or tapes, another block of data is to be recorded on the same tape. In such a case it is preferable not to stop the tape but simply to let it continue running; this saves both time and wear and tear on the tape and tape transport. This is the reason for gate G6141 in tape unit selector TUS6101; it prevents signal OTC from attempting to reset flip-flop F6121 if the same tape has again been selected during the 3 millisecond overrun period (introduced by delay flop DF6101), as indicated by flip-flop F6101 being set when signal OTC occurs at the end of the block.

Finally, it is undesirable to restart a tape too soon after it has been stopped, as this may result in an inadequate interrecord gap. Thus if the same tape is not selected early enough to let it continue running without being stopped, an additional delay is introduced in the OTC signal. Stopping of any tape is indicated by appearance of signal −OFWC, −OFWD, etc., depending on which tape was stopped. Thus these signals are used to trigger blocking oscillators BO6121, BO6122, etc., whose outputs are buffed together at buffer B6113 to trigger delay flop DF6102. The latter's output, inverted by amplifier A6115, blocks gate G6115, preventing the setting of flip-flop F6114 from triggering blocking oscillator BO6114 to generate signal OTC. If flip-flop F6114 has been set, however, during the 8 millisecond period when delay flop DF6102 is on, the latter's recovery will itself trigger blocking oscillator BO6114 to give signal OTC. Thus once an output tape is stopped, it will not be restarted until at least 8 milliseconds later.

8.2. End of data and rewind controls (FIGURE 24)

If the signal OTF is obtained from an output tape unit, it is necessary to prevent further recording on that tape after completion of the current block, with the exception of an "end of data" character on block following the block just recorded. Thus the OTF signals OTFC, OTFD, etc. from the various tape units are combined at buffer, fed via amplifier A6151, B6151 (FIGURE 24) and used to gate signal ESN, which marks the end of the block, at gate G6151 to give the EDS pulse and set flip-flop F6151. The latter gives the EDC (end of data) signal which has been previously encountered in some of the scan control circuits. Signal EDS also sets flip-flop F6152 to give the OIK interlock signal, preventing normal scan operation via buffer B3003 (FIGURE 17) until the "proceed" switch is pressed. Signal EDS also is gated in the tape unit selector TUS6101 (FIGURE 23) at mixer gate M6101 by the OTF signal, causing the tape unit from which OTF came to continue running so that the "end of data" indication can be recorded by action of signal EDC, within output tape unit 30.

It is often necessary to provide for manual recording of an "end of data" indication on all the output tapes upon completion of a processing run, even though signal OTF has not appeared. In this case pressing a button on the control panel causes generation of signal MED, as described under "Output Memory Unit." Signal MED, via buffer B6101 (FIG. 23), selects all tapes via tape selection unit TUS6101, and also, via buffer B6152, gives signal EDS from amplifier A6152 (FIG. 24) which sets flip-flop F6151 generating the EDC signal. As already noted, signal EDS will cause recording of the end of data indication in each output tape unit 30.

Normally an output tape should be rewound before being demounted from an output tape unit 30. This is often accomplished by means of a switch included in output tape unit 30, but can be made automatic by means of circuits shown in FIGURE 24. An "automatic rewind" signal ARW is used; it is usually permanently wired to −6 v. in a system when the feature is desired. Now when the next ESN signal occurs after the EDC signal has appeared, it is gated at gate G6161 to give signal AOR from amplifier A6161, which in turn is gated by the OTF signal (from the particular output tape unit 30 whose reel has been filled) to trigger via one of the buffers B6162-B6164 one of the delay flops DF6162, etc., giving a signal ORWC, etc. This initiates the rewind operation, in the appropriate output tape unit.

Rewind of all tapes following a "manual end of data" operation can be accomplished by pressing a "rewind" button on the control panel. This produces the signal MRW, which acts at buffers B6162, B6163, and B6164 to initiate rewinds on all tape units.

9. OPERATION CONTROL PLUGBOARD (FIGURES 25A AND 25B)

References have already been made to certain features of the OC plugboard. It is illustrated in FIGURES 25A and 25B.

Wiring of the OC plugboard programs the action to be taken on data processed in the system. This is done by co-ordinating the function of a series of logical, arithmetic and data flow units. Each of the units, or functions, can work independently or in combination with each other. By synchronizing their operation to function in the proper sequence, a program is created which effects the processing of data.

The purpose and function of the units controlled by the OC plugboard are described below. The method of co-ordinating their functions will be described later, using examples of typical data processing operations.

9.1. Scan field exit hubs (E–Z, 29–34 Section A)

These hubs are directly related to the FIELD hubs on the Field Definition and Scan (FDSC) plugboard. All fields wired to the FIELD hubs will emit an impulse from the corresponding FIELD EXIT hub on the OC plugboard for the duration of the field defined. A wire from a FIELD EXIT hub is normally required to co-ordinate the time at which action will take place in other functional modules.

9.2. Scan field end hubs (E–Z, 27–28 Section A)

FIELD END hubs emit an impulse after the last character in a definite field and before the next character or field is encountered in memory. There are two FIELD END hubs associated with each series of six FIELD EXIT hubs. The FIELD ENDS correspond to the fields emitting impulses from the A and B hubs of a FIELD EXIT hub series. As in the case of FIELD EXIT hubs, FIELD END hubs co-ordinate timing of action in the system. A FIELD EXIT or END impulse is directly, or indirectly, involved in the wiring of all functional modules programmed on the OC plugboard.

9.3. Memory data out (S, 20–22 Section B)

A hub is associated with the serial data output of each input memory, and that of one or more output memories. These continually emit the data encountered during a scan. The data are directed to other functional modules for the purpose of analysis, arithmetic computation or record modification. (See FIGURE 49.)

9.4. Comparators (U–Z, 3–11 Section A)

The COMPARATORS allow a comparison between two fields of data which are equal in length. The data are introduced to a COMPARATOR at the A and B input hubs (U–Z, 3–6 Section A). The data can come from either input memory, an output memory, Auxiliary Storage or Fixed Character Out hubs.

The comparator is allowed to function by wiring a FIELD EXIT hub to the appropriate CONTROL hub (U–Z, 6–7 Section A) for the field being compared. Results are available after a comparison from the A equals B, A Greater than B, and A Less than B hubs (U–Z, 9–11 Section A). All results are in relation to the data wired to the A input hub. While 6 comparators are shown on the OC plugboard, more can be added. All comparators can function simultaneously, if the nature of the data processing requires such action. Any of the comparators can make repeated comparisons if all aspects of data input and control are properly synchronized.

In addition to the Equal To, Greater Than, Less Than comparators, "Equal Only" comparators are also available (N–T, 3–9 Section A). The manner in which data is presented, and a comparator is controlled, is identical to the comparator module explained above. The only difference is that only "equal" conditions are available as output.

9.5. The digit analyzer (W–Z, 12–26 Section B)

The DIGIT ANALYZER performs the function of determining which specific number, alphabetic or special character is located in a one digit field in a memory or Auxiliary Storage.

The DIGIT ANALYZER functions by wiring the proper data source to the DATA IN hub and wiring a FIELD EXIT hub to the control hub for the one digit field being analyzed. The result of the digit analysis is available from 55 output hubs, and can be directed to other functional modules to effect an action immediately, or at a later time in the data processing cycle.

9.6. AND circuits (A–Z, 3–11 Section B)

AND CIRCUITS are logical devices which can co-ordinate multiple independent decisions into one overall decision. Two to four impulses can be wired to an AND circuit. When all impulses wired to an AND circuit are present, an impulse will be available from the corresponding AND CIRCUIT OUTPUT hub.

9.7. OR circuits (A–R, 18–29 Section B)

OR CIRCUITS are similar to ANDS in that they are a means of co-ordinating multiple independent decisions into one overall decision. Two to four impulses can be wired to an OR circuit. When any of the impulses wired to an OR circuit is present, an impulse will be available from the corresponding OR OUTPUT hub.

9.8. Switches (A–H, 12–17 Section A)

A SWITCH is a remembering device. At the outset of a program, a SWITCH is normally set to the OFF position, which indicates that a certain condition arising from data processing is not present. An impulse is continually available from the OFF hub to indicate this status.

If in the course of precessing a record, it is desired to "remember" a certain decision, an impulse to the SET ON hub of a SWITCH will set the device to the ON position. An impulse is continually available from the ON hub to indicate that the condition is present.

Once a SWITCH is ON it will remain ON until the RESET hub is energized, at which time it will return to the OFF position.

9.9. Group switch resets (A–D, 1–2 Section B)

GROUP SWITCH RESETS are provided as a convenient means of resetting SWITCHES at the end of a processing cycle. There are eight SWITCHES to a group (except the last, which has four), and a GROUP SWITCH RESET for each group of SWITCHES. An impulse to one of the GROUP SWITCH RESET hubs will reset all SWITCHES corresponding to that group. This precludes the need for wiring individual reset impulses to each SWITCH in a group. The hub marked 1 resets switches 1–8; 9 resets 9–16; 17 resets 17–24, and 25 resets 25–28.

9.10. Select memory (H–K, 27–28 Section B)

An impulse to a SELECT MEMORY hub will transfer, or move, that memory to output on the next Scan encountered in the program. If the output memory is selected for "transfer to output," the data in the output memory will be recirculated; however, the data in the output memory can be modified or analyzed when this action takes place.

9.11. Selected data (S, 19 Section B)

The data which has been selected for transfer to output memory is available from the SELECTED DATA hub during the actual transfer of data. This source of data is normally used when there is a possibility that any of several memories will be transferred to output on a particular Scan. By using the SELECTED DATA hub for a source of data in such cases, processing can be effected on the record being transferred without regard to the particular memory from which it emanated.

9.12. Item step (A–D, 27–28 Section B)

An ITEM STEP hub is associated with each memory included in the system. These hubs serve the function of controlling tape unit reads and writes.

When processing unit records in a memory, each impulse to the ITEM STEP hub associated with that memory will cause the tape unit to read or write a record.

When processing grouped, or block records, in a memory, each impulse to the ITEM STEP hub associated with that memory will cause the following action:

(1) If an Input Memory is Stepped, it will make the next record in the group available for processing.

(a) If the last record in a group was just processed and the ITEM STEP is energized, it will automatically cause the input tape unit 10 to read in another group, or block, of data.

(2) If an Output memory is Stepped, it will accept in output the last record transferred to that memory.

(a) If the most recent ITEM STEP indicates that all records of a group are present in output memory, it will automatically cause the output tape unit 30 to write a record

9.13. Select output tape unit (E–G, 27–28 Section B)

An impulse to a SELECT OUTPUT TAPE UNIT hub will allow the writing of data on magnetic tape directly from an input memory. This technique is referred to as Output Control.

The data written on tape is determined by the memory SELECTED for transfer on the scan immediately preceding the scan on which it is desired to use the Output Control technique.

9.14. Auxiliary storage

There are four series of hubs associated with the Auxiliary Storage module.

(1) Store in Control (A–V, 31–32 Section B): These hubs control the time at which data are allowed into an Auxiliary Storage field as defined on the Field Definition and Scan Control Board. There is one STORE IN hub for each of the 20 definable fields in a Storage unit.

(2) Store Data In (S, 25–26 Section B): Data to be stored is wired to the STORE DATA IN hub. Data can come from any Input memory, Output memory, or the FIXED CHARACTER OUT hubs.

(3) Store Out Control (A–V, 33–34 Section B): These hubs control the time at which data is allowed out of an Auxiliary Storage field. There is one STORE OUT hub for each of the 20 definable fields in a Storage unit.

(4) Store Data Out (S, 24 Section B): The data allowed out of a Storage field is available from this hub. The data can be directed to other data receiving hubs on the OC plugboard.

9.15. Modify circuits (U–Z, 27–28 Section B)

Data being transferred from input to output or output to output can be modified by the contents of an alternate data source. The data source for modification can emanate from an alternate Input record or Auxiliary Storage or FIXED CHARACTER OUT hub. The MODIFY CIRCUIT is controlled by energizing the ALLOW hub from a FIELD EXIT hub for the field which requires modification. The data wired to the DATA hub will replace the data being transferred for that field time.

9.16. Fixed character outs (L–R, 27–28 Section B)

The characters set up on the FIXED CHARACTER IN hubs on the FDSC Board are available from the FIXED CHARACTER OUT hubs. The characters are emitted during each digit cycle of all scans. The impulses can be directed to any data receiving hub on the OC plugboard.

9.17. Select scan (B–D, 27–34 Section A)

An impulse to a SELECT SCAN hub will cause the following action:

(1) Select a new scan.

(2) Start interrogation of data at digit position one (1).

(3) Allow processing of fields emitting impulses from FIELD EXIT and END hubs associated with the scan selected.

A new scan can be selected at any point in a scan which precedes the scan selected. The selection of a new scan causes the preceding to end at that time. Normally, the only scans which traverse the entire record will be instances where a record is being transferred from an input memory to an output memory.

9.18. Addition

There are three types of hubs associated with addition.

(1) Add in Control (W–Z, 30–33 Section B): An impulse to an ADD IN CONTROL hub will allow the 16 positions of adder storage to accept data.

(2) Adder Data In (S, 27–28 Section B): A data source (1 to 16 positions) is wired to this hub and will be allowed into adder storage during the time ADD IN CONTROL is energized.

(3) Start Add (A–V, 29–30 Section B): After the data to be added have been positioned in adder storage, an impulse to a START ADD hub will initiate addition. The impulse to the START ADD hub must correspond to the storage field set up to receive the result of the addition.

The hubs described above apply to accumulation of numeric values in a storage field. If it is desired to effect the addition of two factors, it is necessary to position the one factor in adder storage and the other in the storage field which is to receive the result of addition. The proper START ADD hub in this case is energized after both factors have been positioned.

9.19. Subtraction

The function of subtraction is performed in the same manner as addition with one exception. The START ADD impulse is carried on from the common hub of the START ADD hub to SUBTRACT hub (W–X 34 Section B).

9.20. Inverters (J–Z, 12–14 Section A)

An INVERTER is a device which creates an impulse if one is not present, and prohibits an impulse if an impulse is present. To insure proper results through the use of INVERTERS, the following rules must be observed:

(1) Only continuous impulses should be used as input to an INVERTER.

(2) Always send the output of an INVERTER to an AND circuit with a FIELD EXIT or END impulse.

9.21. Amplifiers (J–Z, 15–17 Section A)

Data and impulse emitting hubs can be wires to more than one functional module of the OC plugboard, through the common side of the impulse receiving hubs. AMPLIFIERS are employed to insure that the data or impulse has the proper electronic characteristics when they are directed to multiple impulse receiving hubs. Whether amplifiers are needed in any situation will be determined by a set of operating rules set up for a particular system.

9.22. Halt (B, 29–30 Section A)

When a condition arises which is unacceptable from a data processing standpoint, an impulse to the HALT hub will immediately stop the operation of the system.

9.23. Miscellaneous hubs

There are several hubs on the OC plugboard which are present to aid the programmer in controlling the system.

(1) Illuminators 1 and 2 (V–W, 26 Section B): These hubs are employed to identify the reason for programmed halts. An impulse to one ILLUMINATOR simultaneous with an impulse to HALT will light up the appropriate ILLUMINATOR on the Console to indicate the reason for the Halt. The output of a SWITCH is normally used to impulse an ILLUMINATOR.

(2) Neons (T–U, 18–25 Section B): Neons perform the same function as ILLUMINATORS and are wired in the same manner.

(3) PB 1 and 2 (V, 23–24 Section B): PB 1 and 2 (push buttons) emit a continuous impulse from their respective hubs if either or both of the PB's are depressed at the Console. This provides a convenient means of wiring more than one program on the Operation Control Board. For example, if PB 1 is not depressed, the Operation Control Board is programmed to function on program 1 of a 2 program board. If PB 1 is depressed, the system can be programmed to function on the alternate program.

(4) Adder Overflow (T, 28 Section B): An impulse will be emitted from the Adder O.F. hub when the sum of an addition exceeds the number of characters designated to receive the sum in Auxiliary Storage.

The reader who is familiar with the circuit symbols and corresponding circuitry used in the drawing figures so far described, may skip the next following Sections 10 to 10.14 and proceed directly to Section 11.

10. DESCRIPTION OF SYMBOLS

The schematic equivalents of the symbols which are hereinafter employed to simplify the detailed description of the units of the system which have been illustrated in block form are shown in FIGURES 26 to 38. For convenient reference, all positive and negative supply buses will generally be identified with a number corresponding with their voltage. The circuitry terminals corresponding to the same symbol terminals are identified by the same character reference numbers.

10.1. Gate (FIGURE 26)

The gates ("and" gates) used in the disclosed system are of the "coincidence" type, each comprising a crystal diode network which functions to receive input signals via a plurality of input terminals and to pass the most positive signal.

The symbol for a representative gate 1001, having by way of example, three input terminals 1002, 1003, and 1004 is shown in FIGURE 26A. Since the signal potential levels in the system are minus six volts and zero volts, the potentials of the signals which may exist at the input terminals 1002, 1003, 1004 are thereby limited.

If a potential of zero volts is present at one or more of the input terminals 1002, 1003, 1004, a potential of zero volts will exist at the output terminal 1005. Therefore, if one of the input signals to the input terminals 1002, 1003, 1004 is "negative" (minus six volts) and one or more of the other signals are "positive" (zero volts), the positive signals are passed and the negative signal is "blocked."

When there is a coincidence of negative signals at all three input terminals 1002, 1003 and 1004, a negative signal is transmitted from the output terminal 1005. In such case, it may be stated that a negative signal is "gated" or "passed" by the gate 1001. When all of the input signals to a gate except one are made negative, in preparation for passing a negative signal when the remaining input signal is made negative, the gate may be described as being "primed."

The schematic details of the gate 1001 are shown in FIGURE 26B. Gate 1001 includes the crystal diodes 1012, 1013 and 1014. The input terminals 1002, 1003, 1004 are respectively coupled to the crystal diodes 1012, 1013, 1014. The latter diodes comprise respectively in order: anode 1012A and cathode 1012C, anode 1013A and cathode 1013C, and anode 1014A and cathode 1014C. More particularly, the input terminals 1002, 1003, 1004 are respectively coupled to the anodes 1012A, 1013A, 1014A of respective crystal diodes 1012, 1013, 1014. The cathodes 1012C, 1013C, 1014C are interconnected at the junction 1015, which in turn is connected to the negative voltage bus −26 via a resistor 1016.

The negative supply bus −26 tends to make the cathodes 1012C, 1013C, 1014C more negative than the anodes 1012A, 1013A, 1014A, respectively, causing all three crystal diodes 1012, 1013, 1014 to conduct.

When negative six volt signals are simultaneously present at all three input terminals 1002, 1003, 1004, the crystal diodes 1012, 1013, 1014 are conductive, and the potential of the cathodes 1012C, 1013C, 1014C approaches the potential of the anodes.

If the potential at one of the input terminals 1002, 1003, 1004 increases to zero volts, the potential at the junction 1015 approaches zero volts level, as this voltage is passed through the conducting diode 1012, 1013 or 1014 to which the zero volt potential is applied. The other two diodes stop conducting, since their anodes become more negative than the junction 1015. As a result, a "positive" potential of zero volts appears at the output terminal 1005.

If zero volt potentials are simultaneously fed to two or all three of the input terminals 1002, 1003, 1004, a zero volt potential will appear at the output terminal 1005, since respectively two or all three diodes 1012, 1013, 1014 will remain conducting. Thus the gate 1001 functions to pass the most positive signal received via the input terminals 1002, 1003, 1004.

In the above described manner, the gate 1001 is frequently used as a switch to govern the passage of one signal by the presence of one or more signals which control the operation of the gate 1001.

It should be understood that the potentials of zero volts and minus six volts used for purpose of illustration are approximate, and the exact potentials will be affected in two ways. First, they will be affected by the value of the resistance 1016 and its relation to the impedances of the input circuits connected to the input terminals 1002, 1003, 1004. Second, they will be affected by the fact that a crystal diode has some resistance (i.e., is not a perfect conductor) when its anode is more positive than its cathode. Nevertheless, the assumption that signal potentials are either zero or minus six volts is sufficiently accurate to serve as a basis for the description of the operation taking place in the disclosed system. Although the gate 1001 is shown as having three input terminals 1002, 1003, 1004 connected through diodes 1012, 1013, 1014 respectively to junction 1015, it will be understood that any reasonable number of terminals may be similarly connected through diodes to junction 1015 and that the junction will remain at the voltage of the most positive source connected to any of the input terminals. Many of the gates in the following description are shown as having two or more than three input terminals and such gates are to be taken as having a similar number of diodes connected to an output terminal as 1015.

It should be noted that the disclosed system employs "negative" logic. Therefore, the "and" gate described in this section is deemed "open" when all its input signals are negative, whence its output signal will also be negative. The "and" gate is "closed," when at least one input signal is positive, whence the output signal is also positive. The "and" gate thus corresponds to an "or" gate (buffer) or "positive" logic systems. Conversely, the buffer of the disclosed negative logic system corresponds to the "and" gate of positive logic systems. The buffer utilized in the disclosed system is described in the next section.

10.2 Buffer (FIGURE 27)

The buffers utilized are also known as "or" gates. Each buffer comprises a crystal diode network which functions to receive input signals via a plurality of input terminals and to pass the most negative signal.

The symbol for a representative buffer 1021, having by way of example three input terminals 1022, 1023, 1024, and output terminal 1025, is shown in FIGURE 27A. Since the signal potential levels of the system are minus six volts and zero volts, either one of these potentials may exist at the input terminals 1022, 1023, 1024.

If a potential of minus six volts is present at one or more of the input terminals 1022, 1023, 1024, a potential of minus six volts exists at the output terminal 1025. Therefore, if one or more of the input signals to input terminals 1022, 1023, 1024 is negative, the negative signal is passed to the output terminal 1025, and the "or" gate is said to be open, notwithstanding the fact that the input signals to the remaining input terminals are "positive" (zero volt potential).

When there is coincidence of "positive" (zero volt) signals at all three input terminals 1022, 1023, 1024, a "positive" signal is transmitted from the output terminal 1025, and the "or" gate is said to be closed.

The schematic details of the buffer 1021 are shown in FIGURE 27B. Buffer 1021 includes the crystal diodes 1032, 1033, 1034. The input terminals 1022, 1023, 1024 are respectively coupled to the crystal diodes 1032, 1033, 1034. The latter diodes comprise respectively in order: cathode 1032C and anode 1032A, cathode 1033C and anode 1033A, and cathode 1034C and anode 1034A. More particularly, the input terminals 1022, 1023, 1024 are respectively coupled to the cathodes 1032C, 1033C, 1034C of respective diodes 1032, 1033, 1034. The anodes 1032A, 1033A, 1034A of respective diodes 1032, 1033, 1034 are interconnected at the junction 1035 which is coupled to output terminal 1025, and which connects to the positive supply bus +20 via a resistor 1036.

If negative potentials are simultaneously present at all three input terminals 1022, 1023, 1024, all three diodes 1032, 1033, 1034 will conduct, since the positive supply bus +20 tends to make the anodes 1032A, 1033A, 1034A more positive. The voltage at the junction 1035 will then be minus six volts since, while conducting, the anodes 1032A, 1033A, 1034A of the crystal diodes 1032, 1033, 1034 assume the potentials of the associated cathodes 1032C, 1033C, 1034C.

When a positive signal is fed to one or two, but not all three of the input terminals 1022, 1023, 1024, the respective one or two of cathodes 1032C, 1033C, 1034C are raised to potential of zero volts and therefore more positive than their respective anodes. However, the cathode of the remaining one or two crystal diodes remains at the negative potential of minus six volts, and therefore the potential of the junction 1035 also remains at minus six volts.

When the signals present at all three input terminals 1022, 1023, 1024 are positive, the anodes 1032A, 1033A, 1034A are raised to approximately the same potentials of zero volts as their respective cathodes 1032C, 1033C, 1034C, and the potential at the junction 1035 rises to zero volts.

The potential which exists at the junction 1035 is transmitted from the buffer 1021 via the connected output terminal 1025.

The showing herein of a buffer with two or more than three input leads is to be understood to mean that there are as many diodes having their anodes connected to an output terminal as there are input leads.

10.3. Mixer gate (FIGURE 28)

The symbol for a representative mixer gate 1040, having by way of example three input terminals 1041, 1042, 1043, and output terminal 1044, is shown in FIGURE 28A. The schematic details are shown in FIGURE 28B, wherein a regular gate 1045 is illustrated in the symbolic form previously employed. The practice of representing the circuit details of a unit shown in symbolic form, by symbols representing previously described units, will be followed hereinafter.

As may be seen from FIGURE 28B, the input terminals 1041, 1042, 1043 serve as input terminals for gate 1045, and the output of gate 1045 is coupled to the cathode of a diode 1046, whose anode is in turn coupled to the output terminal 1044. The mixer gate is generally utilized in conjunction with one or more further mixer gates each having two or more input terminals. The output terminals of the several mixer gates are coupled together. Hence the individual gates (corresponding to gate 1045) of the several mixer gates function in the usual "and" circuit fashion. The several diodes corresponding to diode 1046 constitute a buffer common to the individual gates.

10.4. Amplifier (FIGURE 29)

The symbol for a representative amplifier 1050 having input terminal 1051A, "negative" output terminal 1052A, and "positive" output terminal 1052B, is shown in FIGURE 29A. Output terminal 1052A is negative in the sense that it delivers an output signal that is reversed in polarity with respect to an input signal applied to input terminal 1051A. By the same token, the output signal at positive output terminal 1052B will be in phase with an input signal applied to terminal 1015A.

The circuitry of amplifier 1050 is shown in FIGURE 29B. Amplifier 1050 is essentially a two-stage transistor amplifier. It comprises pnp transistors 1060A and 1060B, each connected as a grounded emitter stage. Consistent with the usual convention, pnp junction transistors, such as transistors 1060A and 1060B are illustrated with an arrow at the emitter electrode pointing toward the base electrode. On the other hand, npn junction transistors encountered hereinafter are shown with the arrow at the emitter electrode pointing away from the base electrode. The type of transistor, that is pnp or npn may be recognized from the illustration and will not be explicitly stated except where warranted.

The two stages of amplifier 1050 are structurally similar. The members of the first stage are identified by reference numerals followed by the letter A, and the corresponding parts of the second stage are represented by like reference numerals followed by the letter B. Only the first stage will be described explicitly; the description of the second stage is by way of implicit substitution of the letter B for the letter A. It should be observed that the output terminal 1052A of the first stage constitutes the input terminal 1051B of the second stage.

The input signal that is to be amplified is applied from a source external of amplifier 1050, to input terminal 1051A, from which it is transmitted to the base of transistor 1060A via series connected resistors 1053A and 1055A. These signals utilized in the disclosed system are generally of the pulse type, and as such have steep leading and trailing edges. To maintain the sharp pulse shape, there is provided a speed-up capacitor 1057A which shunts the series combination of resistors 1053A and 1055A. Quiescent base current is established by means of a resistor 1059A, which intercouples the base of transistor 1060A and the +20 volt bus.

The emitter of transistor 1060A is grounded, whereas its collector connects through load resistor 1061A to the —26 volt bus. To limit the negative voltage swing of the collector to —6 volts, the collector of transistor 1060A is coupled to the cathode of a clamping diode 1063A, whose anode connects to the —6 volt bus. Positive voltage swing of the collector is reduced by means of a diode 1064A whose anode is coupled to the collector of transistor 1060A and whose cathode is coupled to the junction of resistors 1063A and 1055A. Diode 1064A thus provides unidirectional and therefore nonlinear degenerative feedback for positive output signals at the output terminal 1052A which is tied to the collector of transistor 1060A.

10.5. Counter reset (FIGURE 30)

The "counter reset" is a special purpose amplifier which is utilized in the disclosed system as a source of clearing signals for flip-flops and counters described in the following sections, and occasionally for other purposes. It is a non-inverting amplifier in the sense that the output signal is in phase with the input signal. The symbol for a representative counter reset 1070, having a single input terminal 1071 and a single output terminal 1072, is shown in FIGURE 30A.

The circuitry of counter reset 1070 is shown in FIGURE 30B. The counter reset is also a two-stage direct coupled common emitter amplifier; however, the two stages are somewhat dissimilar; in particular, the first stage includes pnp transistor 1076, whereas the second stage includes npn transistor 1080. Therefore both stages will be explicitly described.

Input signal applied to input terminal 1071 is transmitted to the base of transistor 1076 via the shunt combination of resistor 1073 and speed-up capacitor 1074. Quiescent base current is established by means of a resistor 1075 which intercouples the base of transistor 1076 and the +20 volt bus. The collector load impedance is formed of a voltage divider that includes resistors 1077 and 1078, which are connected serially from the —26 volt bus to ground and whose junction is tied to the collector of transistor 1076. The emitter of transistor 1076 is grounded.

The amplified output voltage appearing at the collector of transistor 1076 is inverted with respect to the input signal at terminal 1071, and is reinverted by means of the second stage of the counter reset 1070. The collector output signal of transistor 1076 is coupled to the base of transistor 1080 via resistor 1079. The emitter of transistor 1080 is returned to the —6 volt bus. The collector load impedance for transistor 1080 consists of a voltage divider which is comprised of serially connected resistors 1081 and 1082 which span the +20 volt and —6 volt buses. The collector of transistor 1080 is coupled to the junction of resistors 1081 and 1082, and also to the output terminal 1072.

10.6. Counter (FIGURE 31)

The symbol for a representative counter 1090 is shown in FIGURE 31A. Counter 1090 is provided with a set (S) input terminal 1091A, a reset (R) input terminal 1091B, an allow set (AS) input terminal 1092, a "1" or set output terminal 1093A, a "0" or reset output terminal 1093B, and a clear (CL) input terminal 1094. It is a bistable device; that is, it admits of two stable states of operation, the set state and the reset state. When the counter 1090 is in the reset state, the output signal at the "0" terminal 1093B will be "negative" (at a potential of —6 volts) and the output signal at the "1" terminal 1093A will be "positive" (at a potential of 0 volts). The counter output signals are also specified as complementary pairs upon occasion, as for example by Z for the set terminal output signal 1093A and by —Z at the reset output terminal 1093B in FIGURE 31A. In the reset condition of the counter 1090 the —Z signal is deemed to be present or "on." The Z signal is deemed to be absent or "off," although then "positive." In the set state, the —Z signal will be "positive" (at a potential of 0 volts) and deemed absent or "off"; the Z signal will be deemed present or "on," even though then "negative."

The "normal" potential prevailing at the set input terminal 1091A, the reset input terminal 1091B, and the allow set input terminal 1092, is 0 volts. Under these conditions the set and reset signals are deemed to be absent, and the allow set signal to be present. The clear input signal is "normally" absent and at a potential level of 0 volts. When present, the clear signal terminal 1094 assumes a negative potential value of —6 volts, or even below —6 volts.

While in the reset state, changes in the conditions of the reset or allow set input signal levels will not alter the reset state of couner 1090. Assuming that the allow set signal has been present for at least four microseconds, application of a (negative) set pulse at input terminal 1091A of at least four microseconds duration will transfer the counter 1090 to the set state at the termination of such set pulse, that is at its positive-going trailing edge. The Z signal will be "on" and the —Z signal will be "off."

Once in the set state, changes in the conditions of the set and allow set input signals will not alter the set state of counter 1090. However, application of a (negative) reset input signal to terminal 1091B of at least four microseconds duration will transfer flip-flop 1090 to the reset state at the termination of such reset pulse, that is at its positive-going trailing edge. The Z signal will be "off" and the —Z signal will be "on." Application of the (negative) clear signal will place flip-flop 1090 in the reset state.

The schematic details of counter 1090 are shown in FIGURE 31B. The circuit is a transistor type Eccles-Jordan circuit which includes grounded emitter connected transistors 1111A and 1111B. Regenerative cross-coupling is provided between the collector of each transistor and the base of the other transistor. The counter circuit is composed of two half-circuits, one associated with transistor 1111A and the other with transistor 1111B. The half circuits are to greater extent symmetrical; the symmetrical components of the two half-circuits may be recognized by inspection in that a component of the left half-circuit is identified by a given reference numeral followed by the letter A and its symmetrical component in the right half-circuit is identified by the same reference numeral followed by the letter B. Therefore the following explicit description of the half-circuits is basically given for only one half-circuit, and the description of the other is given implicitly by substitution of "A" for "B," and "B" for "A." Unsymmetrical parts are labeled by reference numeral without suffix letter, and are explicitly described for both half-circuits.

In the reset state transistor 1111A conducts at collector current saturation, and its collector electrode which constitutes the "1" terminal is at 0 volt potential. Such collector potential is transmitted via series resistors 1115A and 1117A to the base of transistor 1111B, thereby placing transistor 1111B in a non-conducting state (collector current cut-off). The collectors are coupled to the −26 volt bus through respective resistors 1121A and 1121B. To limit the potential of the collector of transistor 1111B to −6 volts, such collector connects to the −6 volt bus through the cathode and then the anode of a clamping diode 1113B. The collector of transistor 1111B constitutes the "0" output terminal 1093B. The series combination of resistors 1115A and 1117A is shunted by a speed-up capacitor 1118A to accelerate switching from one counter state to the other. To prevent deep saturation of the conducting transistor, the collector of transistor 1111A connects through the anode and then the cathode of a diode 1119A to the junction of resistors 1115B and 1117B, so as to provide nonlinear degenerative feedback for positive-going collector potential from collector to base of transistor 1111A via diode 1119A and resistor 1117B.

The set signal is applied at set input terminal 1091A via differentiating capacitor 1095A and the anode and then the cathode of diode 1101A to the base of transistor 1111A. A differentiating resistor 1099A connects from from the anode of diode 1101A to the −26 volt bus. Diode 1101A blocks the differentiated negative-going leading edge of the incoming set signal, and transmits the positive-going leading edge to initiate the flipping action, assuming that the counter is then reset. The rise in base potential decreases the collector current of transistor 1111A, so that its collector potential decreases. Such decrease in collector potential is coupled via resistors 1115A and 1117A to the base of transistor 1111B to initiate its collector current flow and rise in collector potential. Such latter rise in collector potential is coupled via resistors 1115B and 1117B to the base of transistor 1111A to reenforce the initial action of the set pulse. The effect is cumulative and ultimately transistor 1111A is cut off and transistor 1111B is saturated. The counter 1090 is now in the set state. It may be reset by application of a reset pulse to the reset input terminal 1091B through an analogous chain of events, noting the symmetrical components 1095B, 1099B, 1101B. When a set and a reset pulse are applied concurrently, the counter 1090 will change its state. This is because the set pulse will not affect a previously set counter, but the reset pulse will. Similarly the reset pulse will not affect a previously reset pulse, but the set pulse will. This phenomenon forms the basis of the operation of a binary counter, described in the next section.

The allow set terminal 1092 is coupled to the anode of diode 1011A through a resistor 1092. Application of a −6 volt potential to the allow set terminal 1092 will place the anode of diode 1101A at a potential below that of its cathode and thereby preclude the set pulse from reaching the base of transistor 1111A, and consequently setting of the counter 1090. The allow set signal thus may be used to gate the set signal.

The clear terminal 1094 is coupled to the base of transistor 1111A via resistor 1105 and the anode and then the cathode of diode 1103. Application of the (negative) clear signal will initiate conduction of a previously cut-off transistor 1111A. This will be followed by the usual regenerative flipping action previously described to reset counter 1090. The clear signal will override a concurrent setting signal, noting that the clear signal is applied without differentiation.

The base of transistor 1111A is additionally coupled through a resistor 1109 to a potential source +20S, which is normally maintained at a potential of +20 volts. However, when power is first turned on to the system, or at any other time when it is desired to clear the flip-flop, the potential of source +20S is momentarily changed to −26 volts through a suitable switch (not shown) to clear initially the counter 1090 to the reset state.

The collector of transistor 1111B is coupled to the anode of diode 1101B through a resistor 1107 to off-set the unbalance of the two half-circuits due unsymmetrical components 1097, 1105, 1109 in the left half-circuit.

The system also includes units called flip-flops such as flip-flop F117. The flip-flops are identical to the described counter C1090 except that the CL terminal is deleted along with its associated idode 103 and resistor 1105.

10.7. Binary counter (FIGURE 32)

The exemplary binary counter 1130, sometimes referred to simply as counter, is shown symbolically in FIGURE 32A and in block form in FIGURE 32B as composed of two stages 1131 and 1132. It has a counting capacity of four numbers (zero to three). A counter may be composed of a single stage with a counting capacity of two numbers (zero to one). Each additional stage doubles the capacity of the counter; thus a three-stage counter will have a capacity of eight number (zero to seven).

As may be seen from FIGURE 32B, each counter stage includes a flip-flop whose set input and reset input terminals are tied together, and whose set output ("1") terminal and allow set terminal are tied together. The "1" output of a given stage is tied to the set input terminal of the next higher stage in the counting chain. The input terminal 1133 of counter 1130 is also identified as input signal; it is connected to the set and reset input terminals of the initial stage 1131. The "1" and "0" terminals of stage 1131 are deemed to be the sources of signals A and −A respectively; those of stage 1132 the source of signals B and −B respectively, and so forth for any added stages. The alphabetically ordered signals are a concept that is useful in the description of counter 1130 and of the decoder and parity checker units given in subsequent sections.

The several counter stages are cleared to zero by application of a negative signal to the input terminal 1137 of counter clear 1138, whose output terminal is coupled via line 1139 to the clear terminals of the several counter stages, thus clearing (resetting) them. The fact of reset states prevailing in all counter stages is interpreted as the number zero. In such reset state, each counter stage is in an allow set condition by virtue of intercoupling of the "1" and allow set terminals. Therefore the positive-going trailing edge of the next incoming signal applied to terminal 1133 will set stage 1131, even though it is applied to both the set and reset input terminals of stage 1131. This follows from the discussion of simultaneous application of set and reset signals to a flip-flop given in the preceding section.

The "1" terminal of stage 1131 is now at negative potential; that is, the A signal is now present. This is of significance in several respects. The A signal serves as setting signal for the second stage 1132, but not at this time as yet, recalling that it is the positive-going trailing edge of a setting signal which is effective to set. Thus stage 1132 remains reset, and the fact of stage 1131 set and stage 1132 reset is interpreted as the number one. Secondly, the allow set terminal of stage 1131 is now at negative potential, so that the positive-going trailing edge of the next incoming second signal cannot set stage 1131, but will reset it.

The resetting of stage 1131 by the second signal terminates the A signal, which is now positive-going and therefore sets stage 1132, even though the A signal is applied to both the set and reset terminals of stage 1132. The fact of stage 1132 set and stage 1131 reset is interpreted as the number two. It is seen that stage 1132 is in exactly the same condition as stage 1131 upon receipt of the first signal. The B signal is now present. Also stage 1131 is now in exactly the same condition as it was prior to the first A signal. Therefore the next (third) signal will set stage 1131. The attendant initiation of the A signal does not affect stage 1132 (termination of the A signal subsequently will). Stage 1132 therefore remains set, and the fact of both stages 1131 and 1132 being set is interpreted as the number three. It is seen that the counter 1130 counts the number of signals.

The counter 1130 has now reached the limit of its two-stage capacity. The next (fourth) signal will reset stage 1131. The attendant termination of the A signal now also resets the second stage 1132, so that we have reverted to the initial condition corresponding to the count of zero. However, the attendant termination also of the B signal would set a third counter stage coupled to stage 1132, and such set state coupled with the reset state of stages 1131 and 1132 would be interpreted as the number four. Stages 1131 and 1132 are now ready for another cycle of counts one, two, three, zero as before. In the case of an added third stage, such counts would be interpretable as five, six, seven, zero respectively.

10.8. Monostable multivibrator type circuits

The disclosed system utilizes several monostable type multivibrator circuits, namely a delay flop (FIGURE 33), a gated delay flop (FIGURE 34), a retriggerable delay flop (FIGURE 35) and a blocking oscillator (FIGURE 36. These circuits function generally in the same manner, in that upon receipt of an input trigger signal they will generate an output pulse of predetermined duration. Structurally the circuits are also similar to a certain extent. The delay flop circuit shown in FIGURE 33B is composed of two blocks designated as 1144 and 1145A. The retriggerable delay flop circuit of FIGURE 35B is composed of two blocks designated as 1207 and 1145B. The blocking oscillator circuit of FIGURE 36B is composed of block 1144 of the basic delay flop circuit and of a block 1145C which is essentially a simple modification of blocks 1145A and 1145B. The blocks 1145A and 1145B contain similar structure and corresponding components therein are designated by like reference numeral followed by suffix letters A and B respectively. Components individual to the blocks are designated by reference numeral without suffix letter. The following description will be simplified having regard to the noted similarities.

10.9. The delay flop (FIGURE 33)

The symbol for a representative delay flop 1140 is shown in FIGURE 33A. The delay flop includes input terminal 1141 and output terminal 1142.

The schematic details of the delay flop 1140 are shown in FIGURE 33B. The input signal to terminal 1141 proper for operation of the delay flop 1140 is a positive signal of at least four microseconds duration. The delay flop responds to the negative-going trailing edge of such trigger input signal. The negative-going trailing edge must have a fall time of less than 0.5 microsecond. The mentioned time limitation of four and 0.5 microsecond will assure reliable triggering.

The proper operating level at input terminal 1141 is established by a resistor 1146, which connects from terminal 1141 to the +20 volt bus. The input signal is coupled by means of a capacitor 1148 to the base of transistor 1156 which is connected as an emitter follower. However, the input signal is modified by the action of a network which is connected from the base of transistor 1156 to ground and includes resistor 1154 shunted by the series combination of diode 1150 and resistor 1152. The anode of diode 1150 is tied to the base of transistor 1156. The positive-going leading edge of the incoming trigger pulse is presented with a short-time constant differentiating network including capacitor 1148 and resistor 1152, and is therefore attenuated. The negative-going trailing edge cannot pass through diode 1150, and therefore the impedance it sees is that of coupling capacitor 1148 and resistor 1154 in shunt with the input impedance of the emitter follower transistor 1156, whose time constant is substantially greater. The negative-going trailing edge is therefore not attenuated to substantial degree.

The collector of transistor 1156 is coupled to the −6 volt bus, whereas its emitter is coupled through load resistor 1158 to the +20 volt bus. This completes the description of the elements constituting block 1144. The emitter of transistor 1156 produces a replica of the signal voltage appearing at its base, and this is passed to the cathode of a diode 1160A in block 1145 A.

Diode 1160A suppresses transmission of the residual positive swing of the signal developed at the emitter of transistor 1156, but passes the negative-going trailing edge part to an integrating network composed of shunt-connected resistor 1162A and capacitor 1164, whose ends are respectively connected to the anode of diode 1160A and the base of transistor 1166A, which is connected as a grounded emitter amplifier. Proper operating potential for transistor 1166A is established by means of a resistor 1165A which intercouples the transistor base and the +20 volt bus. The collector load resistor 1168A of transistor connects to the −26 volt bus. Transistor 1166A is normally biased to collector current cut-off, but is turned on by the incoming base signal.

The inverted (positive) integrated signal developed at the collector of transistor 1166A is passed through capacitor 1170A to the base of transistor 1176A, which functions as the monostable multivibrator proper. Capacitor 1170A in cooperation with series-connected resistors 1172A and 1174A constitute a charging network, which determine the duration of the output pulse at output terminal 1142. Capacitor 1170A is selected to provide the desired pulse duration which is expressed for a given delay flop in milliseconds (ms.) in the symbolic form shown in FIGURE 33A.

Resistors 1172A and 1174A intercouple the base of transistor 1176A and the −26 volt supply. The base of transistor 1776A is grounded, while its collector is coupled through load resistor 1178A to the −26 volt bus and is conductor coupled to the output terminal 1142. The negative excursion of the collector potential is limited to −6 volts by means of a clamping diode 1180A whose anode is tied to the collector and whose cathode is tied to the −6 volt supply.

Resistors 1172A and 1174A normally bias transistor 1176A to saturation, so that its collector is at most positive potential. The positive signal applied to its base via capacitor 1170A initially reduces the collector current, so that the collector potential begins to drop, and such drop is regeneratively enhanced by means of a feedback diode 1182A whose anode is coupled to the collector and whose cathode is tied to the cathode of diode 1160A. The diodes 1160A and 1182A are connected as a buffer. By virtue of the regenerative feedback provided by diode 1182A through the integrating network (resistor 1162A and capacitor 1164), transistor 1166A, and capacitor 1170A, transistor 1176A is practically instantly driven to collector current cut-off. Its collector voltage drops and remains at the level of −6 volts until the circuit recovers. Such recovery is due to the charging of capacitor 1170A through resistors 1172A and 1174A. As capacitor 1170A charges, collector current begins to flow once more in transistor 1176A, and it rapidly returns to saturated condition. The regenerative feedback action ends. The collector voltage goes positive again, and to minimize overshoot, a non-linear negative feedback diode 1184A is provided. The anode of diode 1184A is tied to the collector of transistor 1176A, and its cathode to the junction of resistors 1172A and 1174A. The negative feedback path is from the collector via diode 1184A and resistor 1172A to the base of transistor 1176A. The circuit recovery is not complete until capacitor 1170A is charged to normal voltage and such charging depends on the resumption of normal collector potential of transistor 1166A, which in turn depends on the time constant of the integrating network composed of resistor 1162A and capacitor 1164.

10.10. Gated delay flop (FIGURE 34)

The symbol for the representative gated delay flop 1190 is shown in FIGURE 34A. The gated delay flop is similar to the basic delay flop described in the preceding section, and corresponding parts are designated by like reference numerals followed by the suffix letter C. In particular, the gated delay flop 1190 is provided with an input terminal 1141C and output terminal 1142C, and with an additional gating input terminal 1192.

The schematic details of the gated delay flop are shown in FIGURE 34B. It comprises a delay flop 1140C intermediate input and output terminals 1141C and 1142C. The delay flop is of the kind described in the preceding section, except that the conductor connection (FIGURE 33A) between output terminal 1142 and the anode 1182A is broken, and is replaced in the gated delay flop (FIGURE 34B) by a diode 1193, whose cathode is tied to the cathode of diode 1182A. Gating input terminal 1192 connects via the anode and then the cathode of diode 1196 to the cathodes of diodes 1182A and 1193, and operating potential is established by means of resistor 1194 which connects the cathodes of the three diodes 1182A, 1193, 1196 to the −26 volt supply.

The gated delay flop operates normally in the same manner as the basic delay flop. It would appear that diode 1193 is poled in opposition to the transmisson of the negative pulse regeneratively fed back via diode 1182A; however, it should be remembered that the output terminal 1142C is clamped to −6 volts, whereas the cathode of diode 1193 is biased to −26 volts, so that normally the feedback signal is transmitted. However, upon application of a positive inhibiting signal to gating input terminal 1192 diode 1193 is blocked, regeneration is interrupted, and the gated delay flop is prematurely reset. Stated conversely, normal delay flop action is possible, so long as the normal negative gating signal is applied to input terminal 1192, and is otherwise inhibited or interrupted prematurely.

10.11. Retriggerable delay flop (FIGURE 35)

The symbol for the representative retriggerable delay flop 1200 is shown in FIGURE 35A and comprises input terminal 1202, and output terminals 1204 and 1206. The retriggerable delay flop 1200 functions generally as follows. In response to receipt of a negative input pulse at terminal 1202, a positive output pulse will be delivered at output terminal 1206. This output pulse will have a predetermined duration; however, if an additional negative input pulse is applied at terminal 1202 before termination of the output pulse, such positive output pulse will be sustained beyond its normal predetermined duration, and will continue to be sustained upon receipt of additional negative input pulses at terminal 1202. Upon cessation of such negative input pulses, the positive output pulse at terminal 1206 will terminate, and such termination will induce generation of a negative output pulse of predetermined duration at terminal 1204.

The schematic details of the retriggerable delay flop 1200 are shown in FIGURE 35B, and are shown in two blocks 1207 and 1145B, for convenience. The negative input pulse applied at terminal 1202 is coupled via resistor 1208 to the base of a grounded emitter connected transistor 1214, which functions as an inverting stage. Base operating potential is established by means of a resistor 1210 which intercouples the base of transistor 1214 and the +20 volt supply. The collector load resistor 1216 connects to the −26 volt supply. The negative excursion at the collector is limited to a level of −6 volts by means of a clamping diode 1218, whose cathode connects to the collector of transistor 1214 and whose anode is tied to the −6 volt supply.

The resultant positive signal at the collector of transistor 1214 is transmitted through the anode and then the cathode of a diode 1220 and resistor 1226 to the base of a transistor 1228, modified however by the action of a charging network which includes capacitor 1222 and resistor 1226. The upper ends of the latter two elements are connected to the anode of diode 1220; the other ends of capacitor 1222 and resistor 1224 are respectively connected to ground and to the −26 volt supply. The values of resistor 1222 and of capacitor 1224 are selected in accordance with the expected frequency of input pulses in accordance with the following considerations.

Transistor 1228 is quiescently maintained in conduction by means of a voltage divider which comprises resistors 1230 and 1232. The latter two resistors connect in order from the −26 volt bus to ground, and their junction is tied to the emitter of transistor 1228. The collector load resistor 1234 of transistor 1228 connects to the −26 volt supply.

Upon receipt of the initial negative pulse at input terminal 1202 capacitor 1222 will charge, and will cut off transistor 1228 as long as the capacitor charge remains positive with respect to the emitter of transistor 1228. If input pulses appear at terminal 1202 with a period smaller than the recovery time of capacitor 1222, the capacitor charge is replenished, and transistor 1228 remains cut off. As will now be seen, the duration of the output pulse at terminal 1206 corresponds to the duration of cut off of transistor 1228.

Cut off of transistor 1228 produces a negative pulse at its collector. The negative swing is limited to −6 volts by means of a clamping diode 1236, whose cathode is tied to the collector and whose anode is tied to the −6 volt supply.

The negative pulse signal from the collector of transistor 1234 is transmitted to the base of a grounded emitter stage connected transistor 1237 via series resistors 1238 and 1240 shunted by speed-up capacitor 1242. Transistor 1237 had been quiescently cut off by provision of resistor 1244 which couples the transistor base to the +20 volt supply. Load resistor 1246 connects the collector of transistor 1237 to the −26 volt supply.

Transistor 1237 is turned on for so long as the negative signal is received from the collector of transistor 1228, and its collector swings positive, giving rise to the positive output signal at terminal 1206 which is tied to the collector of transistor 1237. To prevent deep saturation, a nonlinear negative feedback is provided from the collector via the anode and then the cathode of a diode 1250 to the junction of resistors 1238 and 1240, and then via the latter resistor to the base of transistor 1237. The collector positive signal terminates upon termination of the negative signal from the collector of transistor 1228. To limit the negative-going return swing of the output voltage at terminal 1206 to −6 volts, the collector of transistor 1237 connects through the cathode and then the anode of a clamping diode 1248 to the −6 volt supply.

The signal at the collector of transistor 1237 is transmitted via a differentiating capacitor 1252 to the cathode of a diode 1160B (in block 1145B), which cathode is returned to ground via a cooperating differentiating resistor 1254. Thus diode 1160B passes only the negative-going trailing edge of the output signal from the collector of transistor 1237. This completes the description of the block 1207.

The circuitry of the block 1145B is structurally very similar to the circuitry of the block 1145A described in connection with the basic delay flop of FIGURE 33, with the following minor differences. Unlike resistor 1162A, the resistor 1162B in block 1145B is not shunted by a capacitor. Thus the integrating feature of the basic delay flop is lacking, and output signal is realized at terminal 1204 as soon as the output at terminal 1206 ends. For the same reason the circuit of block 1145B recovers somewhat more quickly than the circuit of block 1145A. Secondly, there is connected from the collector of transistor 1166B a resistor 1260 to ground, which has no counterpart in the block 1145A. Resistor 1260 is provided for proper biasing, and does not affect the monostable operation of block 1145B, which is essentially the same as that of block 1145A except for quicker recovery as stated.

10.12. Blocking oscillator (FIGURE 36)

The symbol for a representative blocking oscillator 1270, having input terminal 1271 and output terminal 1272, is shown in FIGURE 36A. The corresponding details are shown in symbolic form in FIGURE 36B, from which it may be seen that the blocking oscillator 1270 is structurally and functionally similar to the basic delay flop of FIGURE 33. The blocking oscillator 1270 is composed of blocks 1144 and 1145C. Block 1144 is structurally the same as the like-numbered block in FIGURE 33. Block 1145C is also structurally the same as block 1145A, except that a resistor corresponding to resistor 1260 in block 1145B of FIGURE 35 is included. Functionally the blocking oscillator is the same as the basic delay flop of FIGURE 33; however, its circuit constants are selected to produce output pulse of substantially shorter duration than that of the basic delay flop.

10.13. Decoder (FIGURE 37)

The symbol for a representative decoder 1299 is shown in FIGURE 37A. In the description of the decoder 1299, and also of the gated multivibrator in the next section, it will be convenient to identify terminals and the signals that are applied to or delivered at such terminals by one and the same reference characters. For example, decoder 1299 accepts pairs of complementary input signals A and —A, B and —B, and C and —C. It delivers output signals 0 to 7. The input signals A and —A are deemed to be applied to input signal terminals A and —A respectively.

The decoder is commonly used in conjunction with a binary counter of the kind described in a previous section, or with some similar static register, and its purpose is to provide an output signal at that one of the particular output terminals which corresponds numerically to the count stored in the static register. Thus, the decoder 1299 is deemed to derive its signals by way of example from a three-stage binary counter of counting capacity 0 to 7. The complementary signal pairs, A, B, C are deemed to be derived from the three stages respectively, as described in connection with the binary counter. The following description of the details of decoder 1299 (FIGURE 37B) will further elucidate this concept.

Decoder 1299 includes eight gates 1300 to 1307, whose outputs are connected to the input terminals of eight amplifiers 1310 to 1317 respectively. The latter amplifiers deliver at their negative output terminals the count pulses 0 to 7 respectively.

Each of the gates 1300 to 1307 has three inputs to which are applied one or the other signal in each of the pairs A, B and C. All like labeled input terminals are deemed to be interconnected, although the interconnections are omitted in the interest of clarity. For example, input terminals —A are shown for gates 1300, 1302, 1304 and 1306, and are deemed to be interconnected. It should be recalled that the +A signal is derived from the first stage of the binary counter and therefore represents the least significant bit (binary digit) of the stored count; similarly the +B signal represents the second least significant bit, and the +C signal the third least significant bit. Also the minus sign corresponds to the bit 0 and the absence of the minus sign represents the bit 1 (recall the designations of the output terminals of a counter stage as "0" and "1"). The functioning of the decoder may now be determined by inspection, since in each of gates 1300 to 1307 the stored number passed by a given gate is indicated in binary representation, least significant bit vertically below the A input terminal, second least significant bit vertically below the B input terminal, and third least significant bit vertically below the C input terminal. Additionally there is inscribed in each gate the passed number in decimal representation. Consider gate 1303 which passes the count 3. The binary representation for 3 is 011. For this number to be passed, the +A and +B signals must be present and the +C signal absent, which means that the —C signal must be present, as shown. The remaining gates follow the same pattern.

It will be recalled that a gate, when transmissive, passes a negative output signal. The fact that the output signal from amplifiers 1310 to 1317 is taken from the negative output terminals, implies that when a given gate is open, its associated amplifier will produce a positive output count signal. This is desirable, as decoder 1299 commonly feeds positive logic circuits. If negative logic circuits are to be driven, the in-phase outputs of amplifiers 1310 to 1317 may be utilized.

10.14. Gated multivibrator (FIGURE 38)

The symbol for a representative gated multivibrator is shown in FIGURE 38A. The purpose of this unit is to supply, on receipt of a control signal, a series of pulses having a predetermined repetition rate or period and continuing as long as the control signal remains applied. The period in microseconds—i.e., the time in microseconds from the leading edge of one output pulse to the leading edge of the next—is sometimes indicated on the symbol; thus in FIGURE 38A the GMV shown has a period of 55 microseconds.

The gated multivibrator shown in detail in FIGURE 38B employs two inverting amplifiers 1403 and 1404 interconnected with two capacitors 1405 and 1406 to form a closed loop. Such a circuit is unstable, as it has so-called positive feedback, and thus will oscillate at a rate determined by the characteristics of the amplifiers and the size of the capacitors, the latter providing a convenient variable element for determining the period. The resulting signal into blocking oscillator 1407 will be a repetitive signal of approximately rectangular wave form, which will be converted into a series of pulses by 1407.

Application of a control signal to input terminal 1401 will gate the next pulse from 1407 at gate 1409 to set flip-flop 1410. Since the latter sets on the trailing edge of a signal applied to its S input, it will not set until the end of the pulse from 1407 even if the control signal is applied in the middle of a pulse from 1407.

Thus it is assured that 1410 will not be set in the middle of a pulse from 1407 and thus cannot gate a partial pulse at gate 1411. Consequently the first pulse emitted at output terminal 1402 will be a full-width pulse, the first full-width pulse following application of the control signal to input terminal 1401. Pulses will continue to be emitted from output terminal 1402 as long as the control signal remains applied to input terminal 1401.

When the control signal comes to an end, its trailing edge resets 1410 and no more pulses are gated to output terminal 1402. If it should happen that the control signal ends in the middle of a pulse, the latter, since it is also applied to buffer 1413, will delay disappearance of the signal at the R input of 1410 and hence prevent the resetting of the latter until the full-width output pulse has been gated at 1411. Thus disappearance of the control signal cannot result in the cutting short of the last output pulse. In actual practice the control signal is usually terminated by a pulse derived from the output pulse, and thus in many cases termination of the control signal can be timed by means of external circuits to occur between output pulses, making the added precaution of the inclusion of buffer 1413 superfluous.

11. AUXILIARY STORAGE UNIT

The auxiliary storage unit 48 includes a memory of 128 characters which can be sub-divided into up to 20 fields. This unit can be used alone for storage purposes or, in combination with the adder unit, can be used in such a way that any one of the twenty fields becomes an accumulator.

In addition to provision for loading and read-out of data, it is also possible to load new data into a field at the same time that the previously stored data are being read out. In all cases the storing of new data in a field erases data previously stored in that field, but the reading out of data from a field is non-destructive unless a store operation is being performed simultaneously with the read-out operation.

11.1. Addressing circuits (FIGURES 39 and 40)

The 128 character memory is of the same core matrix type as previously described (memory 14), and is arranged in eight columns and 16 rows. The storage memory 14S is shown in block form in FIGURE 39. The address counter consists of seven counter stages SBC5001 through SBC5007, of which the first three constitute the column counter (FIGURE 39) and the other four the row counter (FIGURE 40). These counters are arranged to count in the forward direction; that is, starting with the cleared position of the counter (representing character number 1) when doing a store or read-out operation. They are arranged to count in the reverse direction during an add operation.

In all cases it is necessary to provide a means for pre-setting these counters to the first character of the desired field before performing any operation. Therefore, eight plugboard hubs are provided on the column counter for pre-setting it to any one of its eight "units" positions and sixteen hubs are provided on the row counter for pre-setting it to any of its sixteen "base" operations.

Twenty plugboard hubs are provided for each of the three operations (read-out, store and add). Thus there are three possible signals which can initiate action involving each field, and these three signals are brought together at a buffer for that field. The buffer for fields 1 through 20 are numbered B5051 through B5070. Only buffer B5051 is shown in FIG. 40 since the others are similar. Each of these buffers feeds a storage field start circuit such as SFS500I, FIG. 40 which has an amplifier which in turn feeds via an amplifier A5099A an interlock gate such as, for example G5061 for field 1, which prevents initiation of a new operation if an addition is in progress at the time the signal was received at the buffer input. In the absence of an interfering add operation or on termination of an add operation which may be in progress at the time a signal is received at one of the buffers, an output from a blocking oscillator, such as for example, BO5001, gives an SF or "select field" pulse corresponding to the desired field. An example of this would be signal SF1 from blocking oscillator BO5001.

Signal SF1 is applied to two buffers B5071 and B5101, each of which feeds a pair of plugboard hubs. These hubs are to be connected through the plugboard to row and column setting hubs, previously mentioned, in order that the SF pulse may set the row and column counters to the position corresponding to the first or most significant character of the field desired. In the case of the add operation, as will be described more fully in connection with the description of the adder circuits, the field selected is actually the one adjacent to the field in which addition is to take place.

11.2. The storage operation (FIGURES 41 and 42)

Storage of data in a field of the auxiliary storage unit is accomplished by applying a control signal to that one of the twenty "store in control" hubs (OBA31-32 to OBV31-32 incl.) corresponding to the field desired, and at the same time supplying data to the "store data" in hub (OBS25-26). The signal from the "store data in" hub goes to one of the field selection circuits just described in the preceding paragraph and also goes to a buffer B5040 (FIGURE 41) where all read-in signals are combined into a common circuit and amplified by amplifier A5025. If an addition operation is in progress at the time the signal is received at the read-in control hub, the signal AH will be present at mixer gate A5099 and the signal from amplifier A5025 will trigger blocking oscillator BO5021 to set flip-flop F5008. This will give the SLK or "storage scan interlock" signal, which will interlock other operations until the add operation has been completed. Disappearance of the ARH signal, upon completion of the addition operation, will reset flip-flop F5008, allowing the storage operation to proceed. Disappearance of signal —AH at gate G5052 will permit the STO or store signal to be produced by amplifier A5026. Signal AH is produced by flip-flop F5091, which like signal ARH (in the adder circuit) is set by amplifier A5098 in response to signal JAM, but signal AH is set by the leading edge of signal JAM while flip-flop 5091 which generates signal ARH is set by its trailing edge. Disappearance of signal ARH resets flip-flop F5091.

The STO store signal actuates two gates, G5103 and G5104 which feed signals via buffers B5099A and B5099B and amplifiers A5097A and A5097B, to give the COWS and CORS write and read signals, respectively, to the memory. Signal STO also gates the "data in" signal at gate G5018 (FIGURE 42) and the resulting signal SSDI, generated by amplifier A5096A, scanned by the narrow pulses N1 through N7 at gates such as G5096A, sets up a character of the input data in seven flip-flops F5011 through the agency of inverting amplifier A5095A of the storage input flip-flop group SIF5001. STO is combined with a clock write inhibit signal, CWI, from the scan timer, at gate G5010 (FIGURE 39) and the resulting signal STI is applied to mixer gates M5031 in SIF5001 (FIGURE 42) to gate the data from flip-flop F5011 into the inhibit drivers for the memory, thus writing data into the memory of the auxiliary storage unit.

The first character is written into the position selected by pre-setting the row and column counters with the signal SF or "select field" pulse which occurred at the beginning of the operation. Each time a new data character occurs the counters are stepped by the signal RSB, which is actually the CWI (clock write inhibit) pulse as gated by either signal STO at gate G5010 or the read-out signal RO at gate G5009 (FIGURE 39). Thus successive characters of the data entering the "store data in" hubs are written into successive positions of the memory starting with the first character position of the desired field. This process continues as long as the signal applied to the "store in control" hub continues, and as long as data continue to appear on the "store data in" hub. No internal means in the auxiliary storage unit is provided for terminating the operation, since it is expected that the control signal applied to the control hub will terminate after the proper number of characters has been stored.

11.3. Read-out operation (FIGURES 41 and 42)

A read-out operation is initiated in the same way as a read-in operation except that in this case one of the "store out control" hubs rather than one of the "store in control" hubs receives the control signal. Setting of the address counter to the proper position occurs in exactly the same fashion as on the store operation. An interlock on arithmetic operations is provided in the same fashion as on the store operation; if no arithmetic operation is in progress (or if one is in progress, then upon termination of that operation) a signal RO or "read-out" is provided by way of gate G5051 (FIGURE 41).

The signal RO generated by amplifier A5094 gates the read strobe signal CS from the scan clock at gate G5008 (FIGURE 42) and these signals pass through buffer B5093 to amplifier A5093 to produce the SSS signal. Signal SSS is used to sample outputs of the sense amplifiers at gate G 5001 to set the information flip-flops F5001 through the agency of amplifier A5093 in the storage output flip-flop assembly SOF5001. Outputs of these flip-flops (the signals ±ASD1 through ±ASD7) are gated by signal RO at the mixer gates M5011 through M5017 and also scanned by the clock pulses C1 through C7 from the scan clock to give the serial data output to the "store data out" hub (OBS24).

Signal RO gates the clock write inhibit pulse CWI from the scan timer at G5009 (in the absence of the STO signal) to give the read-out inhibit or ROI pulses (FIGURE 39). These are applied to recirculation mixer gate M5041 in SIF5001 (FIGURE 42) to permit the data to be written back into the memory, thus providing non-destructive read-out unless a STO signal is present indicating that a store operation is being performed simultaneously with the read-out. In the latter case signal ROI will be absent, so that the information signals ±ASD1 through ±ASD7 will not be gated at mixer gate M5041 in unit SIF5001 and will not interfere with new data coming into the memory as a result of the store operation.

Stepping of the column and row counters occurs in the same way on a read-out operation as on a store operation, and, like the store operation, the read-out is terminated by external means—that is, by disappearance of the signal being applied to the "store out control" hub.

The adder unit is used in conjunction with the auxiliary storage unit. The adder unit itself contains a one-field register, normally sixteen digits long, the adder, and a number of control circuits including a timer. Use of the separate timer allows the add operation to take place in parallel with other operations of the file processor, with a suitable interlock to prevent interference.

11.4. Adder register circuits (FIGURES 43 and 44)

The adder register is a register normally supplied in 16 digit length but capable of expansion to larger size when required. It is of the core matrix tape of the same type as memory 14 previously described, and is designated 14X and shown in block form in FIGURE 43; it differs from other memories 14 in having a capacity of only 5 bits per character instead of 7—these are numbered 3 through 7 omitting 1 and 2. The address counter (FIGURE 43) consists of four stages, ABC4501 through ABC4504, and is preset to the least significant digit position, stepped forward during the load operation, and stepped backward during the add operation.

The adder register is loaded with external data by applying a control signal to an "add in control" hub on the OC plugboard, giving the signal ALAI via buffer B4599 and amplifier A4599, and at the same time applying data to the "adder data in" hub (OBS27–28). Unless signal —ARH at gate G4501 indicates that an arithmetic operation is in progress at the time the signal is applied to the "add in control" hub, a signal ALA is generated by way of gate G4501 and amplifier A4598, after a delay of 8 microseconds introduced by block oscillator BO4590, the trailing edge of whose output sets flip-flop F4590. If an arithmetic operation is in progress at the time the signal is applied to the control hub, the flip-flop F4501 is set by way of mixer gate M4502 and blocking oscillator BO4502, giving the ALK or "adder interlock" signal, to the scan circuits (buffer B3003, FIGURE 17). Termination of the arithmetic operation will cause disappearance of the signal ARH, resetting flip-flop F4501 and permitting the signal ALA to be generated.

The signal ALA will allow new data from the "adder data in" hub to be gated to the data flip-flop F4503 in adder data flip-flop group ADF4501 (FIGURE 44); since the incoming data are serial they are sampled by the narrow scan timer pulses N3 through N7 at mixer gates M4503 and fed to inverting amplifier A4595. Note that since only numeric data are added, only the four numeric bits sampled by pulses N3–N6 inclusive and the parity bit sampled by pulse N7 are significant.

The ALA signal gates the CWI or "clock write inhibit" signal from the scan timer at gate G4508 to give the STP signal from amplifier A4594. Signal STP is combined with another signal STA, which corresponds to gated inhibit pulses from the internal adder timer, at buffer B4505 to give the AWI or "adder write inhibit" signal at amplifier A4593. Signal AWI is brought over to buffer B4501 causing amplifier A4592 to generate signal SFCL which is used to clear the data flip-flops in the memory, and also is brought to gates G4543 through G4537, where it causes data from the data flip-flops to be written into the memory. Signal AWI also goes to buffer B4502 (FIGURE 43) and thence to amplifier A4591 to step the address counter. Since the counter is being stepped forward during the loading operation signal DX1 gates signal STP and not signal STA at the interstage mixer gate M4531, and also signals DX1 and DX2 gate signal STP at the interstage mixer gate M4532. The loading operation terminates when the signal ALA being applied externally disappears after the desired number of characters has been loaded.

Each time signal STP occurs it is used to tranfer the reading of the address counter to a group of four flip-flops F4507 (FIGURE 44) in adder memory registers AMR4501–4504, giving signals MD1–4. The STP signal is fed to inputs of gates G4590. Since this data transfer is made with the same pulse which steps the counter the number represented by the AMR registers will always be one less than that represented by the present state of the counter. Thus after the last character of the field has been stored, the counter is stepped once more because the AWI pulse which steps the counter corresponds to the signal CWI which stored the last character. Thus the signals ±MD1 through ±MD4 will represent the position of the last character stored, which should be the least significant digit of the field.

Reading and writing pulses for the memory during the loading operation are gated by signal ALA at mixer gates M4541 and M4547, respectively.

11.5. Addition operation (FIGURES 45 and 46)

An addition operation is initiated by the appearance of one of the signals AD1 through AD20 (from a "start add" hub—see FIGURE 40 of the auxiliary storage circuits) at buffer B4505, producing a signal ARS by amplifier A4090 (FIGURE 45). This may occur when a previous addition is still uncompleted, in which case ARHE will be present since flip-flop F4099 and will cause signal ARS to set the interlock flip-flop F4501 (FIGURE 43) as in the case of the load operation. If there is no addition operation in progress at the time the AD signal appears (or if there is an operation in progress, then upon its termination) signal ARH either will be absent or will disappear and a signal JAM will be generated by blocking oscillator BO4515 in response to gate G4080. JAM Signal will set the flip-flop F4502, giving the ARH signal, which is characteristic of the addition cycle. After delays produced by blocking oscillators BO4503 and BO4504 the signal SAA will be generated. Signal SAA steps the counter in the auxiliary storage unit (FIGURE 39, buffer B5098) one step backward. The reason for this is as follows: It will be recalled that in loading or reading out of the auxiliary storage unit, the counter is preset to the most significant digit position of the field in question. On the other hand, an addition operation must start with the least significant digit position of the field in question. In order to avoid the necessity of having two preset locations set up on the plugboard for each field, it is desirable to use the same circuitry provided for presetting the counter on read-out or store for the addition operation as well. This can be done in the following manner: if, for example, one wishes to add into field 7, the counter is actually preset in the same manner as it would be for reading into or reading out of field 8. In setting up the field start positions on the plugboard, it is necessary to leave no gaps between fields, and in particular the last field (which in general would be field 20) must be chosen so that its last position is position 128, which is last position in the memory. Likewise, the first field, field 1, must be chosen so that its first position is position 1 in the memory. If these rules are followed, then the least significant digit of field is adjacent in every case to most significant digit of field +1 and therefore, if the counter is preset to the most significant digit (as it normally is on a read-out or store operation) and then stepped backward one position, it will be properly set for the least significant digit position of the field preceding the one to which it was initially preset. Thus, the signal SAA is used to step the counter backward one step putting it in proper position to read out the least significant digit of the field called for. Signal SAA, after a further delay through the agency of amplifier A4070 and blocking oscillator BO4099 to allow adequate time for the counter to settle, is applied through buffer B4504 (FIGURE 45) to a timer chain which generates a series of timing signals for reading and writing and other operations during the addition process. These timing signals include the read pulse generated by block oscillator BO4098 AAR, the read strobe pulse SAP generated by blocking oscillator BO4097, the write pulse AAW and the write inhibit pulse generated by blocking oscillator BO4096 AAI. Signal AAI is further delayed by blocking oscillators BO4505 and BO4506 and fed back through gate G4552 to keep the sequence running as long as the latter gate remains unblocked by the inverted EOF signal fed to amplifier A4071. The relative timing of AAR, SAP, AAW, and AAI is essentially the same as CR, CS, CW, and CWI respectively in FIGURE 7.

Signal JAM, in addition to setting flip-flop F4562 to give ARH, transfers the number stored in the adder memory registers AMR4501–4504 to the address counter of the adder register, via mixer gates M4528–4531 (FIGURE 43). The effect of this is to preset that counter to the least significant digit position of the number stored in the adder register, thus placing the counter in the proper position to read this number out into the adder circuits.

Signal SAA sets the flip-flop F4510 (FIGURE 45) to give a signal ADDN which defines the period during which the number stored in the adder register is to be read out. It is possible for the number stored in the adder register to have fewer digits than the length of the field into which it is to be added. Therefore, the signal ADDN is used to distinguish the actual period during which the number is being read out of the adder register.

Signal ADDN is used to gate signal AAI, the clock write inhibit signal for the add timer, to give a signal STA (G4507, FIGURE 44). This signal, like signal STP, is used to generate signal AWI which steps the address counter, while STA is applied to the interstage gates of the address counter to make it step backward during the add operation. The signal ADDN also gates read and write pulses from the add clock into the memory by way of mixer gates M4542 and M4548.

Likewise, the signal ADDN applied to mixer gates M4513 in unit ADF4501 gates the read sampling pulse SAP, which gates data from the sense amplifiers into data flip-flops F4503 whose outputs are the signals ADA3 through ADA7 (FIG. 44). The signal AWI is used not only to clear these flip-flops (via buffer B4501) but also to cause writing of the data back into the memory through gates G4543–4547 inclusive, making the reading non-destructive.

During this operation signals ADA3 through ADA6 from ADF4501 are applied to the adder input (FIGURE 47) along with signals ASD3 through ASD6 from unit SOF5001 of the auxiliary storage unit and the resulting sum —AO3–AO6 is fed from the adder back into the auxiliary storage unit. Both counters, that in the adder memory and that in auxiliary storage unit, are stepped during this process until all digits stored in the adder memory have been added into the proper field in the auxiliary storage unit. Addition of the last digit in the adder memory will be indicated by the fact that signals —DX1 through —DX4 are all present at gate G4510 (FIGURE 45). This will cause the gating of the AAI pulse corresponding to that digit to reset flip-flop F4510, terminating the ADDN signal.

The addition or subtraction operation terminates when an "end of field" or EOF signal is obtained from the auxiliary storage unit EOF gates the signal TEA from the timer of the adder circuits at gate G4969 which triggers blocking oscillator BO4070 to reset the flip-flop F4502, ending the signal ARH. Signal EOF is also inverted by amplifier A4071 to block gate G4552, breaking the chain in the timer and causing the timer to stop emitting signals.

Signal EOF is generated by circuits shown in FIGURE 46. The row decoder 82 and column decoder 86 in the memory unit 14X (see FIGURE 4 and accompanying description) have their outputs inverted by amplifiers such as A4590 which feed the 8 units hubs and 16 base hubs in the "storage field definition ends" group (FDSC plugboard, row 8 of Section B). These are to be connected to "end units" and "end base" hubs, respectively, for the desired field. (If less than 20 fields are used, an "inhibit" hub is chain-wired to the "end base" hubs of all unused positions, preventing generation of false EOF signals.) Then when the address counter of the auxiliary storage unit, counting backward as usual during addition, passes the first character of a field and steps back to the end character of the preceding field amplifier A4399 in response to one of the mixer gates M4399 generates signal EOF. While signal EOF is also present during addition of the first digit in a field, as a result of signal JAM stepping the counter back one position at the start of the addition operation, no signal TEA occurs until after the first AAI signal, which latter pulse steps the counter back another position; thus by the time the first TEA signal occurs at the start of an addition the auxiliary storage address counter has already been stepped back away from the last character of the field being added into, and signal EOF has disappeared, to appear again only after addition has taken place into all digits of the selected field.

11.6. Algebraic adder (FIGURE 47)

The adder used in the adder module (FIGURE 47) is designed to operate in the code described under "Representation of Data," but is suitably modified if a different data code is used. It consists of two binary adder groups, the first group (BA4603–4606) designed to add together decimal digits and the second (BA4613–4615) designed to supply the necessary correction. A correction is needed if the addition of the two coded digits produces a carry-over, and this fact is sensed by examining the carry output of binary adder BA4603 and applying any signal from that output through mixer gate M4604 to produce the CA3 signal by amplifier A4360. It is also necessary to supply a correction if the output from the first group of binary adders exceeds binary 9. This will be indicated by the occurrence of sum bit signal PA4 or PA5 along with sum bit signal PA3, PA3 being the most significant bit of the sum. Mixer gates M4601 and M4602 look for this pair of possibilities and also produce the signal CA3 is these conditions exist. The proper correction is achieved by adding binary 6 (0110), which corresponds to bits 4 and 5. Signal CA3 is applied to one of the inputs of binary adder BA4615 without the requirement of any gating to distinguish between addition and subtraction. Signal CA3 is gated into binary adder BA4614 on addition to complete the addition of binary 6 by means of gate G4618. Since this may produce a carryover it is necessary to supply an additional binary adder stage BA4613 to handle this carry if it occurs. The least significant bit, however, requires no correction, and therefore, the output of the least significant bit adder BA4606 in the first group is used directly to give the signal outputs AO6 and —AO6.

A circuit is provided (FIGURE 48) to generate the proper parity bit to go with the sum digit. This circuit consists of mixer gates M4627 through M4630 and also gates G4631 and G4632, which cause amplifier A4673 to signal AO7 (or actually —AO7, since the negative output is required for application to the gate which feeds the inhibit driver). The parity circuit will produce the signal —AO7 provided the parity of the sum, as examined, is even. Thus the final result of the four sum bits plus bit AO7 will be an odd parity group.

The inter-digit carries are handled by flip-flop F4601 (FIGURE 47), which produces the signals CA6. Flip-flop F4601 will be set on addition whenever signal CA3 is present at one of the mixer gates M4690 and M4690A which drive amplifier A4690A, in which case CA3 will gate an AAI pulse at mixer gate M4608. Signal CA6 is fed into the carry input of the least significant bit binary adder BA4606. Since signal CA6 must not be present if no carry occurs, signal —CA3 is used to gate signal AAI to reset flip-flop F4601 at mixer gate M4609 whenever no interdigit carry occurs.

It is desirable to have same indication of the fact that the addition of two numbers or the accumulation of a number of quantities into one field produces a result which exceeds the capacity of that field. This is accomplished by examining for the presence of signal CA6 at the time the end of the field is reached, as indicated by the coincidence of signals EOF and TEA at mixer gate M4637 (FIG. 48). If such a condition exists a signal is fed to amplifier A4659A which is used to set the overflow flip-flop F4603, giving a signal to plugboard hub OBT28, which can be used to initiate a program to handle the situation as needed. Mixer gate M4637A senses overflow during subtraction.

11.7. Subtraction (FIGURE 48)

Subtraction is accomplished by adding the complement of the number from the adder memory to the field in the auxiliary storage unit. In order to accomplish the subtraction it is necessary to supply a control signal to the "subtract" hub (OBW—X34) at the same time the signal is applied to the add circuit. This causes the setting of flip-flop F4602 (FIGURE 48) when the JAM pulse occurs at gate G4611 at the start of the add cycle. The output of flip-flop F4602, the SUB signal, is used to cause complementing of the number coming into the adder from the adder memory. The complementing is accomplished simply by activating mixer gates M4613 (FIGURE 47), in place of mixer gates M4603, and thus using the negative signals —ADA3 through —ADA6, in place of positive signals ADA3 through ADA6, as inputs to the adder.

In subtraction, absence of an interdigit carry calls for a correction. Thus signal CA3 is generated on subtraction by mixer gate M4614 if there is no IDC signal. The correction required is the addition of 10 (binary 1010) rather than 6 (binary 0110). Thus on subtraction gate G4618 is blocked and gate G4612 is actuated. Likewise, absence of an interdigit carry should cause a "borrow" signal to go into the next digit; this is accomplished by using signal SUB to gate signal —CA3 at mixer gate M4690 to cause setting of flip-flop 4601 to give the "borrow" signal.

In subtraction an overflow is characterized by the absence of an interdigit carry on the last digit of the field. This condition is sensed by mixer gate M4637A, which sets the overflow flip-flop F4603 if signal CA6 is not present when signal EOF occurs.

12. MISCELLANEOUS CIRCUITS

A number of circuits have been referred to in passing throughout the foregoing description, but have not been specifically described. These include certain circuits of the OC plugboard and the various controls and indicators on the control panel.

12.1. OC plugboard circuits (FIGURES 49A and 49B)

Figure 49:
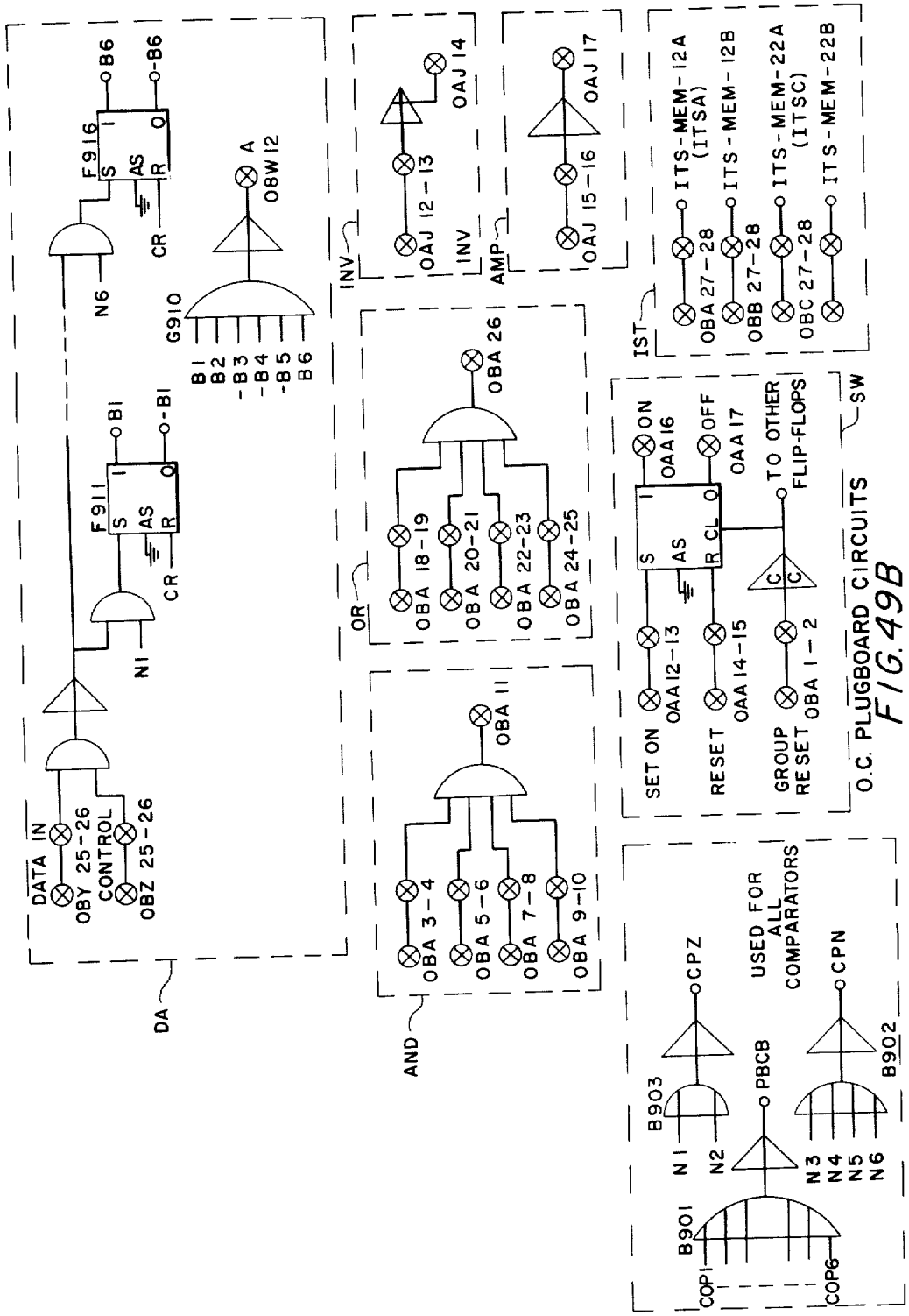

In FIGURE 49 a number of circuits associated with the OC plugboard are shown.

First, it will be noted that the serial data signals DMSA, DMSB, and DWSA are connected to plugboard hubs, making these serial data signals available for analysis or modification.

A comparator group contains six individual comparators together with some circuitry which is common to all comparators. The drawing shows a typical comparator CP, which is number 1 of the six, together with circuitry which is common to all.

Each comparator CP has two data inputs designated "A" and "B" and a "control" input. In using the comparator circuit, serial data are fed to the two data inputs and the control signal is fed to the "control" input.

The data inputs are taken directly to some comparator gates and also are connected to inverters which supply negative signals to other comparator gates. The direct and inverted signals from input A are labeled CA1 and —CA1, respectively, and those from input B are labeled CB1 and —CB1, respectively.

Certain codes are designed to permit direct comparison by simple bit comparison of the coded characters. The code shown under "Representation of Data," however, requires for proper comparison that the two zone bits, bits 1 and 2, be inverted before comparison. Provision for these differences in code characteristics is made in the circuitry which is common to all six comparators of the module. This is accomplished by proper choice of sampling signals which are used at the comparison gates. The sampling signals are desirable in any case because positive and negative pulse signals are being examined, and this results in spurious signals around leading and trailing edges. Thus the narrow pulses N1 through N6, from the scan timer, are used as sampling signals. Narrow pulses N3 through N6 are combined at buffer B902 and used at mixer gate M901 and mixer gate M903 for numeric bit comparison, and narrow pulses N1 and N2 are combined at buffer B903 and applied to alternate comparison mixer gates M902 and M904 in which the data signals are opposite in sense to those at the regular comparison gates. This has the effect of inverting the zone bits of each character. The sampling pulses for bits 3 through 6 (numeric bits) are labeled CPN. The pulses which are applied as sampling pulses to the alternate comparison gates for the zone bits are labeled CPZ.

The comparator itself consists of two flip-flops F901 and F902. These flip-flops are initially cleared when a signal is applied to the "control" hub, since this signal triggers a blocking oscillator BO901 giving the CCL1 signal. Signal CCL1 is applied to the reset inputs of both flip-flops.

The regular comparison gate for flip-flop F901 is mixer gate M901. Data inputs to this gate are signals CA1 and —CB1. The signal from the "control" hub, amplified to produce the signal COP1, restricts operation of the comparator to periods when the "control" hub is energized. Sampling pulse CPN is the fourth input to this gate.

As long as data from input hub A contain only "zeros," no signal can pass mixer gate M901; on the other hand, as soon as a "one" is encountered in this data, it will pass through mixer gate M901 unless simultaneously a "one" is encountered from data hub B. A "one" from data hub A without a simultaneous "one" from data hub B implies that the magnitude of the quantity represented by the signals from data hub A is greater than that represented by signals from data hub B; consequently the passing of a signal by mixer gate M901 indicates that A is greater than B and this signal is used to set flip-flop F901, thus recording the fact that A is greater than B.

Mixer gate M903 performs a similar function to mixer gate M901, but in this case the data inputs are signals CB1 and —CA1. By the same reasoning previously used, a signal from the mixer gate M903 indicates that B is greater than A and such a signal will set flip-flop F902, recording this fact. Since data are examined most significant bit first, the first inequality to be detected indicates the inequality of the entire field being compared. Therefore the first inequality detected should prevent any subsequent inequalities in later bits of the same field from affecting the condition set up as a result of detection of the initial inequality. This lock-out operation is accomplished by connecting the 1 output of flip-flop F901 to the AS input of flip-flop F902 and the 1 output of flip-flop F902 to the AS input of flip-flop F901. Thus as soon as either flip-flop is set the other flip-flop is locked against any response to a signal from its comparison gate.

The 1 output of flip-flop F901 is applied to a plugboard hub labeled $A1>B1$. Similarly, the 1 output of flip-flop F902 is applied to plugboard hub labeled $A1<B1$.

If the entire comparison period passes without either flip-flop F901 or flip-flop F902 being set, it is an indication that the two quantities being compared are equal. Thus the 0 outputs of both flip-flops are gated together at gate G905, whose output is amplified and applied to a plugboard hub marked $A1=B1$.

It should be noted that in all cases the indication of equality or inequality remains applied to the plugboard hubs until a new comparison is initiated.

The "equals comparator" EQC is a simple device; unless the inputs at A and B are always identical, either mixer gate M905 or M906 will pass a signal to set flip-flop F903. Failure of flip-flop F903 to set indicates equality of A and B, and gives a signal at the output hub.

The digit analyzer DA is simply a group of 6 flip-flops F911–F916 which are set by gates scanned by the N1–N6 signals, so that a digit applied to the DATA IN hub while a one-character field impulse is applied to the CONTROL hub will be set up in the flip-flops. The outputs of the latter are decoded in the equivalent of 55 gates such as G910, each feeding an output hub. The gate then gives a signal if the character set up in the flip-flops is the letter A.

AND, OR INVERTER, and AMPLIFIER circuits are simply equivalent to gates, buffers, and inverting or non-inverting amplifiers respectively. SWITCH circuits are simply flip-flops, a GROUP RESET being provided for each 8 circuits.

The ITEM STEP hubs feed ITS signals to the various input and output memory units. As already noted, these signals step the item counters in their respective memory units.

Other hubs on the OC plugboard are discussed in connection with the circuits to which they connect.

12.2. Control panel (FIGURE 50)

Several references have previously been made to the signals originating on the control panel. The latter is shown in FIGURE 50.

The "initial clear" switch is provided for the purpose of clearing all counters and flip-flops (see description of the counter and FIGURE 31), either at the beginning of a processing operation or at any time when it is necessary to start with all circuits in the reset state.

Pulse signals PCD, MED, and MRW are generated by pressing and releasing momentary-contact push buttons. Pressing one of these buttons causes a capacitor such as 500 to charge to a negative potential; releasing the button allows this capacitor to trigger the associated blocking oscillator, such as 501, which thereupon emits a standard pulse which can be used either directly or after gating, to set flip-flops or perform other operations.

The switches such as "one item halt" are shown in their normal positions; when operated, these switches remain in their alternative positions until manually returned to normal. Push buttons 1 and 2 associated with the OC plugboard also operate in this fashion.

"Neon" hubs on the OC plugboard are wired through any voltage amplifier, of a type well known in the art, which can amplify the 6 volt standard data signal used throughout the system to a signal approximately a swing of 60 to 90 volts to operate a common neon indicator lamp. "Illuminator" hubs serve essentially the same purpose as "neon" hubs, but are connected through current amplifiers which supply a sufficient signal, when the respective hub is energized, to actuate a small incandescent lamp. The latter produces a brighter indication than a neon lamp and is useful in cases where it is necessary for the operator to be able to see the indicator from a distance—say, from across the room.

In addition to the controls and indicators shown in FIGURE 50, the control panel will of course include suitable controls for turning on and off the main power source for the system and associated indicators. In practice the control panel may frequently include a number of additional indicators such as the neons and illuminators, each connected to show the status of some flip-flop in the system to assist the operator in making decisions as to the proper course of action in various situations. Typical examples of such indicators would be those associated with such flip-flops as F304 (FIGURE 20) or F6516 (FIGURE 19), which indicate situations requiring the operator to press the "proceed" button before operation can continue.

13. EXAMPLES OF PLUGBOARD WIRING

In order to illustrate the use of the system for a few simple data processing operations, the following examples of plugboard set-ups or "programs" have been given.

13.1. Passing data through the system (FIGURE 51 and FIGURES 52A and 52B)

Moving data which appear on magnetic tape of an input tape unit 10 to core memory, and then to magnetic tape of an output tape unit 30 is the cornerstone of all processing. This function must be accounted for in all data processing tasks involving input and output data.

FIGURES 51 and 52 show a method of wiring a program to create two copies of a magnetic tape which contains 100 digit records.

FDSC Board Wiring (FIGURE 51):

(1) One Field 100 digits in length was defined in the first series of FIELD DEFINITION hubs.

(2) The FIELD OUT hub, for the defined field, was wired to the A level of the fifth and sixth series of FIELD IN hubs.

(3) The fifth series of FIELD IN hubs are controlled to function on Scan #1, and the sixth series are controlled to function on Scan #2.

Operation Control Board Wiring (FIGURE 52): When the PROCEED SWITCH is depressed on the control panel—

(a) The first record on magnetic tape is automatically read into memory.

(b) After the first record is read in, the system automatically goes to Scan #1.

(1) The END FIELD impulse of the field defined (in this case, the entire record) is wired to SELECT INPUT MEMORY #1 to be moved, or transferred, to Output during the next Scan. When an Input is transferred to Output, it is transferred to *all* Output memories associated with the system.

(2) The END impulse is wired from the common side of SELECT INPUT MEMORY #1 to SELECT SCAN #2.

(3) During Scan #2, Input #1 is being transferred to all Output memories. At the END of this Scan, an END FIELD impulse is wired to—

(a) INPUT ITEM STEP #1 which makes the next input record available for processing.

(b) OUTPUT ITEM STEP #1 and #2 which accepts the transferred record in *both* output memories.

(c) SELECT SCAN #1 which will cause the complete cycle to take place for the next record being processed.

If the records being processed were unit records, the STEP INPUT and OUTPUT impulses would initiate a Read and Write of data on tape during each processing cycle. If group or block records were being processed, Reads and Writes would be initiated in accordance with the rules outlined for *memory switching in the input and output memory units*. The program shown in FIGURE 51 would function without modification on both unit and grouped records.

13.2. Selecting records on the basis of digit analysis (FIGURE 53 and FIGURES 54A and 53B)

The wiring required to select certain types of records from a file of input records, is an example of a program on which some actions will occur in all processing cycles, and other actions will occur only if a certain condition is present. The wiring for "Passing Data Through the System," is an example of a program on which every action wired occurred on each processing cycle.

Digit position 11 (i.e., the 11th character of each record) identifies the Type, or classification, of a 150 character record. The Type of records are coded A through Z. The wiring required to Select all Type "E" and Type "H" records from the file of input records is shown in FIGURES 53 and 54.

FDSC Board Wiring (FIGURE 53):

(1) Two Fields were defined—

(a) The Type Code field (position 11) was defined in the first series of FIELD DEFINITION HUBS.

(b) The last digit position of the 150 character record was defined as a Field in the tenth series of FIELD DEFINITION HUBS.

(2) The Type Code field is controlled to be available during Scan #1, and the last digit position field is controlled to be available during Scan #2.

Operation Control Board Wiring (FIGURE 54):

(1) A FIELD EXIT for the Type Code field is wired to the CONTROL hub of the DIGIT ANALYZER.

(2) Data are made available for analysis by wiring from MEMORY 1 DATA OUT to the DATA IN hub of the DIGIT ANALYZER.

(3) The result of the digit analysis, made during the Type Code field time, is wired to SWITCHES 11 and 14 from exit hubs of the DIGIT ANALYZER—

(a) If the Type Code was an "E," SWITCH 11 was SET ON so that future use could be made of the analysis.

(b) If the Type Code was an "H," SWITCH 14 was SET ON.

(c) If the Type Code was not an "E" or an "H," neither SWITCH 11 nor 14 would have been SET ON.

(4) At the END of the Type Code field, because no further processing was required on Scan #1, the SELECT INPUT MEMORY #1 was impulsed; and SCAN #2 was SELECTED.

(5) At the END of Scan #2, the last digit position END FIELD impulse is used in conjunction with the impulse (if any) from the ON side of SWITCHES 11 and 14 to control the OUTPUT ITEM STEP—

(a) The ON impulse of SWITCH 11 is wired to AND CIRCUIT 45. THE END FIELD impulse is also wired to AND 45. If *both* impulses were present, an impulse would be available from AND CIRCUIT OUTPUT 45 which is wired to OUTPUT ITEM STEP 1.

(b) The wiring to AND 47 co-ordinates the SWITCH 14 and END FIELD impulses for the control of the impulse to OUTPUT ITEM STEP 2.

(c) If neither SWITCH 11 or 14 were on (Type Code not an "E" or "H"), neither of the Output memories would have been STEPPED.

(6) The END FIELD IMPULSE is carried on to—

(a) INPUT ITEM STEP 1.

(b) SWITCH RESET 11 and 14—

(1) This will return the SWITCHES to the OFF position. The signal which triggers the individual RESET of a SWITCH occurs at the *end* of the impulse wired to the RESET hub. This allows use of the ON impulse from the SWITCH *during* the time the SWITCH is impulsed to RESET.

(c) SELECT SCAN #1.

As a result of this wiring, all of the input records which had a Type Code of "E" would be written on the Tape Transport associated with Output memory #1. All "H" records would be on the Tape Transport which accepts the information from Output memory #2. All other Input records would have been disregarded.

13.3. Selecting records on the basis of a comparison (FIGURE 55 and FIGURES 56A and 56B)

The first 10 digits of the record previously described represent the Account Number, and control the sequence of all records in the file.

(c) For the purpose of this program it was assumed that the Master File and the Transaction Record had the same format. Field definition of the Account Number and last digit position of the record will apply to both records.

Operation Control Board Wiring (FIGURE 56):

(1) The FIELD EXIT hub of the Account Number field was wired to the CONTROL hub of COMPARATOR #1. This will allow the COMPARATOR to function for the duration of the 10 digit Account Number field.

(2) Data were introduced from MEMORY DATA OUT #1 (Master File), and MEMORY DATA OUT #2 (Transactions).

(3) If the result of the Comparison is Equal, the A Equals B impulse is co-ordinated with the Account Number END FIELD impulse in AND CIRCUIT 37 to effect the following functions—

(a) Set SWITCH 12 ON to remember the result of the Comparison.

(b) SELECT INPUT MEMORY #1 for transfer to Output memory during the next Scan.

(c) SELECT SCAN #2.

(4) If the Master File Account Number was less than the Transaction, the A Less Than B impulse was coordinated with the END FIELD impulse in AND CIRCUIT 40.

(5) AND CIRCUIT OUTPUT 40 will emit an impulse only if the result of the comparison is A Less Than B. AND OUTPUT 40 executes the following actions when the Master File is less than the Transaction record—

(a) Wired to OR CIRCUIT 1. The OR CIRCUIT OUTPUT 1 will emit an impulse in this case to ITEM STEP INPUT #1. This is done because the Master File Record currently being processed is not one that will be Selected and it is desired to process the next record.

(b) The common hub of ITEM STEP INPUT 1 is wired to OR 3. The OR OUTPUT 3 is wired to SELECT SCAN #1 to start a new processing cycle.

(6) When an A Greater Than B Comparison results, it is also co-ordinated with the Account Number END FIELD impulse (AND 43). In this case, the Master File is greater than the Transaction record, which can be classified as an erroneous condition. A wire from AND OUTPUT 43 to HALT will stop the operation of the system when this condition exists.

(7) At the END of Scan #2, the last digit position END FIELD impulse is wired to AND 45 along with the ON impulse from SWITCH 12. The AND OUTPUT 45 impulse is wired to OR 1, the OUTPUT of which impulses ITEM STEP INPUT 1 as in the case of an A Less Than B condition. When either of the impulses wired to OR 1 is present, ITEM STEP INPUT 1 would be energized.

(8) The common side of the AND 45 impulse wired to OR 1 is wired to—

(a) ITEM STEP INPUT 2 to make the next Transaction record available for processing on the next cycle.

(b) ITEM STEP OUTPUT 1 to accept the transferred record in Output memory 1.

(c) SWITCH RESET 12 to reinitialize the setting of SWITCH 12 for the next processing cycle. This is effected from a common hub in OR 3.

(d) SELECT SCAN #1 rom OR OUTPUT 3.

Analysis of this program would indicate that it would not be reqiured to set SWITCH 12. This is true because Scan #2 is encountered *only* when an EQUAL condition exists. However, in more complex programs the wiring indicated would be the normal method employed.

13.4. Modifying records with aligned memory fields (FIGURE 57 and FIGURES 58A and 58B)

Assume a 100 digit Master Record with the Account Number in positions 1 through 10 and the Street Address and City/State in digit positions 36 through 83. The Transaction record represents a Change of Address. The new address also appears in positions 36 through 83. It is desired to insert the new address in the Master Record whenever there is a match between the Master and the Transaction records. FIGURES 57 and 58 show the wiring required to perform this function.

Operation Control Board Wiring (FIGURE 58):

(1) The Account Number of the Master and Transaction records are compared in COMPARATOR #1.

(2) If the result of the Comparison was equal, the A Equals B impulse is co-ordinated with the Account Number END FIELD impulse in AND 37 to—

(a) Set SWITCH 9 on.
(b) SELECT INPUT MEMORY #1 via OR5.
(c) SELECT SCAN #2.

(3) If a Less Than comparison resulted, the A Less Than B impulse is conditioned with the Account Number END FIELD in AND 39 to—

(a) SELECT INPUT MEMORY #1 via OR5.
(b) SELECT SCAN #2.

(4) If a Greater Than comparison resulted, the system is stopped.

(5) On Scan #2 when the Address field is encountered, the appropriate FIELD EXIT impulse is wired to AND 45. The ON impulse from SWITCH 9 is also wired to AND 45.

(6) If a Modification should be effected during SCAN #2 (SWITCH 9 ON), an impulse will be received at the ALLOW (A) hub of MODIFY #1 from AND 45 for the duration of the Address field. Data from Input memory 2 (Transaction record) are wired to the DATA (D) hub of MODIFY #1. If there was not a match between the Master File and the Transaction Record during Scan #1 (SWITCH 9 OFF), no Modification would take place.

(7) At the END of Scan #2, the END FIELD impulse of the last digit position is wired to function as follows—

(a) If SWITCH 9 is ON, an impulse from AND 46 will ITEM STEP INPUT #2 to make the next Transaction available for processing.

(b) SWITCH 9 is RESET to the OFF position.

(c) ITEM STEP INPUT #1 is impulsed to make the next Master record available for processing.

(d) ITEM STEP OUTPUT #1 is impulsed to accept the Master Record most recently transferred. This applies to both the modified and unmodified records.

(e) SELECT SCAN #1 to start a new processing cycle.

As a result of the wiring in FIGURES 57 and 58, a new Master File is created. If a Change of Address applied to the record, the new address is inserted in the proper field. If a Change of Address did not apply, the record would appear unchanged on the new tape.

13.5. Adding (FIGURES 59 and FIGURES 60A and 60B)

Assume a 100 digit Sales History record. The "Sales This Year" field (digits 83 through 87) represents the total amount of sales to the account for the current year. The "Total Sales Previous Years" (digits 88 through 95) represents the total of all sales made to the account in all previous years.

At year end, it is desired to add "Sales This Year" to "Total Sales Previous Years," and place zeros in the "Sales This Year" field. This is to be done for all accounts. FIGURES 59 and 60 show the wiring required to perform this processing.

FDSC Board Wiring (FIGURE 59):

The "Sales This Year," "Total Sales Previous Years" and Miscellaneous (digits 96 through 100) fields were defined and all of them are controlled to be available during Scan #1 and #2. Storage field #1 was defined as an 8 position field for the purpose of positioning the "Total Sales Previous Years" field for addition, and receiving the sum resulting from the addition. The bit configuration for a zero was set up at FIXED CHARACTER INPUTS #1. The latter two connections are made on section B of the FDSC plugboard and are not shown in FIGURE 59; they involve the following:

FBA3 to FBA1 and FBJ3 to FBA4 to define start of storage field; FBH8 to FBA6 and FBJ8 to FBA9 to define end of storage field; all other START BASE hubs (FBB4–5 through FBV4–5) chain-wired and connected to INHIBIT hub FBW2.

FBN21 wired to FBA21 to give the fixed character "zero" (note that "C" in the column to the right of the FIXED CHARACTER INPUTS field represents a parity bit, the only bit present in the character "zero" see Representation of Data).

Operation Control Board Wiring (FIGURE 60):

(1) During Scan #1, the FIELD EXIT hub for the "Sales This Year" field is wired to ADD IN CONTROL hub #1.

(2) Data are wired to ADDER DATA IN from MEMORY DATA OUT #1. Data will enter the ADDER during the time ADDER IN CONTROL is receiving an impulse.

(3) The FIELD EXIT hub for the "Total Sales Previous Years" field is wired to STORE IN CONTROL #1.

(4) Data are wired to STORE DATA IN #1 from MEMORY DATA OUT #1. Data will be allowed into Storage Field #1 during the time STORE IN CONTROL #1 is energized.

(5) Both factors involved in the addition are now postioned. The wire from the FIELD EXIT hub of the Miscellaneous field is wired to START ADD #1. This will initiate the addition and the result will appear in Storage Field #1.

(6) At the END of the Miscelalneous field, the FIELD END is wired to SELECT INPUT MEMORY #1 and SELECT SCAN #2.

(7) During Scan #2, the FIELD EXIT hub for the "Sales This Year" field is wired to MODIFY ALLOW #1.

(8) The zero wired to the FIXED CHARACTER INPUTS #1 on the FDSC Board is wired from the FIXED CHARACTER OUT #1 hub to MODIFY DATA (D) IN #1. During the time MODIFY ALLOW (A) #1 is energized, the record being transferred will be Modified with zeros.

(9) The FIELD EXIT hub for the "Total Sales Previous Years" field is wired to STORE OUT CONTROL and MODIFY ALLOW (A) #2. This allows the sum to be released from Storage Field #1 and the MODIFY #2 to function.

(10) Data are wired to MODIFY DATA IN #2 from the STORE DATA OUT hub. This will place the new sum in the "Total Sales Previous Years" field.

(11) The FIELD END impulse for the Miscellaneous field (end of record) is wired to INPUT ITEM STEP #1, OUTPUT ITEM STEP #1 and SELECT SCAN #1.

The wiring explained above pertains to addition of factors that appear in the same record. The same principles apply if the factors came from more than one memory. If the factors to be added are aligned, they can both be positioned simultaneously. This is, one factor can be going into the Adder, while the other factor is going into Storage. The START ADD impulse must consist of a field impulse which follows the last factor involved in the addition.

If it were desired to Subtract the "Sales This Year" from "Total Sales Previous Years," a wire would be taken from the common side of START ADD #1 to the SUB hub.

The foregoing examples have been confined to relatively simple programs, and are intended to serve only as illustrations of the elements of plugboard programming. Reference to the plugboard diagram (FIGURES 16 and 25) will disclose that the available facilities greatly exceed those required for the simple examples shown. For example, modification of records with non-aligned fields is easily accomplished by using the auxiliary storage unit to accept the field containing the new data during one scan, and release it at a different point in the record during a subsequent scan, thus in effect moving a field from one position in a record to a different position in the same or a different record.

In a similar fashion, the availability of several comparators capable of simultaneous operation permits the intercomparison of account numbers from several records simultaneously—an operation which is usually carried out sequentially rather than simultaneously in systems of prior art, and which is essential in the process of arranging in uniform sequence a group of records originally in random sequence. The multiple comparators and numerous available AND and OR circuits and SWITCHES for interpreting and remembering the results of comparisons make such simultaneous multiple comparisons very simple to set up.

Finally, the adder circuit and such other arithmetic circuits as a multiply-divide unit, which is not described in the system here presented but whose incorporation into the system can easily be accomplished by one skilled in the art, adds still further to the potential of the system, particularly when it is considered that the plugboard facilities permit addition, comparison, and arithmetic operations to take place simultaneously with the interlock feature of the scan circuits assuring that the operator cannot accidentally set up a conflicting operation, such as calling for a read-out of the sum from the auxiliary storage unit before an addition is complete.

14. CONCLUSION

The data processing system described is intended to be an illustrative example of one application of our invention, but it should be understood that the latter is subject to many variations without departing from the substance of the invention. Furthermore it should also be understood that there are many additional features of a data processing system which, while not essential to the operability of the system and not a part of our invention, would in all probability be included as a matter of convenience in a typical system. Such features would notably include a manual keyboard for insertion of data into the various memory and other storage units of the system, and a device for printing out on demand the contents of such units. Additional features which might be included in a typical system are certain status indicators for informing the operator of the condition of various flip-flops and counters, particularly those representing the existence of situations requiring operator intervention.

Since the inclusion of additional circuits such as those just mentioned would contribute nothing to the operability of the system, but on the other hand would add complicating and distracting details which would tend to make more difficult the understanding of the truly essential features of the invention, such extraneous circuits have in general been intentionally excluded.

What we claim is:

1. In a data processing system, at least two character-addressable memory units responsive to addressing and timing signals for accepting and delivering data; a primary counter common to all memory units, said primary counter including a stepping input, a clearing input, and circuits for emitting field signals corresponding to at least one contiguous sequence of stable states of said primary counter and a group of primary status signals uniquely indicative of the current state of said primary counter; a secondary counter associated with each memory unit including a stepping input, a clearing input, and circuits for emitting a group of secondary status signals uniquely indicative of the current state of said secondary counter; clearing inputs of said primary and all of said secondary counters being mutually independent; an addressing signal generator associated with each of said memory units and responsive jointly to said group of primary status signals and to the group of secondary status signals of the secondary counter associated with said memory unit; a plurality of simultaneously operable data processing circuits responsive to said field signals and to data signals from said memory units, certain of said processing circuits including facilities for inverting the normal sequence of data transfer; a plurality of timing signal generators, each associated with at least one of said processing circuits; certain of said memory units including loading facilities responsive to certain predetermined combinations of stepping and secondary status signals in the associated secondary counters for acceptance into said memory units of data from external data storage means; and certain of said memory units including unloading facilities responsive to certain predetermined combinations of stepping and secondary status signals in the associated secondary counters for transfer of data from said memory units to external storage means.

2. The system of claim 1 wherein no more than one of the timing signal generators is operable at any specified time.

3. The system of claim 1 wherein the stepping signal for the primary counter is obtained directly from a timing signal generator.

4. The system of claim 1 wherein the respective timing signal generators operate at different repetition rates.

5. In a character-addressable data memory unit employing a memory element having at least $mn$ addresses each selectable by a different set of addressing signals, where $m$ and $n$ are integers, a first address register having $m$ stable states each characterized by the emission of a first unique set of status signals, a second address register having $n$ stable states each characterized by the emission of a second unique set of status signals, and a combining circuit responsive to said first and second sets of status signals to produce a set of addressing signals corresponding uniquely to one of the $mn$ addresses.

6. In a character-addressable data memory unit: an address counter adapted for counting in a first sequence in response to a first series of stepping signals, and in a second sequence in response to a second series of stepping signals; a storage unit responsive to said first series of stepping signals to record the current status of said counter upon receipt of each of said first series of stepping signals; and a presetting circuit responsive to said storage unit and to a signal preceding the first of said second series of stepping signals to preset said counter to the status recorded in said storage unit.

7. In a character-addressable data memory unit employing a memory element having at least $mn$ addresses each selectable by a different set of addressing signals, where $m$ and $n$ are integers, and where each set of addressing signals represents in coded form an integer equal to or less than $mn$, a first address register having $m$ stable states each characterized by the emission of a first unique group of status signals representing in coded form an integer equal to or less than $m$, a second address register having $n$ stable states each characterized by the emission of a second unique group of status signals representing in coded form an integer which is an integral multiple of $m$, and an addressing signal generator consisting of a circuit representing in coded form the sum of said first and second groups of status signals.

8. In a character-addressable data memory unit employing a memory element having at least $2^p$ addresses, any address being selectable by means of a group of $p$ binary coded addressing signals, a first address register consisting of $m$ binary stages, where $m$ is equal to or less than $p$ and whose output signals constitute a first group of $m$ binary coded signals capable of representing $2^m$ binary numbers, a second address register consisting of $n$ binary stages, where $n$ is equal to or less than $m$ and whose outputs constitute a second group of $n$ binary coded signals capable of representing $2^n$ binary numbers, a binary number translator responsive to said second group of binary coded signals to produce, for each of said $2^n$ binary numbers, a third group of binary coded signals representing a different integral multiple of $m$, and an $m$-digit binary adder whose augend and addend inputs are said first and said third groups of binary coded signals, and whose sum outputs constitute the aforementioned group of $p$ binary coded addressing signals.

9. In an addressable data memory unit having a plurality of addressed storages each selectable by a unique addressing signal, a first address register having a plurality of stable states each characterized by the emission of a first distinctive signal, a second address register having a plurality of stable states each characterized by the emission of a second distinctive signal, and a combining circuit producing a different one of said unique addressing signals in response to each possible combination of said first and second distinctive signals.

10. A multi-state counter having a stepping input, a clearing input, and emitting status output signals each uniquely indicative of the current state of said counter; at least one timing signal generator having a timer actuating input and an output connected to said stepping input and supplying stepping signals at a predetermined uniform repetition rate during the presence of a signal at said timer actuating input; a plurality of field signal generators each activated by a specific predetermined one of said status output signals and deactivated by a different specific predetermined one of said status output signals, and having an output signal present during activation; and a plurality of scan control circuits each having a signal initiating input and a scan control output connected to said timer actuating input and to first inputs of a plurality of gating circuits, second inputs of said gating circuits being connected to certain of said field signal generator outputs, output signals from said gating circuits being present only during the presence of both input signals.

11. In a data processing system: at least one source of cyclically repetitive timing signals, at least one data memory unit responsive to said timing signals and to a counter stepped by said timing signals to deliver sequential data signals representative of data stored in said memory unit; a plurality of signal generators each responsive to said counter to deliver a control signal coincident in time with a particular predetermined consecutive sequence of said data signals; a plurality of mutually independent data processing circuits each responsive jointly to at least one data signal and a control signal coincident in time therewith; means for selectively routing certain of said data signals and certain of said control signals to said processing circuits; and utilization circuits selectively associable with said processing circuits.

12. In a data processing system: at least two sources of cylically repetitive timing signals; a timer selection circuit responsive to a plurality of specific combinations of timer selection signals to select a specific source of timing signals in the presence of each combination; at least one data memory unit responsive to said timing signals and to a counter stepped by said timing signals to deliver sequential data signals representative of data stored in said data memory unit; at least one source of processing control signals; a plurality of data processing circuits, each responsive to said control signals and said data signals, each of said processing circuits including a timer selection signal source.

13. In a data processing system for processing multi-character items on the basis of contiguous characters within an item defining a field to be scanned, a plugboard for establishing the field to be scanned, said plugboard having character selection hubs corresponding to the characters of an item, and start-of-field and end-of-field hubs wired respectively to the character selection hubs corresponding to the limits of the selected field, whereby completely to define the selected field.

14. In a data processing system for processing multi-character items on the basis of contiguous characters within an item defining a field to be scanned, a plugboard for establishing the field to be scanned, said plugboard having units and base character selection hubs, units and base start-of-field hubs, and units and base end-of-field hubs, the units character selection hubs being numerically orderd up to a predetermined number and the base character selection hubs being ordered in multiples of said predetermined number such that a desired character number is established by the character selection hubs appropriate for such number, namely a base character selection hub and a units character selection hub whose ordered number total corresponds to the desired character number, one each units and base start-of-field hub being wired to an appropriate units and base character selection hub respectively, and one each units and base end-of-field hub being wired to an appropriate units and base character selection hub respectively, the two last-mentioned sets of appropriate units and base character selection hubs corresponding to the limits of the selected field, whereby completely to define the selected field.

15. In a data processing system for processing items consisting of serially addressable characters on the basis of contiguous characters within in item defining a fie'd to be scanned, means for generating a field-scanning signal spanning the field to be scanned, comprising means providing timewise spaced character count signals corresponding to the characters of an item, means settable to designate limiting characters for the field to be scanned and providing signal paths for the respectively corresponding character count signals, and means connected to said signal paths and responsive to the limiting character count signals to initiate and terminate said field-scanning signal.

16. In a data processing system for processing items consisting of serially addressable characters on the basis of contiguous characters within an item defining a field to be scanned, means for generating a field-scanning signal spanning the field to be scanned, comprising means providing timewise spaced character count signals corresponding to the characters of an item, means settable to designate limiting characters for the field to be scanned and providing signal paths for the respectively corresponding character count signals, and means including a flip-flop connected to said signal paths and settable and resettable in response to the limiting character count signals to initiate and terminate said field-scanning signal.

17. In a data processor having a plurality of subsystems at least some of which are operable in plural operational modes, means providing signals corresponding to the plurality of operational modes of a given subsystem, timing signal generating means providing timing signals at a plurality of different rates, a plurality of gating means each activatable in response to respective operational-mode-signals corresponding to a given operational mode required of said given subsystem, and means to apply to a given activatable gating means such of said timing signals as have rates most compatible for said given required operational mode for executing such operational mode at optimum speed.

18. In a data processor having a plurality of subsystems at least some of which are operable in plural operational modes, means providing signals corresponding to the plurality of operational modes of a given subsystem, a plurality of timing signal generators each providing timing signals at rates different from the timing signal rates of a given other timing signal generator, a plurality of gating means each activatable in response to respective operational-mode-signals corresponding to a given operational mode required of said given subsystem, and means to apply to a given activatable gating means timing signals from that timing signal generator which produces timing signals at rates most compatible for said given operational mode for executing such operational mode at optimum speed.

19. In a data processor having a plurality of subsystems at least some of which are operable in plural operational modes, means providing signals corresponding to the plurality of operational modes of a given subsystem, timing signal generating means providing timing signals at a plurality of different rates, a plurality of gating means each activatable in response to respective operational-mode-signals corresponding to a given operational mode required of said subsystem, means for normally applying to a given activatable gating means the timing signals having the fastest rates, and means for alternatively applying to said given activatable gating means such slower rate timing signals as have rates most compatible for said given operational mode for executing such operational mode at optimum speed.

20. In a data processor having a plurality of subsystems at least some of which are operable in plural operational modes, means providing signals corresponding to the plurality of operational modes of a given subsystem, a plurality of timing signal generators each providing timing signals at rates different from the timing signal rates of a given other timing signal generator, a plurality of gating means each activatable in response to respective operational-mode-signals corresponding to a given operational mode required of said given subsystem, means for normally applying to a given activatable gating means timing signals from the fastest timing signal generator, and means for alternatively applying to said given activatable gating means timing signals from such slower timing signal generator as provides timing signals most compatible for said given operational mode for executing such operational mode at optimum speed.

21. In a data processor: a pair of data memory units, means for transferring data from one memory unit to the other, and timing means for controlling the data transferring means to cause the transfer of data between said units at a desired one of several different rates of operation of said timing means.

22. In a data processor: a data storage device, means for transferring data to said storage device, and timing means for controlling the data transferring means to cause the transfer of data to said data storage device at a desired one of several different rates of operation of said timing means.

23. In a data processor: a data storage device, means for transferring data from said storage device, and timing means for controlling the data transferring means to cause the transfer of data from said data storage device at a desired one of several different rates of operation of said timing means.

24. In a data processing system: a plurality of data storage devices for storing characters arranged in bits; means for reading data out from a storage device, and means for writing data into a storage device, said latter two means being operable selectively serial by character, parallel by bit, and serial by character, serial by bit.

25. In a data processing system: a memory having a plurality of sequentially addressable data storage locations, an address counter that is steppable in correspondence with said data storage locations, and means for stepping said address counter at a desired one of several different available rates.

26. In a data processing system: a memory having a plurality of sequentially addressable data storage locations each for storing a character arranged in bits; an address counter that is steppable in correspondence with said data storage locations; a first data transfer path connected to said memory for transferring data serial by character, parallel by bit; a second data transfer path connected to said memory for transferring data serial by character, serial by bit; means for stepping said address counter at a first rate when no data transfer is to take place; means for stepping said address counter at a second and slower rate and in synchronism with data transfer via said first data transfer path; and means for stepping said address counter at a third and still slower rate and in synchronism with data transfer via said second data transfer path.

27. In a data processing system: a pair of memories each having a plurality of sequentially addressable memory locations each in turn for storing a character arranged in bits; means for addressing memory location; in each memory; a pair of alternative data transfer paths interconnecting said memories; means for transferring data between said memories serial by character, parallel by bit via one of said data transfer paths and at a first rate; and means for transferring data between said memories serial by character, serial by bit via the other of said transfer paths and at a second and slower rate.

28. In a data processing system: a pair of memories each having a plurality of sequentially addressable memory locations each in turn for storing a character arranged in bits; means for addressing memory locations in each memory; a first, and a second alternative data transfer path interconnecting said memories, each including a data processing station; means for transferring data between said memories serial by character, parallel by bit, via said first data transfer path and its data processing station at a first rate; and means for transferring data between said memories serial by character, serial by bit, via said second data transfer path and its processing station at a second and slower rate.

29. In a data processing system: a pair of memories each having a plurality of sequentially addressable memory locations each in turn for storing a character arranged in bits; means for addressing memory locations in each memory; a first, and a second alternative data transfer path interconnecting said memories, the latter including a data processing station; means for transferring data between said memories serial by character, parallel by bit, via said first data transfer path at a first rate; and means for transferring data between said memories serial by character, serial by bit, via said second data transfer path and its processing station at a second and slower rate.

30. In a data processing system: a pair of memories each having a plurality of sequentially addressable memory locations each in turn for storing a character arranged in bits; means for addressing memory locations in each memory; means for transferring data between said memories via a first transfer path and at a first rate compatible with a transfer serial by character, parallel by bit throughout said first transfer path; and means for transferring data between said memories via a second and alternative transfer path, including a serializer for serializing the originally parallel bits of each serially transferred character, means for processing the characters serially by bit, and means for reparallelizing the bits of the processed characters prior to completion of the transfer, the data being transferred via said second path at a second and slower rate compatible with the mentioned serializing, processing and reparallelizing operations in said second path.

31. In a data processing system: a pair of memories each having a plurality of sequentially addressable memory locations each in turn for storing a character arranged in bits; means for addressing memory locations in each memory; means for transferring data between said memories via a first transfer path including a processing station and at a first rate compatible with a transfer serial by character, parallel by bit throughout said first transfer path; and means for transferring data between said memories via a second and alternative transfer path, including a serializer for serializing the originally parallel bits of each serially transferred character, means for processing the characters serially by bit, and means for reparallelizing the bits of the processed characters prior to completion of the transfer, the data being transferred via said second path at a second and slower rate compatible with the mentioned serializing, processing and reparallelizing operations in said second path.

32. In a data processing system: a plurality of output memories each capable of storing at least two data records containing predetermined numbers of characters, addressing means associated with each memory and coactive with data transfer means to enter the same record into all memories replacing data previously entered in the same addresses, said addressing means normally directing subsequent records into the same addresses but upon receipt of a stepping signal directing subsequent records into subsequent addresses, and means for generating said stepping signal and applying it selectively to certain of said addressing means.

33. In a data processing system: a plurality of output memories each capable of storing at least two data records containing predetermined numbers of characters, addressing means associated with each memory and coactive with data transfer means to enter the same record into all memories replacing data previously entered in the same addresses, said addressing means normally directing subsequent records into the same addresses but upon receipt of a stepping signal directing subsequent records into subsequent addresses, and means for generating said stepping signal and applying it selectively to certain of said addressing means, whereby records entered into certain of said memories are protected from erasure.

34. In a data processing system in which data are arranged in multi-character records, a plurality of memory units some of which are capable of storing at least two such records, addressing means and data transfer means associated with each memory coactive to transfer a record simultaneously into predetermined addresses in all of said memories erasing data previously stored in said predetermined addresses, each of said addressing means normally directing subsequent records into the same addresses previously used, but responsive to receipt of a stepping signal to direct subsequent records into addresses different from those previously used.

35. In a data processing system in which data are arranged in multi-character records, a plurality of memory units some of which are capable of storing at least two such records, addressing means and data transfer means associated with each memory coactive to transfer a record simultaneously into predetermined addresses in all of said memories erasing data previously stored in said predetermined addresses, each of said addressing means normally directing subsequent records into the same addresses previously used, but responsive to receipt of a stepping signal to direct subsequent records into addresses different from those previously used whereby records spuriously entered are replaced by subsequent records and records correctly entered are not disturbed by subsequent records.

36. In a data processing system, a plurality of transportable record media on which data are to be recorded; individual recording means and transport means for each medium; means for feeding the same data to all said recording means simultaneously, and means for activating said transport means selectively.

37. In a data processing system, a plurality of transportable record media on which data are to be recorded; individual recording means and transport means for each medium; means for feeding the same data to all said recording means simultaneously; and means for activating said transport means selectively, whereby said data are actually recorded only on those of said media whose transport means have been activated.

38. In a data processing system, a memory for storing plural items to be processed, an item counter, means providing a signal upon completion of processing of a given item to step said counter to designate the next item for processing, selector means settable to signify the item count intended to correspond to the last item in a given memory load, means responsive to matching of the count stored in the item counter and in the selector means for emitting a signal indicating that the last item of the current memory load is being processed, and means responsive to the latter signal and the next ensuing stepping signal for emitting a signal calling for reloading the memory with a new set of items.

39. In a data processing system, a memory for storing plural items to be processed, an item counter, means providing a signal upon completion of processing of a given item to step said counter to designate the next item for processing, selector means settable to signify the item count intended to correspond to the last item in a given memory load, means responsive to matching of the count stored in the item counter and in the selector means for emitting a signal indicating that the last item of the current memory load is being processed, and means responsive to the latter signal and the next ensuing stepping signal for emitting a signal calling for reloading the memory with a new set of items and for clearing the item counter to an initial count.

40. In a data processing system, a memory for storing plural items to be processed, an item counter, means providing a signal upon completion of processing of a given item to step said counter to designate the next item for processing, selector means settable to signify the item count intended to correspond to the last item in a given memory load, means responsive to matching of the count stored in the item counter and in the selector means for emitting a signal indicating that the last item of the current memory load is being processed, and means responsive to the latter signal and the next ensuing stepping signal for emitting a signal calling for disposing of the contents of the memory.

41. In a data processing system, a memory for storing plural items to be processed, an item counter, means providing a signal upon completion of processing of a given item to step said counter to designate the next item for processing, selector means settable to signify the item count intended to correspond to the last item in a given memory load, means responsive to matching of the count stored in the item counter and in the selector means for emitting a signal indicating that the last item of the current memory load is being processed, and means responsive to the latter signal and the next ensuing stepping signal for emitting a signal calling for disposing of the contents of the memory and for clearing the item counter to an initial count.

42. In a data processing system, two data storage memories for storing plural multi-character items, one of said memories at a given time being currently available for processing of its contents while the other is concurrently available for loading with contents to be processed in the future; an item counter that is associated with whichever memory constitutes said one memory at a given time, means also associated with such one memory for providing a signal upon completion of processing of a given item in such one memory to step said counter to designate the next item for processing, selector means also associated with such one memory and settable to signify the item count intended to correspond to the last item in a given load of such one memory; means also associated with such one memory and responsive to matching of the count stored in the item counter and in the selector means for emitting a signal indicating that the last item of the current load of such one memory is being processed, means responsive to the latter signal and the next ensuing stepping signal for emitting a signal indicating that such one memory is exhausted; means associated with whichever memory constitutes said other memory at a given time for transferring a predetermined number of characters from an external storage medium to such other memory, means associated with such other memory for emitting a signal indicating that such other memory is loaded with said predetermined number of characters; and means responsive to the two emitted signals for interchanging the functions of the two memories and their mentioned respectively associated means.

43. In a data processing system, two data storage memories for storing plural multi-character items, one of said memories at a given time being currently available for processing of its contents while the other is concurrently available for loading with contents to be processed in the future; an item counter that is associated with whichever memory constitutes said one memory at a given time, means also associated with such one memory for providing a signal upon completion of processing of a given item in such one memory to step said counter to designate the next item for processing, selector means also associated with such one memory and settable to signify the item count intended to correspond to the last item in a given load of such one memory; means also associated with such one memory and responsive to matching of the count stored in the item counter and in the selector means for emitting a signal indicating that the last item of the current load of such one memory is being processed, means responsive to the latter signal and the next ensuing stepping signal for emitting a signal indicating that such one memory is exhausted; and for clearing said item counter to an initial count; means associated with whichever memory constitutes said other memory at a given time for transferring a predetermined number of characters from an external storage medium to such other memory, means associated with such other memory for emitting a signal indicating that such other memory is loaded with said predetermined number of characters; and means responsive to the two emitted signals for interchanging the functions of the two memories and their mentioned respectively associated means.

44. In a system having a transportable record medium on which are recorded data arranged in blocks, readout means for reproducing the recorded data and for sensing block-to-block separations, means for counting the separations and settable to a desired number of such separations, and record medium transport means responsive to the counting means attaining said desired number to halt further record medium transport.

45. In a system having a transportable record medium on which data are to be recorded, means for transporting said medium, storage means for storing said data, means for transferring the data from the storage means to the record medium and including means for recording the data onto said record medium and for inserting on said record medium separations between blocks of data, means for counting the separations and settable to a desired number of such separations, and means responsive to the counting means attaining said desired number to halt further record medium transport.

46. A data storage medium having data recorded thereon in a plurality of discrete groups followed by an end-of-data indication, a data memory unit having a storage capacity of at least two of said groups, data transfer circuits connecting said data storage medium with said data memory unit and including a circuit presettable to transfer a predetermined number of said groups in response to a single transfer initiating signal, and a storage circuit responsive to said end-of-data indication to indicate the actual number of groups transferred in response to the transfer initiating signal immediately preceding said end-of-data indication.

47. In a data processing system in which data input cycles alternate with data processing cycles and in which a predetermined number of discrete data groups is read in on each input cycle and is processed on each processing cycle, a storage circuit operation during the data input cycle to register the actual number of groups read in, and during the next following processing cycle to terminate such cycle after said actual number of groups has been processed.

48. A data storage medium capable of accepting data for recording thereon in a plurality of discrete groups followed by an end-of-data indication; a data memory unit having a capacity of at least two of said groups; first data transfer circuits connecting said memory unit with at least one source of data and including a circuit presettable to transfer a predetermined number of said groups to said memory unit and to generate an output initiating signal upon completion of said transfer; second data transfer circuits connecting said memory unit with said data storage medium and including a circuit presettable to transfer said predetermined number of said groups to said storage medium in response to said output initiating signal; an alternative output initiating signal source; a storage unit responsive to said alternative output initiating signal to register the actual number of groups transferred to said memory unit prior to occurrence of said alternative initiating signal, and circuits responsive to said alternative output initiating signal and to said storage unit indication to record an end-of-data indication on said data storage medium following transfer from said data memory unit to said data storage medium of said actual number of groups.

49. In a data processing system in which data processing cycles alternate with data output cycles and in which a predetermined number of discrete data groups is processed on each processing cycle and is transferred to a data storage medium on each output cycle, a storage circuit operative during the processing cycle to register the actual number of groups processed, and during the next following output cycle to terminate such cycle after said actual number of groups has been recorded.

References Cited by the Examiner

UNITED STATES PATENTS

| 2,991,454 | 7/1961 | Hammer | 340—172.5 |
|---|---|---|---|
| 3,056,110 | 9/1962 | Cypser et al. | 340—172.5 |
| 3,107,342 | 10/1963 | Estrems et al. | 340—172.5 |

OTHER REFERENCES

December 1, 1959—Publication: IBM Reference Manual/Ramac 305, form A26-3502-3.

ROBERT C. BAILEY, *Primary Examiner.*

MALCOLM A. MORRISON, *Examiner.*

W. M. BECKER, *Assistant Examiner.*